United States Patent
Komatsu et al.

(10) Patent No.: US 7,576,509 B2
(45) Date of Patent: Aug. 18, 2009

(54) DRIVE CONTROL METHOD, DRIVE CONTROL DEVICE, BELT APPARATUS, IMAGE FORMING APPARATUS, IMAGE READING APPARATUS, COMPUTER PRODUCT

(75) Inventors: Makoto Komatsu, Kanagawa (JP); Toshiyuki Andoh, Kanagawa (JP); Yoshihiro Sakai, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 389 days.

(21) Appl. No.: 10/937,447

(22) Filed: Sep. 10, 2004

(65) Prior Publication Data

US 2005/0099153 A1    May 12, 2005

(30) Foreign Application Priority Data

| Sep. 10, 2003 | (JP) | ............................... 2003-319038 |
| Sep. 18, 2003 | (JP) | ............................... 2003-326822 |
| Sep. 19, 2003 | (JP) | ............................... 2003-328598 |
| Nov. 6, 2003  | (JP) | ............................... 2003-376433 |
| Jun. 21, 2004 | (JP) | ............................... 2004-182596 |

(51) Int. Cl.
    *G05B 19/10* (2006.01)
(52) U.S. Cl. ...................................... 318/567; 318/807
(58) Field of Classification Search ......... 318/560–650, 318/807
    See application file for complete search history.

(56) References Cited

U.S. PATENT DOCUMENTS

| 4,655,579 | A |   | 4/1987 | Adachi et al. |
| 4,662,739 | A |   | 5/1987 | Sakai et al. |
| 4,664,501 | A |   | 5/1987 | Koizumi et al. |
| 4,690,541 | A |   | 9/1987 | Sakai et al. |
| 4,690,542 | A |   | 9/1987 | Furuta et al. |
| 4,717,965 | A |   | 1/1988 | Mashiko et al. |
| 4,742,371 | A |   | 5/1988 | Furuta et al. |
| 4,746,950 | A |   | 5/1988 | Mamizuka et al. |
| 4,750,017 | A |   | 6/1988 | Sakai |
| 4,796,050 | A |   | 1/1989 | Furuta et al. |
| 4,858,158 | A | * | 8/1989 | Ishikawa ..................... 702/176 |

(Continued)

FOREIGN PATENT DOCUMENTS

JP    60-110016    6/1985

(Continued)

OTHER PUBLICATIONS

U.S. Appl. No. 11/495,639, filed Jul. 31, 2006, Komatsu et al.

(Continued)

*Primary Examiner*—Bentsu Ro
*Assistant Examiner*—David S Luo
(74) *Attorney, Agent, or Firm*—Oblon, Spivak, McClelland, Maier & Neustadt, P.C.

(57) ABSTRACT

Driving of a pulse motor is controlled in such a manner that a rotating body driven by the pulse motor rotates at a uniform angular velocity. Angular displacement of the rotating body is detected, a difference between a detection value of the angular displacement and a target value of angular displacement set in advance is calculated, and a drive pulse frequency of a drive pulse signal to be used for driving the pulse motor is calculated based on the difference and a reference drive pulse frequency. Whether the difference is added to the reference drive pulse can be selected.

94 Claims, 55 Drawing Sheets

U.S. PATENT DOCUMENTS

| | | | |
|---|---|---|---|
| 4,922,301 A | 5/1990 | Katoh et al. | |
| 4,933,727 A | 6/1990 | Mizuma et al. | |
| 5,121,170 A | 6/1992 | Bannai et al. | |
| 5,130,583 A | 7/1992 | Andoh | |
| 5,160,969 A | 11/1992 | Mizuma et al. | |
| 5,265,188 A | 11/1993 | Andoh | |
| 5,289,088 A | 2/1994 | Andoh | |
| 5,321,475 A | 6/1994 | Horiuchi et al. | |
| 5,404,206 A | 4/1995 | Andoh et al. | |
| 5,448,145 A * | 9/1995 | Iwashita | 318/568.15 |
| 5,545,381 A | 8/1996 | Iida et al. | |
| 5,612,766 A | 3/1997 | Iida et al. | |
| 5,631,691 A | 5/1997 | Furuta et al. | |
| 5,684,374 A * | 11/1997 | Chaffee | 318/616 |
| 5,705,748 A * | 1/1998 | Moench | 73/462 |
| 5,819,143 A | 10/1998 | Sakai et al. | |
| 5,825,398 A | 10/1998 | Furuta et al. | |
| 5,926,670 A | 7/1999 | Furuta et al. | |
| 5,937,232 A | 8/1999 | Taguchi et al. | |
| 6,031,633 A | 2/2000 | Andoh et al. | |
| 6,057,869 A | 5/2000 | Kawaishi et al. | |
| RE37,197 E | 5/2001 | Iida et al. | |
| 6,320,344 B1 * | 11/2001 | Sakamoto et al. | 318/567 |
| 6,590,358 B1 * | 7/2003 | Tsutsui | 318/560 |
| 6,672,175 B2 * | 1/2004 | Jin et al. | 73/862.326 |
| 6,842,602 B2 * | 1/2005 | Kudo | 399/303 |
| 6,873,129 B1 * | 3/2005 | Leverett et al. | 318/605 |
| 6,930,458 B2 * | 8/2005 | Akiyama et al. | 318/376 |
| 6,949,896 B2 * | 9/2005 | Andoh et al. | 318/135 |
| 7,014,378 B2 * | 3/2006 | Saito et al. | 400/582 |
| 2003/0034375 A1 * | 2/2003 | Kumatori | 226/118.2 |
| 2004/0138530 A1 * | 7/2004 | Kawai et al. | 600/152 |
| 2005/0099153 A1 | 5/2005 | Komatsu et al. | |

FOREIGN PATENT DOCUMENTS

| | | |
|---|---|---|
| JP | 64-21409 | 2/1989 |
| JP | 05-289737 | 11/1993 |
| JP | 8-21742 | 12/1996 |
| JP | 08-336299 | 12/1996 |
| JP | 09-154291 | 6/1997 |
| JP | 9-182497 | 7/1997 |
| JP | 9-229957 | 9/1997 |
| JP | 11-89293 | 3/1999 |
| JP | 11-194825 | 7/1999 |
| JP | 11-201244 | 7/1999 |
| JP | 11-334160 | 12/1999 |
| JP | 2002-108169 | 4/2002 |
| JP | 2002-136164 | 5/2002 |
| JP | 2003-98793 | 4/2003 |
| JP | 2003-280484 | 10/2003 |
| JP | 2003-284371 | 10/2003 |
| JP | 2003-304225 | 10/2003 |

OTHER PUBLICATIONS

U.S. Appl. No. 10/725,450, filed Dec. 3, 2003, Andoh et al.
U.S. Appl. No. 10/724,998, filed Dec. 2, 2003, Kudo et al.
U.S. Appl. No. 10/634,783, filed Aug. 6, 2003, Matsuda et al.
U.S. Appl. No. 10/701,428, filed Nov. 6, 2003, Sakai.
U.S. Appl. No. 10/456,469, filed Jun. 9, 2003, Kamiya et al.
U.S. Appl. No. 10/150,932, filed May 21, 2002, Sakai.
U.S. Appl. No. 09/042,613, filed Mar. 17, 1998, Andoh et al.
U.S. Appl. No. 08/266,386, filed Jun. 27, 1994, Furuta et al.
U.S. Appl. No. 07/518,950, filed May 4, 1990, Bannai et al.
U.S. Appl. No. 07/039,741, filed Apr. 20, 1987, Katoh et al.

* cited by examiner

LIGHT RECEIVING LEVEL — THRESHOLD VALUE

MARK DETECTION SIGNAL

LIGHT RECEIVING LEVEL

MARK DETECTION SIGNAL

LIGHT RECEIVING LEVEL

OUTPUT PULSE
(MARK DETECTION SIGNAL)

MASK CONTROL SIGNAL
(SPECIFIC CONTROL SIGNAL)

LIGHT RECEIVING
LEVEL

OUTPUT PULSE
(MARK DETECTION
SIGNAL)

MASK CONTROL SIGNAL
(SPECIFIC CONTROL
SIGNAL)

PART IMMEDIATE
BEFORE
DISCONTINUOUS
PART C

DISCON-
TINUOUS
PART A

CORRECTION
PROCESSING
PERIOD

LIGHT RECEIVING LEVEL

OUTPUT PULSE (MARK DETECTION SIGNAL)

MASK CONTROL SIGNAL (SPECIFIC CONTROL SIGNAL)

PART IMMEDIATELY BEFORE DISCONTINUOUS PART D

DISCONTINUOUS PART A

CORRECTION PROCESSING PERIOD

PART IMMEDIATELY AFTER DISCONTINUOUS PART E

LIGHT RECEIVING LEVEL LOW FREQUENCY SIGNAL

MASK CONTROL SIGNAL

DRIVE CONTROL METHOD, DRIVE CONTROL DEVICE, BELT APPARATUS, IMAGE FORMING APPARATUS, IMAGE READING APPARATUS, COMPUTER PRODUCT

CROSS-REFERENCE TO RELATED APPLICATIONS

The present document incorporates by reference the entire contents of Japanese priority documents, 2003-319038 filed in Japan on Sep. 10, 2003, 2003-326822 filed in Japan on Sep. 18, 2003, 2003-328598 filed in Japan on Sep. 19, 2003, 2003-376433 filed in Japan on Nov. 6, 2003, and 2004-182596 filed in Japan on Jun. 21, 2004.

BACKGROUND OF THE INVENTION

1) Field of the Invention

The present invention relates to a drive control method and a drive control device that use a pulse motor, a belt apparatus, an image forming apparatus, an image reading apparatus, and a computer product.

2) Description of the Related Art

Conventionally, to perform position control of a rotating body, an encoder is arranged on an axis of the rotating body and the rotating body is controlled based on feedback from the encoder. The rotating body may a cylindrical drum, a circular plate, or a belt laid over at least two shafts. The position control here means angular displacement control or displacement control.

However, in the conventional technology, eccentricity of the shaft to which the encoder is attached, eccentricity of an attachment position of the encoder with respect to the shaft, and the like causes wrong position control. One approach to overcome this problem is to fix a scale directly on the surface of the rotating body and read the scale with a reflective photosensor (hereinafter, "sensor").

However, the scale may become damaged during operation and may produce incorrect readings which leads to incorrect position control.

Moreover, there is always a distinct boundary (hereinafter, "joint") between the rotating body and the scale, which also produces incorrect readings. Japanese Patent Application Laid-Open No. 2002-136164 discloses a countermeasure. According to this publication, when a pulse does not reach within a pre-set time, it is judged that it is a joint that has produced the incorrect readings. Moreover, rotation velocity of the rotating body is corrected based on the judgment.

Japanese Patent Application Laid-Open No. H9-229957 discloses providing reference marks on a rotating drive shaft of the rotating body and detecting those reference marks. Velocity control and position control of the rotating body is performed based on result of detection of the reference marks. However, eccentricity of the drive shaft, errors in the positions of the reference marks, and the like produces incorrect detection and results in inaccurate feedback control. As a countermeasure, there is known a method of providing reference marks directly on the surface of the rotating body.

Most of the existing driving control apparatuses that employ pulse motors use a feedback control loop for angular displacement, which makes accurate control of the pulse motor possible. However, this drive system has a drawback in that, for example, when a detector breaks down or, in particular, when there is a wrong output in a detection signal in, for example, a joint part of a scale at the time when a surface displacement sensor is used, accurate control cannot be performed.

As a countermeasure, Japanese Patent Application Laid-Open No. 2002-136164 discloses providing means for interrupting rotating velocity correction in a velocity control apparatus of the rotating body in which a feedback system using a pulse motor is established. However, with only a velocity control system, it is impossible to cope with a highly accurate position control system.

In the method described in Japanese Patent Application Laid-Open No. 2002-136164 a timer is required for judging the joint. This causes an increase in cost due to an increase in the number of components.

In treatment of the joint, there is also a method of using plural sensors and, when one sensor is judged as abnormal, switching the sensor to another sensor. However, two or more sensors are required in this method, and an increase in cost is also unavoidable.

In addition, the method described in Japanese Patent Application Laid-Open No. 2002-136164 is based on an idea of providing two sensors preliminarily assuming that accuracy is not guaranteed by detection with one sensor. Thus, an increase in cost by an increase in the number of sensors is unavoidable. In addition, when abnormality has occurs with time in an optical pattern (scale) that is a detection object, the number of sensors is meaningless, and suspension and the like of an apparatus operation are unavoidable.

SUMMARY OF THE INVENTION

It is an object of the present invention to solve at least the problems in the conventional technology.

A drive control method according to an aspect of the present invention is a method of controlling driving of a pulse motor such that a rotating body driven by the pulse motor rotates at uniform angular velocity. The drive control method includes detecting angular displacement of the rotating body; calculating a difference between a detection value of the angular displacement and a target value of angular displacement set in advance; and calculating a drive pulse frequency of a drive pulse signal to be used for driving for the pulse motor based on the difference and a reference drive pulse frequency to make it possible to select whether the difference is added to the reference drive pulse.

A drive control method according to another aspect of the present invention is a method of controlling driving of a pulse motor such that a moving body driven by the pulse motor moves at a uniform velocity. The drive control method includes detecting displacement of the moving body; calculating a difference between a detection value of the displacement and a target value of displacement set in advance; calculating a drive pulse frequency of a drive pulse signal to be used for driving for the pulse motor based on the difference and a reference drive pulse frequency, and selecting whether the difference is added to the reference drive pulse.

A drive control device according to still another aspect of the present invention is a device that controls driving of a pulse motor such that a rotating body driven by the pulse motor rotates at uniform angular velocity. The drive control device includes an angular displacement detecting unit that detects angular displacement of the rotating body; a difference calculating unit that calculates a difference between a detection value of the angular displacement and a target value of angular displacement set in advance; and a drive pulse frequency calculating unit that calculates a drive pulse frequency of a drive pulse signal to be used for driving for the pulse motor based on the difference and a reference drive pulse frequency to make it possible to select whether the difference is added to the reference drive pulse.

A drive control device according to still another aspect of the present invention is a device that controls driving of a pulse motor such that a moving body driven by the pulse motor moves at a uniform velocity. The drive control device includes a difference calculating unit that calculates a difference between a detection value of displacement of the moving body and a target value of displacement set in advance; a drive pulse frequency calculating unit that calculates a drive pulse frequency of a drive pulse signal to be used for driving for the pulse motor based on the difference and a reference drive pulse frequency; and a selecting unit that makes it possible to select whether the difference is added to the reference drive pulse.

A belt apparatus according to still another aspect of the present invention includes a belt that is laid over plural support rotating bodies; the above drive control device that controls driving of the belt; and a drive device that drives the belt based on a drive pulse frequency output from the drive control device.

An image forming apparatus according to still another aspect of the present invention includes an image bearing member; the above drive control device that controls driving of the image bearing member; and a drive device that drives the image bearing member based on a drive pulse frequency output from the drive control device.

An image forming apparatus according to still another aspect of the present invention includes a plurality of image bearing members; the above drive control device that controls driving of the image bearing members; and a drive device that drives the image bearing members based on a drive pulse frequency output from the drive control device.

An image reading apparatus according to still another aspect of the present invention includes a moving body that includes an optical system for image reading; the above drive control device that controls driving for the moving body; and a drive device that drives the moving body based on a drive pulse frequency output from the drive control device.

A position control method according to still another aspect of the present invention is a method of feedback-controlling displacement in a rotating direction of a rotating body, which is driven to rotate by a drive source, by reading a signal generated according to rotation of the rotating body. When a signal amount read in sampling time is outside a range compared with a defined signal amount, correction processing for a feedback signal is performed.

A position control method according to still another aspect of the present invention is a method of feedback-controlling displacement in a rotating direction of a rotating body, which is driven to rotate by a drive source, by reading a scale pulse generated based on a scale provided in the rotating body. When a scale pulse number read in sampling time is outside a range compared with a defined scale pulse number, correction processing for a feedback signal is performed.

A position control device according to still another aspect of the present invention controls position of a rotating body. The position control device includes a signal generating unit that is provided in a rotating body driven to rotate by a drive source, which operates in response to a control signal, and generates a signal for detecting displacement in a rotating direction of the rotating body; and a control unit that reads the signal generated by the signal generating unit, feedbacks the signal, calculates a deviation between present displacement and a target displacement, and outputs the control signal anew. When a signal amount read in sampling time is outside a range compared with a defined signal amount, the control unit performs correction processing for a feedback signal.

A position control device according to still another aspect of the present invention controls position of a rotating body. The position control device includes a scale that is provided in a rotating body driven to rotate by a drive source, which operates in response to a control signal; a scale pulse generating unit that generates a pulse for detecting displacement in a rotating direction of the rotating body based on the scale; and a control unit that reads a scale pulse generated by the scale pulse generating unit, feedbacks the scale pulse, calculates a deviation between present displacement and target displacement, and outputs the control signal anew. When a scale pulse number read in sampling time is outside a range compared with a defined scale pulse number, the control unit performs correction processing for a feedback signal.

An image forming apparatus according to still another aspect of the present invention includes an image bearing member on which an image is formed; and the above position control device that drive controls the image bearing member.

An image forming apparatus according to still another aspect of the present invention includes a plurality of image bearing members on which a color image is formed; and the above position control device that drive controls at least one of the image bearing members.

An image reading apparatus according to still another aspect of the present invention includes a traveling body drive device that reads an image; and the above position control device that drive controls the traveling body drive device.

A position control method according to still another aspect of the present invention is a method of controlling displacement in a rotating direction of a rotating body, which is driven to rotate by a drive source, by reading signals generated according to rotation of the rotating body. The signals are two kinds of signals, namely, a first signal generated by rotation of the rotating body itself and a second signal generated by rotation of a shaft of the rotating body, and these two signals are used as a control signal selectively.

A position control device according to still another aspect of the present invention controls position of a rotating body. The position control device includes a first signal generating unit that is provided in a rotating body driven to rotate by a drive source and generates a first signal for detecting displacement in a rotating direction of the rotating body; a second signal generating unit that is provided in a shaft of the rotating body and generates a second signal for detecting displacement in a rotating direction of the shaft; and a control unit that controls the drive source based on the signal generated by the first signal generating unit or the second signal generating unit. The control unit uses the two signals as a control signal selectively.

An image forming apparatus according to still another aspect of the present invention includes an image bearing member on which an image is formed; and the above position control device that drive controls the image bearing member.

An image forming apparatus according to still another aspect of the present invention includes a plurality of image bearing members on which an image is formed respectively; and the above position control device that drive controls at least one of the image bearing members.

An image reading apparatus according to still another aspect of the present invention includes a traveling body drive device that reads an image; and the above position control device that drive controls the traveling body drive device.

A drive control device according to still another aspect of the present invention includes a mark detecting unit that detects plural marks that are provided on a drive control object member at predetermined interval along a direction of movement of the drive control object member, or that detects plural marks that are provided on an endless moving member at predetermined interval along a direction of movement of the endless moving member, wherein the drive control object member and the endless moving member move endlessly, wherein the mark detecting unit outputs a mark detection signal when a mark is detected; a multiplying unit that generates a multiplied signal by increasing by a predetermined times a magnitude of the mark detection signal; and a feedback control unit that performs feedback control using the multiplied signal when it is judged that a discontinuous part, where intervals of signal parts corresponding to the marks are outside a range decided in advance, is not present in the mark detection signal or the multiplied signal and performs the feedback control using an alternative signal instead of the multiplied signal when it is judged that the discontinuous part is present.

A drive control method according to still another aspect of the present invention includes detecting plural marks that are provided on a drive control object member at predetermined interval along a direction of movement of the drive control object member, or that detects plural marks that are provided on an endless moving member at predetermined interval along a direction of movement of the endless moving member, wherein the drive control object member and the endless moving member move endlessly; outputting a mark detection signal when a mark is detected and the mark detection signal; generating a multiplied signal by increasing by a predetermined times a magnitude of the mark detection signal; and performing feedback control using the multiplied signal when it is judged that a discontinuous part, where intervals of signal parts corresponding to the marks are outside a range decided in advance, is not present in the mark detection signal or the multiplied signal and performs the feedback control using an alternative signal instead of the multiplied signal when it is judged that the discontinuous part is present.

An image forming apparatus according to still another aspect of the present invention includes a drive control object member that moves endlessly; and the above drive control device that drive controls the drive control object member.

A drive control device according to still another aspect of the present invention includes a mark detecting unit that detects plural marks that are provided on a drive control object member at predetermined interval along a direction of movement of the drive control object member, or that detects plural marks that are provided on an endless moving member at predetermined interval along a direction of movement of the endless moving member, wherein the drive control object member and the endless moving member move endlessly, wherein the mark detecting unit outputs a mark detection signal when a mark is detected; a feedback control unit that performs feedback control using an alternative signal instead of the mark detection signal at least for one of a discontinuous part in the mark detection signal where intervals of signal parts corresponding to the respective marks are outside a range decided in advance and signal parts immediately before and after the discontinuous part.

A drive control method according to still another aspect of the present invention includes detecting plural marks that are provided on a drive control object member at predetermined interval along a direction of movement of the drive control object member, or that detects plural marks that are provided on an endless moving member at predetermined interval along a direction of movement of the endless moving member, wherein the drive control object member and the endless moving member move endlessly; outputting a mark detection signal when a mark is detected and the mark detection signal; and performing feedback control using an alternative signal instead of the mark detection signal at least for one of a discontinuous part in the mark detection signal where intervals of signal parts corresponding to the respective marks are outside a range decided in advance and signal parts immediately before and after the discontinuous part.

An image forming apparatus according to still another aspect of the present invention includes a drive control object member that moves endlessly; and the above drive control device that drive controls the drive control object member.

An image reading apparatus according to still another aspect of the present invention includes a traveling body that irradiates light on an original surface or receives reflected light of light irradiated on the original surfaced; a drive control object member, which moves endlessly, provided on a drive force transmission path for transmitting a drive force for causing the traveling member to travel along the original surface; and the above drive control device that drive controls the drive control object member.

A computer program according to still another aspect of the present invention realizes the above drive control method on a computer. A computer-readable recording medium according to still another aspect of the present invention stores therein the above computer program.

The other objects, features, and advantages of the present invention are specifically set forth in or will become apparent from the following detailed description of the invention when read in conjunction with the accompanying drawings.

DETAILED DESCRIPTION

Exemplary embodiments of the present invention will be explained below with reference to the accompanying drawings.

Figure 1:
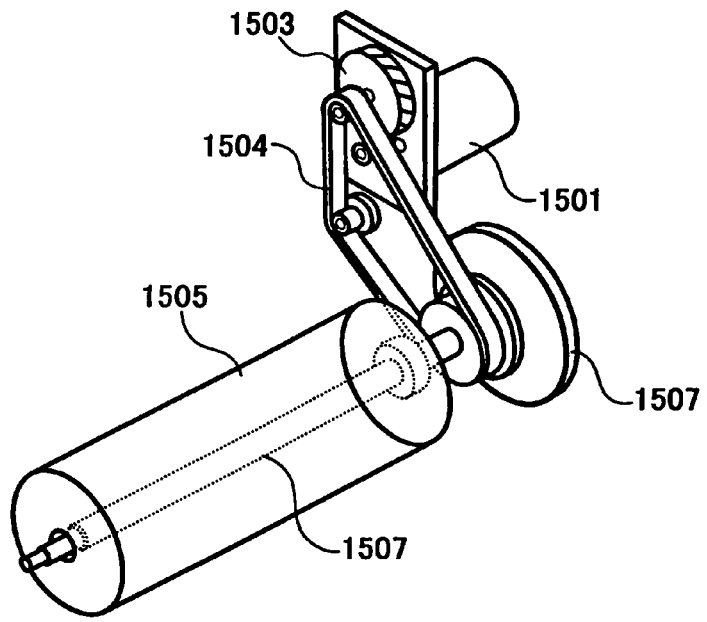
FIG. 1 is a perspective view of an appearance of a pulse motor according to a first embodiment of the invention.

FIG. 1 shows a rotating body, a power transmission system, and a pulse motor serving as a rotation drive source according to a first embodiment of the invention. The first embodiment is an example of a rotating body drive control device. In FIG. 1, reference numeral 1501 denotes a pulse motor serving as a rotation drive source that drives to rotate a rotating body. A rotation torque of the pulse motor 1501 is transmitted to a shaft 1506 of a rotating body 1505 by a train of gears 1503 and a timing belt 1504 that constitute a power transmission system. The rotating body 1505 is fixed to the shaft 1506 firmly. Reference numeral 1507 denotes an encoder serving as a state detection device that detects angular displacement of the rotating body 1505. The encoder 1507 is attached to the shaft 1506 of the rotating body 1505 via a coupling (not shown). It is needless to mention that angular displacement of the shaft 1506 to be detected by the encoder 1507 is the same as angular displacement of the rotating body 1505.

Figure 2:
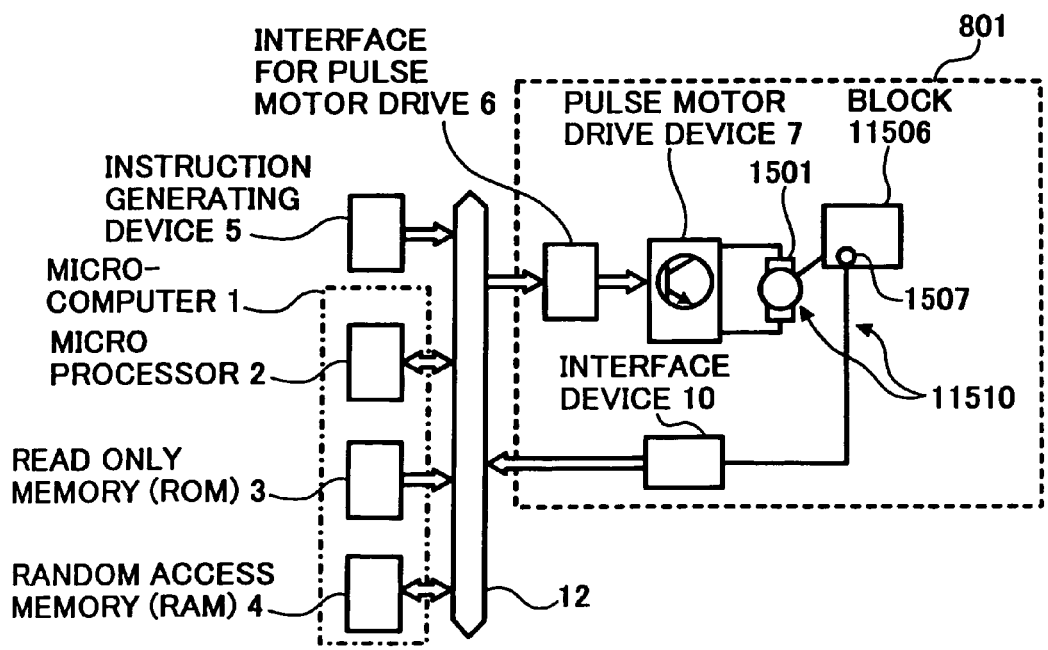
FIG. 2 is a block diagram of a structure of a digital control system according to the first embodiment.

FIG. 2 shows a structure of a control system that subjects angular displacement of the pulse motor 1501 to digital control based on a state detection signal for the rotating body 1505 (in this context, an output signal of the encoder 1507). In FIG. 2, reference numeral 1 denotes a microcomputer including a microprocessor 2, and a read only memory (ROM) 3, a random access memory (RAM) 4. The microprocessor 2, the read only memory (ROM) 3, and the random access memory (RAM) 4 are connected to one another via a bus 9.

Reference numeral 5 denotes an instruction generating device that outputs a state instruction signal for instructing target angular displacement of the rotating body 1505. The instruction generating device 5 generates an angular displacement instruction signal. An output side of the instruction generating device 5 is also connected to the bus 9. Reference numeral 10 denotes an interface device for detection that processes an output pulse of the encoder 1507 and converts the output pulse into a digital numerical value. The interface device for detection 10 includes a counter that counts an output pulse of the encoder 1507. The interface device for detection 10 multiplies a numerical value counted by the counter by a predetermined conversion constant of pulse number versus angular displacement and converts the numerical value into angular displacement of the rotating body 1505. Reference numeral 6 denotes an interface for pulse motor drive. The interface for pulse motor drive 6 converts a result of arithmetic operation (control output) of the microcomputer 1 into a pulse-like signal (control signal) for actuating, for example, a power semiconductor constituting a pulse motor drive device 7. The pulse motor drive device 7 operates based on the pulse-like signal from the interface for pulse motor drive 6 and drives to rotate the pulse motor. As a result, the rotating body 1505 is controlled to follow up predetermined angular displacement instructed by the instruction generating device 5. The angular displacement of the rotating body 1505 is detected by the encoder 1507 and the interface device 10 and taken into the microcomputer 1, and these operations are repeated. Here, reference numeral 11506 denotes a block indicating the rotating body 1505, and 11510 denotes a block indicating the gear power transmission system 1503 and the timing belt power transmission system 1504 shown in FIG. 1.

Next, drive control for a rotating body, which controls the rotating body 1505 to come into a uniform angular velocity state by controlling rotation angle displacement of the rotating body 1505 with the pulse motor 1501 according to the embodiment constituted as described above, will be explained with reference to a block structure of the embodiment shown in FIG. 3.

Figure 3:
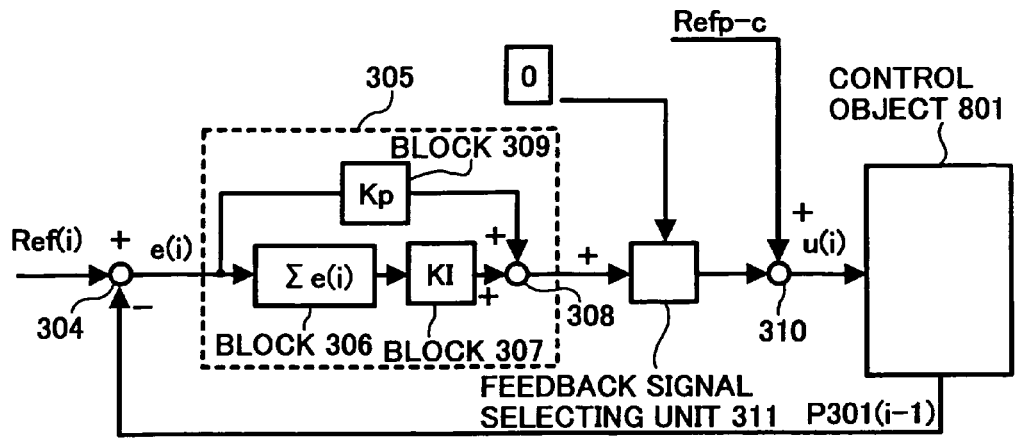
FIG. 3 is a block diagram of drive control for a rotating body according to the first embodiment.

In FIG. 3, reference numeral 801 denotes a control object including the entire rotating body drive system shown in FIG. 1 and the interface for pulse motor drive 6, the pulse motor drive device 7, and the interface device 10 shown in FIG. 2 in the embodiment. An output from the interface device 10 that processes an output from the encoder 1507, that is, angular displacement information P301(i−1) of the rotating body 1505 is given to an arithmetic operation unit 304. The arithmetic operation unit 304 calculates a difference e(i) between target angular displacement Ref(i) of the rotating body 1505, which is a control target value, and angular displacement P301(i−1) of the rotating body 1505. The arithmetic operation unit 304 inputs the difference e(i) to a controller unit 305. The controller unit 305 is constituted by, for example, a PI control system. The difference e(i) calculated in the arithmetic operation unit 304 is integrated in a block 306, multiplied by a constant KI in a block 307, and given to an arithmetic operation unit 308. Simultaneously, the difference e(i) calculated in the arithmetic operation unit 304 is multiplied by a constant KP in a block 309 and given to the arithmetic operation unit 308. The arithmetic operation unit 308 adds two input signals from the blocks 307 and 309 and gives a result of the addition to a feedback signal selecting unit 311. The feedback signal selecting unit 311 receives a feedback judgment signal, selects an output from the arithmetic operation unit 308 or a constant 0, and gives the output or the constant 0 to an arithmetic operation unit 310. In short, the feedback signal selecting unit 311 selects the output from the arithmetic operation unit 308 when feedback is performed and selects the constant 0 when feedback is not performed. The feedback judgment signal can be given as, for example, an arbitrary I/O signal affected by abnormality of a sensor or the like. It is needless to mention that the feedback signal selecting unit 311 selects the output from the arithmetic operation unit 308 when there is no abnormality and selects the constant 0 when there is abnormality. Thereafter, the arithmetic operation unit 310 adds a constant pulse input Refp_c and determines a drive pulse frequency u(i).

The drive pulse frequency u(i) calculated in the arithmetic operation unit 310 is output to the pulse motor 1501 via the interface for pulse motor drive 6 and the pulse motor drive device 7, the rotating body 1505 rotates via a transmission system, and the loop operation described above is repeated. Although a PI control system is used as the controller unit 305 as an example, the controller unit 305 is not limited to this. All the above-mentioned arithmetic operations are performed by a numerical operation in the microcomputer 1 and can be realized easily. Refp_c is a pulse number that is determined uniquely based on a rotating body angular velocity and a reduction gear ratio of a deceleration system. However, in the invention, it is also possible to select a pulse number arbitrarily within a range in which a step-out phenomenon does not occur during motor driving. In addition, Ref(i) can be calculated easily by integrating a target uniform angular velocity of the rotating body 1505.

According to the first embodiment, when there is abnormality, usual pulse motor drive is performed without performing feedback. Thus, a position control system in a pulse motor drive system, which is capable of carrying out accurate and highly accurate control even when there is a wrong output in a detection signal due to influence of noise or the like caused by failure and abnormality in a sensor, can be established.

Next, a second embodiment of the invention will be explained. The second embodiment is an example of a belt conveyance control method to which the invention is applied.

Figure 4:
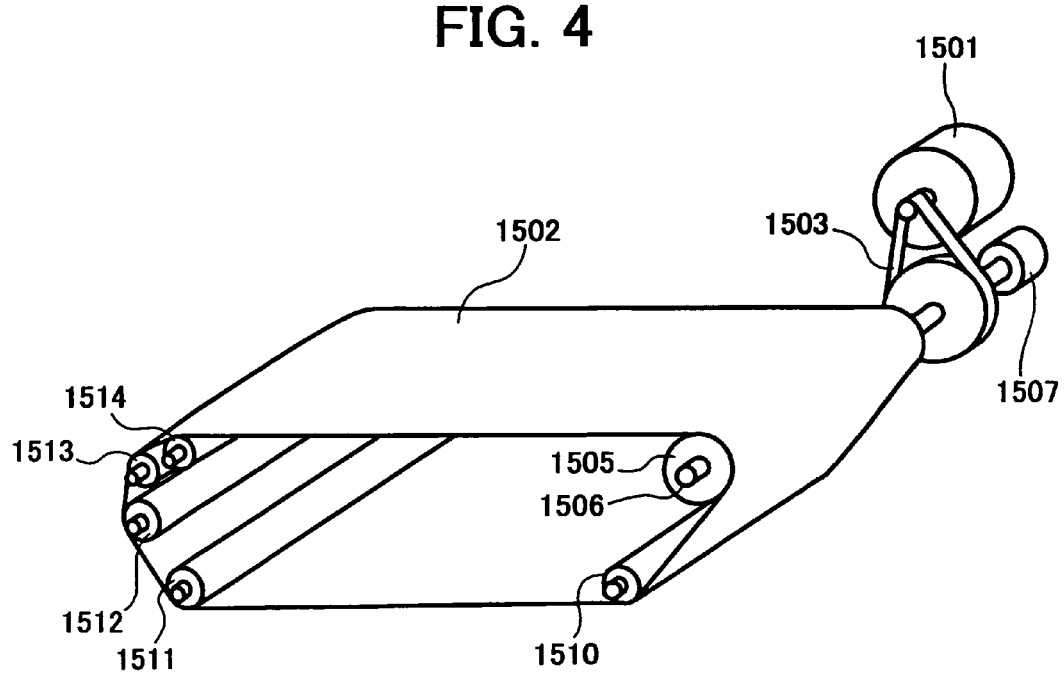
FIG. 4 is a perspective view of an appearance of a pulse motor according to a second embodiment of the invention.

In FIG. 4, reference numeral 1501 denotes a pulse motor serving as a rotation drive source for driving to rotate a belt 1502. A rotation torque of the pulse motor 1501 is transmitted to the drive shaft 1506 and the drive roller 1505 for the belt by a deceleration system, for example, a timing belt 1503 constituting a power transmission system. The belt is wound around the drive roller 1505 and driven rollers 1510, 1511, 1512, 1513, and 1514. Therefore, when the drive roller 1505 is rotated by the pulse motor 1501, the belt 1502 moves accordingly.

Reference numeral 1507 denotes an encoder serving as a state detecting device for detecting angular displacement of the drive roller 1505. The encoder 1507 is attached to the shaft 1506 of the drive roller 1505 via a coupling (not shown).

Figure 5:
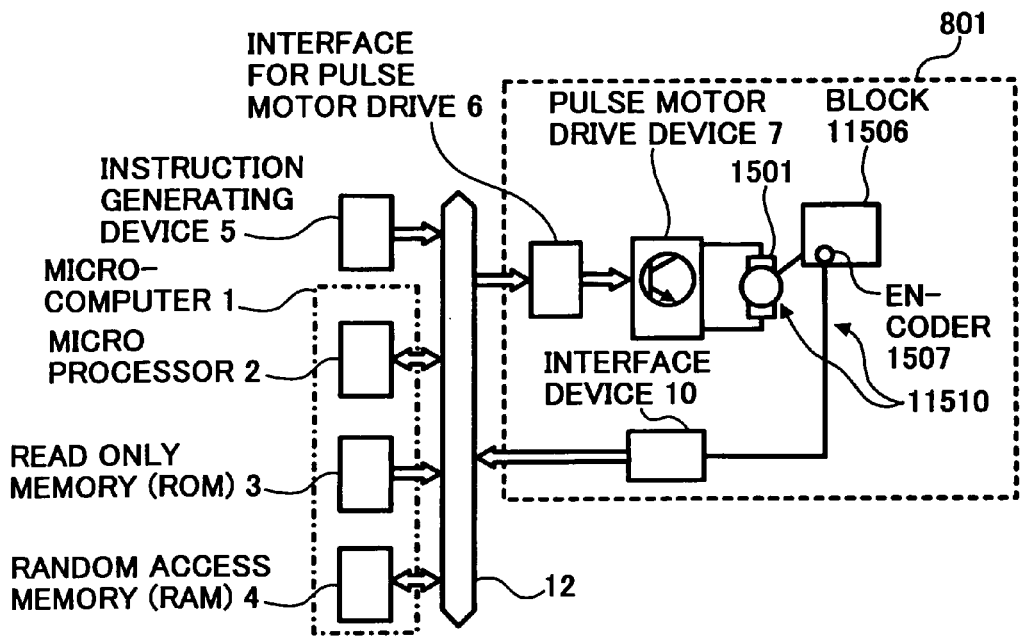
FIG. 5 is a block diagram of a structure of a digital control system according to the second embodiment.
Figure 6:
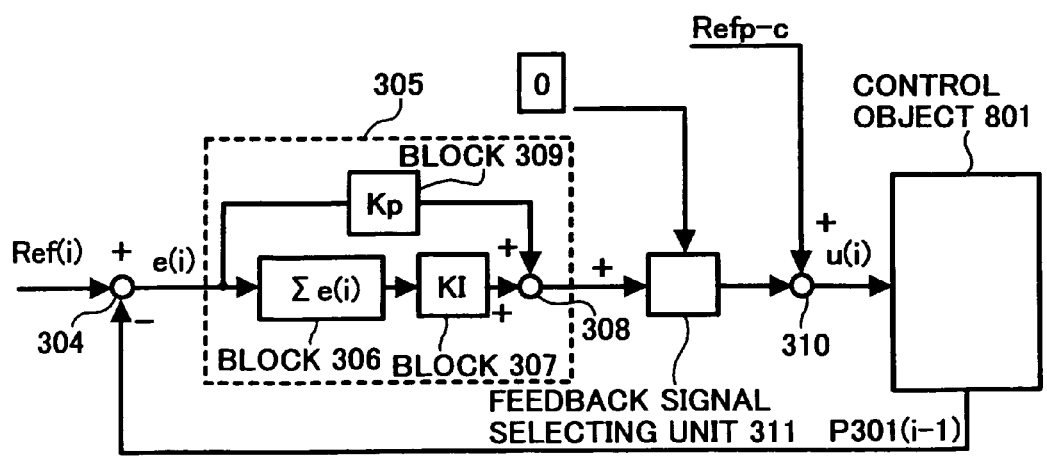
FIG. 6 is a block diagram of a structure of the digital control system according to the second embodiment.

A belt conveying apparatus shown in FIG. 4 is subjected to drive control in a control system shown in FIGS. 5 and 6.

FIG. 5 shows a structure of a control system that subjects angular displacement of the pulse motor 1501 to digital control based on a state detection signal for the drive roller 1505 (in this context, an output signal of the encoder 1507). In FIG. 5, reference numeral 1 denotes a microcomputer including the microprocessor 2, and the read only memory (ROM) 3, the random access memory (RAM) 4. The microprocessor 2, the read only memory (ROM) 3, and the random access memory (RAM) 4 are connected to one another via the bus 9.

Reference numeral 5 denotes an instruction generating device that outputs a state instruction signal for instructing target angular displacement of the drive roller 1505. The instruction generating device 5 generates an angular displacement instruction signal. An output side of the instruction generating device 5 is also connected to the bus 9. Reference numeral 10 denotes an interface device for detection that processes an output pulse of the encoder 1507 and converts the output pulse into a digital numerical value. The interface device for detection 10 includes a counter that counts an output pulse of the encoder 1507. The interface device for detection 10 multiplies a numerical value counted by the counter by a predetermined conversion constant of pulse number versus angular displacement and converts the numerical value into angular displacement of the drive roller 1505. Reference numeral 6 denotes an interface for pulse motor drive. The interface for pulse motor drive 6 converts a result of arithmetic operation (control output) of the microcomputer 1 into a pulse-like signal (control signal) for actuating, for example, a power semiconductor constituting a pulse motor drive device 7. The pulse motor drive device 7 operates based on the pulse-like signal from the interface for pulse motor drive 6 and drives to rotate the pulse motor. As a result, the drive roller 1505 is controlled to follow up predetermined angular displacement instructed by the instruction generating device 5. As a result, the belt 1502 wound around the drive roller 1505 is driven at uniform velocity. The angular displacement of the drive roller 1505 is detected by the encoder 1507 and the interface device 10 and taken into the microcomputer 1, and these operations are repeated. Here, reference numeral 11506 denotes a block indicating the drive roller 1505, and 11510 denotes a block indicating the timing belt power transmission system 1503 shown in FIG. 4.

Next, drive control for a belt, which controls the belt to come into a uniform angular velocity state by controlling rotation angle displacement of the drive roller 1505 with the pulse motor 1501 according to the embodiment constituted as described above, will be explained with reference to a block structure of the embodiment shown in FIG. 6. In FIG. 6, reference numeral 801 denotes a control object including the entire rotating body drive system shown in FIG. 4 and the interface for pulse motor drive 6, the pulse motor drive device 7, and the interface device 10 shown in FIG. 5 in the embodiment.

An output from the interface device 10, which processes an output from the encoder 1507, that is, angular displacement information P301(i−1) of the rotating body 1505, is given to an arithmetic operation unit 304. The arithmetic operation unit 304 calculates a difference e(i) between target angular displacement Ref(i) of the rotating body 1505, which is a control target value, and angular displacement P301(i−1) of the rotating body 1505. The arithmetic operation unit 304 inputs the difference e(i) to a controller unit 305.

The controller unit 305 is constituted by, for example, a PI control system. The difference e(i) calculated in the arithmetic operation unit 304 is integrated in the block 306, multiplied by a constant KI in the block 307, and given to the arithmetic operation unit 308. At the same time, the difference e(i) calculated in the arithmetic operation unit 304 is multiplied by a constant KP in the block 309 and given to the arithmetic operation unit 308. The arithmetic operation unit 308 adds two input signals from the blocks 307 and 309 and gives a result of the addition to the feedback signal selecting unit 311. The feedback signal selecting unit 311 receives a feedback judgment signal, selects an output from the arithmetic operation unit 308 or a constant 0, and gives the output or the constant 0 to the arithmetic operation unit 310. In short, the feedback signal selecting unit 311 selects the output from the arithmetic operation unit 308 when feedback is performed and selects the constant 0 when feedback is not performed. The feedback judgment signal can be given as, for example, an arbitrary I/O signal affected by abnormality of a sensor or the like. It is needless to mention that the feedback signal selecting unit 311 selects the output from the arithmetic operation unit 308 when there is no abnormality and selects the constant 0 when there is abnormality. Thereafter, the arithmetic operation unit 310 adds a constant pulse input Refp_c and determines a drive pulse frequency u(i).

The drive pulse frequency u(i) calculated in the arithmetic operation unit 310 is output to the pulse motor 1501 via the interface for pulse motor drive 6 and the pulse motor drive device 7, the rotating body 1505 rotates via a transmission system, and the loop operation described above is repeated. Although a PI control system is used as the controller unit 305 as an example, the controller unit 305 is not limited to this. All the above-mentioned arithmetic operations are performed by a numerical operation in the microcomputer 1 and can be realized easily.

Refp_c is a pulse number that is determined uniquely based on a rotating body angular velocity and a reduction gear ratio of a deceleration system. However, in the invention, it is also possible to select a pulse number arbitrarily within a range in which a step-out phenomenon does not occur during motor driving. In addition, Ref(i) can be calculated easily by integrating a target uniform angular velocity of the rotating body 1505.

According to the second embodiment, when there is abnormality, usual pulse motor drive is performed without performing feedback. Thus, a belt position control system in a pulse motor drive system, which is capable of carrying out accurate and highly accurate control even when there is a wrong output in a detection signal due to influence of noise or the like caused by failure and abnormality in a sensor, can be established.

Next, a third embodiment of the invention will be explained. The third embodiment is an example of the belt conveyance control method.

Figure 7:
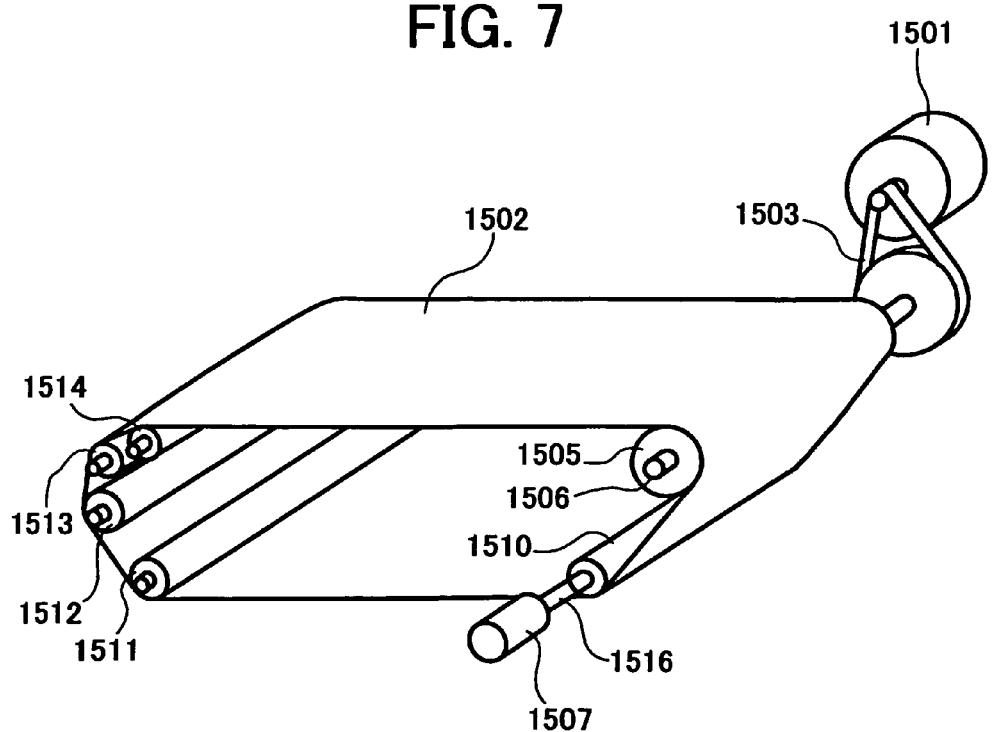
FIG. 7 is a perspective view of an appearance of a pulse motor according to a third embodiment of the invention.

In FIG. 7, reference numeral 1501 denotes a pulse motor serving as a rotation drive source for driving to rotate the belt 1502. A rotation torque of the pulse motor 1501 is transmitted to the drive shaft 1506 and the drive roller 1505 for the belt by a deceleration system, for example, the timing belt 1503 constituting the power transmission system. The belt is wound around the drive roller 1505 and the driven rollers 1510, 1511, 1512, 1513, and 1514. Therefore, when the drive roller 1505 is rotated by the pulse motor 1501, the belt 1502 moves accordingly.

Reference numeral 1507 denotes an encoder serving as a state detecting device for detecting angular displacement of the driven roller 1510. The encoder 1507 is attached to a shaft of the driven roller 1510 via a coupling 1516.

Figure 8:
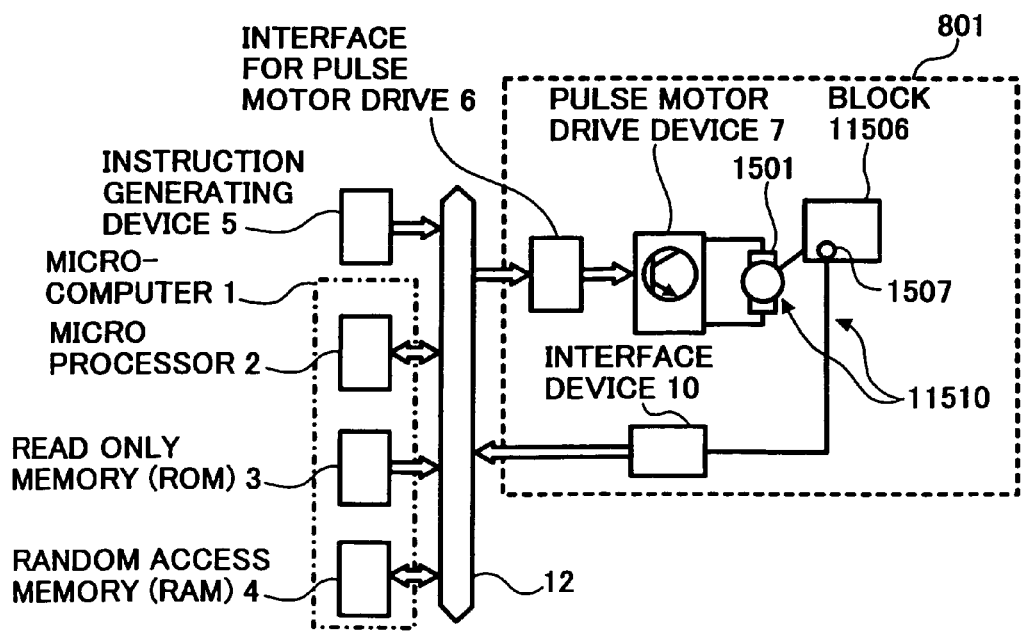
FIG. 8 is a diagram of a structure of a digital control system according to the third embodiment.
Figure 9:
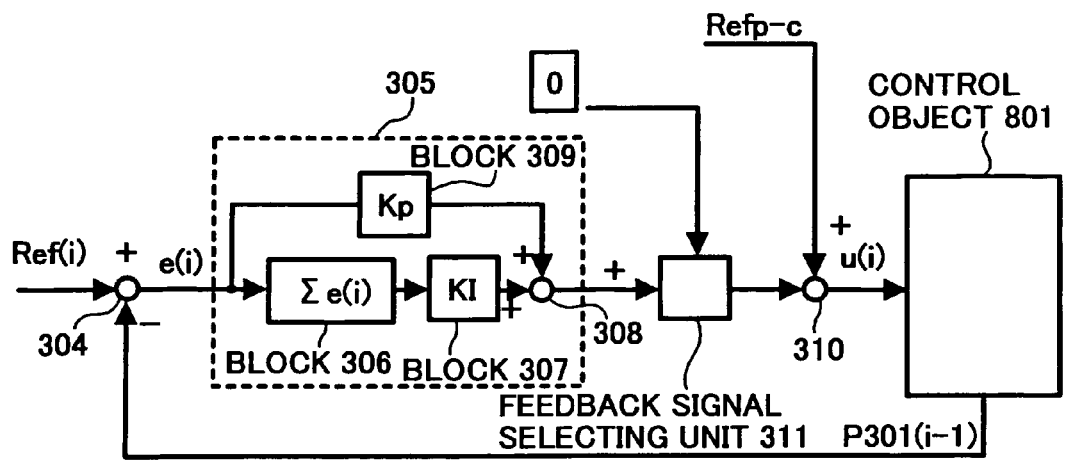
FIG. 9 is a block diagram of a drive system for a rotating body according to the third embodiment.

A belt conveying apparatus shown in FIG. 7 is subjected to drive control in a control system shown in FIGS. 8 and 9.

FIG. 8 shows a structure of a control system that subjects angular displacement of the pulse motor 1501 to digital control based on a state detection signal for the driven roller 1510 (in this context, an output signal of the encoder 1507). In FIG. 8, reference numeral 1 denotes a microcomputer including the microprocessor 2, the read only memory (ROM) 3, and the random access memory (RAM) 4. The microprocessor 2, the read only memory (ROM) 3, and the random access memory (RAM) 4 are connected to one another via the bus 9.

Reference numeral 5 denotes an instruction generating device that outputs a state instruction signal for instructing target angular displacement of the driven roller 1510. The instruction generating device 5 generates an angular displacement instruction signal. An output side of the instruction generating device 5 is also connected to the bus 9. Reference numeral 10 denotes an interface device for detection that processes an output pulse of the encoder 1507 and converts the output pulse into a digital numerical value. The interface device for detection 10 includes a counter that counts an output pulse of the encoder 1507. The interface device for detection 10 multiplies a numerical value counted by the counter by a predetermined conversion constant of pulse number versus angular displacement and converts the numerical value into angular displacement of the driven roller 1510. Reference numeral 6 denotes an interface for pulse motor drive. The interface for pulse motor drive 6 converts a result of arithmetic operation (control output) of the microcomputer 1 into a pulse-like signal (control signal) for actuating, for example, a power semiconductor constituting a pulse motor drive device 7. The pulse motor drive device 7 operates based on the pulse-like signal from the interface for pulse motor drive 6 and drives to rotate the pulse motor. As a result, the driven roller 1510 is controlled to follow up predetermined angular displacement instructed by the instruction generating device 5. As a result, the belt 1502 wound around the driven roller 1510 is driven at uniform velocity. The angular displacement of the driven roller 1510 is detected by the encoder 1507 and the interface device 10 and taken into the microcomputer 1, and these operations are repeated. Here, reference numeral 11506 denotes a block indicating the belt conveying apparatus, and 11510 denotes a block indicating the timing belt power transmission system 1503 shown in FIG. 7.

Next, drive control for a belt, which controls the belt to come into a uniform angular velocity state by controlling rotation angle displacement of the driven roller 1510 with the pulse motor 1501 according to the embodiment constituted as described above, will be explained with reference to a block structure of the embodiment shown in FIG. 9. In FIG. 9, reference numeral 801 denotes a control object including the entire rotating body drive system shown in FIG. 7 and the interface for pulse motor drive 6, the pulse motor drive device 7, and the interface device 10 shown in FIG. 8 in the embodiment.

An output from the interface device 10, which processes an output from the encoder 1507, that is, angular displacement information P301(i−1) of the rotating body 1505, is given to the arithmetic operation unit 304. The arithmetic operation unit 304 calculates a difference e(i) between target angular displacement Ref(i) of the rotating body 1505, which is a control target value, and angular displacement P301(i−1) of the rotating body 1505. The arithmetic operation unit 304 inputs the difference e(i) to a controller unit 305.

The controller unit 305 is constituted by, for example, a PI control system. The difference e(i) calculated in the arithmetic operation unit 304 is integrated in the block 306, multiplied by a constant KI in a block 307, and given to the arithmetic operation unit 308. Simultaneously, the difference e(i) calculated in the arithmetic operation unit 304 is multiplied by a constant KP in the block 309 and given to the arithmetic operation unit 308. The arithmetic operation unit 308 adds two input signals from the blocks 307 and 309 and gives a result of the addition to the feedback signal selecting unit 311. The feedback signal selecting unit 311 receives a feedback judgment signal, selects an output from the arithmetic operation unit 308 or a constant 0, and gives the output or the constant 0 to the arithmetic operation unit 310. In short, the feedback signal selecting unit 311 selects the output from the arithmetic operation unit 308 when feedback is performed and selects the constant 0 when feedback is not performed. The feedback judgment signal can be given as, for example, an arbitrary I/O signal affected by abnormality of a sensor or the like. It is needless to mention that the feedback signal selecting unit 311 selects the output from the arithmetic operation unit 308 when there is no abnormality and selects the constant 0 when there is abnormality. Thereafter, the arithmetic operation unit 310 adds a constant pulse input Refp_c and determines a drive pulse frequency u(i).

The drive pulse frequency u(i) calculated in the arithmetic operation unit 310 is output to the pulse motor 1501 via the interface for pulse motor drive 6 and the pulse motor drive device 7, the rotating body 1505 rotates via a transmission system, and the loop operation described above is repeated. Although a PI control system is used as the controller unit 305 as an example, the controller unit 305 is not limited to this. All the above-mentioned arithmetic operations are performed by a numerical operation in the microcomputer 1 and can be realized easily.

Refp_c is a pulse number that is determined uniquely based on a drive roller angular velocity and a reduction gear ratio of a deceleration system that are based on a belt velocity and a belt drive radius. However, in the invention, it is also possible to select a pulse number arbitrarily within a range in which a step-out phenomenon does not occur during motor driving. In addition, Ref(i) can be calculated easily by integrating a target uniform angular velocity of the driven roller 1510.

According to the third embodiment, when there is abnormality, usual pulse motor drive is performed without performing feedback. Thus, a belt conveyance control apparatus in a pulse motor drive system, which is capable of carrying out accurate and highly accurate control even when there is a wrong output in a detection signal due to influence of noise or the like caused by failure and abnormality in a sensor, can be established.

Next, a fourth embodiment of the invention will be explained. The fourth embodiment is an example of the belt conveyance control method.

Figure 10:
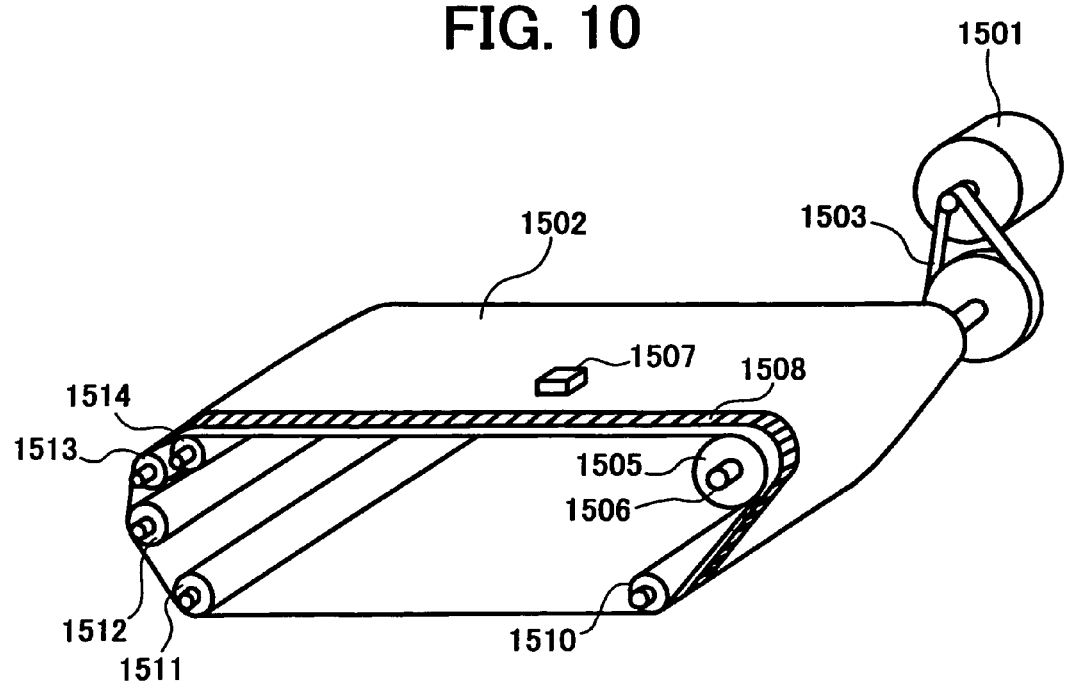
FIG. 10 is a perspective view of an appearance of a pulse motor according to a fourth embodiment of the invention.

In FIG. 10, reference numeral 1501 denotes a pulse motor serving as a rotation drive source for driving to rotate the belt 1502. A rotation torque of the pulse motor 1501 is transmitted to the drive shaft 1506 and the drive roller 1505 for the belt by a deceleration system, for example, the timing belt 1503 constituting the power transmission system. The belt is wound around the drive roller 1505 and the driven rollers 1510, 1511, 1512, 1513, and 1514. Therefore, when the drive roller 1505 is rotated by the pulse motor 1501, the belt 1502 moves accordingly.

Reference numeral 1507 denotes a marker sensor set in a position opposed to a marker 1508. The marker sensor 1507 includes a photo-interrupter. The marker sensor 1507 outputs a digital signal "1" when the marker 1508 reaches a detection position to be opposed to the marker sensor 1507 and outputs a digital signal "0" when a part between the marker 1508 and another marker 1508 reaches the detection position to be opposed to the marker sensor 1507. Displacement of the surface of the belt 1502 can be detected by counting a digital signal from the marker sensor 1507. Although not shown in the figure, the marker 1508 necessarily has a gap, and the marker sensor 1507 cannot output a signal at a predetermined interval in that part.

Figure 11:
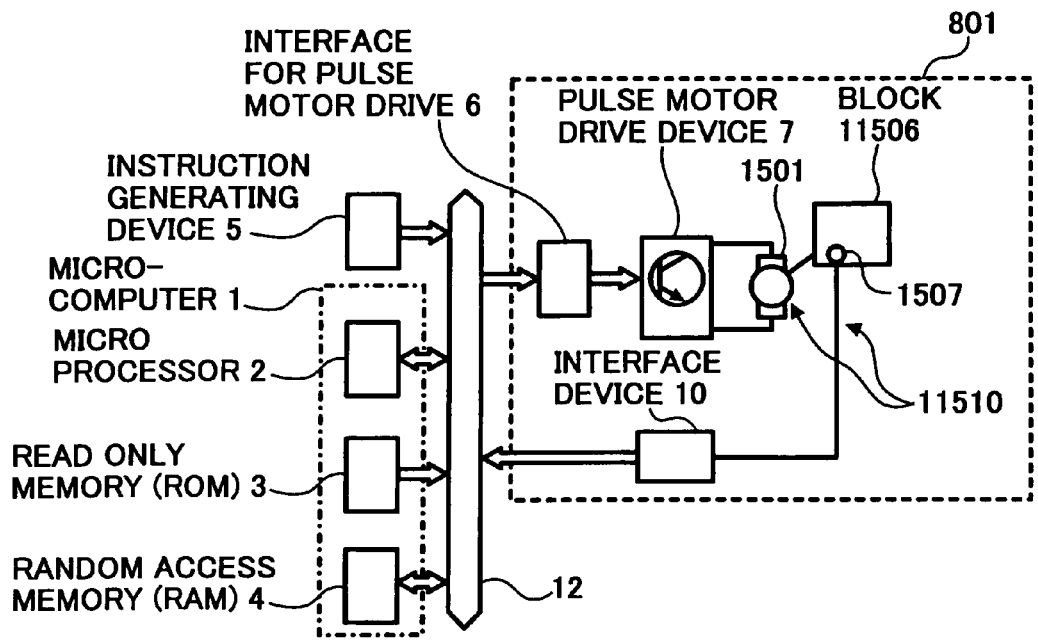
FIG. 11 is a block diagram of a structure of a digital control system according to the fourth embodiment.
Figure 12:
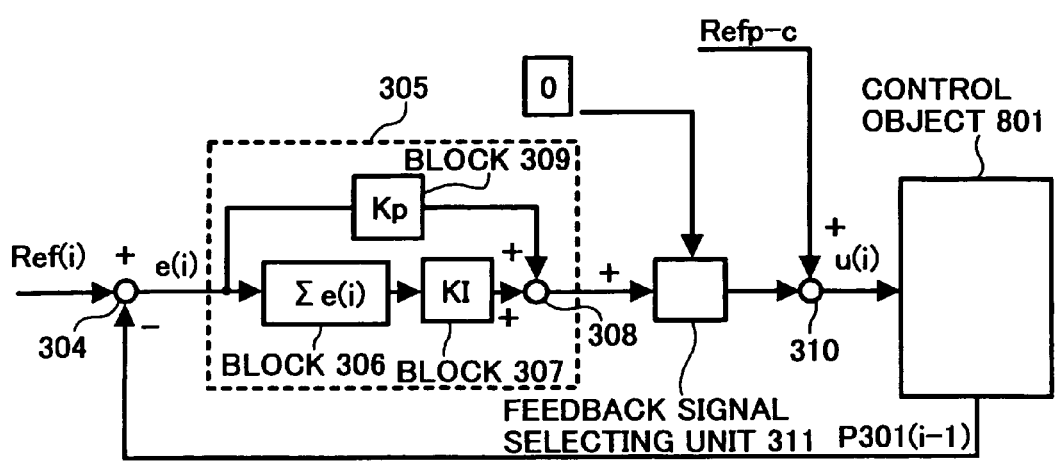
FIG. 12 is a block diagram of drive control for a rotating body according to the fourth embodiment.

A belt conveying apparatus shown in FIG. 10 is subjected to drive control in a control system shown in FIGS. 11 and 12.

FIG. 11 shows a structure of a control system that subjects angular displacement of the pulse motor 1501 to digital control based on a state detection signal for the belt 1502 (in this context, an output signal of the encoder 1507). In FIG. 11, reference numeral 1 denotes a microcomputer including the microprocessor 2, and the read only memory (ROM) 3, the random access memory (RAM) 4. The microprocessor 2, the read only memory (ROM) 3, and the random access memory (RAM) 4 are connected to one another via the bus 9.

Reference numeral 5 denotes an instruction generating device that outputs a state instruction signal for instructing target angular displacement of the belt 1502. The instruction generating device 5 generates an angular displacement instruction signal. An output side of the instruction generating device 5 is also connected to the bus 9. Reference numeral 10 denotes an interface device for detection that processes an output pulse of the marker sensor 1507 and converts the output pulse into a digital numerical value. The interface device for detection 10 includes a counter that counts an output pulse of the marker sensor 1507. The interface device for detection 10 multiplies a numerical value counted by the counter by a predetermined conversion constant of pulse number versus angular displacement and converts the numerical value into displacement of the belt 1502. Reference numeral 6 denotes an interface for pulse motor drive. The interface for pulse motor drive 6 converts a result of arithmetic operation (control output) of the microcomputer 1 into a pulse-like signal (control signal) for actuating, for example, a power semiconductor constituting a pulse motor drive device 7. The pulse motor drive device 7 operates based on the pulse-like signal from the interface for pulse motor drive 6 and drives to rotate the pulse motor. As a result, the belt 1502 is controlled to follow up predetermined angular displacement instructed by the instruction generating device 5. In other words, the belt 1502 is driven at uniform velocity. The angular displacement of the belt 1502 is detected by the encoder 1507 and the interface device 10 and taken into the microcomputer 1, and these operations are repeated. Here, reference numeral 11506 denotes a block indicating the belt conveying apparatus, and 11510 denotes a block indicating the timing belt power transmission system 1503 shown in FIG. 10.

Next, drive control for a belt, which controls the belt to come into a uniform angular velocity state by controlling rotation angle displacement of the belt 1502 with the pulse motor 1501 according to the embodiment constituted as described above, will be explained with reference to a block structure of the embodiment shown in FIG. 12. In FIG. 12, reference numeral 801 denotes a control object including the entire drive system shown in FIG. 10 and the interface for pulse motor drive 6, the pulse motor drive device 7, and the interface device 10 shown in FIG. 11 in the embodiment.

An output from the interface device 10, which processes an output from the marker sensor 1507, that is, displacement information P301(i−1) of the belt 1502, is given to the arithmetic operation unit 304. The arithmetic operation unit 304 calculates a difference e(i) between target angular displacement Ref(i) of the belt 1502, which is a control target value, and measured displacement P301(i−1) of the belt 1502. The arithmetic operation unit 304 inputs the difference e(i) to a controller unit 305.

The controller unit 305 is constituted by, for example, a PI control system. The difference e(i) calculated in the arithmetic operation unit 304 is integrated in the block 306, multiplied by a constant KI in a block 307, and given to the arithmetic operation unit 308. At the same time, the difference e(i) calculated in the arithmetic operation unit 304 is multiplied by a constant KP in the block 309 and given to the arithmetic operation unit 308. The arithmetic operation unit 308 adds two input signals from the blocks 307 and 309 and gives a result of the addition to the feedback signal selecting unit 311. The feedback signal selecting unit 311 receives a feedback judgment signal, selects an output from the arithmetic operation unit 308 or a constant 0, and gives the output or the constant 0 to the arithmetic operation unit 310. In short, the feedback signal selecting unit 311 selects the output from the arithmetic operation unit 308 when feedback is performed and selects the constant 0 when feedback is not performed. The feedback judgment signal can be given as, for example, an arbitrary I/O signal affected by a gap of a marker sensor, abnormality of a sensor, or the like. It is needless to mention that the feedback signal selecting unit 311 selects the output from the arithmetic operation unit 308 when there is no abnormality and selects the constant 0 when there is abnormality. Thereafter, the arithmetic operation unit 310 adds a constant pulse input Refp_c and determines a drive pulse frequency u(i).

The drive pulse frequency u(i) calculated in the arithmetic operation unit 310 is output to the pulse motor 1501 via the interface for pulse motor drive 6 and the pulse motor drive device 7, the drive shaft 1505 rotates via a transmission system, and the loop operation described above is repeated. Although a PI control system is used as the controller unit 305 as an example, the controller unit 305 is not limited to this. All the above-mentioned arithmetic operations are performed by a numerical operation in the microcomputer 1 and can be realized easily.

Refp_c is a pulse number that is determined uniquely based on a drive roller angular velocity and a reduction gear ratio of a deceleration system that are based on a belt velocity and a belt drive radius. However, in the invention, it is also possible to select a pulse number arbitrarily within a range in which a step-out phenomenon does not occur during motor driving. In addition, Ref(i) can be calculated easily by integrating a target uniform angular velocity of the driven roller 1510.

According to the fourth embodiment, when there is a gap of a marker sensor, abnormality of a sensor, or the like, usual pulse motor drive is performed without performing feedback. Thus, a belt conveyance control apparatus in a control system for a pulse motor using a belt surface sensor, which is capable of carrying out correct and highly accurate control even when there is a wrong output in a detection signal due to influence of noise or the like caused by a gap of a marker sensor or failure and abnormality in a sensor, can be established.

Next, a fifth embodiment of the invention will be explained. Although the fifth embodiment will be explained using the first embodiment, the invention is applicable to the second embodiment to the fourth embodiment in the same manner.

Figure 13:
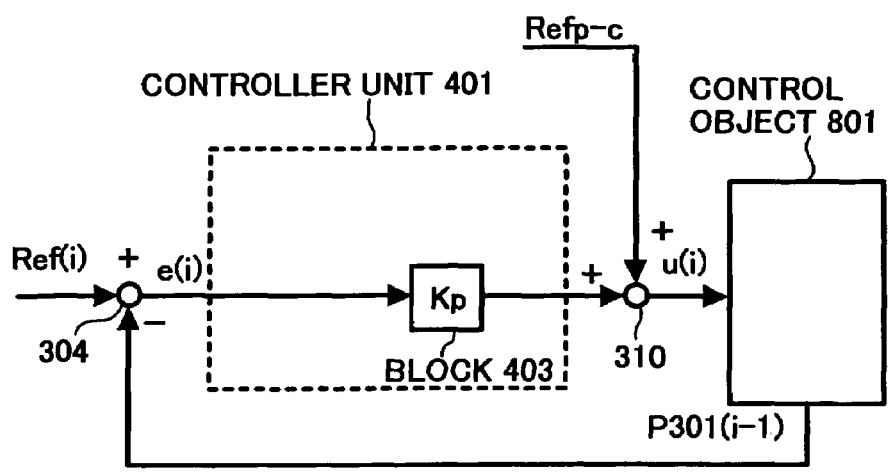
FIG. 13 is a block diagram of drive control for a rotating body according to a fifth embodiment of the invention.

FIG. 13 is a structure of a control system that controls the rotating body 1505 to come into a uniform angular velocity state by controlling rotation angle displacement of the rotating body 1505 with the pulse motor 1501. In FIG. 13, reference numerals and signs identical with those in FIG. 3 denote the identical components, and an explanation of the components will be omitted.

A difference e(i) between a target angular displacement Ref(i) of the rotating body 1505 and angular displacement P301(i−1) of the rotating body 1505 is input to the controller unit 401. The controller unit 401 includes only a system without an integrating element, for example, a proportional control system. A result of an arithmetic operation is given to the arithmetic operation unit 310, a constant pulse input Refp_c is added to the result in the arithmetic operation unit 310, and a drive pulse frequency u(i) is determined.

If an integrating element is included in the control system, when a feedback pulse is added or is not added to a drive pulse, the drive pulse may include a large error depending upon timing for the switching. Thus, to avoid such a risk, the control system is established by a system not including an integrating element. The control system is not limited to a proportional control system and may be any system as long as an integrating element is not included.

According to the fifth embodiment, since the feedback system is established by a system not including an integrating element, a position control system in a pulse motor drive system, which is capable of carrying out correct and highly accurate control even when there is a wrong output in a detection signal due to influence of noise or the like caused by failure or abnormality of a sensor, can be established more safely.

A seventh embodiment of the invention will be hereinafter explained with reference to FIGS. 14 to 22.

First, with reference to FIG. 14, a basic structure of a belt drive apparatus including a belt serving as a rotating body to be an object of position control (drive control) will be explained. The belt is an endless belt wound around at least two shafts and is equivalent to a photosensitive belt, an intermediate transfer belt, and a direct transfer belt to be described later.

A drive shaft 2101 is attached to a rotation shaft of a gear 2100 to be capable of rotating synchronously with the rotation shaft. A gear 2103 is attached to a rotation shaft of a motor 2102 to transmit rotation of the motor 2102 serving as a drive source via a gear 2103 and a gear 2100 and drive to rotate the drive shaft 2101. A belt 2106, which is an object of drive and an object of position control, is wound around the drive shaft 2101 and driven shafts 2104 and 2105 such that a constant tension is applied to the belt 2106 by a tension roller 2107.

A linear scale 2108 serving as a scale is stuck on a surface of the belt 2106 along a moving direction of the belt 2106. This linear scale 2108 is read by a surface sensor 2109 consisting of a reflective photo-sensor, whereby a drive state (fluctuation in velocity) of the belt 2106 is measured. The linear scale 2108 and the surface sensor 2109 constitute a signal generating unit.

The belt 2106, which is the object of drive, is driven to rotate by rotating the motor 2102. Although the linear scale 2108 is stuck at an end on the surface of the belt 2106 here, the linear scale 2108 may be stuck in a central part or on a back of the belt 2106. In addition, a scale may be written on the belt 2106 directly.

A basic structure of a rotating body drive apparatus including a rotating body to be an object of position control will be explained with reference to FIG. 15. The rotating body is equivalent to a photosensitive drum and a transfer drum to be described later.

A drive pulley 2125 is attached to a rotation shaft 2124 of a gear 2122. A gear 2123 engaging with the gear 2122 is attached to a rotation shaft of a motor 2121 serving as a drive source. The drive pulley 2125 is driven to rotate by rotation of the motor 2121.

A motor shaft encoder 2129 is attached to the motor 2121. A timing belt 2131 is wound around the drive pulley 2125 and a driven pulley 2128 such that a constant tension is applied to the timing belt 2131 by a tension pulley 2130. A drum 2126 serving as a rotating body, which is an object of drive and an object of position control, is attached to the driven pulley 2128 via a shaft 2127 such that coaxiality is kept. A linear scale 2108 serving as a scale is stuck on a surface of the drum 2126, which is the object of drive, along a peripheral direction thereof. The linear scale 2108 is read by the surface sensor 2109, whereby a drive state (fluctuation in velocity) of the drum 2126 is measured.

The drum 2126 is driven to rotate by rotating the motor 2121. The linear scale 2108 is stuck to an end of the surface of the drum 2126 as well in this structure. However, the linear scale 2108 may be stuck in a central part of the surface of the drum 2126 or, if the drum 2126 is tubular, may be stuck on a back thereof. In addition, a scale may be written on the drum 2126 directly. Any object may be used instead of a scale as long as positional displacement (drive displacement) of a rotating body can be grasped as some signal amount using the object.

Figure 14:
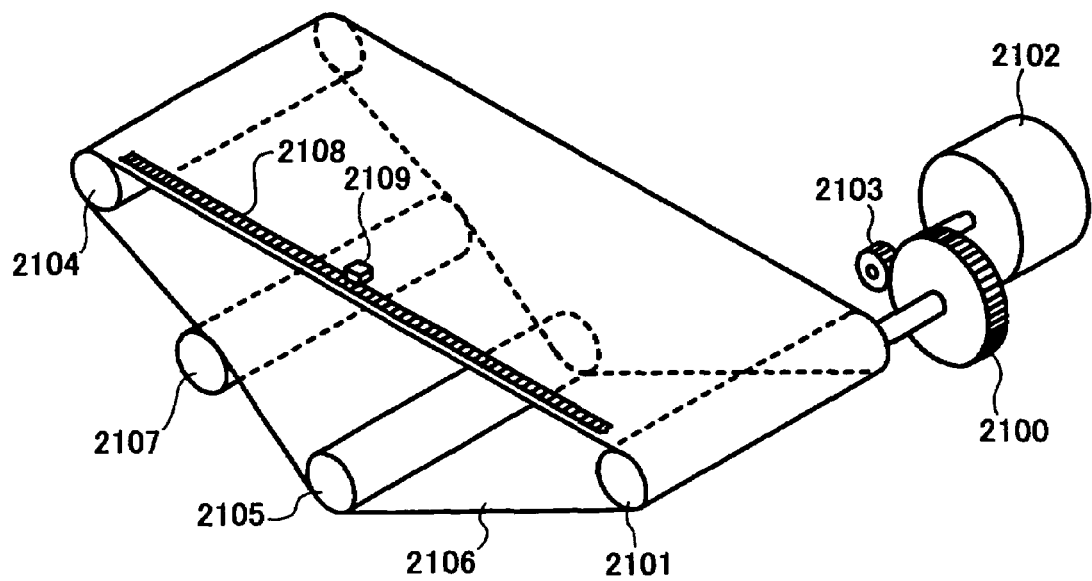
FIG. 14 is a perspective view of a belt drive apparatus according to a seventh embodiment of the invention.
Figure 15:
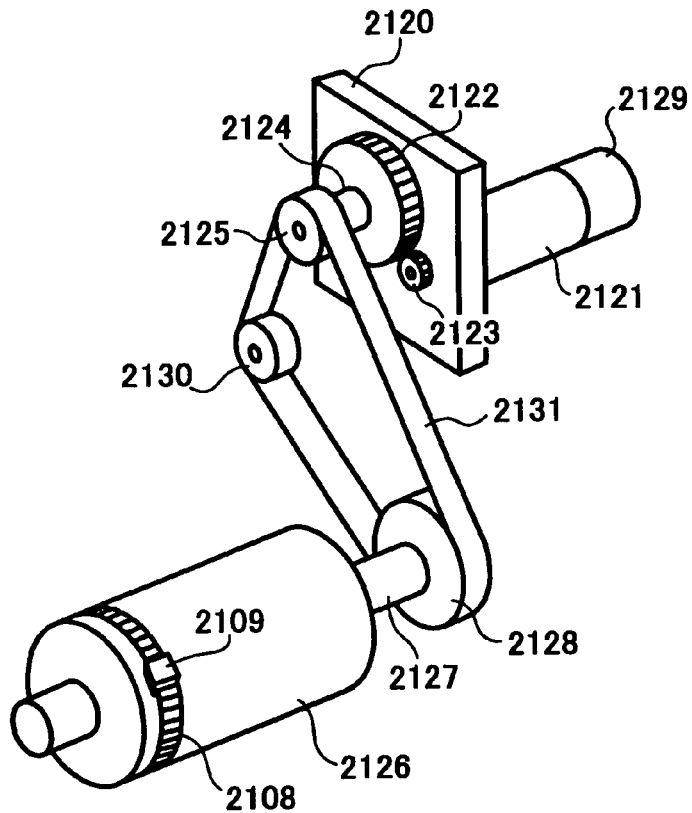
FIG. 15 is a perspective view of a rotating body (drum) drive apparatus.

FIG. 16 is an enlarged view of a joint part of the linear scale 2108 that is stuck to the belt 2106 in FIG. 14 or the drum 2126 in FIG. 15. Patterns (reference graduations for signal and pulse generation) 2108a, which make it possible to measure a drive state, are written in the linear scale 2108 at equal intervals in a moving direction of a rotating body by a method like laser irradiation.

More specifically, the patterns 2108a are written on a tape made of aluminum, and light emitted from a not-shown light-emitting element of the surface sensor 2109 is irradiated on the linear scale 2108 and reflected, and a not-shown light-receiving element of the surface sensor 2109 detects the reflected light. Since the reflected light is intense in parts where the patterns 2108a are not written and the reflected light is weak in parts where the patterns 2108a are written, the patterns 2108a of the linear scale 2108 is recognized. Although an aluminum tape is used as a base material of the linear scale 2108 here, a tape of other materials may be used as long as a drive state can be measured.

Figure 16A:
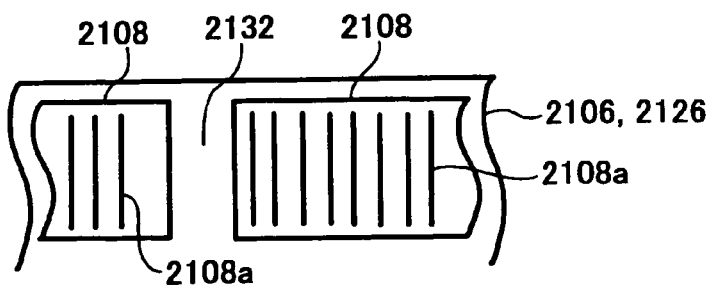
FIGS. 16A and 16B are plan views of a joint of a linear scale.
Figure 16B:
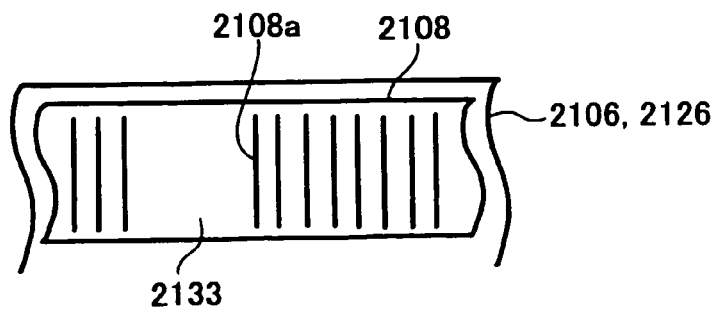

There are two kinds of joints in a method of sticking a tape-like scale such as the linear scale 2108. One is a physical joint 2132 where the linear scale 2108 is not physically continuous as shown in FIG. 16A. The other is a writing joint 2133 as a blank part, where nothing is written on the linear scale 2108 because of a problem of accuracy or the like at the time when the patterns 2108*a* are written, although the linear scale 2108 is present continuously as shown in FIG. 16B.

There is no tape at all in the physical joint 2132, and only a tape without the patterns 2108*a* is present in the writing joint 2133. Thus, a usual measurement signal is not obtained in both the joints. Therefore, in this embodiment, these joints are treated as the same joints and will be hereinafter expressed simply as "joint". In this explanation, it is assumed that the physical joint 2123 and the writing joint 2133 are present separately. However, the physical joint 2123 and the writing joint 2133 may be treated as joints even if the physical joint 2123 and the writing joint 2133 are mixed. In addition, a usual measurement signal is not obtained due to an output error of the surface sensor 2109 itself including scratches, stains, and noise as in the joints.

Figure 17:
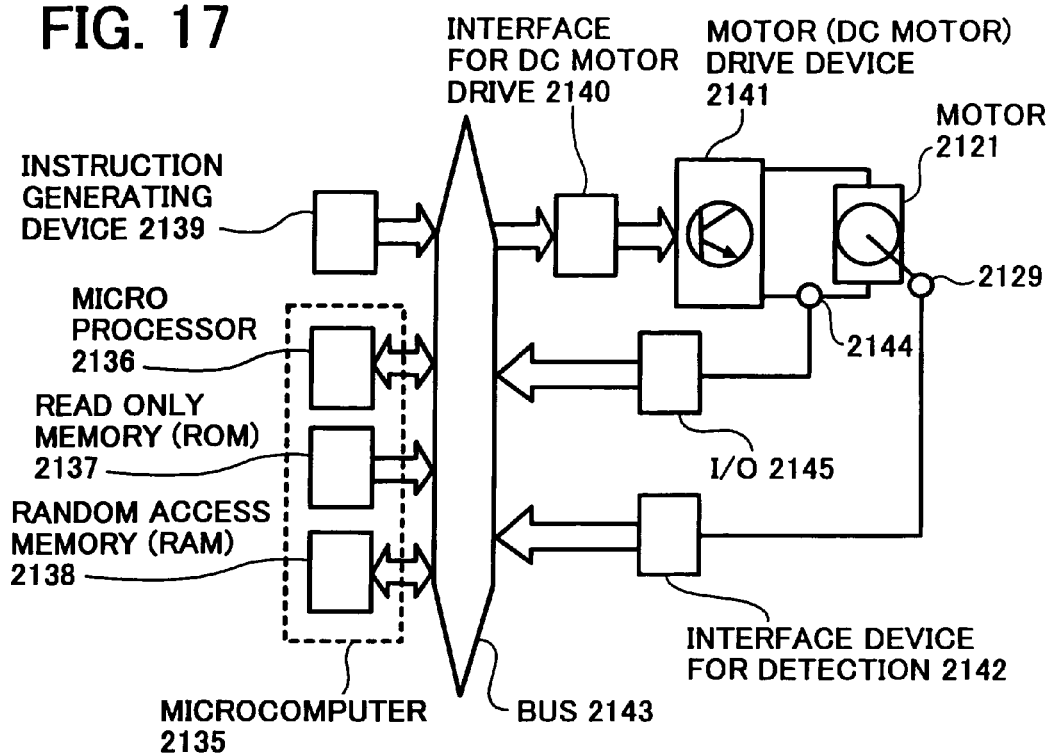
FIG. 17 is a block diagram of a current control system.

FIG. 17 is a block diagram of a structure of a control system that subjects angular displacement of the motor 2121 to digital control based on an output signal of the motor shaft encoder 2129 in a current control system common to the respective embodiments.

In FIG. 17, reference numeral 2135 denotes a microcomputer including a microprocessor 2136, a read only memory (ROM) 2137, and a random access memory (RAM) 2138. The microprocessor 2136, the read only memory (ROM) 2137, and the random access memory (RAM) 2138 are connected to one another via a bus 2143.

Reference numeral 2139 denotes an instruction generating device that outputs a state instruction signal for instructing angular displacement of the motor 2121. The instruction generating device 2139 generates a target angular displacement instruction signal. An output side of the instruction generating device 2139 is also connected to the bus 2143. Reference numeral 2142 denotes an interface device for detection that processes an output pulse of a motor shaft encoder 2129 and converts the output pulse into a digital numerical value. The interface device for detection 2142 includes a counter that counts an output pulse of the motor shaft encoder 2129. The interface device for detection 2142 multiplies a numerical value counted by the counter by a predetermined conversion constant of pulse number versus angular displacement and converts the numerical value into angular displacement of a motor shaft. A motor drive current is taken into the microcomputer 2135 from a current sensor 2144 via an I/O 2145.

Reference numeral 2140 denotes an interface for DC motor drive. The interface for DC motor drive 2140 converts a calculation result of a feedback control system, which is described in embodiments to be described later, obtained by the microcomputer 2135 into a pulse-like signal (control signal) for actuating a power semiconductor, for example, a transistor constituting a motor (DC motor) drive device 2141 according to motor shaft angular displacement and target angular displacement.

The DC motor drive device 2141 operates based on the pulse-like signal from the interface for DC motor drive 2140 and controls a voltage to be applied to the motor 2121. As a result, the motor 2121 is controlled to follow up predetermined angular displacement instructed by the instruction generating device 2139. Angular displacement of the motor 2121 is detected by the motor shaft encoder 2129 and the interface device 2142 and taken into the microcomputer 2135, and the control is repeated.

The linear scale 2108, the surface sensor 2109, and the microcomputer 2135 serving as control means constitute a position control device that controls position of a rotating body in this embodiment.

Figure 18:
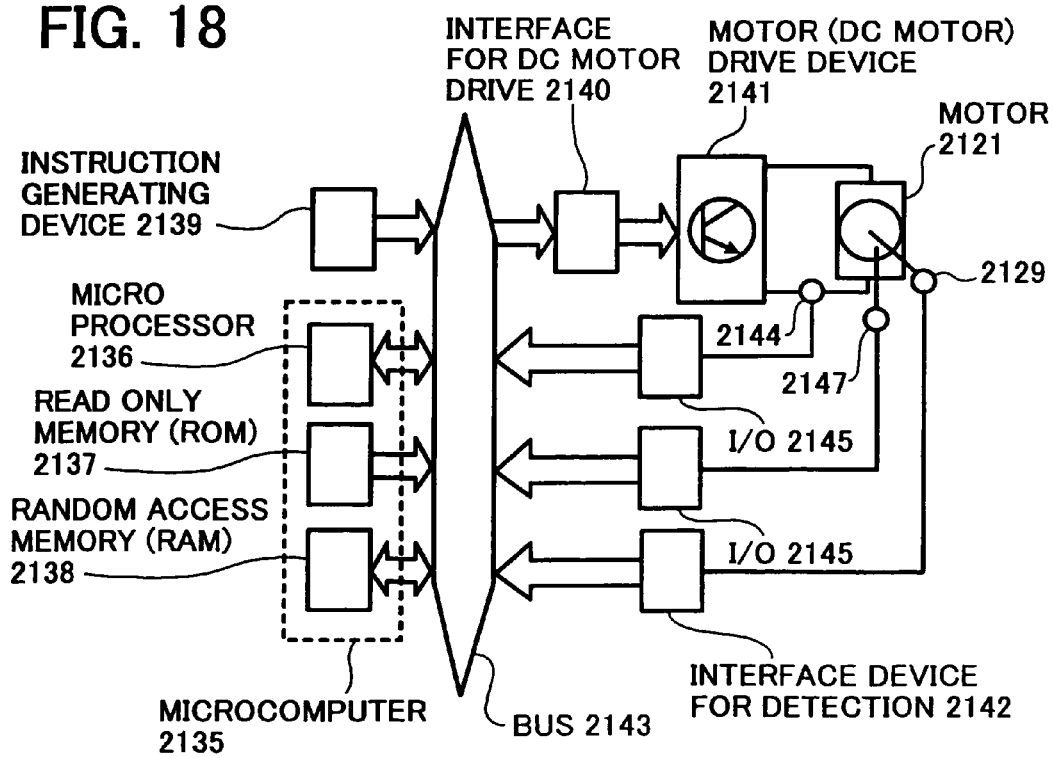
FIG. 18 is a block diagram of a current control system in another example.

FIG. 18 is a block diagram of a structure of a control system that measures angular velocity of the motor 2121 while subjecting angular displacement of the motor 2121 to digital control based on an output signal of the motor shaft encoder 2129 in a current control system common to the respective embodiments.

Only differences from the structure shown in FIG. 17 will be explained. A device 2147 for detecting angular velocity of the motor 2121 is attached to the motor 2121, an output from the device 2147 is input to the interface device 2145 for detection, which converts the output into a digital numerical value, and motor drive velocity is taken into the microcomputer 2135.

Here, angular displacement is detected by an encoder or the like directly from the motor 2121. The same holds true for a method of detecting drive of the belt 2106 and the drum 2126 driven by the motor 2102 and the motor 2121.

In an explanation of this embodiment, an output error of the surface sensor 2109 itself including noise like a joint and dust has occurred and a signal amount (scale pulse number) read in sampling time has fallen below a defined pulse count number (hereinafter simply referred to as "pulse number" as well).

Figure 19:
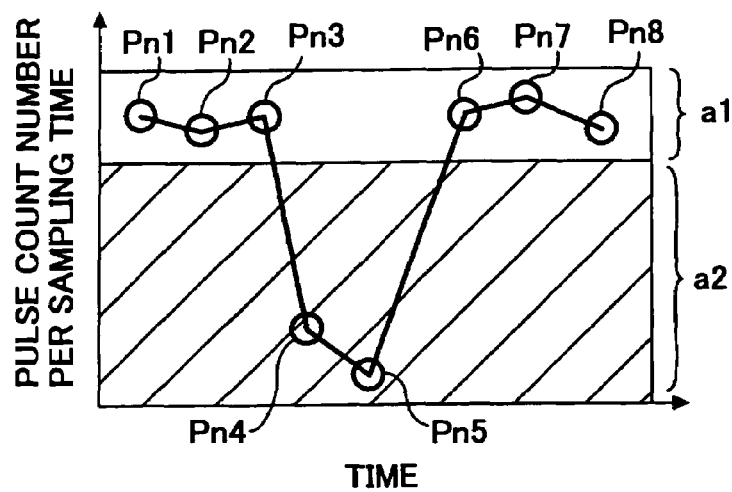
FIG. 19 is a conceptual diagram for grasping a pulse count number per sampling time.

FIG. 19 is a diagram of a drive state at the time when the motor 2102 or the motor 2121 is rotated and driven with respect to the belt 2106 in FIG. 14 or the drum 2126 in FIG. 15. In FIG. 19, a horizontal axis indicates time and a vertical axis indicates a pulse count number per sampling time measured by the surface sensor 2109 (the same holds true for graphs to be described below).

Figure 20:
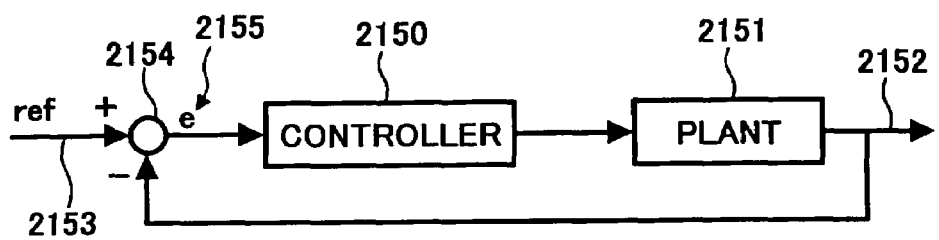
FIG. 20 is a block diagram of a feedback control system in a conventional technique.

Before explaining characteristics of this embodiment, usual drive control, which has been performed conventionally, will be explained with reference to a part of FIG. 19 and a feedback control system shown in FIG. 20. The pulse number per sampling time fluctuates within a range of a usual area a1 in FIG. 19 due to a usual disturbance. At this point, as shown in FIG. 20, in the feedback control system, a control signal is output from a controller 2150, and a drive source of a plant 2151 is driven in response to the control signal. Here, the controller 2150 also includes a current control loop, and the plant 2151 means an overall structure (drive device) that drives the belt 2106 and the drum 2126 with the motors 2102 and 2121 shown in FIGS. 14 and 15.

The surface sensor 2109 measures a drive state of a rotating body such as the belt 2106 and the drum 2126, and an accumulated signal value 2152 is obtained. This accumulated signal value 2152 is feedbacked, a subtracter 2154 compares the fed-back accumulated signal value 2152 and a reference signal 2153 to calculate a deviation 2155 between present displacement and target displacement.

This deviation 2155 is input to the controller 2150, whereby a new control signal is created. This is the usual control that has been performed conventionally. Conventionally, feedback control has been performed based on only fluctuation in the range of the usual area a1 in FIG. 19. In other words, the control is performed according to judgment on whether there is a signal.

This embodiment will be hereinafter explained specifically. A pulse number at present sampling time can be calculated as, for example, (present accumulated pulse number)−(accumulated pulse number at immediately preceding sampling time) from the accumulated signal value 2152 measured by the surface sensor 2109. The pulse number at the present sampling time is calculated in this way.

As shown in FIG. 19, this embodiment introduces a concept of dividing an area where a signal (scale pulse) is generated into the usual area a1 where a fluctuation width, which could occur due to usual disturbance, is taken into account and au unusual area a2 deviating from the usual area a1. A pulse number range equivalent to fluctuation, which hardly occurs due to usual disturbance, that is, the unusual area a2 outside the range of the usual area a1 is determined.

Then, when a signal enters this unusual area a2, it is determined that an error has occurred.

A designer can determine the usual area a1 arbitrarily. As an example of a method of determining a threshold pulse number, when it is assumed that sampling time is A, velocity of the belt 2106 is B, resolution is C, and a scale pitch (pitch of patterns 2108a) is D, the designer calculates a theoretical value as A×B×C÷D, determines a fluctuation width, which could occur due to usual disturbance, with respect to this value, and further determines the usual area a1 shown in FIG. 19 taking into account a margin equivalent to the fluctuation range. "Margin" in this context can be determined from, for example, a distribution state of experimental data.

When only a usual feedback control is performed, as described above, the control is performed based on a measurement result like a pulse number Pn3 in the range of the usual area a1 in FIG. 19.

However, when an output error of the surface sensor 2109 itself including noise like a joint and dust has occurred, the measured pulse number changes to Pn4. Then, although the belt 2106 or the drum 2126 is driven normally, a pulse number is not measured, or a pulse number is measured as if the pulse number has decreased. It is judged that driving of the belt 2106 or the drum 2126 has slowed down.

Therefore, a signal instructing to increase velocity is sent from the control side. Then, when the error part ends (passes) and the measured pulse number changes to Pn6, it is judged that driving of the belt 2106 or the drum 2126 is fast because the velocity is increased in the error part, and a signal instructing to decrease velocity is sent from the control side. Through the series of processing, fluctuation, which is not present originally, is caused by the output error of the surface sensor 2109 itself, and large fluctuation is caused in driving of the belt 2106 or the drum 2126.

It is also likely that the control system becomes unstable when measurement time for an error is long or error occurs frequently, and continuation of control becomes impossible.

Consequently, it is necessary to perform error detection for the pulse number Pn4 or the like, which is measured in the error part inadvertently, and further perform error correction to prevent the control system from being made unstable.

Thus, this embodiment is characterized in that, when it is judged that a measured pulse number is an error, control is continued using a defined pulse number (dummy pulse number) within the usual area a1 instead of the measured pulse number.

This embodiment is different from the conventional technique in that all signals deviating from the usual area a1 where a fluctuation width, which could occur due to a usual disturbance, is taken into account are captured and subjected to correction processing to be used for control.

Figure 21:
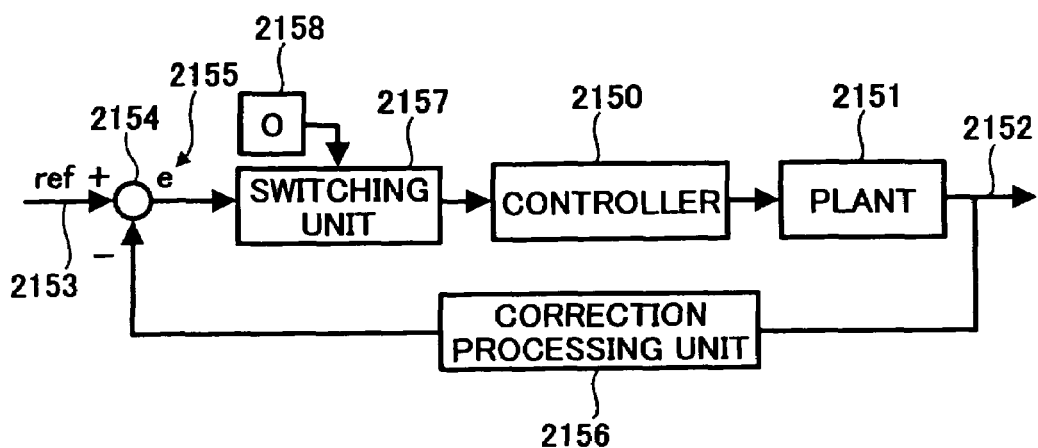
FIG. 21 is a block diagram of a feedback control system according to the seventh embodiment.

FIG. 21 shows the control system in this embodiment. The controller 2150 outputs a control signal, and a drive source for the plant 2151 is driven by the control signal. The accumulated signal value 2152 is obtained from the surface sensor 2109 that has measured a drive state of the plant 2151, and the value is input to a correction processing unit 2156.

If a measured value is a usual value, that is, a pulse number is within the usual area a1, the correction processing unit 2156 outputs the value directly as a feedback signal. If it is judged that the measured value is an error, that is, the pulse number is within the unusual area a2, the correction processing unit 2156 feedbacks a value subjected to correction processing.

The subtracter 2154 compares the feedback value from the correction processing unit 2156 and the reference signal 2153 and inputs a deviation between the feedback value and the reference signal 2153 to a switching unit 2157. When the correction processing unit 2156 judges the measured value is a usual value, the switching unit 2157 uses the deviation directly as a control input. When the correction processing unit 2156 judges that the measured value is an error, a signal generating unit 2158 inputs zero to the switching unit 2157 as a control input.

In the control system in FIG. 21, the entire control system excluding the plant 2151 constitutes the microcomputer 2135 as a control unit in this embodiment.

Figure 22:
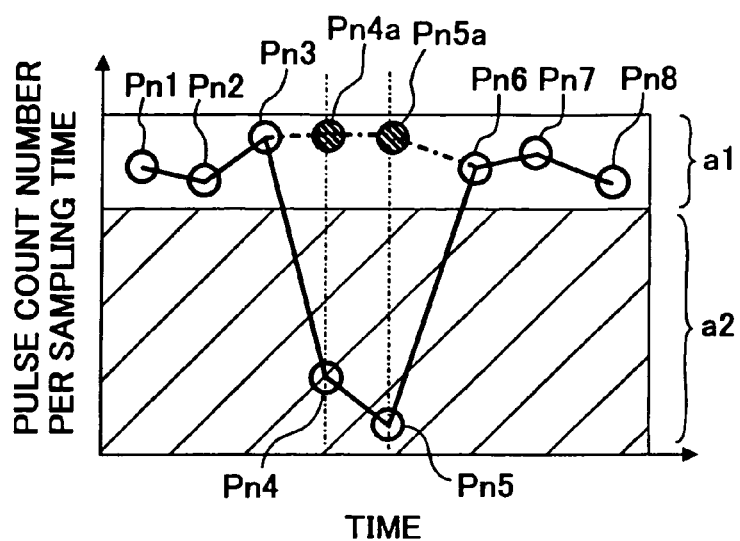
FIG. 22 is a graph of a relation between time and a pulse count number per a sampling time for explaining a position control method for a rotating body according to the seventh embodiment.

An example of a method of determining a dummy pulse number used in the correction processing will be explained with reference to FIG. 22. The usual feedback control is performed up to the pulse number Pn3. While the control is performed, a pulse number in sampling time at that point is saved in, for example, the RAM 2138. When signals from the surface sensor 2109 are normal continuously (when the signals are within the usual area a1), a value of a pulse number is always rewritten, that is, updated.

Then, when the pulse number Pn4 is measured, since the pulse number Pn4 is within the unusual area a2 where a pulse number does not satisfy the defined pulse number, the microcomputer 2135 judges that the pulse number Pn4 is an error.

Consequently, the pulse number saved in the RAM 2138 when the signals are normal (the pulse number Pn3 updated last) is used as a dummy pulse number in error processing instead of the pulse number Pn4. A pulse number Pn4a is treated as a measured pulse number in a control loop. The same holds true for a pulse number Pn5.

When a pulse number enters the error part, the saved pulse number is not updated. An error is always corrected using the saved pulse number (the pulse number Pn3 updated last) in the error part. This processing is continued while a pulse number is judged as an error.

When the error part ends and a pulse number Pn6 is measured, the control departs from the error processing, the usual feedback control is performed, and the saved pulse number is updated again. In this way, the control system does not become unstable to continue the control. Here, a pulse number to be saved may be a pulse number in sampling of the last time or much earlier sampling.

An eighth embodiment of the invention will be explained with reference to FIG. 23. Note that, components identical with those in the above-mentioned embodiment are denoted by the identical reference numerals. The structures and the functions already explained will not be explained repeatedly unless specifically required, and only principal parts will be explained (the same holds true for other embodiments to be described later).

Figure 23:
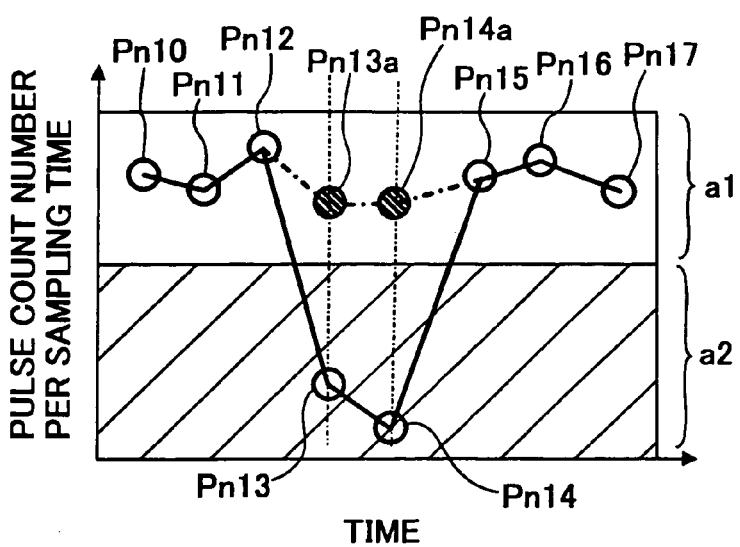
FIG. 23 is a graph of a relation between time and a pulse count number per sampling time for explaining a position control method for a rotating body according to an eighth embodiment of the invention.

As shown in FIG. 23, the usual feedback control is performed up to a pulse number Pn12. When a pulse number Pn13 is measured, since the pulse number Pn13 is within the unusual area a2 where a pulse number does not satisfy the defined pulse, the pulse number Pn13 is judges as an error.

In this case, a calculated logical pulse number is used as a dummy pulse number instead of the pulse number Pn13. A logical pulse number Pn13a is treated as a measured pulse number in the control loop. The same holds true for a pulse number Pn14. This processing is continued while a pulse number is judged as an error. When the error part ends and a pulse number Pn15 is measured, the control departs from the error processing, and the usual feedback control is performed. In this way, the control system does not become unstable to continue the control.

Figure 24:
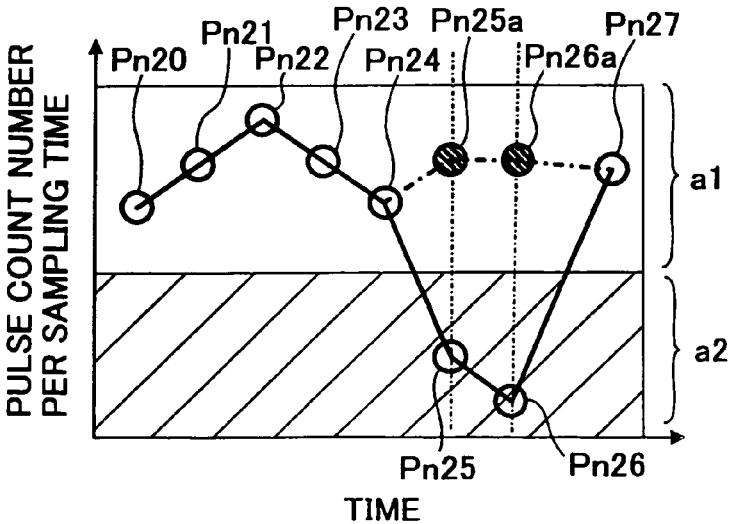
FIG. 24 is a graph of a relation between time and a pulse count number per sampling time for explaining a position control method for a rotating body according to a ninth embodiment of the invention.

A ninth embodiment of the invention will be explained with reference to FIG. 24.

The usual feedback control is performed up to a pulse number Pn24. In the usual feedback control, at least two pulse numbers in sampling time in the past are saved. In this embodiment, a case in which five pulse numbers are saved will be considered.

When signals from the surface sensor 2109 are normal continuously, a value saved earliest is always rewritten such that a state in which immediately preceding five pulse numbers are always saved is maintained. Then, when a pulse number Pn25 is measured, since the pulse number Pn25 is within the unusual area a2 where a pulse number does not satisfy the defined pulse, the pulse number Pn25 is judged as an error.

An average value of the saved immediately preceding five pulse numbers is used as a dummy pulse number instead of the pulse number Pn25. A pulse number Pn25*a* is treated as a measured pulse number in the control loop. The same holds true for a pulse number Pn26.

When a pulse number is in the error part, the pulse number is not updated. While the pulse number is in the error part, an error is always corrected using the average value calculated earlier. This processing is continued while a pulse number is judged as an error. When the error part ends and a pulse number Pn27 is measured, the control departs from the error processing, the usual feedback control is performed, and the saved pulse number is updated. In this way, the control system does not become unstable to continue the control.

Figure 25:
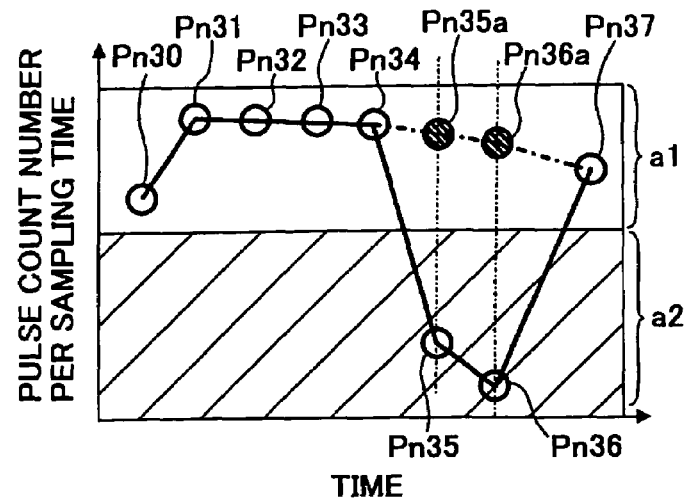
FIG. 25 is a graph of a relation between time and a pulse count number per sampling time for explaining a position control method for a rotating body according to a tenth embodiment of the invention.

A tenth embodiment of the invention will be explained with reference to FIG. 25.

The usual feedback control is performed up to a pulse number Pn34. In the usual feedback control, average velocity of a rotating body in sections in the past is calculated, and an average pulse number is calculated from the average velocity and saved. When signals from the surface sensor 2109 are normal continuously, a value of the average pulse number calculated from the average velocity is always updated continuously.

When a pulse number Pn35 is measured, since the pulse number Pn35 is within the unusual area a2 where a pulse number does not satisfy the defined pulse number, the pulse number Pn35 is judges as an error. The average pulse number calculated from the average velocity is used as a dummy pulse number instead of the pulse number Pn35. A pulse number Pn35*a* is treated as a measured pulse number in the control loop. The same holds true for a pulse number Pn36.

When a pulse number is in the error part, the saved average pulse number calculated from the average velocity is not updated. While the pulse number is in the error part, an error is always corrected using the average pulse number. This processing is continued while a pulse number is judged as an error. When the error part ends and a pulse number Pn37 is measured, the control departs from the error processing, the usual feedback control is performed, and a value of the average pulse number calculated from the average velocity is updated again. In this way, the control system does not become unstable to continue the control.

According to the respective embodiments, a position accuracy of driving of the belt 2106 or the drum 2126, which is an object of drive, can be improved, and highly accurate driving can be performed.

In the explanation of all the embodiments, an output error of the surface sensor 2109 itself including a joint, dust, and noise has occurred and a pulse number has fallen below the defined pulse number. In an explanation of an eleventh embodiment, a signal amount (scale pulse number) read in sampling time has exceeded the defined pulse number.

Figure 26:
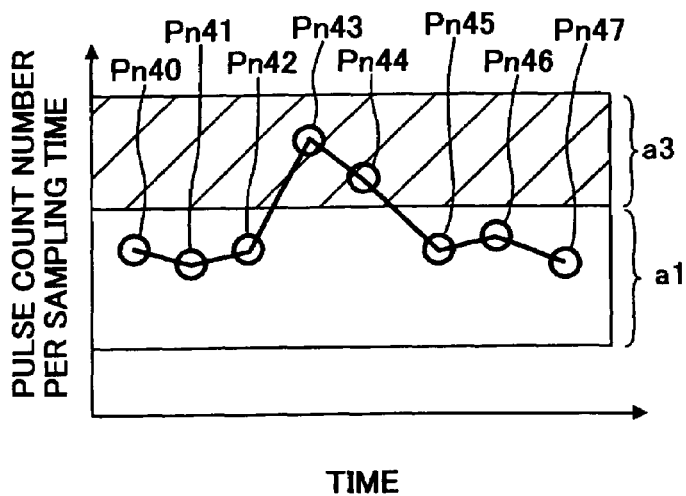
FIG. 26 is a graph of a basic concept of a relation between time and a pulse count number per sampling time according to an eleventh embodiment of the invention.

As shown in FIG. 26, an area where a signal (scale pulse) is generated is divided into a usual area a1 where a fluctuation width, which could occur due to usual disturbance, is taken into account and an unusual area a3 deviating from the usual area a1. When a signal enters this unusual area a3, it is determined that the signal is an error. A method of determining the usual area a1, a method of determining a threshold pulse number, and the like are the same as those in the above description.

When only the usual feedback control is performed, the control is performed based on a measurement result of a pulse number Pn40 and the like in a range of the usual area a1.

However, when an output error of the surface sensor 2109 itself including a joint, dust, and noise occurs, a measured pulse number changes to Pn43. Then, although the belt 2106 or the drum 2126 is always driven, a pulse number is not measured, or a pulse number is measured as if the pulse number has decreased. It is judged that driving of the belt 2106 or the drum 2126 has slowed down.

Therefore, a signal instructing to increase velocity is sent from the control side. Then, when the error part ends (passes) and the measured pulse number changes to Pn45, it is judged that driving of the belt 2106 or the drum 2126 is fast because the velocity is increased in the error part, and a signal instructing to decrease velocity is sent from the control side. Through the series of processing, fluctuation, which is not present originally, is created by the output error of the surface sensor 2109 itself, and large fluctuation is caused in driving of the belt 2106 or the drum 2126.

It is also likely that the control system becomes unstable when measurement time for an error is long or error occurs frequently, and continuation of control becomes impossible.

Consequently, it is necessary to perform error detection for the pulse number Pn43 or the like, which is measured in the error part inadvertently, and further perform error correction to prevent the control system from being made unstable.

Thus, in this embodiment, when it is judged that a measured pulse number is an error, control is continued using a defined pulse number (dummy pulse number) within the usual area a1 instead of the measured pulse number. The control system at the time when the correction processing is performed is the same as that in the above-mentioned embodiments.

Figure 27:
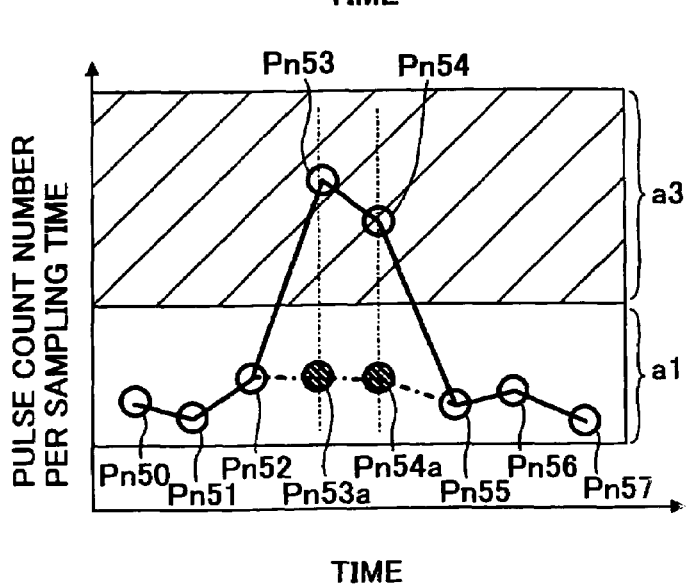
FIG. 27 is a graph of a relation between time and a pulse count number per sampling time for explaining a position control method for a rotating body according to the eleventh embodiment.

An example of a method of determining a dummy pulse number used in the correction processing will be explained with reference to FIG. 27.

The usual feedback control is performed up to a pulse number Pn52. While the control is performed, a pulse number in sampling time at that point is saved. When signals from the surface sensor 2109 are normal continuously, a value of a pulse number is always rewritten.

When a pulse number Pn53 is measured, since the pulse number Pn53 is within the unusual area a3 where a pulse number does not satisfy the defined pulse number, it is judged that the pulse number Pn53 is an error. Thus, the pulse number Pn52, which is saved when the signals are normal, is used as a dummy pulse number in error processing instead of the pulse number Pn53. A pulse number Pn53*a* is treated as a measured pulse number in a control loop. The same holds true for a pulse number Pn54.

When a pulse number is in the error part, the saved pulse number is not updated. An error is always corrected using the saved pulse number in the error part. This processing is continued while a pulse number is judged as an error. When the error part ends and a pulse number Pn55 is measured, the control departs from the error processing, the usual feedback control is performed, and the saved pulse number is updated again. In this way, the control system does not become unstable to continue the control. Here, a pulse number to be saved may be a pulse number in sampling of the last time or much earlier sampling.

Figure 28:
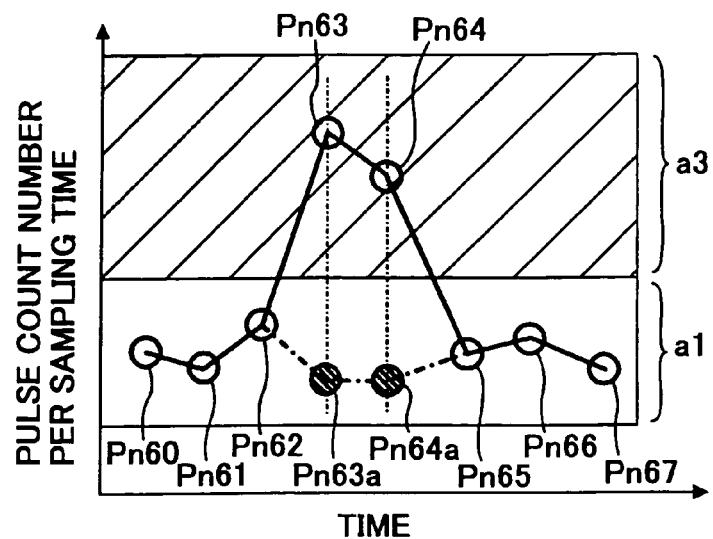
FIG. 28 is a graph of a relation between time and a pulse count number per sampling time for explaining a position control method for a rotating body according to a twelfth embodiment.

A twelfth embodiment of the invention will be explained with reference to FIG. 28.

The usual feedback control is performed up to a pulse number Pn62. When a pulse number Pn63 is measured, since the pulse number Pn63 is within the unusual area a3 where a pulse number does not satisfy the defined pulse, the pulse number Pn63 is judges as an error. A calculated logical pulse number is used as a dummy pulse number instead of the pulse number Pn63. A logical pulse number Pn63a is treated as a measured pulse number in the control loop. The same holds true for a pulse number Pn64.

This processing is continued while a pulse number is judged as an error. When the error part ends and a pulse number Pn65 is measured, the control departs from the error processing, and the usual feedback control is performed. In this way, the control system does not become unstable to continue the control.

Figure 29:
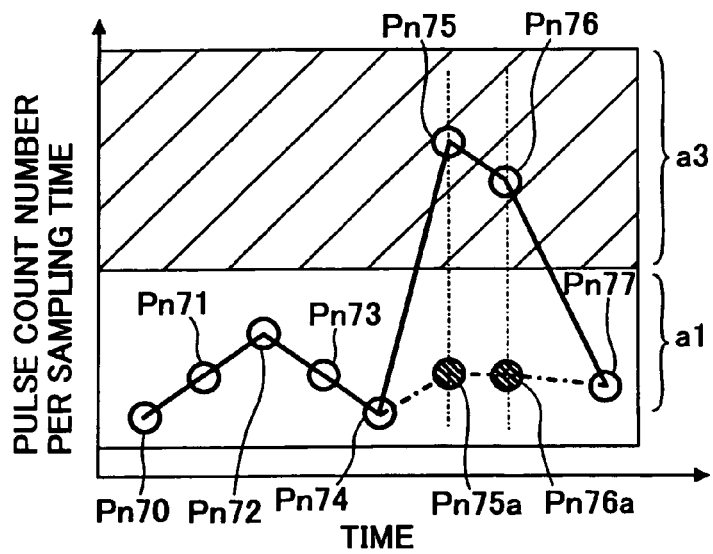
FIG. 29 is a graph of a relation between time and a pulse count number per sampling time for explaining a position control method for a rotating body according to a thirteenth embodiment.

A thirteenth embodiment of the invention will be explained with reference to FIG. 29.

The usual feedback control is performed up to a pulse number Pn74. In the usual feedback control, at least two pulse numbers in sampling time in the past are saved. In this embodiment, a case in which five pulse numbers are saved will be considered.

When signals from the surface sensor 2109 are normal continuously, a value saved earliest is always rewritten such that a state in which immediately preceding five pulse numbers are always saved is maintained. Then, when a pulse number Pn75 is measured, since the pulse number Pn75 is within the unusual area a3 where a pulse number does not satisfy the defined pulse, the pulse number Pn75 is judged as an error. An average value of the saved immediately preceding five pulse numbers is used as a dummy pulse number instead of the pulse number Pn75. A pulse number Pn75a is treated as a measured pulse number in the control loop. The same holds true for a pulse number Pn76.

When a pulse number is in the error part, the pulse number is not updated. While the pulse number is in the error part, an error is always corrected using the average value calculated earlier. This processing is continued while a pulse number is judged as an error. When the error part ends and a pulse number Pn77 is measured, the control departs from the error processing, the usual feedback control is performed, and the saved pulse number is updated. In this way, the control system does not become unstable to continue the control.

Figure 30:
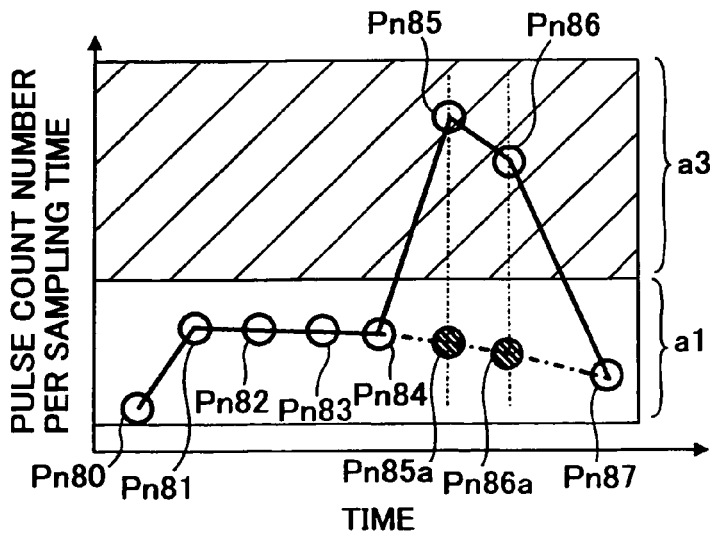
FIG. 30 is a graph of a relation between time and a pulse count number per sampling time for explaining a position control method for a rotating body according to a fourteenth embodiment.

A fourteenth embodiment of the invention will be explained with reference to FIG. 30.

The usual feedback control is performed up to a pulse number Pn84. In the usual feedback control, average velocity of a rotating body in sections in the past is calculated, and an average pulse number is calculated from the average velocity and saved. When signals from the surface sensor 2109 are normal continuously, a value of the average pulse number calculated from the average velocity is always updated continuously.

When a pulse number Pn85 is measured, since the pulse number Pn85 is within the unusual area a3 where a pulse number does not satisfy the defined pulse number, the pulse number Pn85 is judges as an error. The average pulse number calculated from the average velocity is used as a dummy pulse number instead of the pulse number Pn85. A pulse number Pn85a is treated as a measured pulse number in the control loop. The same holds true for a pulse number Pn86.

When a pulse number is in the error part, the average pulse number calculated from the average velocity is not updated. While the pulse number is in the error part, an error is always corrected using the average pulse number. This processing is continued while a pulse number is judged as an error. When the error part ends and a pulse number Pn87 is measured, the control departs from the error processing, the usual feedback control is performed, and a value of the average pulse number calculated from the average velocity is updated again. In this way, the control system does not become unstable to continue the control.

As described above, a position accuracy of driving of the belt 2106 or the drum 2126, which is an object of drive, can be improved, and highly accurate driving can be performed.

In the explanation of the above-mentioned respective embodiments, a pulse number has fallen below the defined pulse number or the case in which a pulse number has exceeded the defined pulse number. In an explanation of a fifteenth embodiment, an output error of the surface sensor 2109 itself including a joint, dust, and noise occurs and a signal amount (scale pulse number) read in sampling time exceeds or falls below the defined pulse number.

Figure 31:
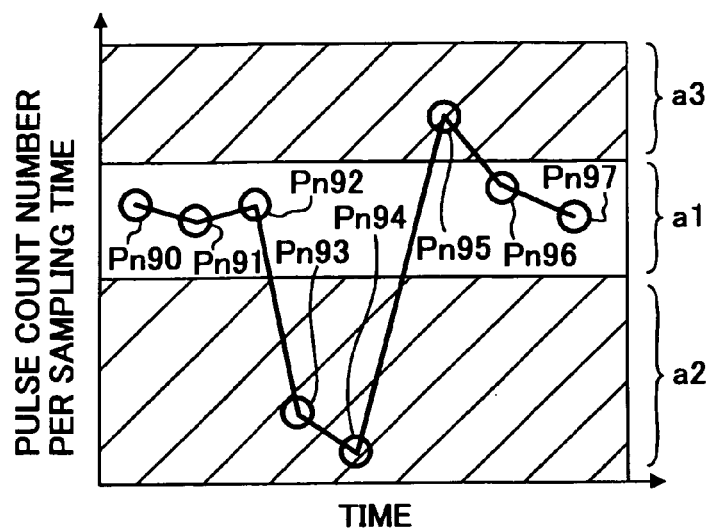
FIG. 31 is a graph of a basic concept of a relation between time and a pulse count number per sampling time according to a fifteenth embodiment of the invention.

As shown in FIG. 31, an area where a signal (scales pulse) is generated is divided into a usual area a1 where a fluctuation width, which could occur due to usual disturbance, is taken into account, and an unusual area a2 and an unusual area a3 deviating from the usual area a1. When a signal enters the unusual area a2 or a3, it is determined that the signal is an error. A method of determining the usual area a1, a method of determining a threshold pulse number, and the like are the same as those described above.

When only the usual feedback control is performed, the control is performed based on a measurement result for a pulse number Pn90 within a range of the usual area a1.

However, when an output error of the surface sensor 2109 including a joint, dust, and noise occurs, a measured pulse number changes to Pn93. Then, although the belt 2106 or the drum 2126 is driven normally, a pulse number is not measured, or a pulse number is measured as if the pulse number has decreased. It is judged that driving of the belt 2106 or the drum 2126 has slowed down.

When the measured pulse number changes to a pulse number Pn95, a pulse number is measured as if the measured number has increased, and it is judged that driving of the belt 2106 or the drum 2126 has become fast. Therefore, a signal instructing to increase or decrease velocity is sent from the control side. Then, when the error part ends and the measured pulse number changes to a pulse number Pn96, it is judged that driving of the belt 2106 or the drum 2126 is fast because velocity is increased in the error part as a whole or driving of the belt 2106 or the drum 2126 is slow because velocity is decreased in the error part as a whole. A signal instructing to decrease or increase velocity is sent from the control side.

Through the series of processing, fluctuation, which is not present originally, is created by the output error of the surface sensor 2109 itself, and large fluctuation is caused in driving of the belt 2106 or the drum 2126.

It is also likely that the control system becomes unstable when measurement time for an error is long or error occurs frequently, and continuation of control becomes impossible.

Consequently, it is necessary to perform error detection for the pulse number Pn93 and the pulse number Pn94, which is measured in the error part inadvertently, and further perform error correction to prevent the control system from being made unstable.

Thus, in this embodiments, when it is judged that a measured pulse number is an error, control is continued using a defined pulse number (dummy pulse number) within the usual area a1 instead of the measured pulse number. The control system at the time when n the correction processing is performed is the same as that in the above-mentioned embodiments.

Figure 32:
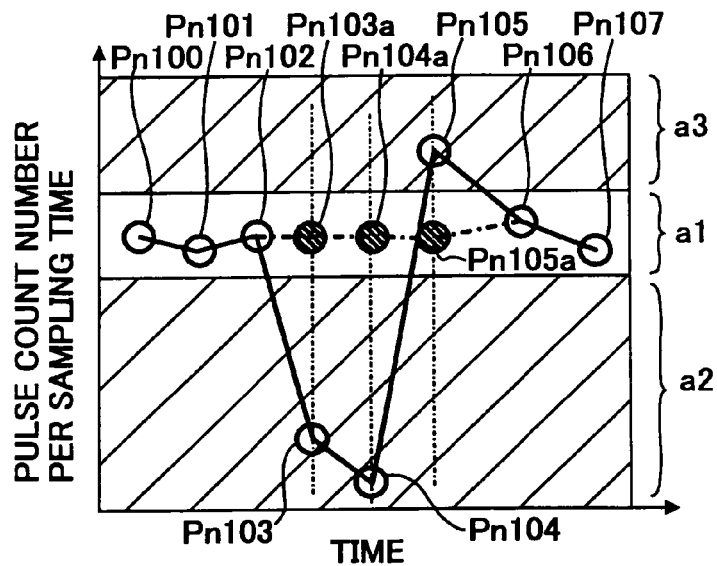
FIG. 32 is a graph of a relation between time and a pulse count number per sampling time for explaining a position control method for a rotating body according to the fifteenth embodiment.

An example of a method of determining a dummy pulse number used in the correction processing will be explained with reference to FIG. 32.

The usual feedback control is performed up to a pulse number Pn2102. While the control is performed, a pulse number in sampling time at that point is saved. When signals from the surface sensor 2109 are normal continuously, a value of a pulse number is always rewritten.

When a pulse number Pn2103 is measured, since the pulse number Pn2103 is within the unusual area a2 where a pulse number does not satisfy the defined pulse number, it is judged that the pulse number Pn2103 is an error. Thus, a pulse number, which is saved when the signals are normal, is used as a dummy pulse number in error processing. A pulse number Pn2103a is treated as a measured pulse number in a control loop. The same holds true for a pulse number Pn2104.

When a pulse number is in the error part, the saved pulse number is not updated. An error is always corrected using the saved pulse number in the error part. In addition, when a pulse number Pn2105 is measured continuously or discontinuously, since the pulse number Pn2105 is within the unusual area a3 where a pulse number does not satisfy the defined pulse number, the pulse number Pn2105 is judged as an error. In this case, as in the above case, a pulse number Pn2105a is treated as a measured pulse number in the control loop.

This processing is continued while a pulse number is judged as an error. When the error part ends and a pulse number Pn2106 is measured, the control departs from the error processing, the usual feedback control is performed, and the saved pulse number is updated again. In this way, the control system does not become unstable to continue the control. Here, a pulse number to be saved may be a pulse number in sampling of the last time or much earlier sampling.

Figure 33:
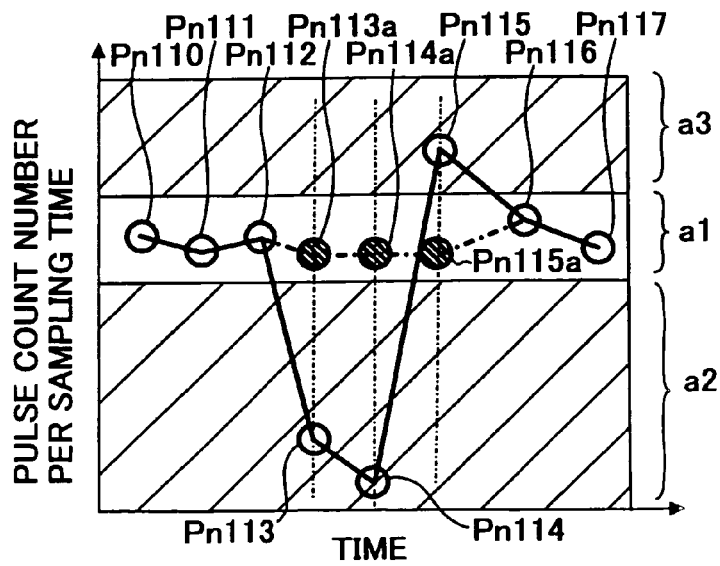
FIG. 33 is a graph of a relation between time and a pulse count number per sampling time for explaining a position control method for a rotating body according to a sixteenth embodiment.

A sixteenth embodiment of the invention will be explained with reference to FIG. 33.

The usual feedback control is performed up to a pulse number Pn112. When a pulse number Pn113 is measured, since the pulse number Pn113 is within the unusual area a2 where a pulse number does not satisfy the defined pulse, the pulse number Pn113 is judges as an error. A calculated logical pulse number is used as a dummy pulse number instead of the pulse number Pn113. A pulse number Pn113a is treated as a measured pulse number in the control loop. The same holds true for a pulse number Pn114.

When a pulse number Pn115 is measured continuously or discontinuously, since the pulse number Pn115 is within the unusual area a3 where a pulse number does not satisfy the defined pulse, the pulse number Pn115 is judges as an error. In this case, as in the above case, a pulse number Pn115a is treated as a measured pulse number in the control loop. This processing is continued while a pulse number is judged as an error.

When the error part ends and a pulse number Pn116 is measured, the control departs from the error processing, and the usual feedback control is performed. In this way, the control system does not become unstable to continue the control.

Figure 34:
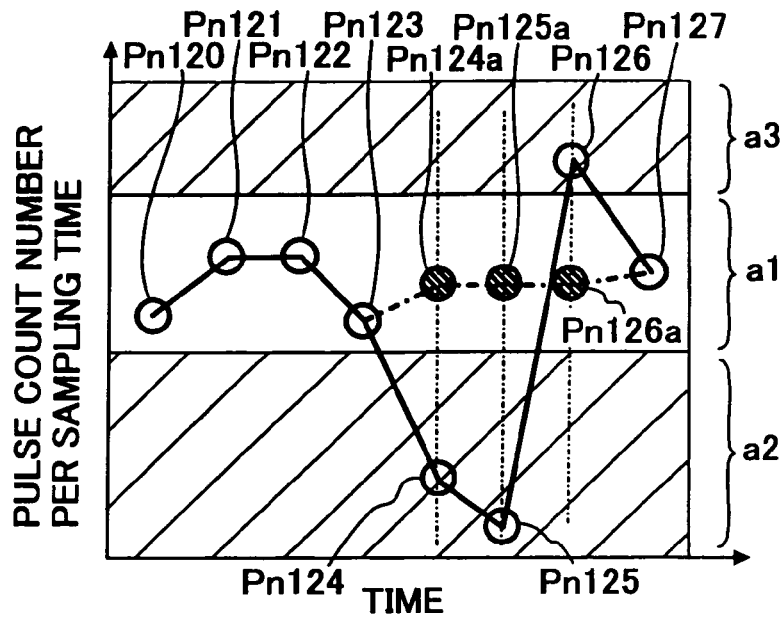
FIG. 34 is a graph of a relation between time and a pulse count number per sampling time for explaining a position control method for a rotating body according to a seventeenth embodiment.

A seventeenth embodiment of the invention will be explained with reference to FIG. 34.

The usual feedback control is performed up to a pulse number Pn2123. In the usual feedback control, at least two pulse numbers in sampling time in the past are saved. In this embodiment, a case in which four pulse numbers are saved will be considered.

When signals from the surface sensor 2109 are normal continuously, a value saved earliest is always rewritten such that a state in which immediately preceding four pulse numbers are always saved is maintained.

When a pulse number Pn2124 is measured, since the pulse number Pn2124 is within the unusual area a2 where a pulse number does not satisfy the defined pulse, the pulse number Pn2124 is judged as an error. An average value of the saved immediately preceding four pulse numbers is used as a dummy pulse number instead of the pulse number Pn2124. A pulse number Pn2124a is treated as a measured pulse number in the control loop. The same holds true for a pulse number Pn2125.

When a pulse number is in the error part, the saved pulse number is not updated. While the pulse number is in the error part, an error is always corrected using the average value calculated earlier. In addition, when a pulse number Pn2126 is measured continuously or discontinuously, since the pulse number Pn2126 is within the unusual area a3 where a pulse number does not satisfy the defined pulse number, the pulse number Pn2126 is judged as an error. In this case, as in the above case, a pulse number Pn2126a is treated as a measured pulse number in the control loop.

This processing is continued while a pulse number is judged as an error. When the error part ends and a pulse number Pn2127 is measured, the control departs from the error processing, the usual feedback control is performed, and the saved pulse number is updated. In this way, the control system does not become unstable to continue the control.

Figure 35:
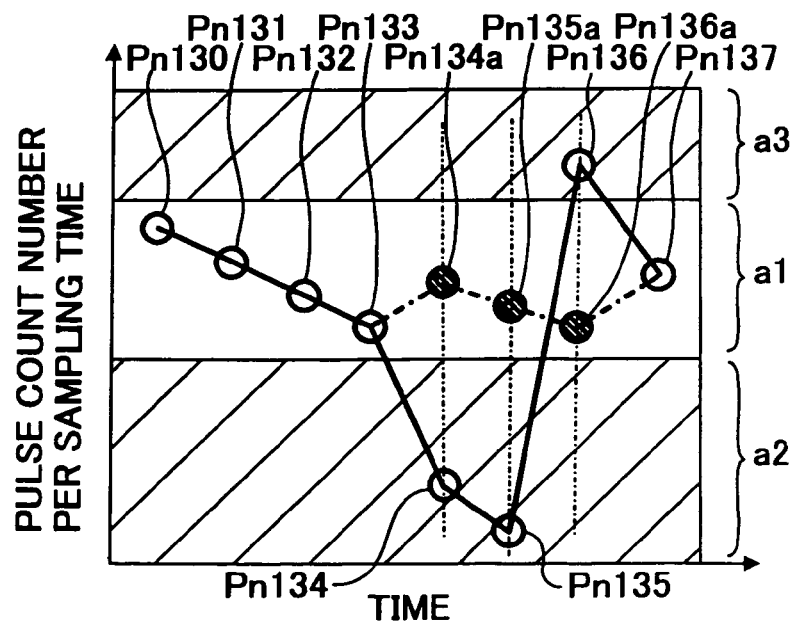
FIG. 35 is a graph of a relation between time and a pulse count number per sampling time for explaining a position control method for a rotating body according to an eighteenth embodiment of the invention.

An eighteenth embodiment will be explained with reference to FIG. 35.

The usual feedback control is performed up to a pulse number Pn2123. In the usual feedback control, average velocity of a rotating body in sections in the past is calculated, and an average pulse number is calculated from the average velocity and saved. When signals from the surface sensor 2109 are normal continuously, a value of the average pulse number calculated from the average velocity is always updated continuously.

When a pulse number Pn2134 is measured, since the pulse number Pn2134 is within the unusual area a2 where a pulse number does not satisfy the defined pulse number, the pulse number Pn2134 is judges as an error. The average pulse number calculated from the average velocity is used as a dummy pulse number instead of the pulse number Pn2134. A pulse number Pn2134a is treated as a measured pulse number in the control loop. The same holds true for a pulse number Pn2135.

When a pulse number is in the error part, the average pulse number calculated from the average velocity is not updated. While the pulse number is in the error part, an error is always corrected using the average pulse number. Moreover, when a pulse number Pn2136 is measured continuously or discontinuously, since the pulse number Pn2136 is within the unusual area a3 where a pulse number does not satisfy the defined pulse number, the pulse number Pn2136 is judged as an error. In this case, as in the above case, a pulse number Pn2136a is treated as a measured pulse number in the control loop.

This processing is continued while a pulse number is judged as an error. When the error part ends and a pulse number Pn2137 is measured, the control departs from the error processing, the usual feedback control is performed, and a value of the average pulse number calculated from the average velocity is updated again. In this way, the control system does not become unstable to continue the control.

As described above, even when a pulse number falls below or exceeds the defined pulse number, a position accuracy of driving of the belt 2106 or the drum 2126, which is an object of drive, can be improved, and highly accurate driving can be performed.

Although the current control system is explained in the above-mentioned respective embodiments, the control system may be a voltage control system.

Figure 36:
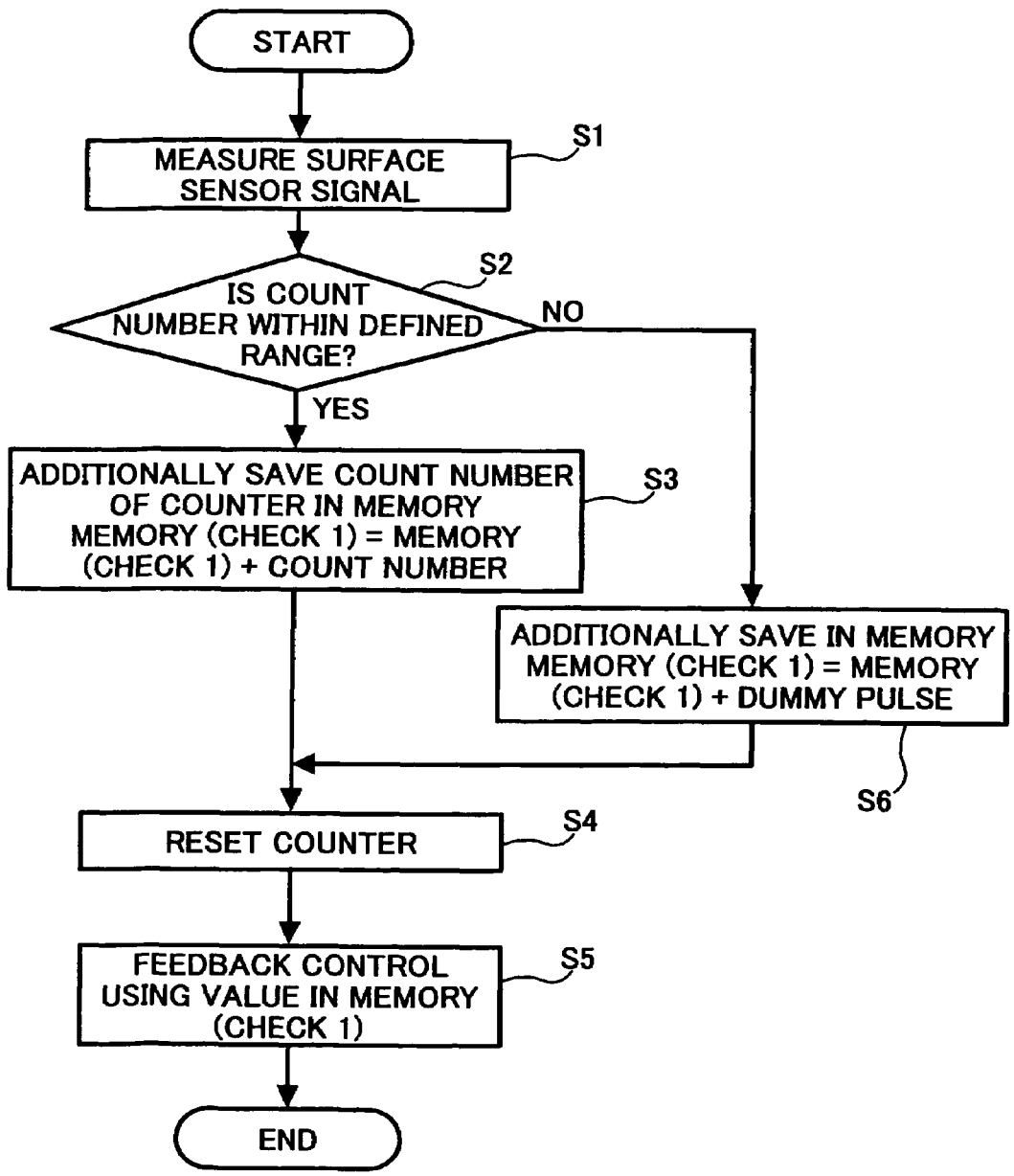
FIG. 36 is a flowchart of error detection, error processing, and an operation of a control system at the time when a counter has a reset function.

Error detection, error processing, and an operation of a control system in the respective embodiments will be explained with reference to a flowchart in FIG. 36. In this explanation, a counter has a reset function.

The surface sensor 2109 measures a drive state of the belt 2106 or the drum 2126 (S1). A value necessary for performing position control is an accumulated count number (number) from an initial period. However, even when a counter has a reset function and performs reset, position control is possible by saving an accumulated count number in a memory.

A control unit judges whether a pulse count number measured by the counter is within a defined range (S2). When the pulse count number is within the defined range, since the count number is a normal measurement value, the control unit additionally saves a count number measured by the counter in addition to a count number accumulated to that point in a memory (check 1) (S3). Here, the memory (check 1) means a specific saving area in the RAM 2138.

Thereafter, the control unit resets the counter (S4) and performs feedback control using the value additionally saved in the memory (check 1) (S5). Note that, an initial value of the memory (check 1) is 0.

If the count number measured by the counter is not within the defined range in S2, since the count number is an abnormal measured value of a joint or the like, the control unit additionally saves a dummy pulse(more strictly, dummy pulse number) in the memory (check 1) (S6).

Thereafter, the control unit resets the counter and performs the feedback control using the value of the dummy pulse additionally saved in the memory (check 1).

The counter is reset once per one loop, which makes it easy to obtain a count number per sampling time and also makes it possible to prevent a count number, which does not satisfy the defined range at the time of abnormality such as a joint, from being saved.

Figure 37:
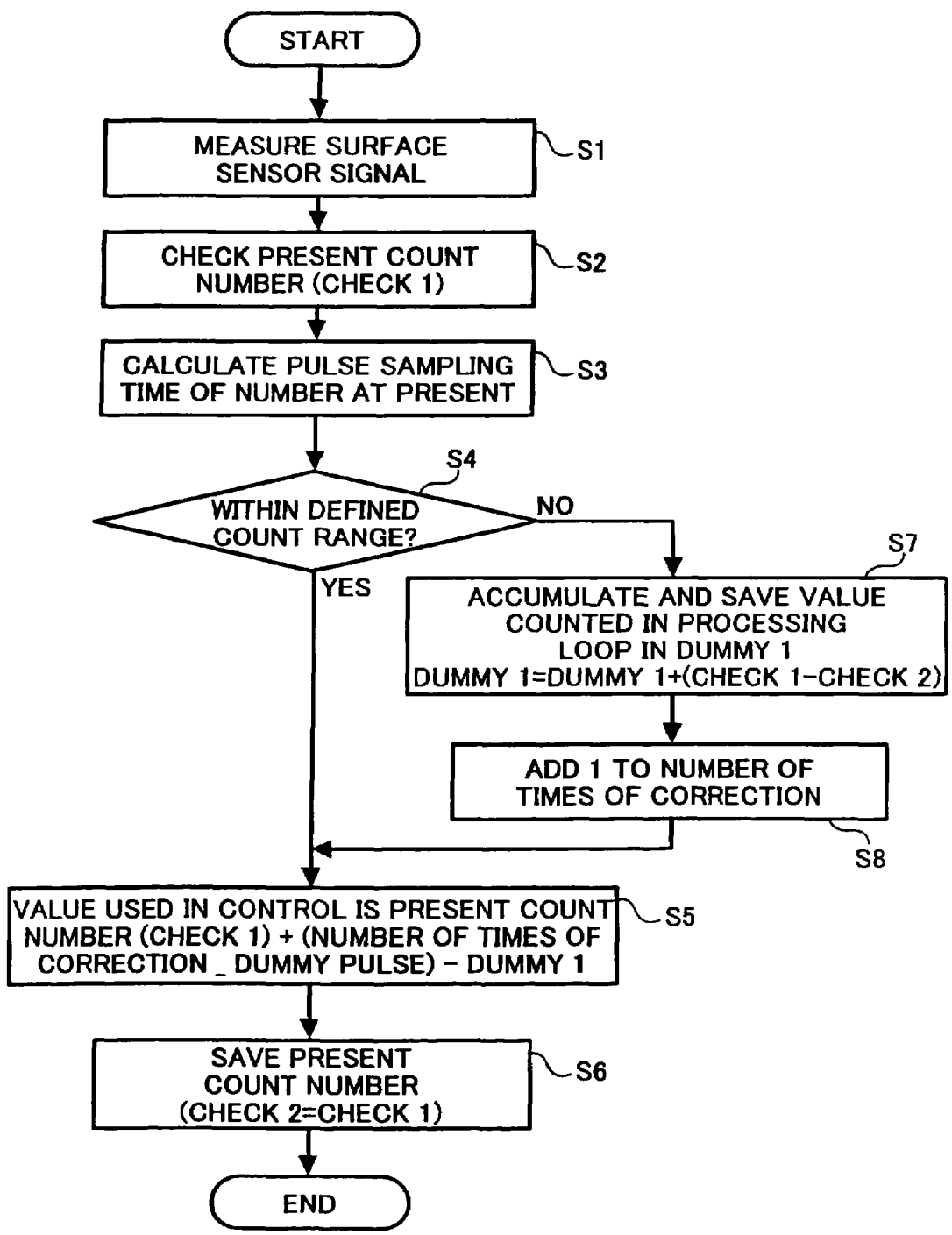
FIG. 37 is a flowchart of error detection, error processing, and an operation of a control system at the time when a counter does not have a reset function.

FIG. 37 is a flowchart about a case in which a counter does not have the reset function.

The surface sensor 2109 measures a drive state of the belt 2106 or the drum 2126 (S1). Since position control is performed here, an accumulated pulse number from the start of drive is counted in the counter. First, the control unit saves a present count number in a memory area check 1 (S2). An accumulated count number at immediately preceding sampling time is saved in a memory area check 2. The control unit can calculate a pulse number at the present sampling time by calculating a difference between check 1 and check 2 (S3).

Here, an initial value of check 2 is 0. Next, the control unit checks whether the calculated pulse number at the present sampling time is within a defined count range (S4). If the pulse number is within the defined count range, the control unit performs control without entering a correction loop. At this point, a value to be used in the control is calculated as the present counter value (check 1)+(the number of times of correction×dummy pulse number)−dummy 1 (S5). Here, dummy 1 indicates accumulated and saved error counts, which are measured in the error part inadvertently. An initial value of dummy 1 is 0. In addition, an initial value of the number of times of correction is 0.

A value calculated by the above-mentioned method is input as a dummy pulse number. After error detection, the control unit writes a value of the present count number check 1 over check 2 and saves the value (S6). In this way, the value can be used in the next step as an accumulated count number at immediately preceding sampling time. Then, the control unit executes control.

If the pulse number at the present sampling time is not within the defined count range in S4, the control unit judges that the pulse number is an error and performs error processing. First, the control unit accumulates and saves the count number, which is measured inadvertently, in dummy 1 (S7) and adds 1 to the number of times of correction (S8). A value to be used in the control is the same as the above expression. However, since the number of times of correction is larger by one and the accumulated value in dummy 1 is different, the value is subjected to error processing and input to the control loop. Thereafter, the control unit writes a value of the present count number check 1 over check 2 and saves the value.

In this way, the value can be used in the next step as an accumulated count number at immediately preceding sampling time. Then, the control unit executes control.

Since the control loop proceeds in such a flow, even if an error is present, the error is detected correctly, and the error processing is performed surely. This makes it possible to drive the belt 2106 or the drum 2126, which is an object of drive, highly accurately.

A nineteenth embodiment of the invention will be hereinafter explained with reference to FIGS. 38 to 44.

First, with reference to FIG. 38, a basic structure of a belt drive apparatus including a belt serving as a rotating body to be an object of position control (drive control, displacement control) will be explained. The belt in this context is an endless belt wound around at least two shafts and is equivalent to a photosensitive belt, an intermediate transfer belt, and a direct transfer belt to be described later.

A drive shaft 3101 is attached to a rotation shaft of a gear 3100 to be capable of rotating synchronously with the rotation shaft. A gear 3103 is attached to a rotation shaft of a motor 3102 to transmit rotation of the motor 3102 serving as a drive source via a gear 3103 and a gear 3100 and drive to rotate the drive shaft 3101. A belt 3106, which is an object of drive and an object of position control, is wound around the drive shaft 3101 and driven shafts 3104 and 3105 such that a constant tension is applied to the belt 3106 by a tension roller 3107.

A linear scale 3108 serving as a scale is stuck on a surface of the belt 3106 along a moving direction of the belt 3106. This linear scale 3108 is read by a surface sensor 3109 consisting of a reflective photo-sensor, whereby a drive state (fluctuation in a position, fluctuation in velocity) of the belt 3106 is measured. The linear scale 3108 and the surface sensor 3109 constitute a first signal generating unit.

The belt 3106, which is the object of drive, is driven to rotate by rotating the motor 3102. Although the linear scale 3108 is stuck at an end on the surface of the belt 3106 here, the linear scale 3108 may be stuck in a central part or on a back of the belt 3106. In addition, a scale may be written on the belt 3106 directly.

A basic structure of a rotating body drive apparatus including a rotating body to be an object of position control will be explained with reference to FIG. 39. The rotating body in this context is equivalent to a photosensitive drum and a transfer drum to be described later.

A drive pulley 3125 is attached to a rotation shaft 3124 of a gear 3122. A gear 3123 engaging with the gear 3122 is attached to a rotation shaft of a motor 3121 serving as a drive source. The drive pulley 3125 is driven to rotate by rotation of the motor 3121.

A motor shaft encoder 3129 serving as second signal generating means is attached to the motor 3121. A timing belt 3131 is wound around the drive pulley 3125 and a driven pulley 3128 such that a constant tension is applied to the timing belt 3131 by a tension pulley 3130. A drum 3126 serving as a rotating body, which is an object of drive and an object of position control, is attached to the driven pulley 3128 via a shaft 3127 such that coaxiality is kept. A linear scale 3108 serving as a scale is stuck on a surface of the drum 3126, which is the object of drive, along a peripheral direction thereof. The linear scale 3108 is read by the surface sensor 3109, whereby a drive state (fluctuation in velocity) of the drum 3126 is measured.

An encoder may be attached to a driven shaft that supports the belt 3106 or a shaft, which rotates following the motor shaft of the drum 3126 (in a broad sense, a shaft that rotates following a rotating body), rather than the motor shaft.

The drum 3126 is driven to rotate by rotating the motor 3121. The linear scale 3108 is stuck to an end of the surface of the drum 3126 as well in this structure. However, the linear scale 3108 may be stuck in a central part of the surface of the drum 3126 or, if the drum 3126 is tubular, may be stuck on a back thereof. In addition, a scale may be written on the drum 3126 directly. Any object may be used instead of a scale as long as positional displacement (drive displacement) of a rotating body can be grasped as some signal amount using the object.

Figure 38:
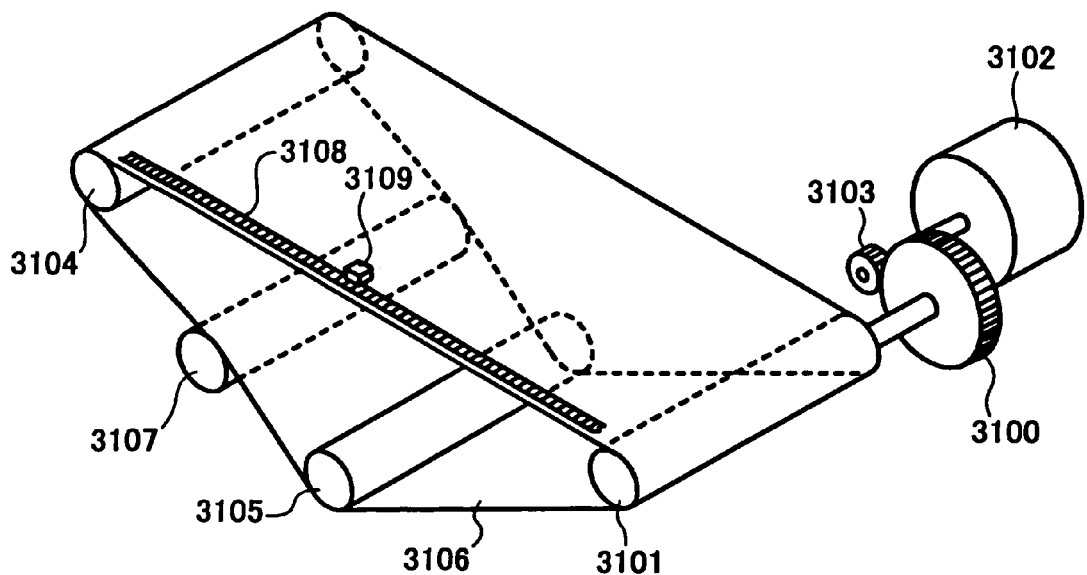
FIG. 38 is a perspective view of a belt drive apparatus according to a nineteenth embodiment of the invention.
Figure 39:
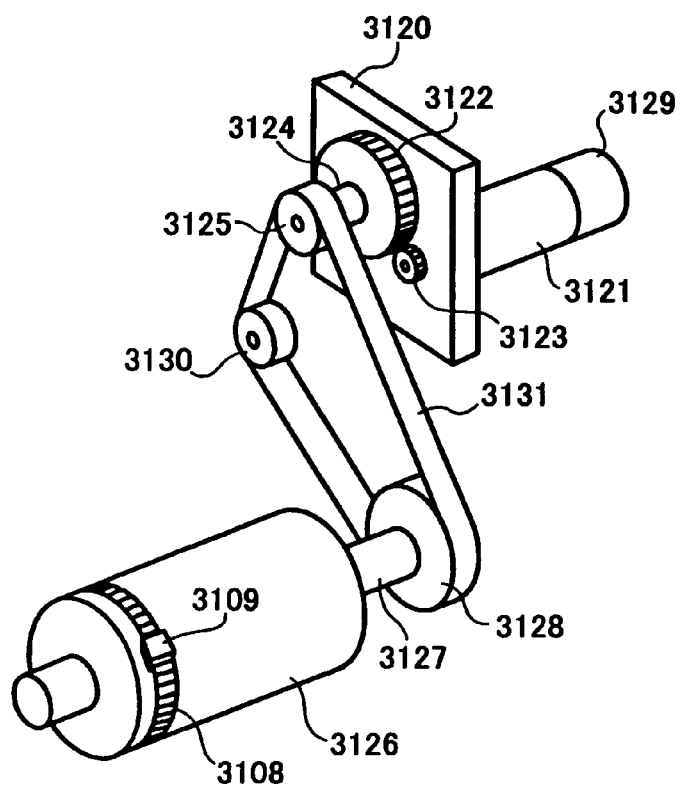
FIG. 39 is a perspective view of a rotating body (drum) drive apparatus.
Figure 40:
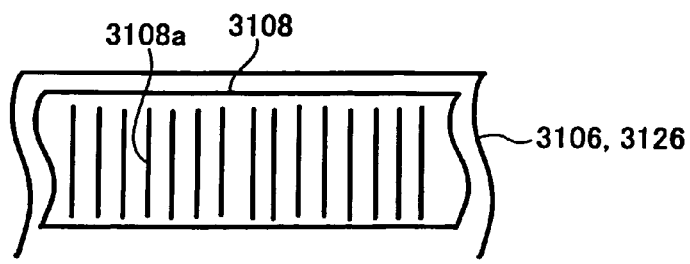
FIG. 40 is a main part plan view of a writing pattern of a linear scale.

FIG. 40 is an enlarged view of a part of the linear scale 3108 that is stuck to the belt 3106 in FIG. 38 or the drum 3126 in FIG. 39. Patterns (reference graduations for signal and pulse generation) 3108a, which make it possible to measure a drive state, are written in the linear scale 3108 at equal intervals in a moving direction of the rotating body by a method like laser irradiation.

More specifically, the patterns 3108a are written on a tape made of aluminum, and light emitted from a light-emitting element to be described later of the surface sensor 3109 is irradiated on the linear scale 3108 and reflected, and a light-receiving element to be described later of the surface sensor 3109 detects the reflected light. Since the reflected light is intense in parts where the patterns 3108a are not written and the reflected light is weak in parts where the patterns 3108a are written, the patterns 3108a of the linear scale 3108 is recognized. Although an aluminum tape is used as a base material of the linear scale 3108 here, a tape of other materials may be used as long as a drive state can be measured.

Figure 41:
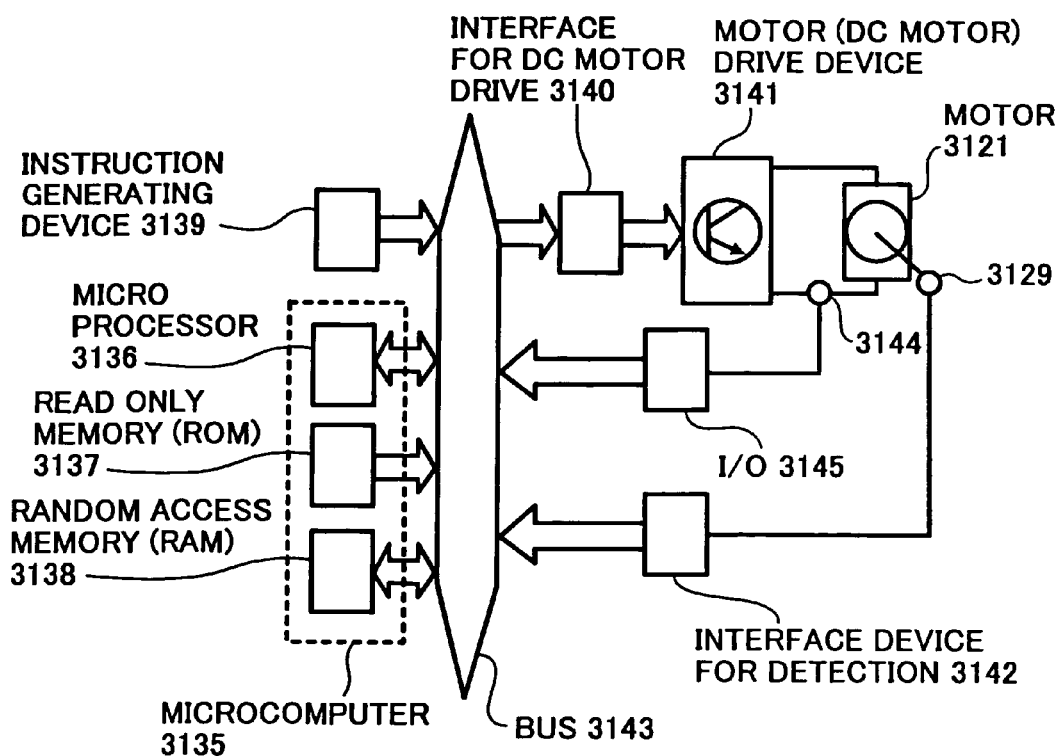
FIG. 41 is a block diagram of a current control system.

FIG. 41 is a block diagram of a structure of a control system that subjects angular displacement of the motor 3121 to digital control based on an output signal of the motor shaft encoder 3129 in a current control system common to the respective embodiments.

In FIG. 41, reference numeral 3135 denotes a microcomputer including a microprocessor 3136, a read only memory (ROM) 3137, and a random access memory (RAM) 3138. The microprocessor 3136, the read only memory (ROM) 3137, and the random access memory (RAM) 3138 are connected to one another via a bus 3143.

Reference numeral 3139 denotes an instruction generating device that outputs a state instruction signal for instructing angular displacement of the motor 3121. The instruction generating device 3139 generates a target angular displacement instruction signal. An output side of the instruction generating device 3139 is also connected to the bus 3143. Reference numeral 3142 denotes an interface device for detection that processes an output pulse of the motor shaft encoder 3129 and converts the output pulse into a digital numerical value. The interface device for detection 3142 includes a counter that counts an output pulse of the motor shaft encoder 3129. The interface device for detection 3142 multiplies a numerical value counted by the counter by a predetermined conversion constant of pulse number versus angular displacement and converts the numerical value into angular displacement of the motor shaft. A motor drive current is taken into the microcomputer 3135 from a current sensor 3144 via an I/O 3145.

Reference numeral 3140 denotes an interface for DC motor drive. The interface for DC motor drive 3140 converts a calculation result of a feedback control system, which is described in embodiments to be described later, obtained by the microcomputer 3135 into a pulse-like signal (control signal) for actuating a power semiconductor, for example, a transistor constituting a motor (DC motor) drive device 3141 according to motor shaft angular displacement and target angular displacement.

The DC motor drive device 3141 operates based on the pulse-like signal from the interface for DC motor drive 3140 and controls a voltage to be applied to the motor 3121. As a result, the motor 3121 is controlled to follow up predetermined angular displacement instructed by the instruction generating device 3139. Angular displacement of the motor 3121 is detected by the motor shaft encoder 3129 and the interface device 3142, and taken into the microcomputer 3135, and the control is repeated.

The linear scale 3108, the surface sensor 3109, and the microcomputer 3135 serving as control means constitute a position control device that controls position of a rotating body in this embodiment.

Here, angular displacement is detected directly from the motor 3121 using an encoder or the like. The same holds true for a method of detecting drive of the belt 3106 and the drum 3126 driven by the motor 3102 and the motor 3121.

In addition, although the current control system is explained, the control system may be a voltage control system.

Figure 42:
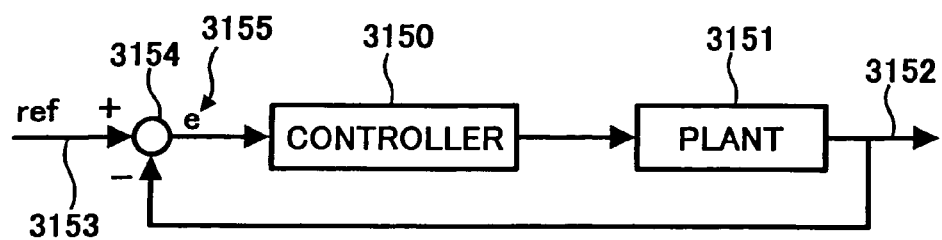
FIG. 42 is a block diagram of a feedback control system in a conventional technique.

Before explaining characteristics of this embodiment, first, usual drive control, which has been performed conventionally, will be explained with reference to a feedback control system shown in FIG. 42. In this feedback control system, a control signal is output from a controller 3150, and a drive source of a plant 3151 is driven in response to the control signal. Here, the controller 3150 also includes a current control loop, and the plant 3151 means an overall structure (drive device) that drives the belt 3106 and the drum 3126 with the motors 3102 and 3121 shown in FIGS. 38 and 39.

The surface sensor 3109 measures a drive state of a rotating body such as the belt 3106 and the drum 3126 to obtain a displacement measurement signal value 3152. This displacement measurement signal value 3152 is feedbacked, and a subtracter 3154 compares the fed-back displacement measurement signal value 3152 and a reference signal 3153 to calculate a deviation 3155 between present displacement and target displacement. A new control signal is created by inputting this deviation 3155 to the controller 3150.

However, when only the usual feedback control is performed as described above, it is judged that driving is slow, and control cannot be performed normally when a signal is not obtained temporarily due to a trouble of the surface sensor 3109 or the scale 3108.

In addition, when no signal is obtained at all, since a feedback signal is not obtained, the control unit takes measures to stop driving, and control cannot be performed at all.

Thus, in this embodiment, to prevent the apparatus from stopping in this way (dead time in work time from occurring), two kinds of signals, namely, a first signal obtained from the surface sensor 3109 that reads a scale pulse and a second signal obtained from the motor shaft encoder 3129, are adopted as control signals. These two signals are used as a feedback signal (control signal) selectively to perform processing (switching processing) that prevents the control system from being made unstable.

Figure 43:
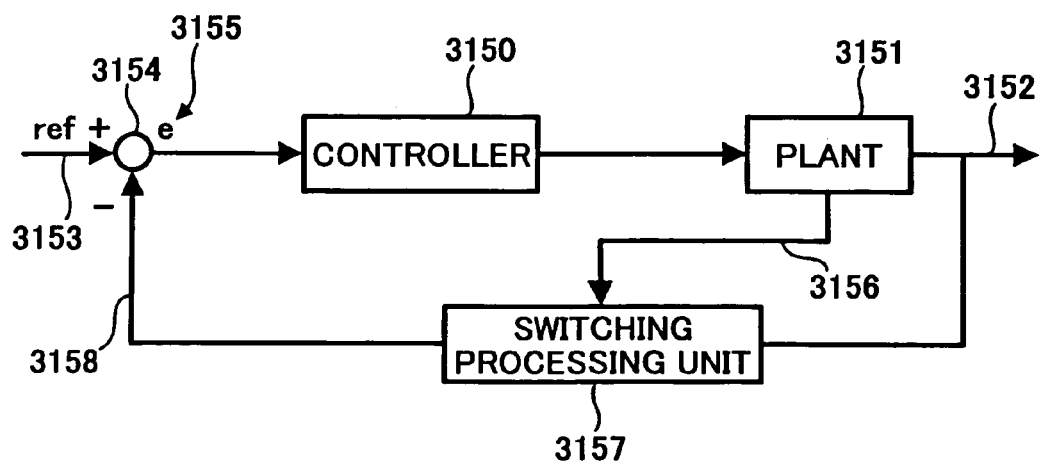
FIG. 43 is a block diagram of a feedback control system according to the nineteenth embodiment.

FIG. 43 shows a control system in at the time when switching processing in this embodiment is performed. A control signal is output from the controller 3150, and the drive source of the plant 3151 is driven by the control signal. Here, the controller 3150 also includes a current control loop, and the plant 3151 means an overall structure (drive device) that drives the belt 3106 and the drum 3126 with the motors 3102 and 3121 as shown in FIGS. 38 and 39.

The surface sensor 3109 or the motor shaft encoder 3129 measures a drive state of the rotating body such as the belt 3106 or the drum 3126 to obtain a surface sensor measurement displacement signal value 3152 and a motor shaft encoder measurement displacement signal value 3156.

The respective displacement signal values are input to a switching processing unit 3157. The switching processing unit 3157 selects one of the signals and outputs the signal as a feedback signal according to a measured value or a state of the entire control system at that point.

The subtracter 3154 compares a feedback value 3158 selected by the switching processing unit 3157 and the reference signal 3153 to calculate the deviation 3155 between present displacement and target displacement. A new control signal is created by inputting this deviation 3155 to the controller 3150. This is the control system at the time when the switching processing is performed.

In the control system in FIG. 43, the entire control system excluding the plant 3151 constitutes the control unit (microcomputer 3135) in this embodiment.

This embodiment is characterized in that, when control is performed based on the second signal (signal from the motor shaft encoder 3129), in switching the control to control based on the first signal (scale pulse from the surface sensor 3109) at arbitrary time, the control based on the second signal is continued if the first signal cannot be read.

Figure 44:
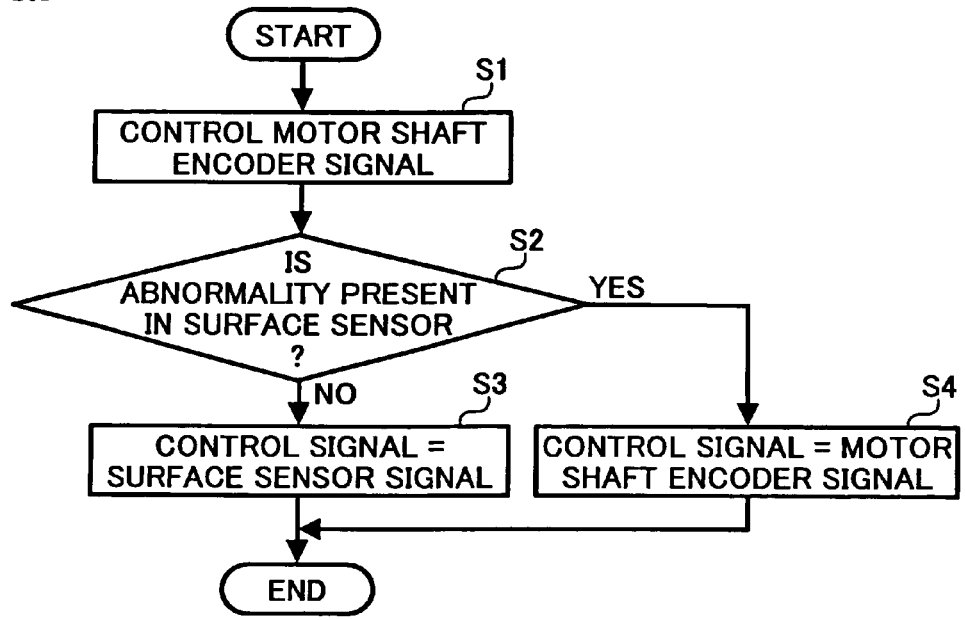
FIG. 44 is a flowchart of selection control for a signal in a position control method for a rotating body according to the nineteenth embodiment.

This control method (algorithm) will be explained with reference to a flowchart in FIG. 44.

At present, the belt 3106 or the drum 3126 is driven based on a signal from the motor shaft encoder 3129 (S1). At arbitrary time, when it is intended to change a feedback signal from a signal from the motor shaft encoder 3129 to a signal from the surface sensor 3109, first, the control unit judges whether abnormality is present in the surface sensor 3109 (S2).

As criteria for this judgment, for example, a signal notifying abnormality is sent from the surface sensor 3109, a normal signal is not sent from the surface sensor 3109, or a measurement displacement signal to be feedbacked is not received in an arbitrary time section or is abnormal.

Reasons for occurrence of the abnormality include decline in measurement function of the surface sensor 3109 itself and deterioration in time of the scale 3109.

If there is no abnormality and no problem in the surface sensor 3109, the control unit selects the surface sensor signal (first signal) as a feedback signal to drive the belt 3106 or the drum 3126 based on the first signal (S3).

If abnormality is present in the surface sensor 3109, the control unit selects the signal from the motor shaft encoder 3129 instead of the surface sensor signal as a feedback signal to drive the belt 3106 or the drum 3126 (S4).

Instead of the signal from the motor shaft encoder 3129, a motor fg signal for measuring a drive state of a motor using a Hall element may be adopted as the second signal. A motor mr signal for measuring a drive state of motor using a magnetic resistance effect element (MR element) may be adopted as the second signal. This makes it possible to reduce a space required by the motor shaft encoder 3129 and to reduce apparatus cost on the drive source side. Moreover, a method of attaching an encoder to a drive shaft of the belt 3106 or the drum 3126, a driven shaft (supporting shaft) of the belt 3106, or the like rather than the motor shaft may be used.

A control signal is selected to perform control in this way, whereby it becomes possible to perform control without making driving of the belt 3106 or the drum 3126 driven by the signal from the motor shaft encoder 3129 unstable and without stopping the apparatus.

Figure 45:
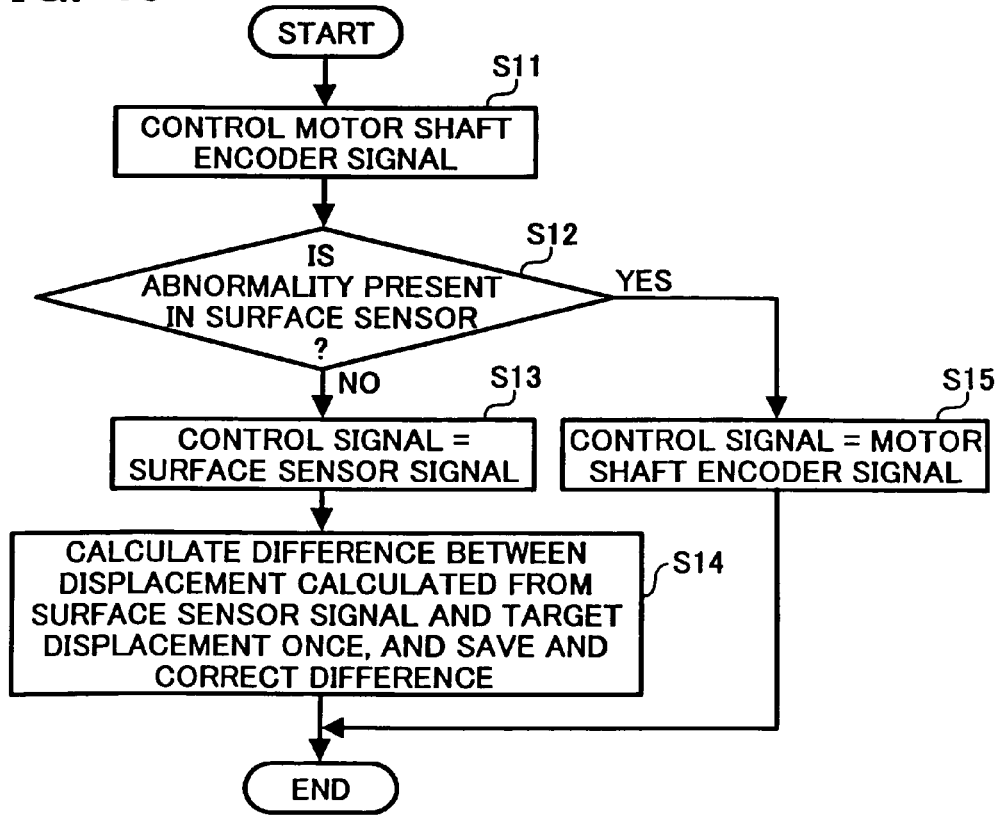
FIG. 45 is a flowchart of selection control for a signal according to a twentieth embodiment of the invention.

A twentieth embodiment of the invention will be explained with reference to FIG. 45. Note that, a structure and a functions according to the twentieth embodiment are identical with those according to the above-mentioned embodiments, an explanation of the structure and the functions will be omitted, and only a principal part (control method) will be explained (the same holds true for other embodiments).

This embodiment is characterized in that, in driving of the belt 3106 or the drum 3126, when switching from the motor shaft encoder signal (second signal) to the surface sensor signal (first signal) is possible, a difference between displacement calculated from a surface sensor signal to be used after the switching and target displacement is corrected.

At present, the belt 3106 or the drum 3126 is driven according to a signal from the motor shaft encoder 3129 (S11). At arbitrary time, when it is intended to change a feedback signal from a signal from the motor shaft encoder 3129 to a surface sensor signal, first, the control unit judges whether abnormality is present in the surface sensor 3109 (S12).

If there is no abnormality and no problem in the surface sensor 3109, the control unit selects the surface sensor signal as the feedback signal to drive the belt 3106 or the drum 3126 (S13). In that case, only when the surface sensor signal is selected for the first time, the control unit calculates a difference between displacement calculated from the surface sensor signal and target displacement and saves the difference in a memory (e.g., RAM 3138) to perform correction processing (S14).

If abnormality is present in the surface sensor 3109 in S12, the control unit selects the motor shaft encoder signal instead of the surface sensor signal as the feedback signal to drive the belt 3106 or the drum 3126 (S15).

Such control makes it possible to, when the belt 3106 or the drum 3126 is driven according to a signal from the motor shaft encoder 3129 and when it is attempted to switch control to control according to the surface sensor signal at arbitrary time, continue to drive the belt 3106 or the drum 3126 without causing sudden suspension of the apparatus or adversely affecting the entire system and continue to control the driving of the belt 3106 or the drum 3126 correctly according to with the target displacement.

Figure 46:
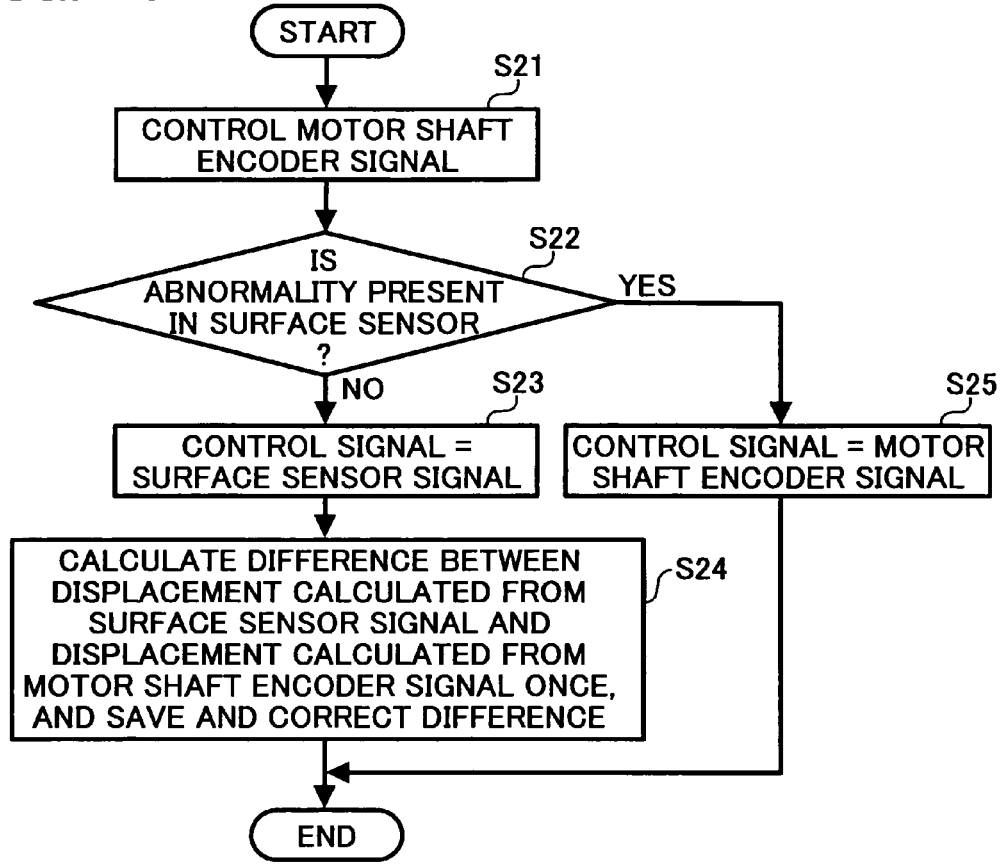
FIG. 46 is a flowchart of selection control for a signal according to a twenty-first embodiment of the invention.

A twenty-first embodiment of the invention will be explained with reference to FIG. 46.

This embodiment is characterized in that, when switching from a motor shaft encoder signal to a surface sensor signal is possible, a difference between displacement calculated from the surface sensor signal and displacement calculated from the motor shaft encoder signal is corrected.

At present, the belt 3106 or the drum 3126 is driven according to a signal from the motor shaft encoder 3129 (S21). At arbitrary time, when it is intended to change a feedback signal from a motor shaft encoder signal to a surface sensor signal, first, the control unit judges whether abnormality is present in the surface sensor 3109 (S22).

If there is no abnormality and no problem in the surface sensor 3109, the control unit selects the surface sensor signal as the feedback signal to drive the belt 3106 or the drum 3126 (S23). In that case, only when the surface sensor signal is selected for the first time, the control unit calculates a difference between displacement (position) calculated from the surface sensor signal (a control signal to be used after switching) and displacement calculated from the motor shaft encoder signal (control signal used before the switching) and saves the difference to perform correction processing (S24).

If abnormality is present in the surface sensor 3109 in S22, the control unit selects the motor shaft encoder signal instead of the surface sensor signal as the feedback signal to drive the belt 3106 or the drum 3126 (S25).

Such control makes it possible to, when the belt 3106 or the drum 3126 is driven according to a signal from the motor shaft encoder 3129 and when it is attempted to switch control to control according to the surface sensor signal at arbitrary time, continue to drive the belt 3106 or the drum 3126 without causing sudden suspension of the apparatus or adversely affecting the entire system, continue to control the driving of the belt 3106 or the drum 3126 correctly according to the target displacement, and shift from control according to the motor shaft encoder signal to control according to the surface sensor signal continuously.

Figure 47:
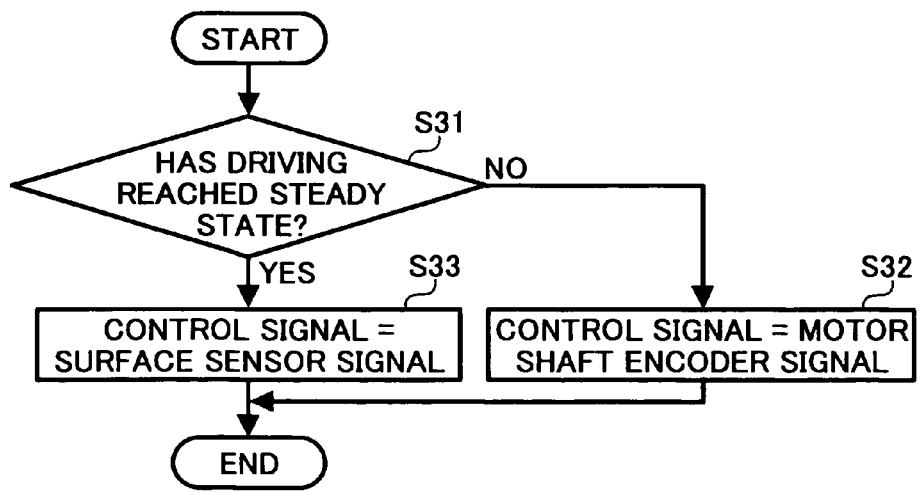
FIG. 47 is a flowchart of selection control for a signal according to a twenty-second embodiment of the invention.

A twenty-second embodiment of the invention will be explained with reference to FIG. 47.

This embodiment is characterized in that control is performed according to a measurement signal (simply referred to as a signal as well) from the motor shaft encoder 3129 from the time when driving of the belt 3106 or the drum 3126 is started until the time when the driving reaches a steady state and, after the driving reaches the steady state, the control is switched to control according to a measurement signal (simply referred to as a signal as well) from the surface sensor 3109 to drive the belt 3106 or the drum 3126.

When the signal from the surface sensor 3109 is used from the time when the driving of the belt 3106 or the drum 3126 is started until the driving reaches the steady state, a control system is made unstable if there is a part where a signal is not obtained due to a joint of a scale, and driving cannot be started surely. Therefore, a method of using measuring means other than the surface sensor 3109 is effective to obtain stable starting drive.

Drive control for the belt 3106 or the drum 3126 according to the motor shaft encoder signal is started. After the driving is started, the control unit judges whether the driving of the belt 3106 or the drum 3126 has reached the steady state (S31).

In this case, the control unit may determine whether the driving has reached the steady state based on an output from the motor shaft encoder 3129, which measures a drive state of the belt 3106 or the drum 3126, or may determine whether the driving has reached the steady state based on an output from the surface sensor 3109. In addition, when the driving is considered to be in the steady state if certain time has elapsed from the start of driving rather than on the basis of a measurement result, the control unit may determine whether the driving has reached the steady state according to time.

The control unit continues the control according to the motor shaft encoder signal until the driving of the belt 3106 or the drum 3126 reaches the steady state (S32). When the driving of the belt 3106 or the drum 3126 has reached the steady state, the control unit switches the feedback signal from the motor shaft encoder signal to the surface sensor signal to drive the belt 3106 or the drum 3126 according to the surface sensor signal after that (S33).

Figure 48:
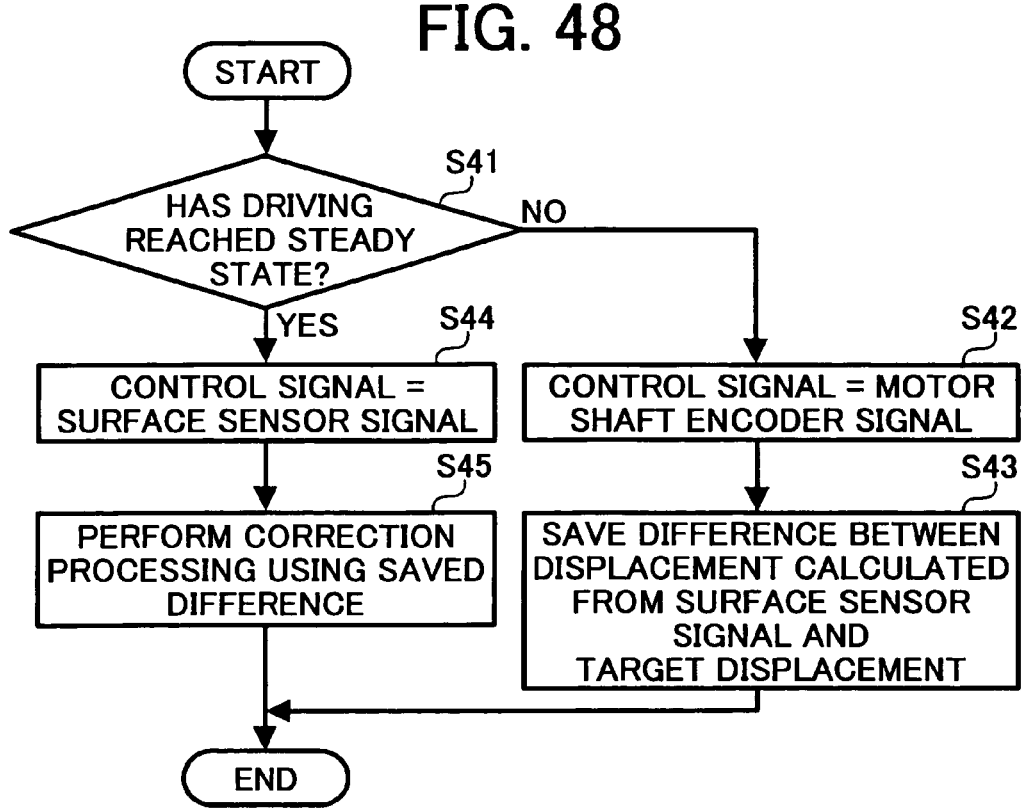
FIG. 48 is a flowchart of selection control for a signal according to a twenty-third embodiment of the invention.

A twenty-third embodiment of the invention will be explained with reference to FIG. 48.

This embodiment is characterized in that, when a feedback signal is switched from a motor shaft encoder signal to a surface sensor signal after driving of the belt 3106 or the drum 3126 has reached a steady state, a difference between displacement calculated from the surface sensor signal and target displacement is corrected.

Drive control for the belt 3106 or the drum 3126 according to the motor shaft encoder signal is started. After the driving is started, the control unit judges whether the driving of the belt 3106 or the drum 3126 has reached the steady state (S41).

The control unit continues control according to the motor shaft encoder signal until the driving of the belt 3106 or the drum 3126 reaches the steady state (S42). At the same time, the control unit measures displacement of the belt 3106 or the drum 3126 using the surface sensor signal and saves a difference between the displacement and target displacement (S43). This difference value is always updated while the control according to the motor shaft encoder signal is continued.

When the driving of the belt 3106 or the drum 3126 has reached the steady state, the control unit switches the feedback signal from the motor shaft encoder signal to the surface sensor signal (S44) and, at that point, performs correction processing using the difference value saved in S43 to perform surface sensor control (S45). Thereafter, the belt 3106 or the drum 3126 is driven according to the surface sensor signal, and the difference value is not updated.

Such control makes it possible to eliminate influence of a surface sensor signal value until the driving reaches the steady state (instability of the control) and control the driving of the belt 3106 or the drum 3126 correctly according to the target displacement.

Figure 49:
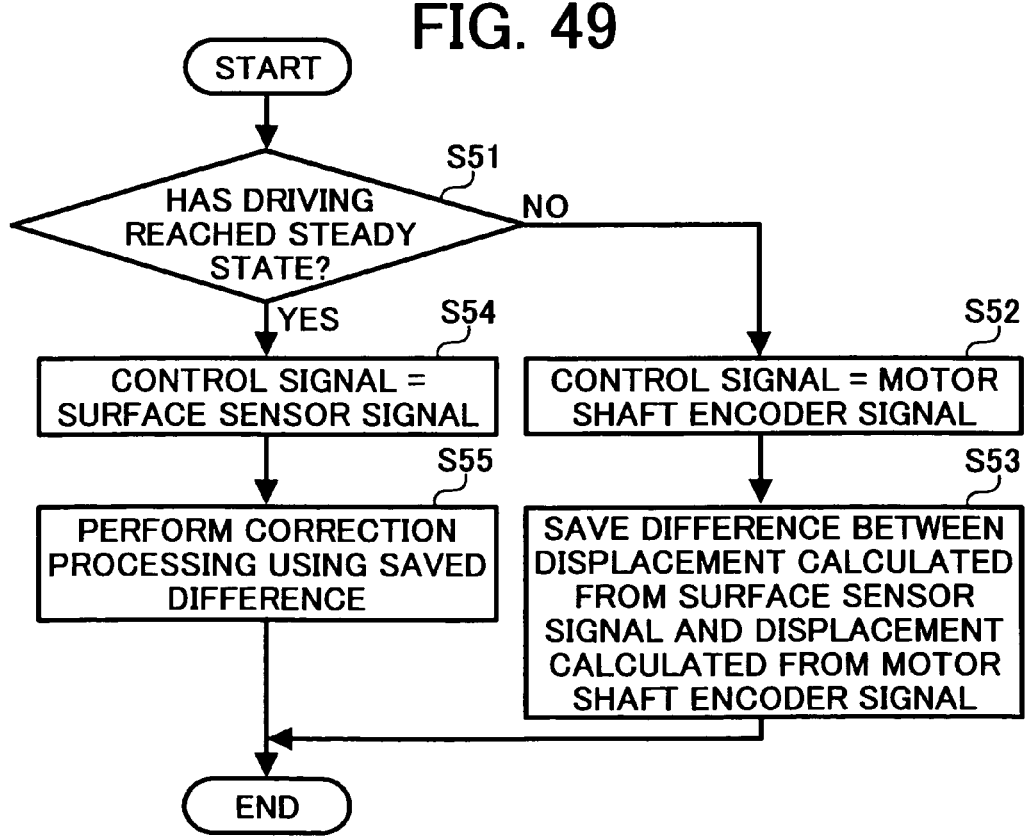
FIG. 49 is a flowchart of selection control for a signal according to a twenty-fourth embodiment of the invention.

A twenty-fourth embodiment of the invention will be explained with reference to FIG. 49.

This embodiment is characterized in that, when a feedback signal is switched from a motor shaft encoder signal to a surface sensor signal after driving of the belt 3106 or the drum 3126 has reached a steady state, a difference between displacement calculated from the surface sensor signal and displacement calculated from the motor shaft encoder signal is corrected.

Drive control for the belt 3106 or the drum 3126 according to the motor shaft encoder signal is started. After the driving is started, the control unit judges whether the driving of the belt 3106 or the drum 3126 has reached the steady state (S51). The control unit continues control according to the motor shaft encoder signal until the driving of the belt 3106 or the drum 3126 reaches the steady state (S52).

At the same time, the control unit measures displacement of the belt 3106 or the drum 3126 using the surface sensor signal and saves a difference between the displacement and displacement calculated from the motor shaft encoder signal (S53). This difference value is always updated while the control according to the motor shaft encoder signal is continued.

When the driving of the belt 3106 or the drum 3126 has reached the steady state, the control unit switches the feedback signal from the motor shaft encoder signal to the surface sensor signal (S54) and, at that point, performs correction processing using the difference value saved in S53 (S55) to perform control according to the surface sensor signal. Thereafter, the belt 3106 or the drum 3126 is driven according to the surface sensor signal, and the difference value is not updated.

Such control makes it possible to eliminate influence of a surface sensor signal value until the driving reaches the steady state and, in the driving of the belt 3106 or the drum 3126, control the driving continuously according to the displacement calculated from the motor shaft encoder signal that has been used as the feedback signal.

In this embodiment, the motor shaft encoder signal may be a motor fg signal or a motor mr signal as in the above-mentioned embodiments.

A twenty-fifth embodiment of the invention will be explained with reference to FIG. 50.

This embodiment is characterized in that, when some abnormality occurs in the surface scale 3108 or the surface sensor 3109 and a measurement signal is not obtained while the belt 3106 or the drum 3126 is subjected to drive control according a measurement signal from the surface sensor 3109, the control is switched to control according to a measurement signal from the motor shaft encoder 3129.

Drive control for the belt 3106 or the drum 3126 according to a surface sensor signal is continued. The control unit judges whether an output from the surface sensor 3109 is normal while continuing the drive control (S61).

As criteria for this judgment, for example, a signal notifying abnormality is sent from the surface sensor 3109, a normal signal is not sent from the surface sensor 3109, or a measurement displacement signal to be feedbacked is not received in an arbitrary time section or is abnormal.

If there is no abnormality in the output from the surface sensor 3109 and there is no problem, the control unit continues to select the surface sensor signal as the feedback signal (S62) to drive the belt 3106 or the drum 3126.

If there is abnormality in the surface sensor 3109 in S61, the control unit selects the motor shaft encoder signal rather than the surface sensor signal as the feedback signal (S63) to drive the belt 3106 or the drum 3126.

Figure 51:
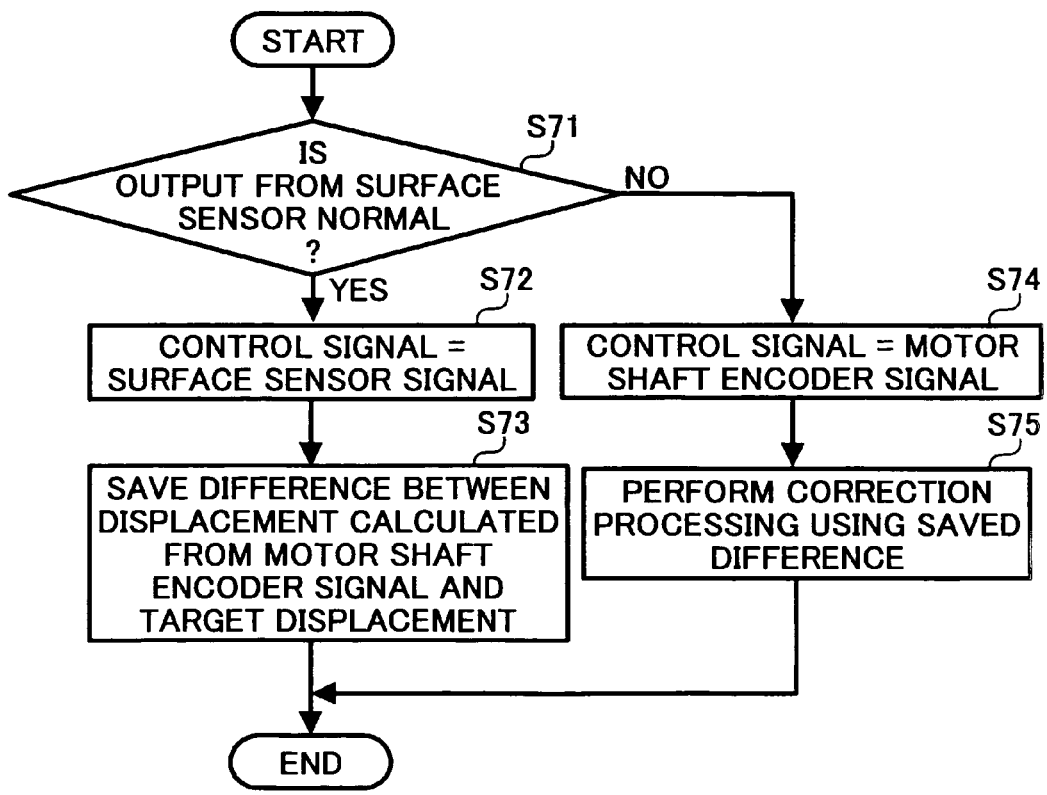
FIG. 51 is a flowchart of selection control for a signal according to a twenty-sixth embodiment of the invention.

A twenty-sixth embodiment of the invention will be explained with reference to FIG. 51.

This embodiment is characterized in that, when a feedback signal is switched from a surface sensor signal to a motor shaft encoder signal in driving of the belt 3106 or the drum 3126, a difference between displacement calculated from the motor shaft encoder signal and target displacement is corrected.

Drive control for the belt 3106 or the drum 3126 according to the surface sensor signal is continued. The control unit judges whether an output from the surface sensor 3109 is normal while continuing the drive control (S71). If there is no abnormality in the output from the surface sensor 3109 and there is no problem, the control unit continues to select the surface sensor signal as the feedback signal (S72) to drive the belt 3106 or the drum 3126.

At the same time, the control unit measures displacement of the belt 3106 or the drum 3126 using the motor shaft encoder signal and saves a difference between the displacement and target displacement (S73). This difference value is always updated while the control according to the surface sensor signal is continued.

If there is abnormality in the surface sensor 3109 in S71, the control unit switches the feedback signal from the surface sensor signal to the motor shaft encoder signal (S74) and, at that point, performs correction processing using the difference value saved in S73 to perform control according to the motor shaft encoder signal (S75). Thereafter, the belt 3106 or the drum 3126 is driven according to the motor shaft encoder signal, and the difference value is not updated.

Such control makes it possible to, even if abnormality occurs in surface sensor measurement (including both abnormality of the surface sensor 3109 itself and abnormality of the scale 3108), continue the driving of the belt 3106 or the drum 3126 and control the belt 3106 and the drum 3126 correctly according to the target displacement without causing sudden suspension of the apparatus or adversely affecting the entire system.

Figure 52:
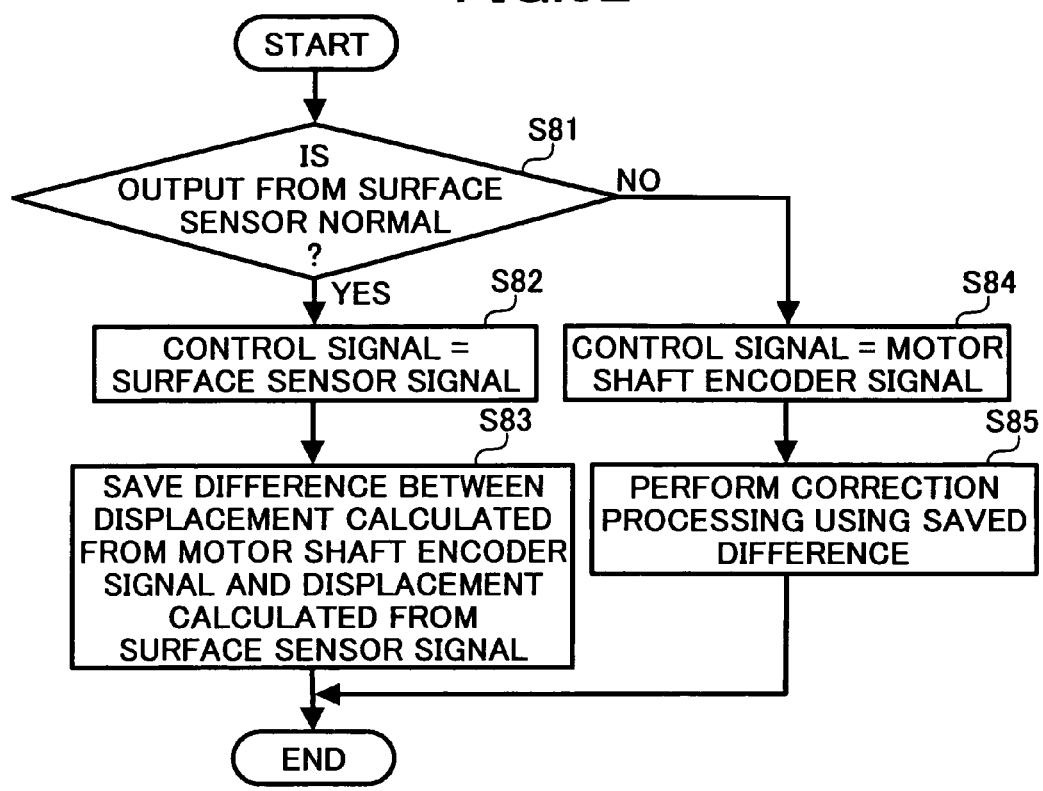
FIG. 52 is a flowchart of selection control for a signal according to a twenty-seventh embodiment of the invention.

A twenty-seventh embodiment of the invention will be explained with reference to FIG. 52.

This embodiment is characterized in that, when a feedback signal is switched from a surface sensor signal to a motor shaft encoder signal in driving of the belt 3106 or the drum 3126, a difference between displacement calculated from the motor shaft encoder signal and displacement calculated from the surface sensor signal is corrected.

Drive control for the belt 3106 or the drum 3126 according to the surface sensor signal is continued. The control unit judges whether an output from the surface sensor 3109 is normal while continuing the drive control (S81). If there is no abnormality in the output from the surface sensor 3109 and there is no problem, the control unit continues to select the surface sensor signal as the feedback signal (S82) to drive the belt 3106 or the drum 3126.

At the same time, the control unit measures displacement of the belt 3106 or the drum 3126 using the motor shaft encoder signal and saves a difference between the displacement and target displacement (S83). This difference value is always updated while the control according to the surface sensor signal is continued.

If there is abnormality in the surface sensor 3109 in S81, the control unit switches the feedback signal from the surface sensor signal to the motor shaft encoder signal (S84) and, at that point, performs correction processing using the difference value saved in S83 (S85) to perform control according to the motor shaft encoder signal. Thereafter, the belt 3106 or the drum 3126 is driven according to the motor shaft encoder signal, and the difference value is not updated.

Such control makes it possible to, even if abnormality occurs in surface sensor measurement, continue the driving of the belt 3106 or the drum 3126 and shift to the control according to the motor shaft encoder signal continuously from the control according to the surface signal.

In this embodiment, again, the motor shaft encoder signal may be a motor fg signal or a motor mr signal.

A twenty-eighth embodiment of the invention will be explained with reference to FIG. 53.

This embodiment is characterized in that, in a state in which some abnormality occurs in the surface scale 3108 or the surface sensor 3109 and a measurement signal is not obtained, and while driving of the belt 3106 or the drum 3126 is performed using a measurement signal of the motor shaft encoder 3129, when the abnormality in the surface scale 3108 or the surface sensor 3109 is eliminated and the measurement signal is obtained, control is switched to control according to a measurement signal from the surface sensor 3109 to drive the belt 3106 or the drum 3126.

Abnormality (decline or incapability in a measurement function) occurs in the surface sensor 3109, and drive control for the belt 3106 or the drum 3126 according to a motor encoder signal is continued (S91). The control unit checks a state of the surface sensor 3109 while continuing the drive control (S92).

As criteria for this judgment, for example, a signal notifying abnormality is not sent from the surface sensor 3109, a signal is sent from the surface sensor 3109 normally, or a measurement displacement signal to be feedbacked is received in an arbitrary time section or is normal.

When it is judged that there is no abnormality in the state of the surface sensor 3109 and the surface sensor 3109 is normal, the control unit selects a surface sensor signal instead of the motor shaft encoder signal as the feedback signal (S93) to drive the belt 3106 or the drum 3126.

When the measurement function of the surface sensor 3109 does not revive in S92, the control unit continues the control according to the motor shaft encoder signal (S94).

Figure 54:
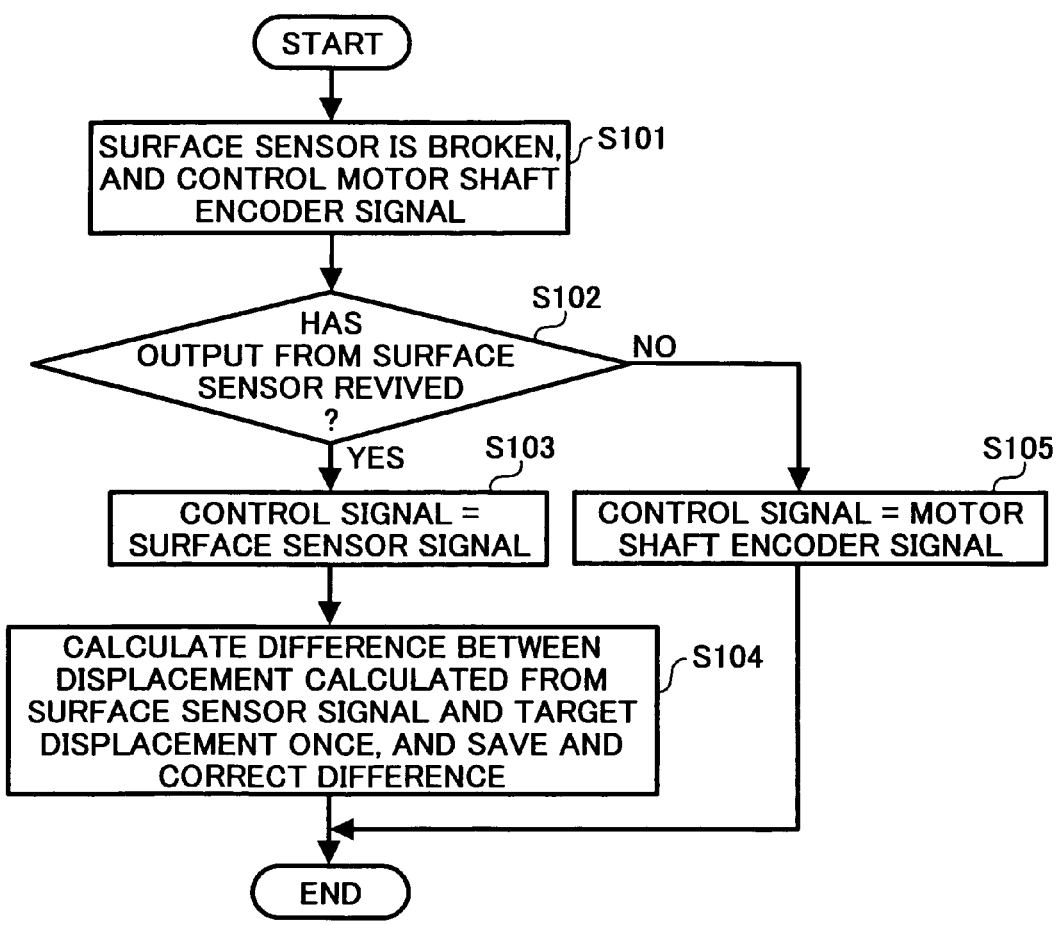
FIG. 54 is a flowchart of selection control for a signal according to a twenty-ninth embodiment of the invention.

A twenty-ninth embodiment of the invention will be explained with reference to FIG. 54.

This embodiment is characterized in that, when a feedback signal is switched from a motor shaft encoder signal to a surface sensor signal in driving of the belt 3106 or the drum 3126, a difference between displacement calculated from the surface sensor signal and target displacement is corrected.

Abnormality occurs in the surface sensor 3109, and drive control for the belt 3106 or the drum 3126 according to the motor encoder signal is continued (S101). The control unit checks a state of the surface sensor 3109 while continuing the drive control (S102). When it is judged that there is no abnormality in the state of the surface sensor 3109 and the surface sensor 3109 is normal, the control unit selects the surface sensor signal as the feedback signal (S103) to drive the belt 3106 or the drum 3126.

In that case, only when the surface sensor signal is selected for the first time, the control unit calculates a difference between the displacement calculated from the surface sensor signal and the target displacement and saves the difference to perform correction processing (S104). Thereafter, the control unit continues only the correction processing without updating this difference. The belt 3106 or the drum 3126 is driven according to the surface sensor signal.

When a measurement function of the surface sensor 3109 does not revive in S102, the control unit continues the control according to the motor shaft encoder signal (S105).

Such control makes it possible to, in the driving of the belt 3106 or the drum 3126 in which abnormality occurs in surface sensor measurement, if the surface sensor measurement returns to normal, continue the driving of the belt 3106 or the drum 3126 and continuously control the driving of the belt 3106 or the drum 3126 according to the target displacement correctly without causing sudden suspension of the apparatus or adversely affecting the entire system.

Figure 55:
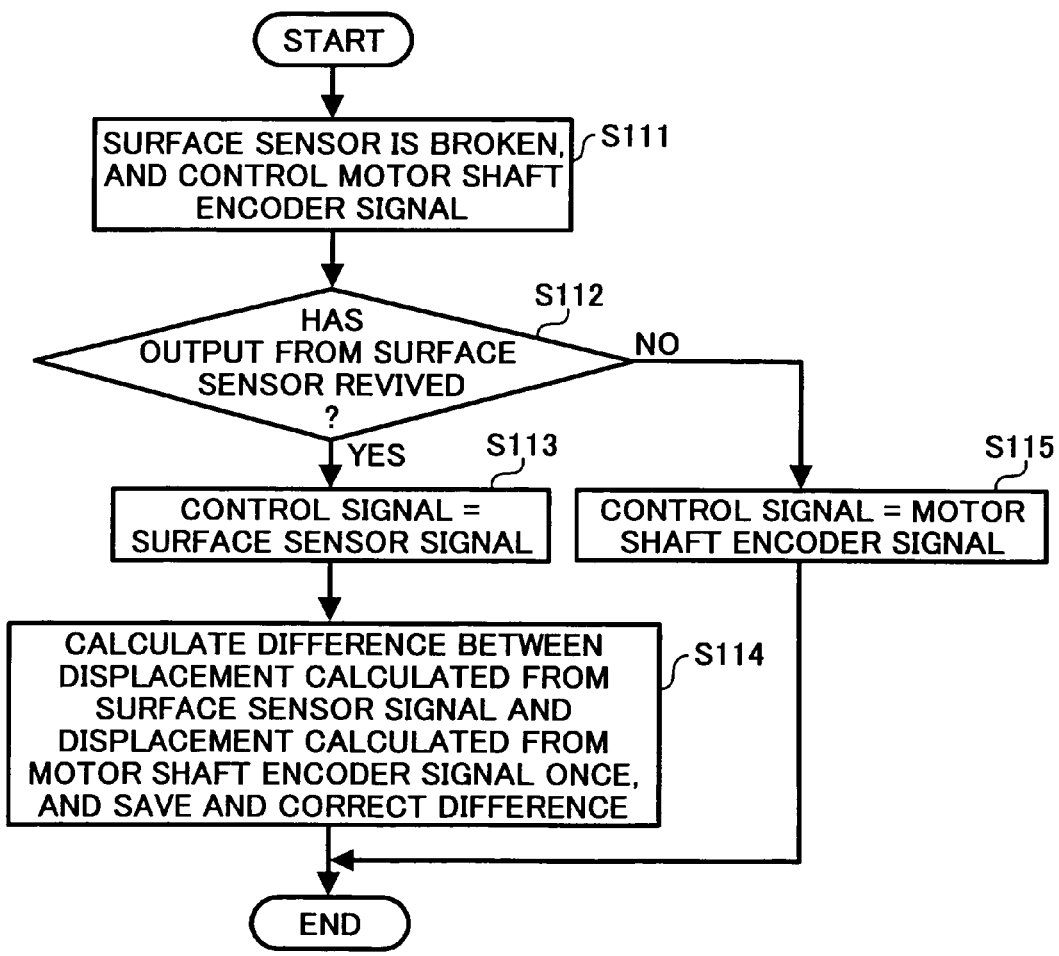
FIG. 55 is a flowchart of selection control for a signal according to a thirtieth embodiment of the invention.

A thirtieth embodiment of the invention will be explained with reference to FIG. 55.

This embodiment is characterized in that, when a feedback signal is switched from a motor shaft encoder signal to a surface sensor signal in driving of the belt 3106 or the drum 3126, a difference between displacement calculated from the surface sensor signal and displacement calculated from the motor shaft encoder signal is corrected.

Abnormality occurs in the surface sensor 3109, and drive control for the belt 3106 or the drum 3126 according to the motor encoder signal is continued (S11). The control unit checks a state of the surface sensor 3109 while continuing the drive control (S112). When it is judged that there is no abnormality in the state of the surface sensor 3109 and the surface sensor 3109 is normal, the control unit selects the surface sensor signal as the feedback signal (S113) to drive the belt 3106 or the drum 3126.

In that case, only when the surface sensor signal is selected for the first time, the control unit calculates a difference between the displacement calculated from the surface sensor signal and the displacement calculated from the motor shaft encoder signal and saves the difference to perform correction processing (S114). Thereafter, the control unit continues only the correction processing without updating this difference. The belt 3106 or the drum 3126 is driven according to the surface sensor signal.

When a measurement function of the surface sensor 3109 does not revive in S112, the control unit continues the control according to the motor shaft encoder signal (S115).

Such control makes it possible to, in the driving of the belt 3106 or the drum 3126 in which abnormality occurs in surface sensor measurement, if the surface sensor measurement returns to normal, continue the driving of the belt 3106 or the drum 3126 and shift to the control according to the surface signal continuously from the control according to the motor shaft encoder signal.

In this embodiment, again, the motor shaft encoder signal may be a motor fg signal or a motor mr signal.

Figure 50:
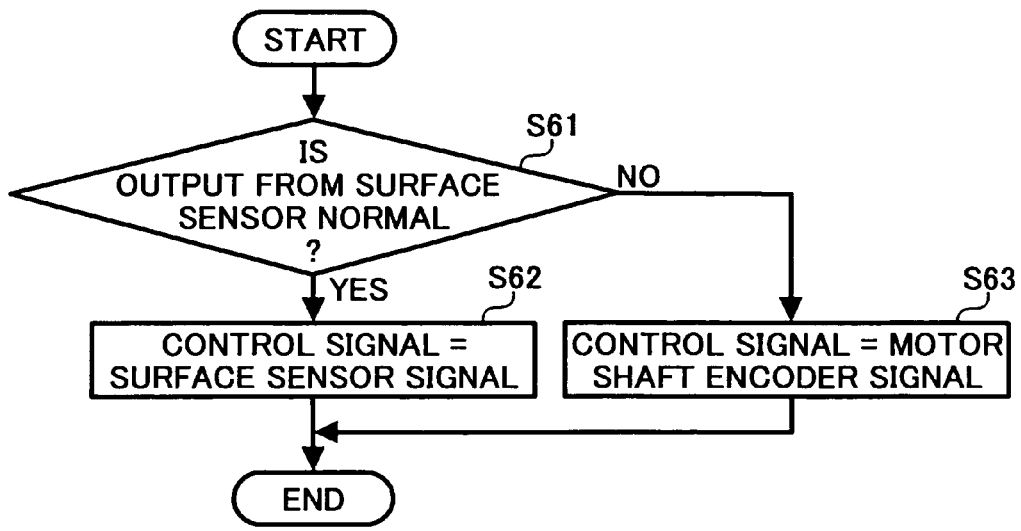
FIG. 50 is a flowchart of selection control for a signal according to a twenty-fifth embodiment of the invention.
Figure 53:
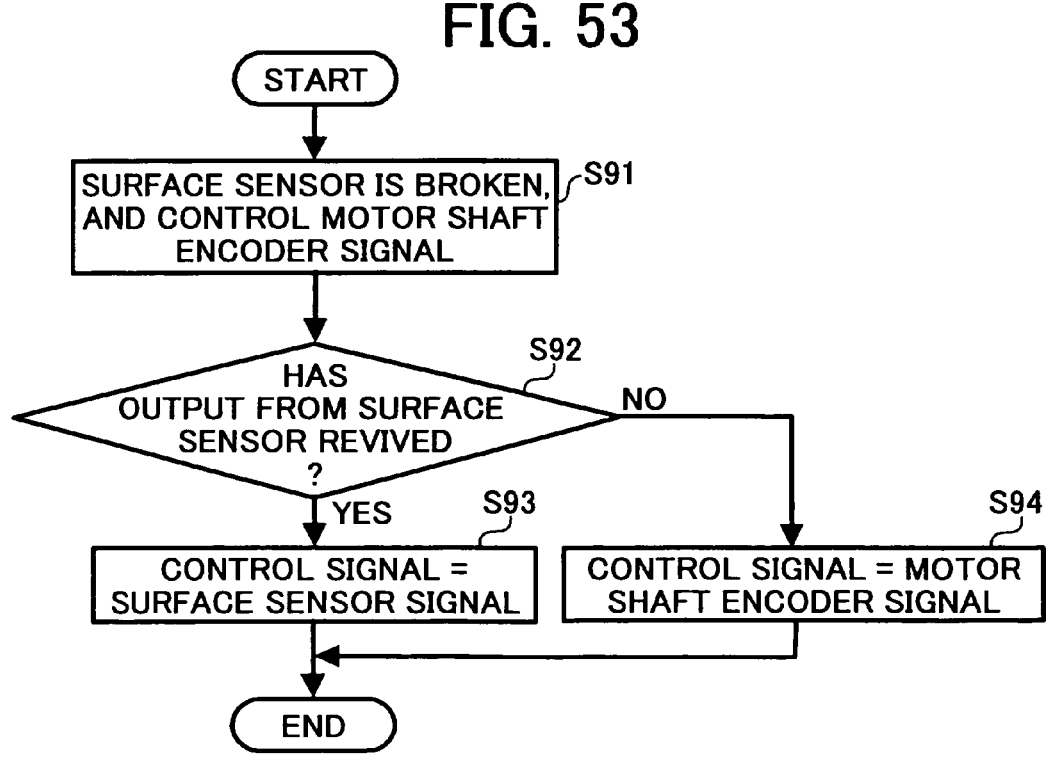
FIG. 53 is a flowchart of selection control for a signal according to a twenty-eighth embodiment of the invention.

In the twenty-eighth embodiment, the "state in which abnormality occurs in the surface sensor 3109 and drive control for the belt 3106 or the drum 3126 according to a motor shaft encoder signal is continued" is the end state in the twenty-fifth embodiment, and the start in FIG. 53 is the end in FIG. 50. Similarly, the start in FIG. 54 (the twenty-ninth embodiment) is the end in FIG. 51 (the twenty-sixth embodiment), and the start in FIG. 55 (the thirtieth embodiment) is the end in FIG. 52 (the twenty-seventh embodiment).

Figure 56A:
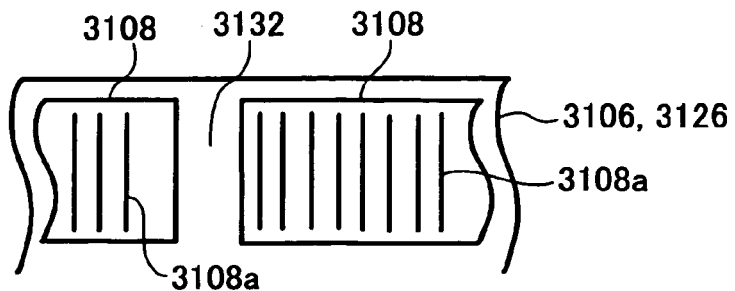
FIGS. 56A and 56B are plan views of a joint of a linear scale.
Figure 56B:
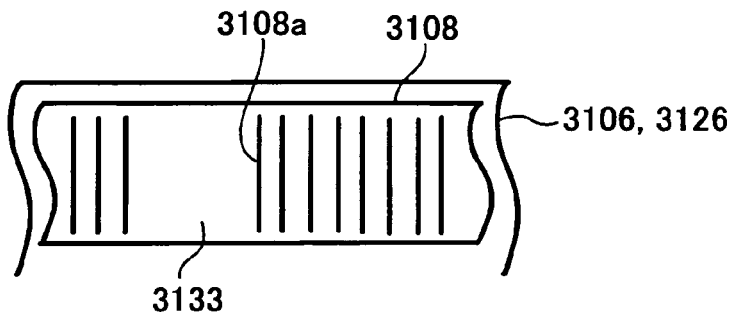
Figure 57:
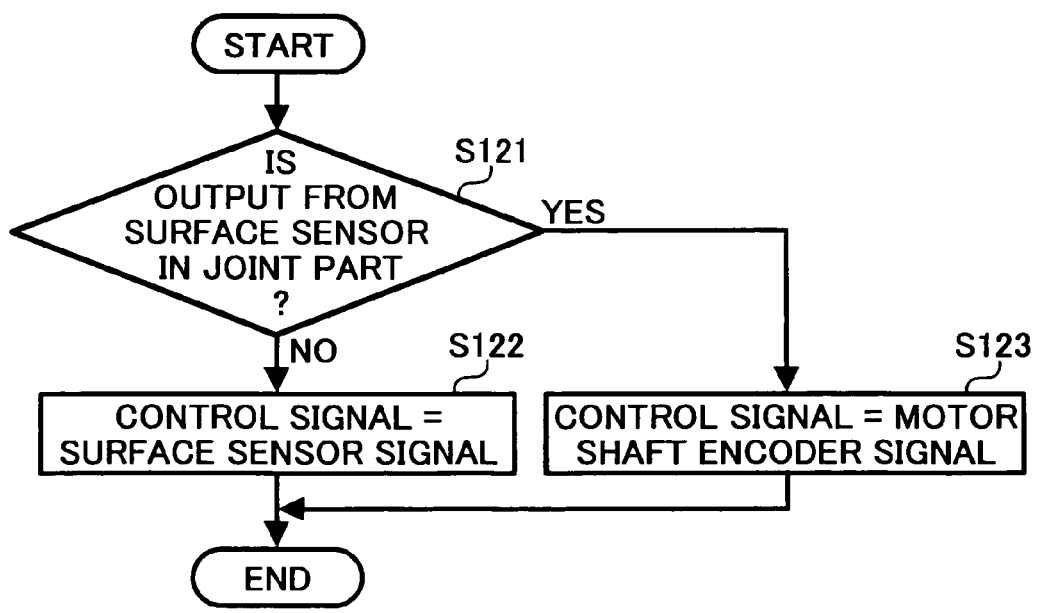
FIG. 57 is a flowchart of selection control for a signal according to a thirty-first embodiment of the invention.

A thirty-first embodiment of the invention will be explained with reference to FIGS. 56 and 57.

This embodiment is characterized in that drive control for the belt 3106 or the drum 3126 is performed according to a measurement signal from the surface sensor 3109, when a joint is present in the surface scale 3108, a measurement signal from the motor shaft encoder 3129 is used when a measurement position of the surface sensor 3109 enters the joint, and the control is switched to the control according to the measurement signal from the surface sensor 3109 if the measurement position returns to a usual position from the joint to drive the belt 3106 or the drum 3126.

FIG. 56 is an enlarged view of a joint part of the linear scale 3108 stuck on the belt 3106 in FIG. 38 or the drum 3126 in FIG. 39.

There are two kinds of joints in a method of sticking a tape-like scale such as the linear scale 2108. One is a physical joint 3132 where the linear scale 3108 is not physically continuous as shown in FIG. 56A. The other is a writing joint 3133 as a blank part, where nothing is written on the linear scale 3108 because of a problem of accuracy or the like at the time when the patterns 3108a are written, although the linear scale 3108 is present continuously as shown in FIG. 56B.

There is no tape at all in the physical joint 3132, and only a tape without the patterns 3108a is present in the writing joint 3133. Thus, a usual measurement signal is not obtained in both the joints. Therefore, in this embodiment, these joints are treated as the same joints and will be hereinafter expressed simply as "joint". In this explanation, it is assumed that the physical joint 3123 and the writing joint 3133 are present separately. However, the physical joint 3123 and the writing joint 3133 may be treated as joints even if the physical joint 3123 and the writing joint 3133 are mixed. In addition, a usual measurement signal is not obtained due to an output error of the surface sensor 3109 itself including scratches, stains, and noise as in the joints.

A control operation in this embodiment will be explained with reference to a flowchart in FIG. 57.

The drive control for the belt 3106 or the drum 3126 according to a surface sensor signal is continued. The control unit judges whether the surface sensor 3109 is in the joint part while continuing the drive control (S121).

As criteria for this judgment, for example, a signal notifying that the surface sensor 3109 is in the joint is sent from the surface sensor 3109, or a normal signal is not sent from the surface sensor 3109. If the surface sensor 3109 is not in the joint, the control unit continues to select the surface sensor signal as the feedback signal (S122) to drive the belt 3106 or the drum 3126.

If it is judged in S121 that the surface sensor 3109 is in the joint, the control unit selects the motor shaft encoder signal instead of the surface sensor signal as the feedback signal (S123) to drive the belt 3106 or the drum 3126.

After the surface sensor 3109 entered the joint, when it is judged that the surface sensor 3109 has exited the joint, the control unit selects the surface sensor signal as the feedback signal to drive the belt 3106 or the drum 3126.

Figure 58:
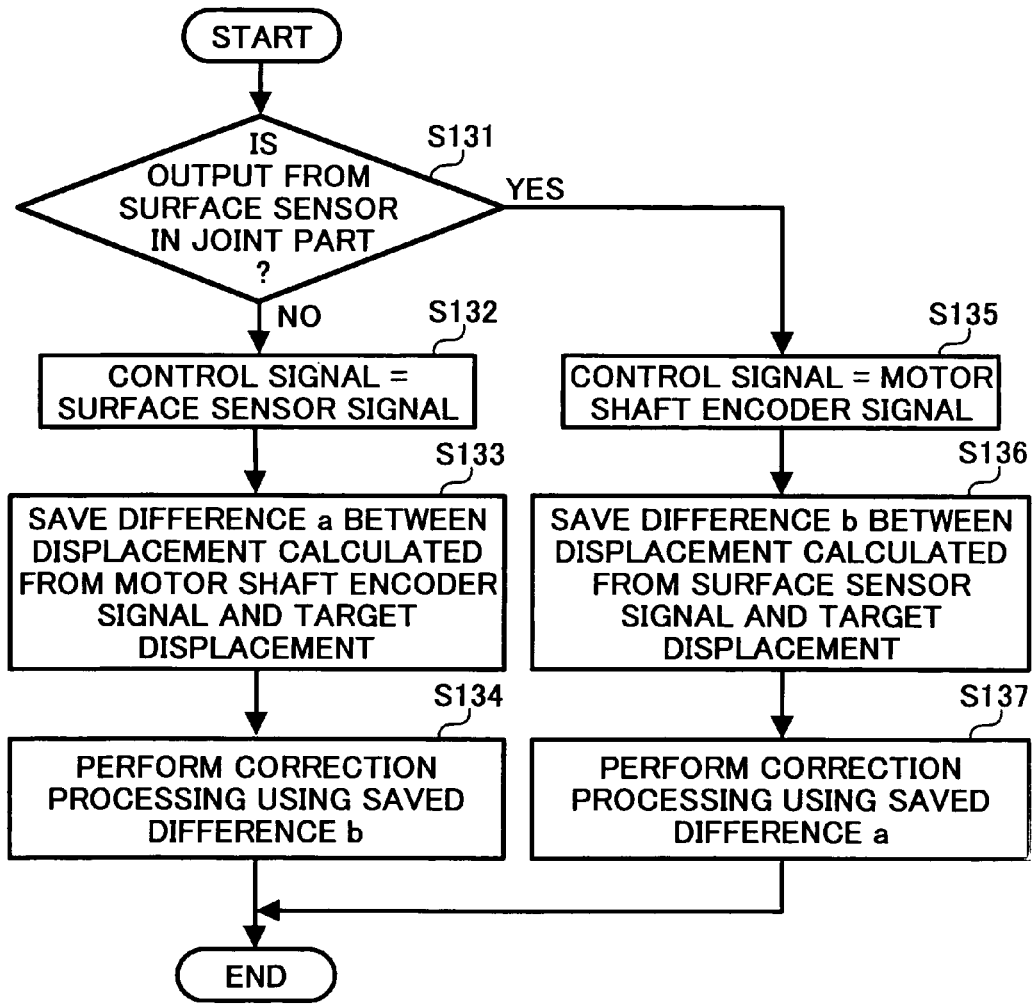
FIG. 58 is a flowchart of selection control for a signal according to a thirty-second embodiment of the invention.

A thirty-second embodiment will be explained with reference to FIG. 58.

This embodiment is characterized in that, in driving of the belt 3106 or the drum 3126, when a feedback signal is switched from a surface sensor signal to a motor shaft encoder signal, a difference between displacement calculated from the motor shaft encoder signal and target displacement is corrected, or when the feedback signal is switched from the motor shaft encoder signal to the surface sensor signal, a difference between displacement calculated from the surface sensor signal and the target displacement is corrected.

Drive control for the belt 3106 or the drum 3126 according to the surface sensor signal is continued. The control unit judges whether the surface sensor 3109 is in the joint part while continuing the drive control (S131). If the surface sensor 3109 is not in the joint, the control unit continues to select the surface sensor signal as the feedback signal (S132). At this point, the control unit saves a difference a between the displacement calculated from the motor shaft encoder signal and the target displacement (S133).

This difference value is updated while the surface sensor 3109 is not in the joint and the surface sensor control is continued. Then, the control unit performs correction processing using a difference b between displacement calculated from a surface sensor signal, which was generated in response to the surface sensor 3109 entering and exiting the joint before, and the target displacement (S134) to drive the belt 3106 or the drum 3126.

When it is judged in S131 that the surface sensor 3109 is in the joint, the control unit selects the motor shaft encoder signal instead of the surface sensor signal as the feedback signal (S135). At this point, the control unit saves the difference between the displacement calculated from the surface sensor signal and the target displacement (S136). This difference value is always updated while the surface sensor 3109 is in the joint.

Then, the control unit performs correction processing using the difference a between the displacement calculated from the motor shaft encoder signal, which was generated in response to the surface sensor 3109 entering and exiting the joint before, and the target displacement (S137) to drive the belt 3106 or the drum 3126.

Such control makes it possible to, even if a joint is present in the scale 3108 of the belt 3106 or the drum 3126, continue driving of the belt 3106 or the drum 3126 and control the belt 3106 or the drum 3126 according to the target displacement without causing sudden suspension of the apparatus or adversely affecting the entire system.

Figure 59:
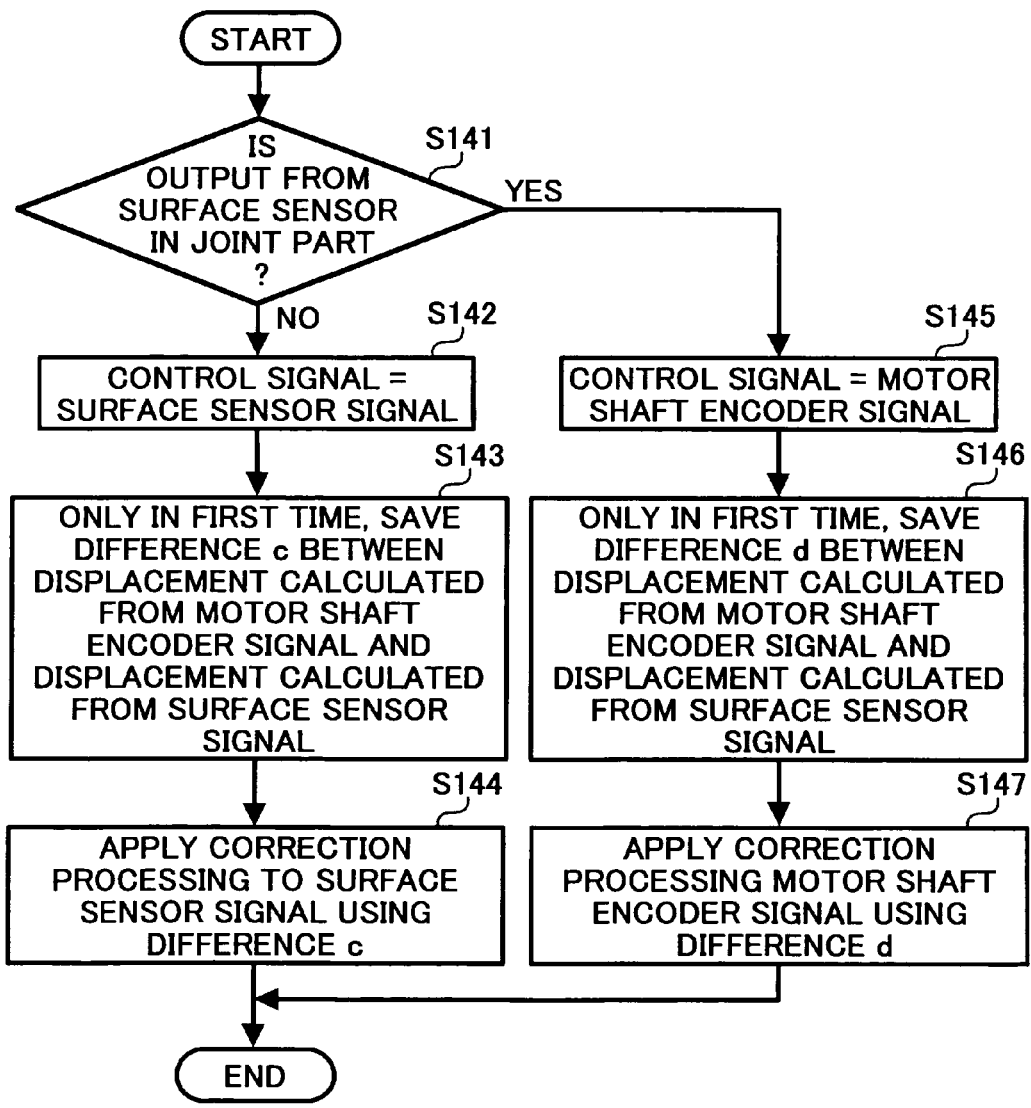
FIG. 59 is a flowchart of selection control for a signal according to a thirty-third embodiment of the invention.

A thirty-third embodiment of the invention will be explained with reference to FIG. 59.

This embodiment is characterized in that, in driving of the belt 3106 or the drum 3126, when a feedback signal is switched from a surface sensor signal to a motor shaft encoder signal, a difference between displacement calculated from the motor shaft encoder signal and displacement calculated from the surface sensor signal is corrected.

Drive control for the belt 3106 or the drum 3126 according to the surface sensor signal is continued. The control unit judges whether the surface sensor 3109 is in the joint part while continuing the drive control (S141). If the surface sensor 3109 is not in the joint, the control unit continues to select the surface sensor signal as the feedback signal (S142). At this point, only when the surface sensor signal is selected for the first time, the control unit saves a difference c between the displacement calculated from the motor shaft encoder signal and the displacement calculated from the surface sensor signal (S143).

Then, the control unit applies correction processing to the surface sensor signal using the calculated difference c (S144) to drive the belt 3106 or the drum 3126.

When it is judged in S141 that the surface sensor 3109 is in the joint, the control unit selects the motor shaft encoder signal instead of the surface sensor signal as the feedback signal (S145). At this point, only when the motor shaft encoder signal is selected for the first time, the control unit saves a difference d between the displacement calculated from the motor shaft encoder signal and the displacement calculated from the surface sensor signal (S146). Then, the control unit applies correction processing to the motor shaft encoder signal using the calculated difference d (S147) to drive the belt 3106 or the drum 3126.

Such control makes it possible to, even if a joint is present in the scale 3108 of the belt 3106 or the drum 3126, continue driving of the belt 3106 or the drum 3126 and shift from control according to the surface control signal to control according to the motor shaft control signal continuously without causing sudden suspension of the apparatus or adversely affecting the entire system.

In this embodiment, again, the motor shaft encoder signal may be a motor fg signal or a motor mr signal.

When dust or sensor abnormality is avoided temporarily other than the joint, it can be considered that the same algorithm as above is used except that a part of the algorithm for judging whether a joint is present is changed.

Here, a state of a sensor (surface sensor 3109) at the time when abnormality occurs in the sensor in reading a scale pulse on the belt 3106 or the drum 3126 will be described.

Figure 60:
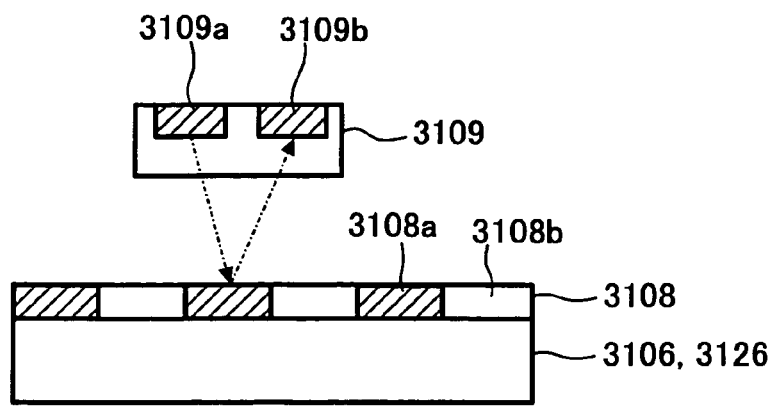
FIG. 60 is a diagram of a structure of a first signal generating unit.

FIG. 60 is an enlarged view of the parts of the surface sensor 3109 and the scale 3108. The scale 3108 is stuck on the surface of the belt 3106 or the drum 3126. Patterns 3108a and patterns 3108b are alternately written on the scale 3108 at fixed intervals. Reflectance of light is high in the patterns 3108b, and reflectance is low in the parts of the patterns 3108a compared with the patterns 3108b.

The surface sensor 3109, which reads the patterns 3108a and the patterns 3108b, are provided near the scale 3108. Light is emitted from a light-emitting section 3109a of the surface sensor 3109. The emitted light is irradiated on the scale 3108, and a light-receiving section 3109b receives a reflected wave of the light. Since the reflectance is different in the patterns 3108*a* and the patterns 3108*b*, it is possible to measure a drive state of the belt 3106 or the drum 3126 by reading a difference of intensity of light to be received.

Figure 61:
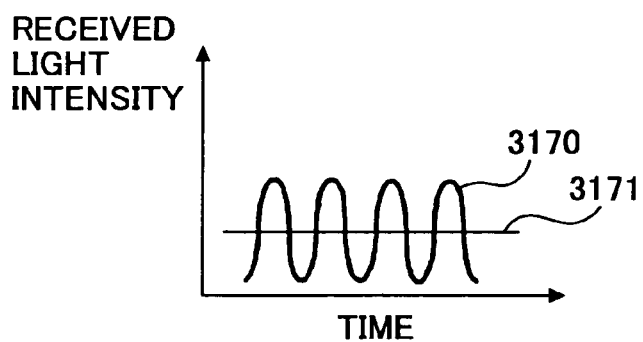
FIG. 61 is a graph of a state of output by a surface sensor.

FIG. 61 shows an output of the surface sensor 3109 at the time when patterns with different degrees of reflectance shown in FIG. 60 are read. A horizontal axis indicates time, and a vertical axis indicates intensity of light to be received on the surface sensor 3109. Since the light is intense when the patterns 3108*b* are read and is weak when the patterns 3108*a* are read, an output 3170 of a sine wave shape is obtained.

Figure 62:
FIG. 62 is a diagram showing an output by the surface sensor as a rectangular pulse.

This output 3170 may be used directly as a measurement signal. When it is desired to change a measurement signal to a pulse signal, an arbitrary threshold level 3171 is provided with respect to the output 3170. When the output 3170 exceeds this threshold level 3171, an H signal is used, and when the output 3170 falls below the threshold level 3171, an L signal is used, whereby the output 3170 can be obtained as a rectangular pulse 3172 as shown in FIG. 62.

Figure 63:
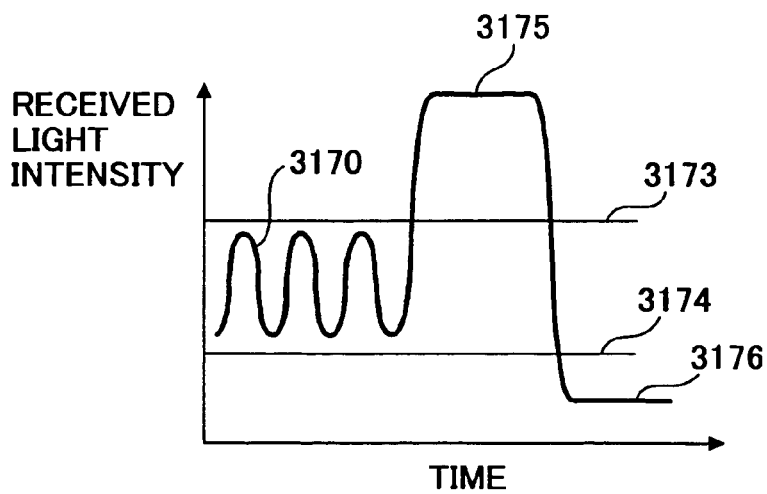
FIG. 63 is a diagram of criteria for judgment of abnormality in an output signal output by the surface sensor.

FIG. 63 shows a method of determination for judging whether abnormality has occurred in the surface sensor 3109. An upper limit level 3173 and a lower limit level 3174 are provided with respect to the output 3170 obtained from the surface sensor 3109. If the output 3170 is between the upper limit and the lower limit, it is judged that the output 3170 is normal.

When abnormality occurs in the surface sensor 3109, and an output level of the surface sensor 3109 increases to a level 3175, since the output exceeds the upper limit level 3173, it is judged that abnormality has occurred. When the output level decreases to a level 3176, since the output falls below the lower limit level 3174, it is judged that abnormality has occurred.

In this way, it is judged whether the surfaced sensor 3109 is abnormal or normal. Thus, if abnormality occurs, it is possible to notify the control side of the occurrence of abnormality by outputting an abnormality occurrence signal from the surface sensor 3109 side.

Occurrence of abnormality may be judged by measuring time of a pulse interval or a pulse width of the rectangular pulse 3172 shown in FIG. 62 to judge whether the time of the pulse interval or the pulse width is longer or shorter than usual time.

Figure 64:
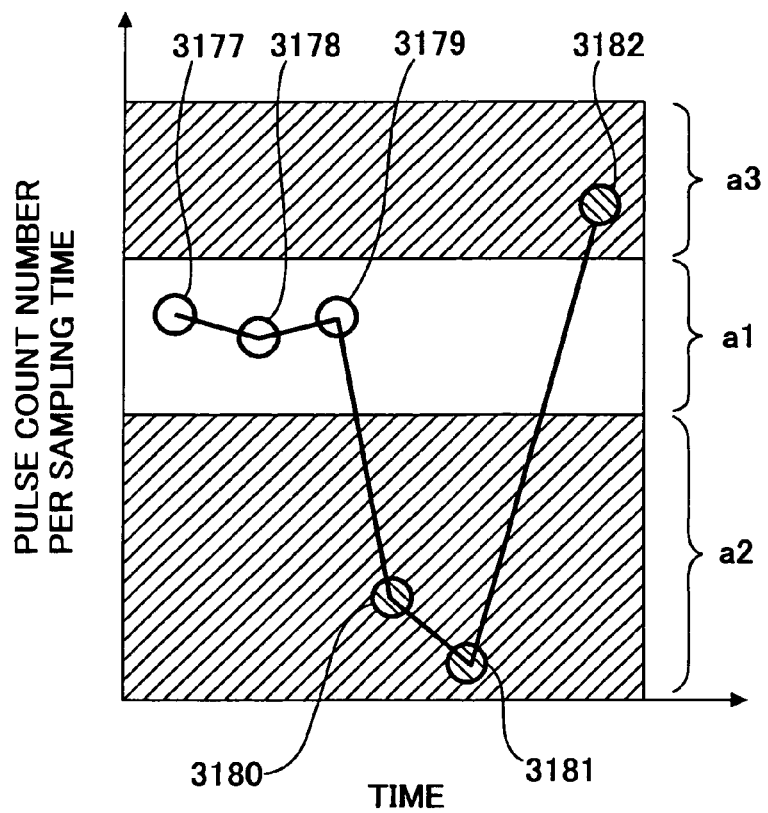
FIG. 64 is a graph of a relation between time and a pulse count number per sampling time in the diagram of criteria for judgment of abnormality in an output signal output by the surface sensor.

FIG. 64 shows a method of detecting that surface sensor measurement is abnormal on the control side (control unit side) without depending on the surface sensor 3109.

A case in which a pulse number of the rectangular pulse 3172 as shown in FIG. 62 is counted in control every sampling time to perform position control according to an accumulated count number will be considered. A horizontal axis indicates elapsed time per sampling time, and a vertical axis indicates a count number (pulse count number) per sampling time.

When the position control is performed, the pulse count number fluctuates within a fluctuation range a1 of a count number, which is possible in usual load variation (disturbance), pulse count numbers 3177, 3178, and 3179 are measured. At this point, if abnormality occurs in the surface sensor 3109, since a sensor itself does not operate correctly, pulse count numbers 3180 and 3181 within a range a2 lower than usual fluctuation range a1 are measured. Alternatively, a pulse number 3182 within a range a3 exceeding the usual fluctuation range a1 is measured.

When a pulse count number not within the usual fluctuation range a1 is measured, the control side judges that abnormality occurs in the surface sensor 3109 and outputs an abnormality occurrence signal. This makes it possible to judge or inform that surface sensor measurement is impossible.

Next, a thirty-fourth embodiment will be explained. In the thirty-fourth embodiment, an example of performing feedback control using an inexpensive mark sensor with low resolution is described. When the mark sensor with low resolution is used, there is a limit in a mark interval that can be detected with the resolution. More specifically, for example, when a mark is directly provided on a surface of a drive control object member moving endlessly at velocity of 282 millimeters per second, a limit of the mark interval is about 4160 micrometers. In this case, a position of the drive control object member can only be grasped by a unit of 4169 micrometers. Therefore, for example, when marks are detected in a number larger than a target mark number by one, even when a position of the drive control object member actually has moved further than a target position only by 1 micrometer, it is judged that the position of the drive control object member has moved further than the target position by 4160 micrometers. Consequently, when the mark sensor with low resolution is used, accuracy of causing the position of the drive control object member to follow the target position is low compared with a mark sensor with high resolution.

Even an apparatus using such a mark sensor with low resolution can perform stable feedback control concerning a period of a discontinuous part.

However, the apparatus simulatively feedbacks a mark detection signal or the like (dummy signal) in a continuous part in the past as a mark detection signal in the discontinuous part throughout the period of the discontinuous part. Thus, when the mark sensor with low resolution is used, an actual position in the drive control object member cannot be grasped for the period of the discontinuous part. Moreover, velocity of the drive control object member varies due to various errors in a drive system. Therefore, it is impossible to grasp to which degree an actual endless movement position immediately after the end of the period of the discontinuous part is behind or ahead of the target position.

Figure 65:
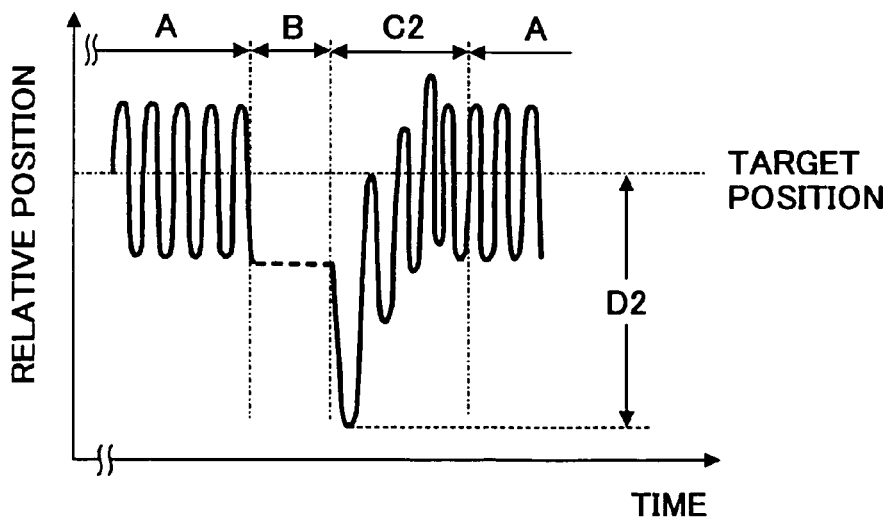
FIG. 65 is a graph for explaining positions of a belt and a drum with respect to a target position before and after a period of a discontinuous part in a feedback control system that does not multiply a sensor output.

FIG. 65 is a graph schematically showing a position of the drive control object member, which is grasped based on a mark detection signal from the mark sensor before and after the period of the discontinuous part, to explain the position. In this graph, a horizontal axis indicates time and a vertical axis indicates a position of the drive control object member with respect to the target position (a relative position).

As shown in the figure, in a period A of a continuous part, feedback control following the target position is performed based on a mark detection signal from the mark sensor. Even in this example in which the mark sensor with low resolution is used, a position of the drive control object member in this period A can be placed within a range of about 4160 micrometers around the target position by the feedback control. On the other hand, in a period B of a discontinuous part, the feedback control is performed using the dummy signal as described above. In this period B, a position of the drive control object member cannot be grasped as described above. Here, it is assumed that a position of the drive control object member with respect to the target position (a relative position) does not change during the period B. On the other hand, when the period B of the discontinuous part ends, the feedback control is performed again based on a mark detection signal from the mark sensor. In this case, a result of the feedback control is not instantly reflected on change of a position of the drive control object member due to influence of a torque or the like applied to the drive system. Therefore, immediately after the period B of the discontinuous part ends, a position of the drive control object member may deviate largely from the target position.

Figure 66:
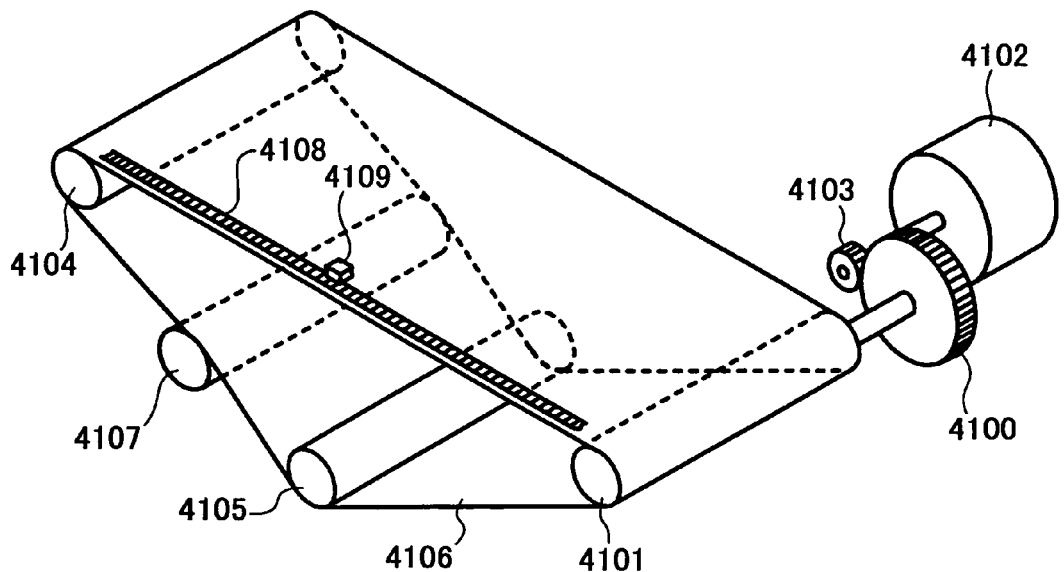
FIG. 66 is a schematic diagram of a structure of belt drive apparatus that is an embodiment of the invention.

FIG. 66 is a schematic diagram of a structure of a belt drive apparatus that is a rotating body drive apparatus including a belt 4106 serving as a drive control object member. This belt 4106 is an endless belt wound around at least two shafts and is equivalent to a photosensitive belt, an intermediate transfer belt, and a direct transfer belt.

A drive roller 4101 is fixed to a rotation shaft of a gear 4100, and a gear 4103 is fixed to a rotation shaft of a motor 4102 serving as a DC motor. When the motor 4102 serving as a drive source is driven to rotate, a torque of the motor 4102 is transmitted to a drive roller 4101 via the gear 4103 and the gear 4100, and the drive roller 4101 is driven to rotate. A belt 4106 is wound around the drive roller 4101 and driven roller 4104 and 4105 such that a constant tension is applied to the belt 4106 by a tension roller 4107. A linear scale, on which plural marks are formed, is stuck on a surface of the belt 4106 along a surface moving direction (endless moving direction) of the belt 4106. In addition, a surface sensor 4109 including a reflective photo-sensor serving as mark detecting means is provided to be opposed to the linear scale 4108. A surface moving position, which is an endless moving position, and surface moving velocity, which is endless moving velocity, of the belt 4106 are measured by reading the marks on the linear scale 4108 with the surface sensor 4109.

Figure 67:
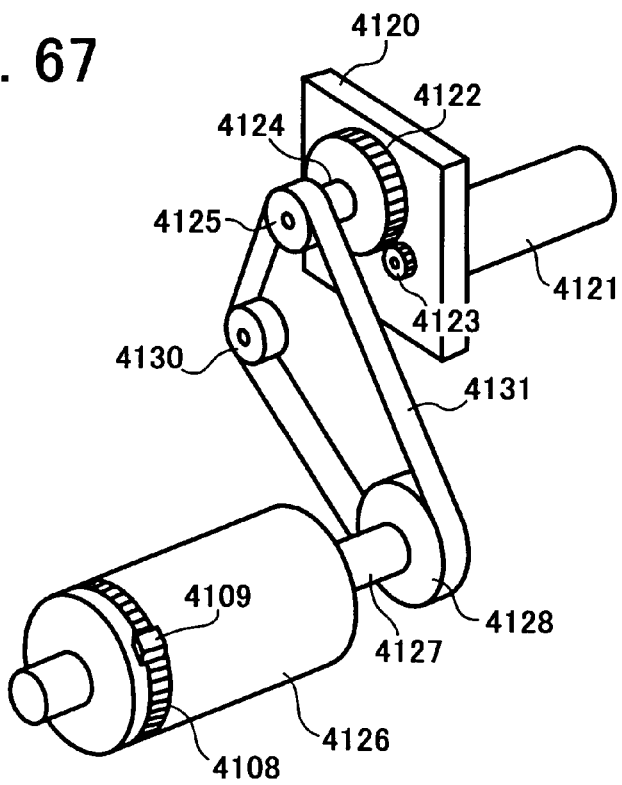
FIG. 67 is a schematic diagram of a structure of a drum drive apparatus that is another embodiment of the invention.

FIG. 67 is a schematic diagram of a structure of a drum drive apparatus serving as a rotating body drive apparatus including a drum 4126 serving as a drive control object member. The drum 4126 is equivalent to a photosensitive drum and a transfer drum to be described later.

A drive pulley 4125 is fixed to a rotation shaft 4124 of the gear 4122, and a gear 4123 engaging with the gear 4122 is fixed to a rotation shaft of a motor 4121 that is a DC motor serving as a drive source. When the motor 4121 is driven to rotate, a torque of the motor 4121 is transmitted to the drive pulley 4125 via the gears 4122 and 4123, and the drive pulley 4125 is driven to rotate. A timing belt 4131 is wound around the drive pulley 4125 and a driven pulley 4128 such that a constant tension is applied to the timing belt 4131 by a tension pulley 4130. A drum 4126 is attached to the driven pulley 4128 via a shaft 4127 such that coaxiality is kept. The linear scale 4108, which is the same as the linear scale shown in FIG. 66, is stuck on a surface of the drum 4126 along a peripheral direction of the drum 4126. In addition, the surface sensor 4109 including a reflective photo-sensor is provided as a mark detecting unit to be opposed to the linear scale 4108. A surface moving position, which is an endless moving position, and surface moving velocity, which is endless moving velocity, of the belt 4106 are measured by reading the marks on the linear scale 4108 with the surface sensor 4109.

Note that, although the linear scale 4108 is stuck at one end of the surface of the belt 4106 or the drum 4126 in the thirty-fourth embodiment, the linear scale 4108 may be stuck in a central part of the surface or on a back the belt 4106 or the drum 4126. In addition, in the thirty-fourth embodiment, the marks are directly provided on a belt 4106 or the drum 4126, which are a drive control object member. However, the marks may be provided on an endless moving member like the drive roller 4101 or the driven roller 4104 or 4105, which moves endlessly following the surface movement of the belt 4106 or the driven pulley 4128, which moves endlessly following the surface movement of the drum 4126. In addition, in the thirty-fourth embodiment, the marks are provided on the belt 4106 by sticking the linear scale 4108, on which the marks are formed in advance to continue at predetermined intervals, on the belt 4106. However, the marks may be provided by directing writing the marks on the belt 4106.

Figure 68A:
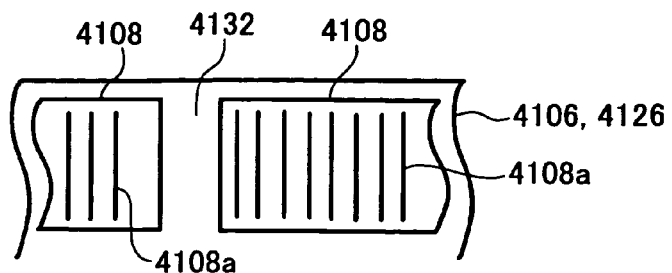
FIGS. 68A and 68B are enlarged views of a joint part of a linear scale.

FIG. 68A is an enlarged view of a joint part of the linear scale 4108 stuck on the belt 4106 in FIG. 66 or the drum 4126 in FIG. 67. Plural marks 4108a are written in the linear scale 4108 by a method like laser irradiation at equal intervals in a surface movement direction of the belt 4106 or the drum 4126 (hereinafter referred to as "rotating body" according to circumstances). More specifically, the marks 4108a are written at intervals of about 4160 micrometers on a tape made of aluminum. It is also possible to write the marks 4108a at narrower intervals. However, since the surface sensor 4109 used in the thirty-fourth embodiment is an inexpensive sensor with low resolution using a photodiode as a light-receiving element, the intervals cannot be made narrower than this. The surface sensor 4109 irradiates light, which is output from a not-shown light-emitting element, on the linear scale 4108 and receives reflected light of the light with a not-shown light-receiving element. Since the reflected light is intense in parts where the marks 4108a are not written and is weak in parts where the marks 4108a are written, the marks 4108a on the linear scale 4108 are recognized according to a difference of an amount of received light. Although the aluminum tape is used as a base material for the linear scale 4108, the linear scale 4108 may be made of other materials.

When marks are provided by sticking the linear scale 4108 as in the thirty-fourth embodiment, as shown in FIG. 68A, usually, the linear scale 4108 is stuck such that both ends of the linear scale 4108 never overlap each other. Therefore, an interval of two marks opposed to each other across this joint is much wider than the mark intervals on the linear scale 4108. Thus, a mark detection signal part corresponding to this joint part is a discontinuous part where an interval of signal parts corresponding to the marks is outside a range decided in advance, and a normal signal is not obtained.

Figure 68B:
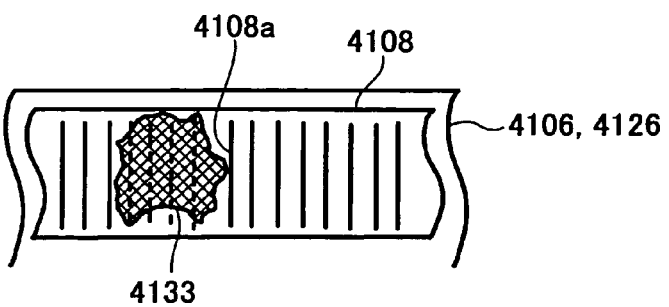

FIG. 68B is an enlarged view of a part where a stain 4133 adheres on the linear scale 4108 stuck on the belt 4106 in FIG. 66 or the drum 4126 in FIG. 67.

When the marks are provided on the surface side of the rotating body 4106 or 4126 as in the thirty-fourth embodiment, stains of a toner or the like may adhere to the marks. When the stains adhere in this way, reflected light of that part is weakened, and the part changes to a discontinuous part where intervals of signal parts corresponding to the marks are outside a range decided in advance. Therefore, a normal signal is not obtained as in the case of the joint. Note that the same problem occurs not only when stains adhere but also when the marks are scratched.

Figure 69:
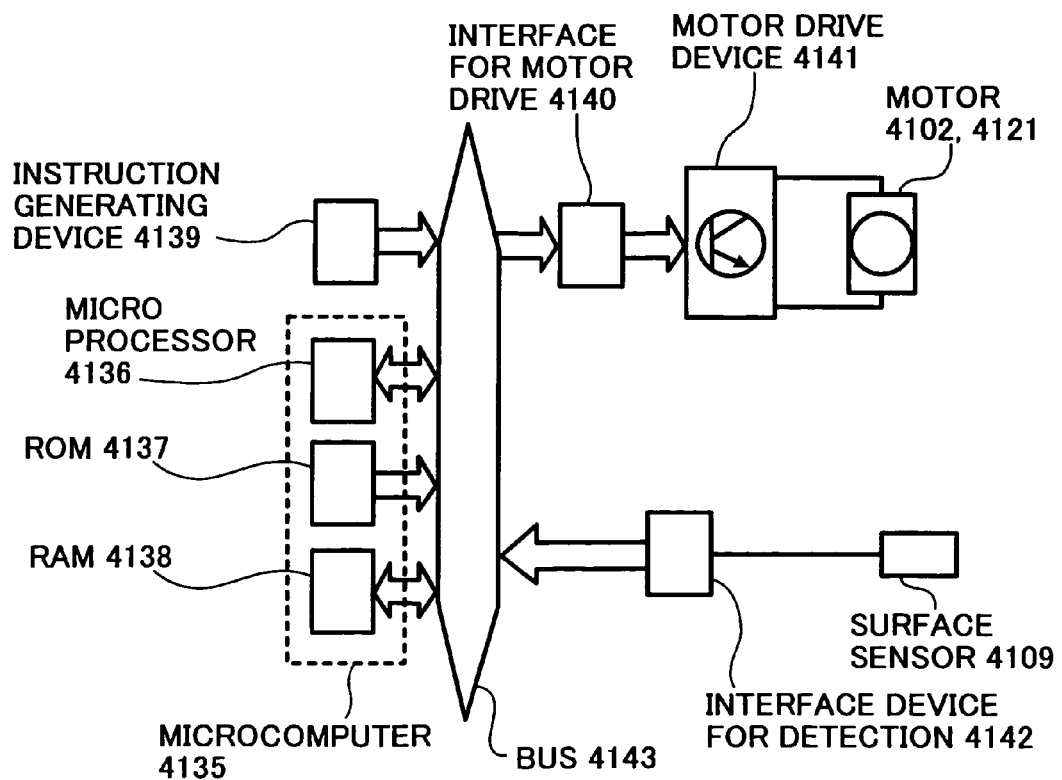
FIG. 69 is a block diagram of a structure of a control system that subjects angular displacement of a motor to digital control based on an output signal of a surface sensor.

FIG. 69 is a block diagram of a structure of a control system that subjects angular displacement of motors 4120 and 4121 to digital control based on an output signal from the surface sensor 4109.

In FIG. 69, reference numeral 4135 denotes a microcomputer including a microprocessor 4136, a read only memory (ROM) 4137, and a random access memory (RAM) 4138. The microprocessor 4136, the read only memory (ROM) 4137, and the random access memory (RAM) 4138 are connected to one another via a bus 4143. Reference numeral 4139 denotes an instruction generating device that outputs a target instruction signal for instructing target angular displacement of the motors 4102 and 4121. The instruction generating device 4139 is also connected to the bus 4143. Reference numeral 4142 denotes an interface device for detection that processes an output pulse (mark detection signal) from the surface sensor 4109 and converts the output pulse into a digital numerical value. The interface device for detection 4142 includes a counter, which counts the output pulse from the surface sensor 4109 every predetermined sampling time, and sequentially sends count numbers of the counter to the microcomputer 4135 via the bus 4143. Reference numeral 4140 denotes an interface for motor drive. The interface for motor drive 4140 outputs a pulse-like signal (control signal) for actuating a power semiconductor, for example, a transistor constituting the motor drive device 4141 based on a result of comparison of a feedback signal sent from the microcomputer 4135 and a target instruction signal sent from the instruction generating device 4139. The motor drive device 4141 operates based on the pulse-like signal from the interface for motor drive 4140 to control a voltage to be applied to the motors 4102 and 4121.

Note that, in the thirty-fourth embodiment, the interface device for detection 4142, the microcomputer 4135, the instruction generating device 4139, and the interface for motor drive 4140 constitute a feedback control unit.

Figure 70:
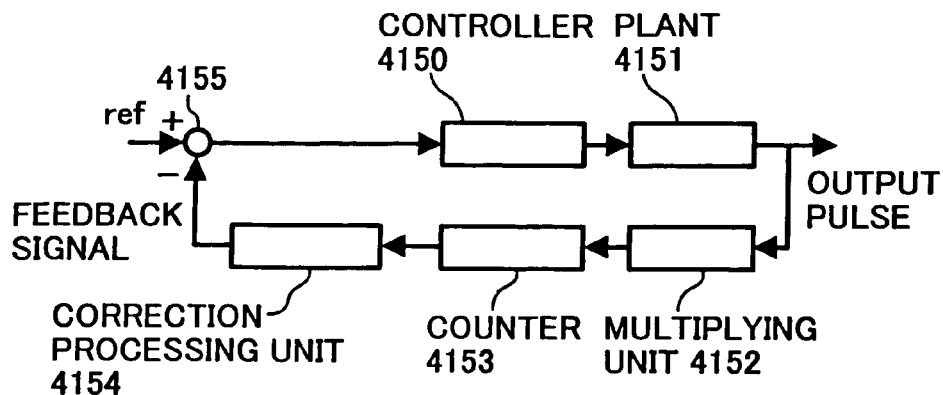
FIG. 70 is a control block diagram of a schematic structure of a feedback control system according to an embodiment of the invention.

FIG. 70 is a block diagram of a schematic structure of a feedback control system according to the thirty-fourth embodiment. In the block diagram, a controller 4150 and a subtracter 4155 are constituted by the interface for motor drive 4140 shown in FIG. 69. A plant 4151 includes an overall structure (drive device), which drives the motors 4102 and 4121, the belt 4106, and the drum 4126, and the surface sensor 4109 shown in FIGS. 66 and 67. A multiplying unit 4152 and a counter 4153 are constituted by the interface device for detection 4142 shown in FIG. 69. In addition, a correction processing unit 4154 is constituted by the microcomputer 4135. Note that a reference signal ref input to the subtracter 4155 is equivalent to a target instruction signal output from the instruction generating device 4139.

In such a feedback control system, when the controller 4150 outputs a control signal to the motor drive device 4141 in the plant 4151, the motors 4102 and 4121 are driven to rotate at the number of revolutions corresponding to the control signal. When this rotation drive force is transmitted to the belt 4106 or the drum 4126 in the plant 4151, and the belt 4106 or the drum 4126 performs surface movement, the linear scale 4108 moves endlessly following the surface movement. Then, the surface sensor 4109 in the plant 4151 continuously detects the marks 4108a on the linear scale 4108 to thereby output an output pulse. When this output pulse is input to the multiplying unit 4152 constituted by the interface device for detection 4142, a frequency of the output pulse is multiplied to be sixty-four times as large. The pulse multiplied to be sixty-four times as large in this way (multiplied pulse) is input to the counter 4153 constituted by the interface device for detection 4142. The counter 4153 counts a pulse number of the input multiplied pulse every predetermined sampling time. This count number is input to the correction processing unit 4154 constituted by the microcomputer 4135. After performing correction processing to be described later, the correction processing unit 4154 outputs a feedback signal to the subtracter 4155. The subtracter 4155 subtracts the feedback signal (the multiplied pulse or a dummy pulse to be described later) output from the correction processing unit 4154 from the reference signal ref, that is, the target instruction signal (target pulse number) input to the subtracter 4155 and outputs a result of the subtraction to the controller 4150. The controller 4150 constituted by the interface for motor drive 4140 generates a control signal for controlling the motor drive device 4141 from the subtraction result and outputs the control signal to the motor drive device 4141 of the plant 4151. As a result, the belt 4106 or the drum 4126 is subjected to the feedback control such that a surface movement position thereof follows a target position corresponding to a target instruction signal generated by the instruction generating device 4139.

Figure 71:
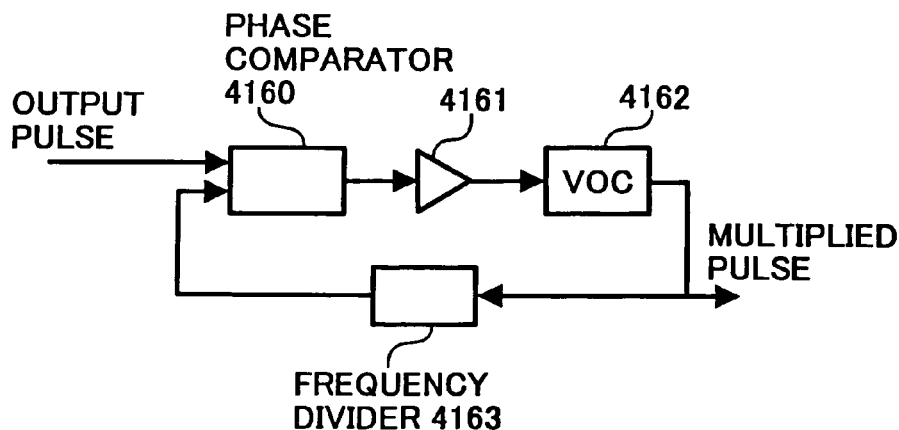
FIG. 71 is a functional block diagram of a multiplying circuit that constitutes a multiplying unit constituting the feedback control system.

FIG. 71 is a functional block diagram of a multiplying circuit that constitutes the multiplying unit 4152. This multiplying circuit uses Phase-Locked-Loop (PLL). More specifically, when an output pulse from the surface sensor 4109 is input, this output pulse is input to a phase comparator 4160. A divided pulse from a frequency divider 4163 is also input to the phase comparator 4160. The phase comparator 4160 performs phase comparison for the output pulse from the surface sensor 4109 and the divided pulse from the frequency divider 4163 and outputs a voltage proportional to a phase difference of the output pulse and the divided pulse. This output is input to a loop filter 4161 and smoothed. An output of this loop filter 4161 is input to a Voltage-Controlled-Oscillator (VCO) 4162. The VCO 4162 controls a frequency of a pulse that is output according to a voltage output from the loop filter 4161. In the thirty-fourth embodiment, the VCO 4162 outputs a multiplied pulse having a frequency sixty-four times as large as the output pulse from the surface sensor 4109. This multiplied pulse is input to the counter 4153 as described above and, at the same time, feedbacked to the frequency divider 4163. The frequency divider 4163 divides a frequency of the multiplied pulse from the VCO 4162 to a frequency inverse times of the multiple, that is, 1/64 as large. This divided pulse is input to the phase comparator 4160.

In the next explanation, a discontinuous part is formed in an output pulse from the surface sensor 4109 because a scratched or stained part of the linear scale 4108 or a joint of the scale is present in a detection area of the surface sensor 4109.

Figure 72:
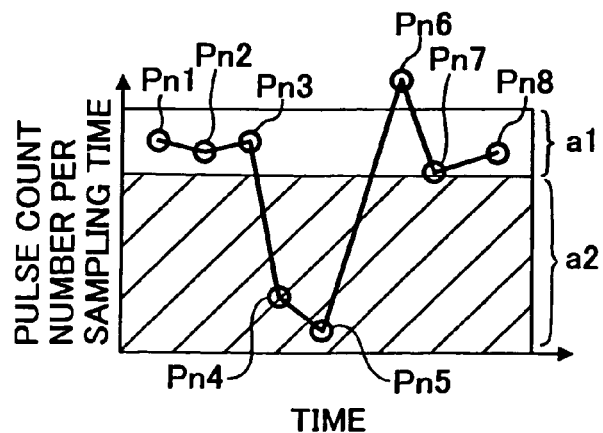
FIG. 72 is a graph of a pulse number to be counted every sampling time before and after a discontinuous part at the time when correction processing by a correction processing unit is not performed.

FIG. 72 is a graph of a pulse number to be counted every sampling time before and after a discontinuous part when correction processing by the correction processing unit 4154 is not performed. In FIG. 72, a horizontal axis indicates time and a vertical axis indicates a pulse number counted every sampling time for an output pulse from the surface sensor 4109. The pulse number per sampling time is within a usual area a1 in the figure for a continuous part. However, when the scratched or stained part of the linear scale 4108 or the joint of the scale reaches a detection area of the surface sensor 410, the surface sensor 4109 cannot detect the marks 4108a and the pulse number decreases as shown in the figure. Thus, in the thirty-fourth embodiment, when the pulse number per sampling time enters a range of an unusual area a2 deviating from the usual area a1, the correction processing unit 4154 judges that an error has occurred. Note that a designer can determine the usual area a1 arbitrarily.

As an example of a method of determining a threshold pulse number indicating a boundary of the usual area a1 and the unusual area a2, when it is assumed thin sampling time is A, velocity of the belt 4106 or the drum 4126 is B, resolution is C, and a mark interval (pitch of the marks 4108a) is D, the designer calculates a theoretical value from calculation of A×B×C÷D, determines a fluctuation width, which could occur due to usual disturbance, with respect to this value, and further determines the usual area a1 shown in FIG. 72 taking into account a margin equivalent to the fluctuation range. "Margin" in this context can be determined from, for example, a distribution state of experimental data.

Pulse numbers Pn1, Pn2, and Pn3 at the time when the scratched or stained part or the joint part is not present in the detection area of the surface sensor 4109 are within the range of the usual area a1 in FIG. 72. However, when the scratched or stained part or the joint reaches the detection area of the surface sensor 4109, the pulse numbers fall to Pn4 and Pn5 to enter the range of the unusual area a2 in FIG. 72. When the pulse numbers Pn4 and Pn5 (discontinuous part) are directly used as a feedback signal, although the belt 4106 or the drum 4126 is driven appropriately, it is judged that driving of the belt 4106 or the drum 4126 has slowed down, and the belt 4106 or the drum 4126 is subjected to drive control to increase velocity. Then, when the discontinuous part ends, it is judged that the driving of the belt 4106 or the drum 4126 is fast because the velocity is increased in the error part (Pn6), and the belt 4106 or the drum 4126 is subjected to drive control to decrease the velocity. Through such a series of drive operations, the feedback system itself causes fluctuation, which is not present originally, and large fluctuation is caused in driving of the belt 4106 or the drum 4126.

Thus, in the thirty-fourth embodiment, it is judged whether a pulse number counted every sampling time is within the range of the usual area a1. If it is judged that the pulse number is not within the range of the usual area a1, that is, the pulse number is within the range of the unusual area a2, a dummy pulse is used as an alternative signal in the usual area a1 instead of the counted pulse number to continue the control.

Figure 73:
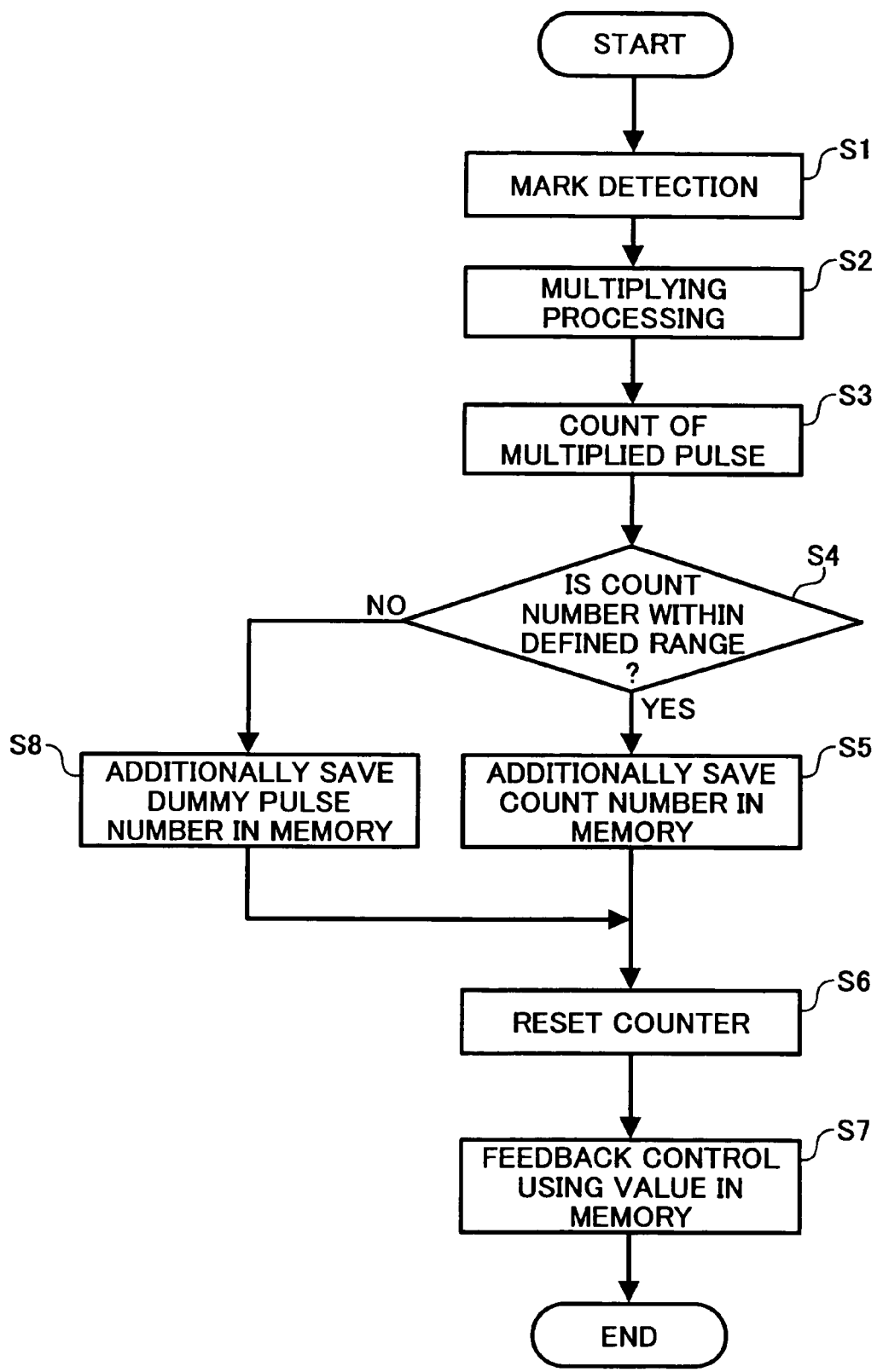
FIG. 73 is a flowchart of a flow of control in the feedback control system.

FIG. 73 is a flowchart of a flow of control in the feedback control system according to the thirty-fourth embodiment. The surface sensor 4109 detects the marks 4108a on the linear scale 4108 (S1). The multiplying unit 4152 multiplies a frequency of an output pulse from the surface sensor 4109 to be a frequency sixty-four times as large (S2). Then, the counter 4153 counts a pulse number of the multiplied pulse every sampling time (S3). The correction processing unit 4154 judges whether a count number output from the counter 4153 is within a defined range, that is, whether the count number is equal to or larger than the threshold pulse number (S4).

When the count number is within the defined range, since the count number is normal, the control unit additionally saves a count number measured by the counter in the memory (check 1) in addition to a count number accumulated to that point (S5). Here, the memory (check 1) means a specific saving area in the RAM 4138 shown in FIG. 69. Thereafter, the control unit resets the counter (S6) and performs feedback control using the value additionally saved in the memory (check 1) (S7). Note that, an initial value of the memory (check 1) is 0.

On the other hand, when it is judged in S4 that the count number is not within the defined range, the count number is an error value corresponding to a joint part or a scratched or stained part. Thus, in the thirty-fourth embodiment, the control unit additionally saves a pulse number of a dummy pulse in the memory (check 1) as a count number (S8). Thereafter, the control unit resets the counter (S6) and performs feedback control using the value in the memory (check 1) in which the pulse number of the dummy pulse is additionally saved (S7).

Figure 74:
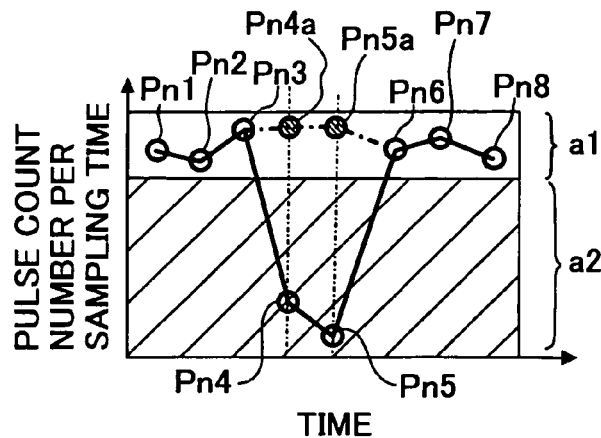
FIG. 74 is a graph of a pulse number to be counted every sampling time before and after a discontinuous part at the time when correction processing by the correction processing unit is performed.

Next, an example of determining a dummy pulse used in the correction processing in the correction processing unit 4154 will be explained with reference to FIG. 74.

In FIG. 72, up to a pulse number Pn3, usual feedback control, in which a count number indicating the pulse number is directly used as a feedback signal, is performed. The pulse number at this point is saved in, for example, the RAM 4138. When a count number of an output pulse from the surface sensor 4109 is within the usual area a1, a value of the pulse number saved in the RAM 4138 is updated. When a pulse number Pn4 within the range of the unusual area a2 is counted, the pulse number (the pulse number Pn3 updated last) saved in the RAM 4138 is used as a pulse number Pn4a of the dummy pulse instead of the pulse number Pn4. This pulse number is adopted as a feedback signal. This pulse number Pn4a is treated as a counted pulse number in a control loop. The same holds true for a pulse number Pn5. In this case, the value of the pulse number saved in the RAM 4138 is not updated, and the pulse number Pn3 updated last is held. Then, when a pulse number Pn6 in the usual area a1 is counted, the processing returns to the usual feedback control. By performing such correction processing, even if the joint part or the scratched or stained part is present in a detection area of the surface sensor 4109, a feedback control system does not become stable and the control is continued.

Note that the method of determining a dummy pulse is not limited to this, and other methods of determining a dummy pulse may be adopted.

According to the thirty-fourth embodiment, a pulse number is counted every predetermined sampling time for a multiplied pulse obtained by multiplying an output pulse from the surface sensor 4109 to be sixty-four times as large. Therefore, the pulse number counted in the sampling time can be increased significantly compared with the time when the output pulse is not multiplied. This makes it possible to perform highly accurate feedback control. As a result, a maximum deviation amount between a position of the belt 4106 or the drum 4126 immediately after a period of a discontinuous part ends and a target position can be reduced.

Figure 75A:
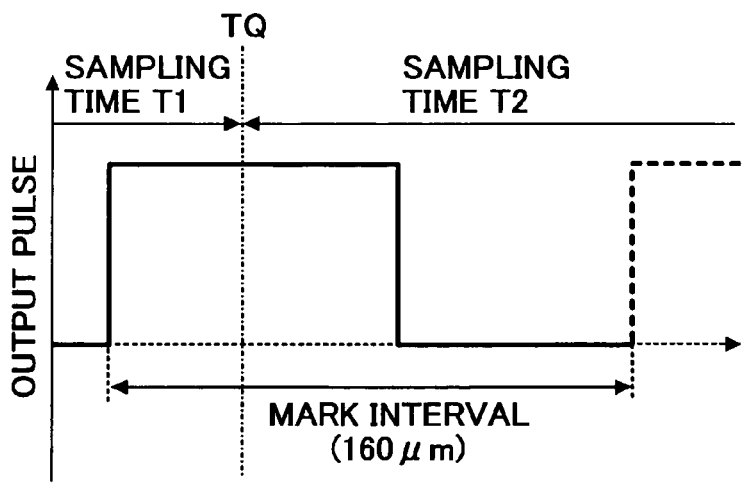
FIG. 75A is a diagram of an output pulse before multiplication and a multiplied pulse after the multiplication.
Figure 75B:
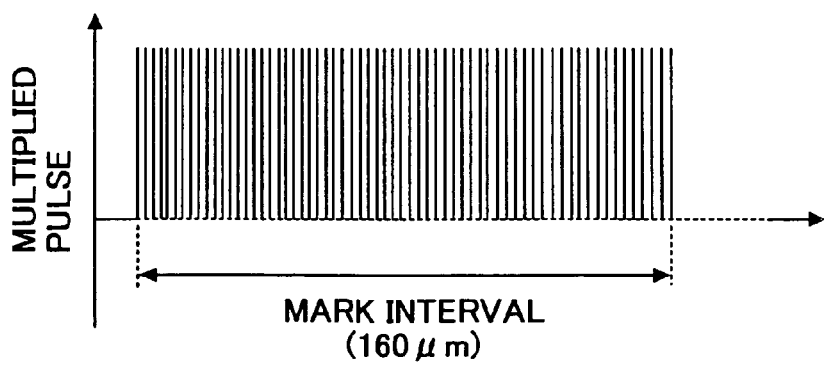
FIG. 75B is a diagram of an output pulse before multiplication and a multiplied pulse after the multiplication.
Figure 76:
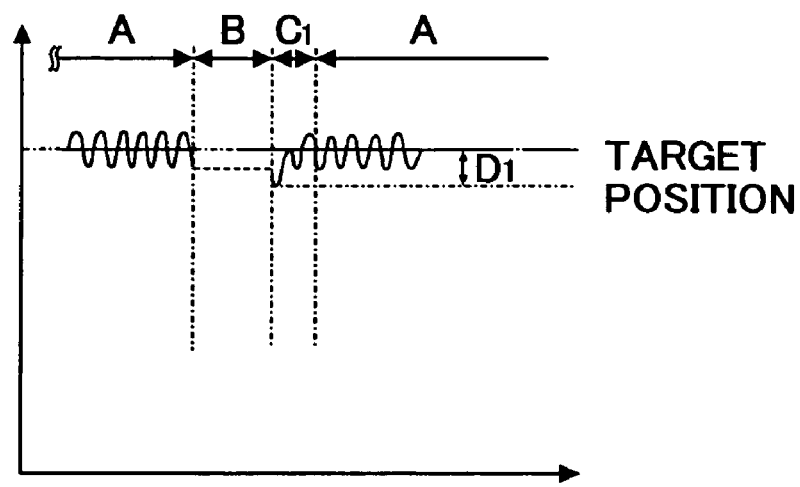
FIG. 76 is a graph for explaining positions of a belt and a drum with respect to a target position before and after a period of a discontinuous part at the time when the feedback control system is used.

More specifically, as shown in FIG. 75A, in an output pulse before multiplication, when one pulse is present across a section timing T0 of sampling time T1 or T2, this one pulse is counted in the sampling time T1 when a pulse number is counted at a rising part of the pulse. In such a case, if the sampling time T1 is started right in the rising part of the pulse, an advance position error equivalent to about ¾ of a mark interval occurs at this sampling time T1. In addition, if the sampling time T2 is ended right in the rising part of the pulse, a delay position error equivalent to about ¼ of the mark interval occurs at this sampling time T2. On the other hand, when the multiplied pulse obtained by multiplying the output pulse is used as in the thirty-fourth embodiment, as shown in FIG. 75B, a position error, which could occur in sampling time T1 or T2, is equivalent to ¹⁄₆₄ of the mark interval at the maximum. As a result, as shown in FIG. 76, an error range of a position of the belt 4106 or the drum 4126 with respect to the target position, that is, an amplitude of a waveform in a period A or a period C1 can be reduced compared with the time when an output pulse is not multiplied shown in FIG. 75A. Consequently, a maximum delay amount D1 with respect to the target position of the belt 4106 or the drum 4126, which could occur immediately after the period B of the discontinuous part ends, can be reduced compared with a maximum delay amount D2 in the time when an output pulse is not multiplied.

Next, a modification of the thirty-fourth embodiment will be explained.

In the thirty-fourth embodiment, since the multiplying circuit using PLL is used as the multiplying unit 4152, the multiplying unit 4152 includes the loop filter 4161. Therefore, there is delay time equivalent to a time constant of the loop filter 4161. As a result of such delay time, even if a normal output pulse, that is, an output pulse having a pulse number within the range of the usual area a1 is input to the multiplying unit 4152 after an abnormal output pulse, that is an output pulse having a pulse number within the range of the unusual area a2 is input to the multiplying unit 4152 from the surface sensor 4109, a multiplied pulse a predetermined number times (sixty-four times) as large cannot be generated instantly. Therefore, even if the normal output pulse is output from the surface sensor 4109, a normal multiplied pulse is not output from the multiplying unit 4152 in a period corresponding to the delay time, and appropriate feedback control cannot be performed.

Figure 77:
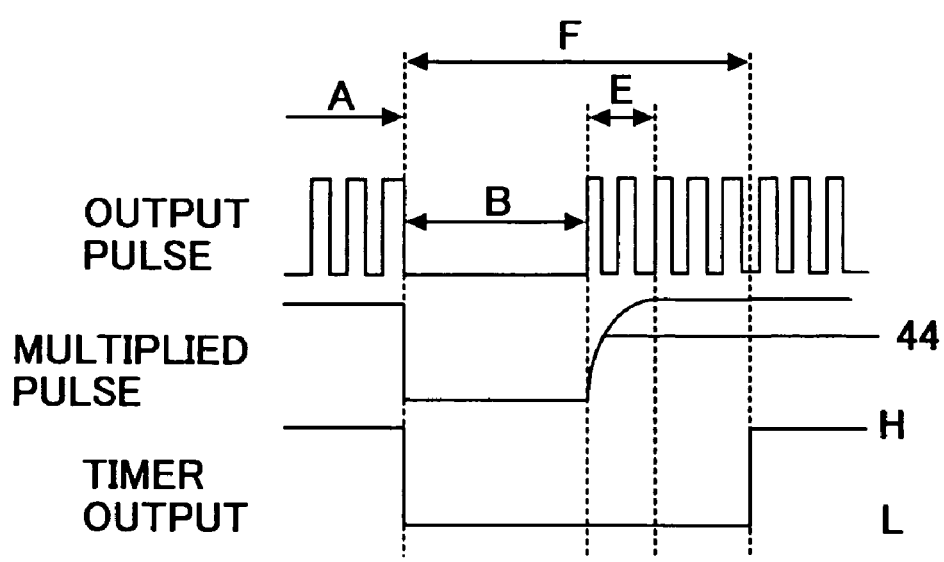
FIG. 77 is a timing chart for explaining a relation between an output pulse output from a surface sensor and an operation of a multiplying unit.

FIG. 77 is a timing chart for explaining a relation between an output pulse output from the surface sensor 4109 and an operation of the multiplying part 4152. In this timing chart, an upper part indicates an output pulse output from the surface sensor 4109, a middle part schematically indicates a frequency of a multiplied pulse output from the multiplying unit 4152, and a lower part indicates an output signal of a timer to be described later.

If a joint part or a scratched or stained part is present in a detection area of the surface sensor 4109, as shown in the figure, a discontinuous part, where marks are not detected in an output pulse from the surface sensor 4109, is formed. In this case, it is assumed that a multiplied pulse is not output from the multiplying unit 4152 that multiplies the output pulse. Note that a multiplied pulse of a different frequency may be output from the multiplying unit 4152. When the period B of the discontinuous part ends, an output pulse is output from the surface sensor 4109 again. However, the multiplying unit 4152 cannot output a multiplied pulse multiplied to be the predetermined number times (sixty-four times) as large immediately due to the time constant of the loop filter 4161. In other words, even after the period B of the discontinuous part ends, an appropriate multiplied pulse is not output from the multiplying unit 4152 during a period E in the figure. Therefore, if a pulse number used in the correction processing unit 4154 is switched from a dummy pulse number to a pulse number of a multiplied pulse immediately after the period B of the discontinuous part ends, it is likely that appropriate feedback control cannot be performed.

Figure 78:
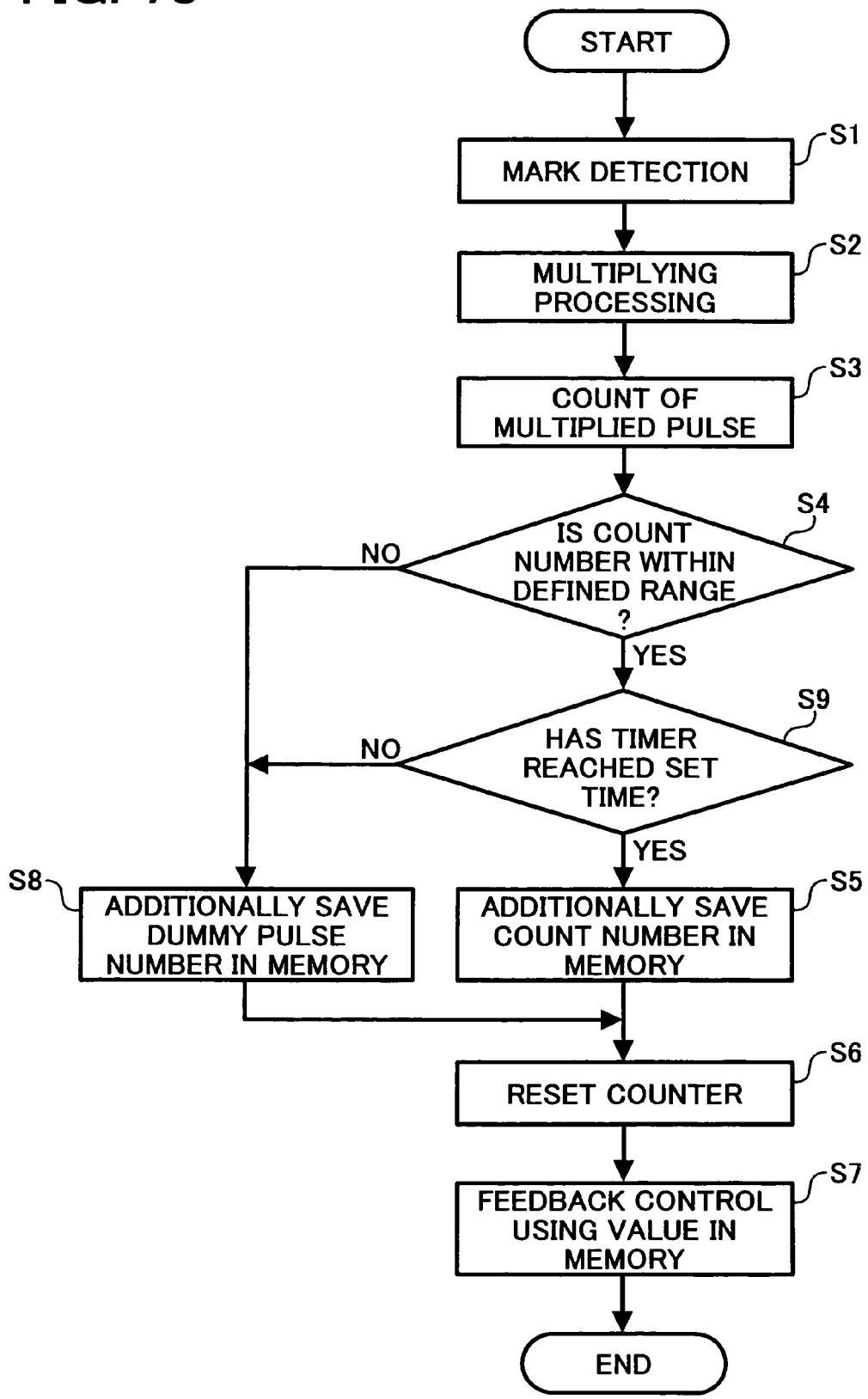
FIG. 78 is a flowchart of a flow of control in a feedback control system according to a modification.

FIG. 78 is a flowchart of a flow of control in a feedback control system according to this modification.

In this modification, when the correction processing unit 4154 judges that a count number of a multiplied pulse output from the counter 4153 is not within a defined range (S4), the correction processing unit 4154 starts a timer. This timer is constituted by a not-shown timer circuit provided outside the microcomputer 4135 shown in FIG. 69. Thus, the microcomputer 4135, which has judged that the count number is not within the defined range, sends a measurement signal to the timer circuit. The timer circuit, which has received the measurement signal, measures time until a set time. As shown in FIG. 77, the timer circuit outputs an output signal of an L level to the microcomputer 4153 when the timer starts the measurement of time and outputs an output signal of an H level when the time has reached the set time. Note that, thereafter, while it is judged that a count number is within the defined range, the correction processing unit 4154 never restarts the timer even if it is judged that a count number is not within the defined range. Note that, although the set time is measured using the timer circuit in this modification, other means may be used as long as the means can measure time.

When the correction processing unit 4154 judges that the count number is within the defined range (S4), the correction processing unit 4154 judges whether the timer has reached the set time based on an output signal from the timer circuit (S9). When the correction processing unit 4154 judges that the time has not reached the set time, the feedback control system continues feedback control using a dummy pulse in the same manner as at the time when the correction processing unit 4154 judges that the count number is not within the defined range in S4 (S8, S6, and S7). Thereafter, when the correction processing unit 4154 judges that the timer has reached the set time (S9), the feedback control system returns to the usual feedback control (S5, S6, and S7). Therefore, if the set time of the timer is set larger than the time obtained by adding the period E to the period B shown in FIG. 77, the feedback control system can perform appropriate feedback control without being affected by delay time of the multiplying unit 4152. Note that this set time only has to be equal to or larger than the time obtained by adding the period E to the period B shown in FIG. 77. However, in this modification, the set time is set to be time F equivalent to time integer times as long as the sampling time. This makes it possible to use a reference clock, which is used to measure the sampling time, in the time circuit as well and not to use a clock generating circuit in realizing the feedback control system. Note that, in this modification, since the period B is also time equivalent to time integer times as long as the sampling time, time obtained by deducting time equivalent to the period B from the time F (operation stable period) is also time equivalent to time integer times as large as the sampling time.

In this modification, the microcomputer 4135 constituting the correction processing unit 4154 functions as a control switching unit that performs switching processing for switching feedback control using a multiplied pulse and feedback control using a dummy pulse based on an output signal from the timer circuit. More specifically, a program for causing the microprocessor 4136 constituting the microcomputer 4135 to function as the control switching unit is stored in the ROM 4137 serving as a program storing medium, and the microprocessor 4136 reads out and executes this program, whereby the switching processing is performed.

Although this switching processing is realized by software in this modification, the switching processing may be realized by hardware. For example, the interface device for detection 4142, which processes an output pulse from the surface sensor 4109 and converts the output pulse into a digital numerical value, may be functioned as the control switching unit. In this case, for example, the interface device for detection 4142 judges a discontinuous part in the same manner as the correction processing unit 4154 from the output pulse from the surface sensor 4109 and prevents the output pulse from being input to the multiplying unit 4152 until the set time after the period B of the discontinuous part starts.

Figure 79:
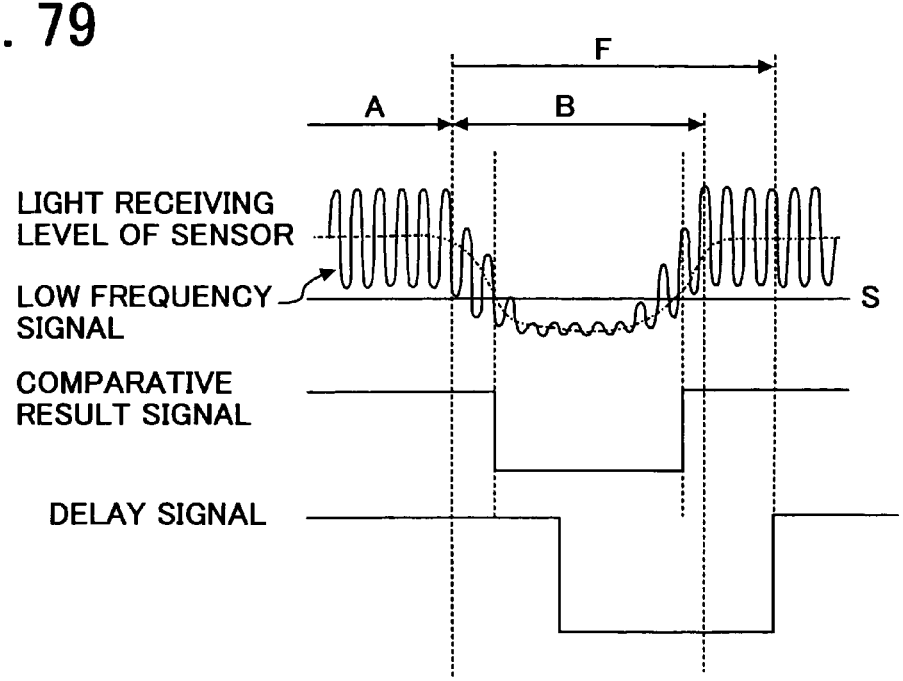
FIG. 79 is a graph of a light receiving level of a surface sensor, a comparative result signal, and a multiplied signal for explaining another example of a structure according to the modification.

It is also possible to continue the feedback control using a dummy pulse until time equivalent to the set time without using the timer circuit. As a specific example, a light receiving level of the surface sensor 4109 before and after the discontinuous part is as indicated by a solid line shown in an upper part of FIG. 79. When this light receiving level signal is passed through a low pass filter, a low frequency signal as indicated by an alternate long and short dash line shown in the upper part of FIG. 79. Then, a signal level of this low frequency signal and a predetermined threshold level S are compared to generate a comparison result signal shown in a middle part of FIG. 79. This comparison result signal is at an H level if the signal level of the low frequency signal is equal to or higher than the predetermined threshold level S and at an L level if the signal level of the low frequency signal is lower than the predetermined threshold level S. This comparison result signal is output to the correction processing unit 4154 after being delayed by a delay circuit or the like. Through this delay, an L level end time of the delay signal input to the correction processing unit 4154 is made coincident with an end of the period F shown in FIG. 77. If the surface sensor 4109 constituted in this way is used, the correction processing unit 4154 judges whether this delay signal is at the L level instead of the judgment in S9 shown in FIG. 78. Consequently, it is possible to cause the surface sensor 4109 to continue the feedback control using a dummy pulse until the time equivalent to the set time without using the timer circuit.

As described above, the drive control device in the thirty-fourth embodiment detects the marks 4108*a*, which are provided to continue at the predetermined intervals over the endless moving direction of the belt 4106 or the drum 4126 serving as a drive control object member, which moves endlessly, or the drive roller 4101, the driven roller 4104 or 4105, or the driven pulley 4128 serving as an endless moving member endlessly moving following the endless movement of the belt 4106 or the drum 4126, with the surface sensor 4109 serving as mark detecting means. Then, the drive control device feedback-controls driving of the belt 4106 or the drum 4126 using an output pulse that is a mark detection signal obtained by the detection. The drive control device includes the interface device for detection 4142 constituting the multiplying unit 4152 serving as multiplying means that generates a multiplied pulse, which is a multiplied signal obtained by multiplying the output pulse to be predetermined times as large. In addition, the drive control device also includes the interface device for detection 4142 serving as feedback control means, which performs feedback control using a multiplied pulse when it is judged that a discontinuous part in which intervals of signal parts corresponding to marks are outside the range decided in advance (usual area a1) is not present in an output pulse or a multiplied signal and performs feedback control using a multiplied pulse when the discontinuous part is present, the microcomputer 4135, the instruction generating device 4139, and the interface for motor drive 4140. With such a structure, as described above, even if the surface sensor 4109 is a surface sensor with low resolution, there is an effect of improving dummy resolution. In addition, concerning a continuous part in an output pulse or a multiplied pulse, an error range of a position of the belt 4106 or the drum 4126 with respect to a target position can be reduced. As a result, an amount of maximum deviation D1, which could occur immediately after the period B of the discontinuous part ends, can be reduced. Therefore, rapid velocity variation in the belt 4106 or the drum 4126, which could occur immediately after the period B of the discontinuous part ends, can be controlled. In addition, a period C1, which is required until velocity of the belt 4106 or the drum 4126 stabilizes after the end of the period B of the discontinuous part, can also be reduced.

In the thirty-fourth embodiment, the feedback control system uses the PLL circuit serving as a multiplying circuit, which compares phases of a feedbacked multiplied pulse and an output pulse before multiplication and generates a multiplied pulse using a result of the phase comparison. This makes it possible to generate a multiplied pulse with an inexpensive structure.

In the thirty-fourth embodiment, the feedback control system has the control switching unit that performs switching processing for switching selection concerning whether to cause the feedback control unit to perform feedback control using a multiplied pulse or to perform feedback control using a dummy pulse. Consequently, a period in which the feedback control unit is caused to perform feedback control using a dummy pulse is set as a period obtained by adding an operation stabilizing period, which is set to be equal to or longer than time E necessary for a multiplication operation by the multiplying circuit to stabilize, to period B from the time when it is judged that the discontinuous part is present until the time when the discontinuous part is not present. As a result, as described above, the feedback control means can perform appropriate feedback control without being affected by delay time of the multiplying circuit as described above.

In the thirty-fourth embodiment, the judgment on whether the discontinuous part is present depends on whether a count number, which is the number of signal parts corresponding to marks in an output pulse or a multiplied pulse obtained in predetermined sampling time, is less than a defined number. The operation stabilizing period is set to a period equivalent to time integer times as long as the sampling time. This makes it possible not to use the clock generating circuit and realize cost reduction as described above.

In the thirty-fourth embodiment, the feedback control system has the ROM 4137 serving as a program storing medium having stored therein a program for causing the microprocessor 4136 of the computer 4135 functioning as the feedback control unit to function as the control switching means. The microprocessor 4136 performs the switching processing by executing this program. By performing the switching processing on software in this way, since it is unnecessary to provide hardware functioning as the control switching unit separately, cost reduction can be realized.

As described above, the control switching unit may be constituted to perform the switching processing by sending a switching signal to the feedback control unit. With such as structure, the switching processing can also be performed.

Next, a thirty-fifth embodiment of the invention will be explained. Since a basic structure in the thirty-fifth embodiment is the same as that in the thirty-fourth embodiment, only different parts will be explained.

A drive control device in the thirty-fifth embodiment detects the marks 4108a, which are provided to continue at the predetermined intervals over the endless moving direction of the belt 4106 or the drum 4126 serving as a drive control object member, which moves endlessly, or the drive roller 4101, the driven roller 4104 or 4105, or the driven pulley 4128 serving as an endless moving member endlessly moving following the endless movement of the belt 4106 or the drum 4126, with the surface sensor 4109 serving as mark detecting means. Then, the drive control device feedback-controls driving of the belt 4106 or the drum 4126 using an output pulse that is a mark detection signal obtained by the detection.

In the thirty-fourth embodiment, it is likely that, even if the feedback control is applied to a discontinuous part in a mark detection signal using an alternative signal, a signal part immediately before or after the discontinuous part is made unstable and appropriate drive control cannot be performed in that signal part. Thus, the thirty-fifth embodiment describes a more improved example.

Figure 80A:
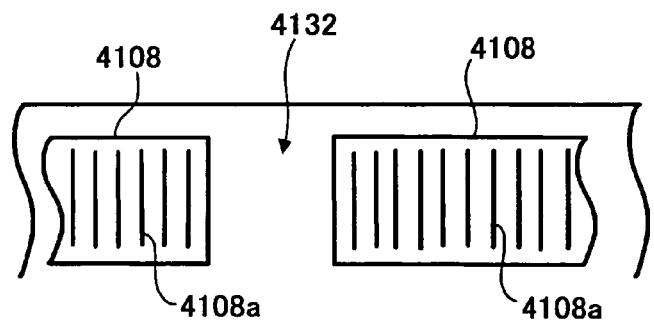
FIG. 80A is an enlarged view of a joint part of a linear scale.
Figure 80B:
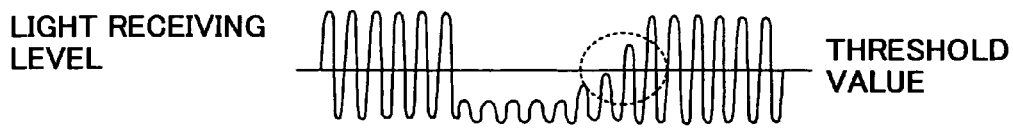
FIG. 80B is a diagram of a light receiving level of a surface sensor for detecting a linear scale.

FIG. 80A is an enlarged view of a joint part of the linear scale 4108 stuck on a surface of a drive control member. The plural marks 4108a are provided at equal intervals in an endless moving direction on a tape made of aluminum. A not-shown surface sensor serving as mark detecting means irradiates light emitted from a light-emitting element on the linear scale 4108 and receives reflected light of the light with a light-receiving element. Since the reflected light is intense in parts where the marks 4108a are not written and is weak in parts where the marks 4108a are written, the marks 4108a on the linear scale 4108 are recognized according to a difference of an amount of received light. Although the aluminum tape is used as a base material for the linear scale 4108, the linear scale 4108 may be made of other materials. When marks are provided by sticking the linear scale 4108 as in this way, as shown in FIG. 80A, usually, the linear scale 4108 is stuck such that both ends of the linear scale 4108 never overlap each other. Therefore, an interval of two marks opposed to each other across this joint is much wider than the mark intervals on the linear scale 4108. Since light reflectance on the surface of the drive control object member is usually lower than that on the surface of the linear scale, as shown in FIG. 80B, a light receiving level in a part corresponding to the joint part 4132 falls. As a result, in a mark detection signal shown in FIG. 80C obtained by forming this light receiving level in a pulse shape using a predetermined threshold value, there is a discontinuous part where intervals of signal parts (H level parts) corresponding to marks are outside a range decided in advance. Therefore, in the thirty-fourth embodiment, as described above, the feedback control is applied to this discontinuous part using an alternative signal as a mark detection signal.

Figure 80C:
FIG. 80C is a diagram of an output pulse of the surface sensor that is output according to the light receiving level.

However, when the joint part 4132 shown in FIG. 80A passes a detection area of the surface sensor, a light receiving level is made unstable as in a part encircled by a broken line in FIG. 80B immediately after the passage. This is caused by influence of charging time or the like of a capacitor provided in an electric circuit of the surface sensor. In the part where the light receiving level is unstable in this way, as shown in FIG. 80C, a duty ratio of a mark detection signal is broken, and the mark detection signal is made unstable. As a result, even if the alternative signal is used only for the discontinuous part, appropriate feedback control cannot be performed in some cases.

Figure 81A:
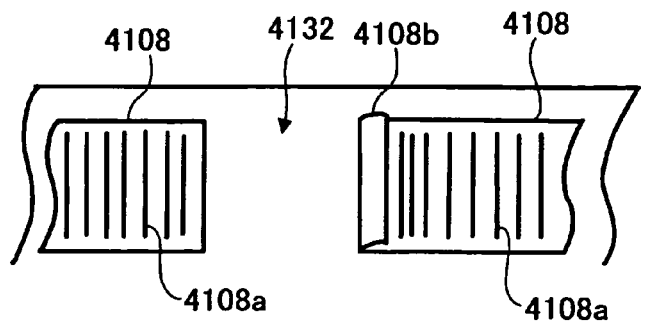
FIG. 81A is an enlarged view of a joint part of a linear scale in which end turn-up has occurred.
Figure 81B:
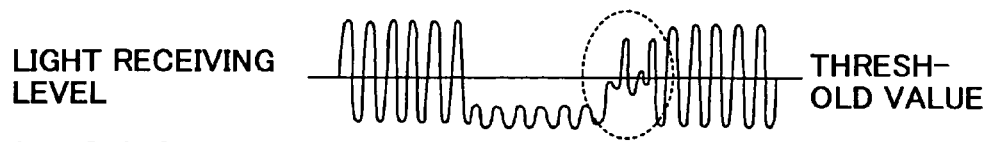
FIG. 81B is a diagram of a light receiving level of a surface sensor for detecting the linear scale.
Figure 81C:
FIG. 81C is a diagram of an output pulse of the surface sensor that is output according to the light receiving level.

FIG. 81A is an enlarged view of the joint part of the linear scale 4108 stuck on the surface of the drive control object member as in FIG. 80A. An end of the linear scale 4108 stuck on the surface of the drive control object member may be turned up as shown in FIG. 81B due to use of the drive control object member over time. In such a turned-up part 4108*b*, a reflecting direction of light from a light-emitting element varies depending on how the part is turned up. Thus, a light receiving level is made unstable in a part corresponding to the turned-up part as indicated by a broken line in FIG. 81B. In the part where the light receiving level is unstable in this way, as shown in FIG. 81C, a duty ratio of a mark detection signal is broken, and the mark detection signal is made unstable. As a result, even if the alternative signal is used only for the discontinuous part, appropriate feedback control cannot be performed in some cases.

Note that this turned-up part 4108*b* could be formed at both ends of the linear scale 4108. Therefore, when the turned-up part 4108*b* is formed at the end of the linear scale 4108 on the left side in FIG. 81B, an unstable mark detection signal with a broken duty ratio also appears on a start side (left side in FIG. 81C) of the discontinuous part.

Figure 82A:
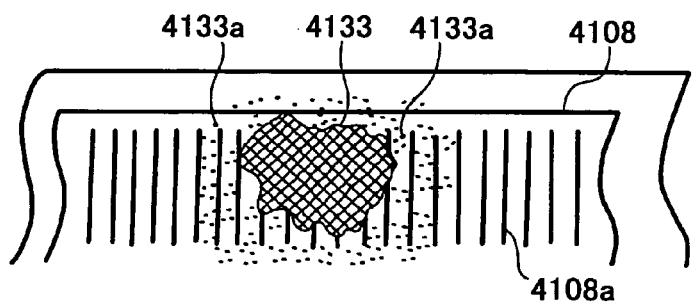
FIG. 82A is an enlarged view of a stain part adhering on a linear scale.
Figure 82B:
FIG. 82B is a diagram of a light receiving level of a surface sensor for detecting the linear scale.

FIG. 82A is an enlarged view of a stain part 133 adhering on the linear scale 4108 stuck on a surface of a drive control object member. As described above, a stain may adhere to a part of marks on the linear scale 4108. Since light reflectance is generally low in this stain part 133, as shown in FIG. 82B, a light receiving level in a part corresponding to the stain part 133 falls. As a result, in a mark detection signal, there is a discontinuous part where intervals of signal parts (H level parts) corresponding to marks are outside a range decided in advance. Therefore, in the thirty-fourth embodiment, as described above, the feedback control is applied to this discontinuous part using an alternative signal as a mark detection signal.

However, when powder like a toner hardens to form the stain part 133, the powder may spread and adhere around the stain part 133. In a powder part 133*a* spread in this way, a light receiving level in a part corresponding to the powder part 133*a* is made unstable as indicated by a broken line in FIG. 82B. In the part where the light receiving level is unstable in this way, a duty ratio of a mark detection signal is broken, and the mark detection signal is made unstable. As a result, even if the alternative signal is used only for the discontinuous part, appropriate feedback control cannot be performed in some cases.

Figure 83A:
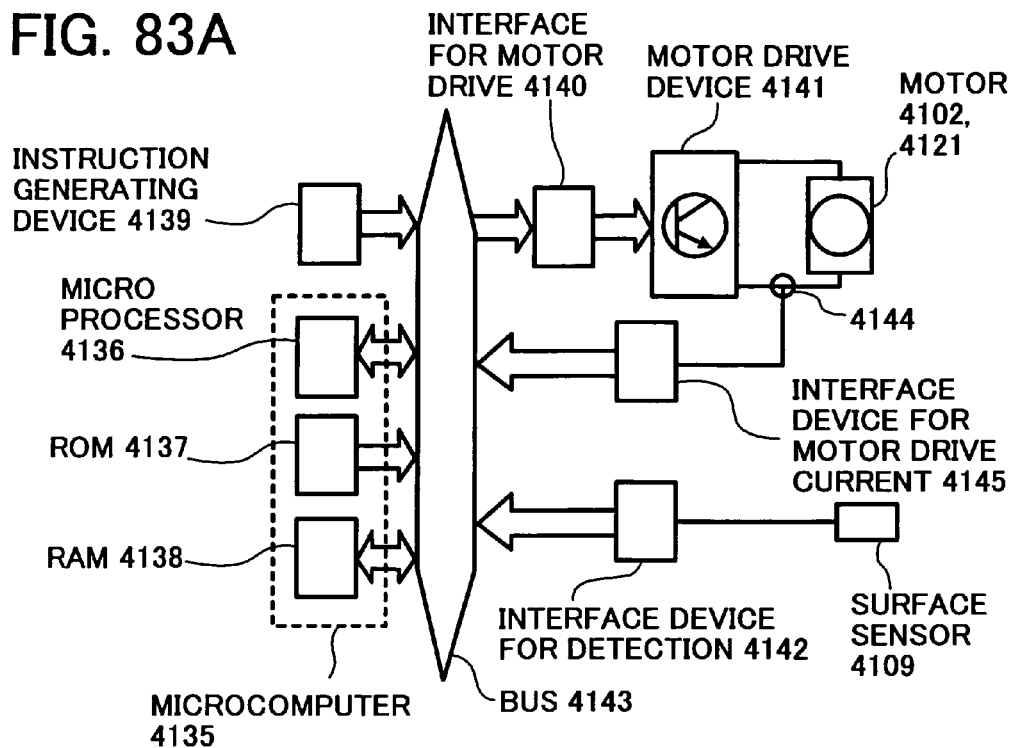
FIG. 83A is a block diagram of a structure of a control system that subjects angular displacement of a motor to digital control based on an output signal of a surface sensor.
Figure 83B:
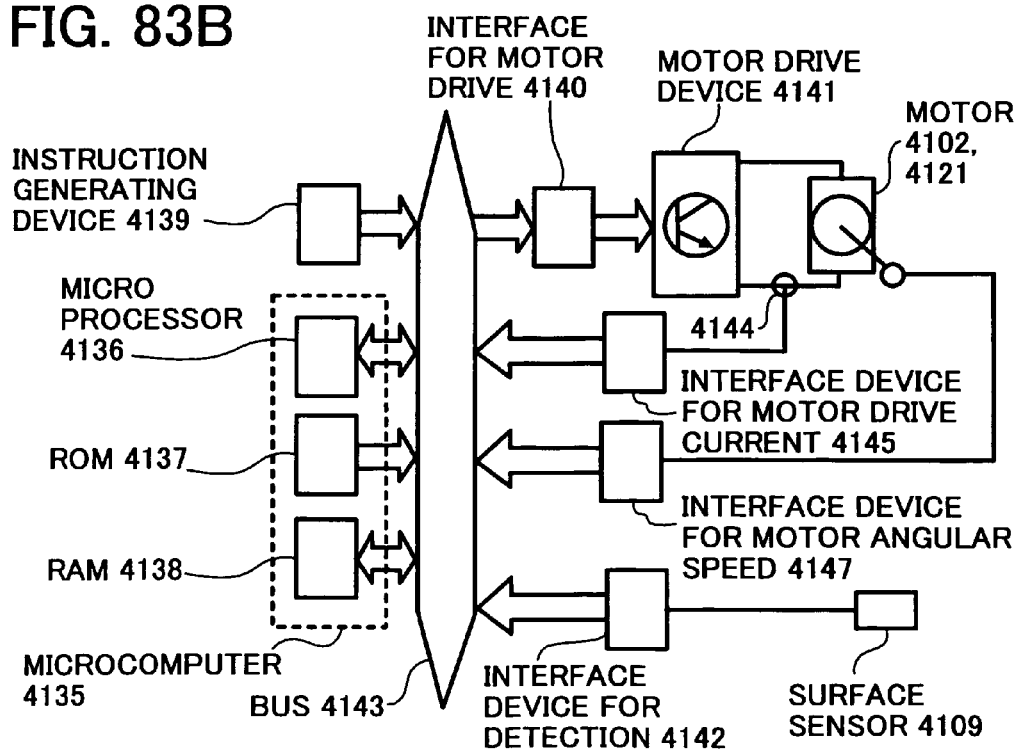
FIG. 83B is a block diagram of a structure of a control system that subjects angular displacement of a motor to digital control based on an output signal of a surface sensor.

FIGS. 83A and 83B are block diagrams of structures of a control system that subjects angular displacement of the motors 4102 and 4121 to digital control based on an output signal from the surface sensor 4109. In FIGS. 83A and 83B, reference numeral 4135 denotes a microcomputer including the microprocessor 4136, the read only memory (ROM) 4137, and the random access memory (RAM) 4138. The microprocessor 4136, the read only memory (ROM) 4137, and the random access memory (RAM) 4138 are connected to one another via the bus 4143. Reference numeral 4139 denotes an instruction generating device that outputs a target instruction signal for instructing target angular displacement of the motors 4102 and 4121. The instruction generating device 4139 is also connected to the bus 4143. Reference numeral 4142 denotes an interface device for detection that processes an output pulse (mark detection signal) from the surface sensor 4109 and converts the output pulse into a digital numerical value. The interface device for detection 4142 includes a counter, which counts the output pulse from the surface sensor 4109 every predetermined sampling time, and sequentially sends count numbers of the counter to the microcomputer 4135 via the bus 4143. The microcomputer 4135 multiplies the count value by a conversion constant of pulse number versus angular displacement decided in advance to obtain angular displacement of the rotation shaft of the motor 4102. Reference numeral 4140 denotes an interface for motor drive. The interface for motor drive 4140 outputs a pulse-like signal (control signal) for actuating a power semiconductor, for example, a transistor constituting the motor drive device 4141 based on a result of comparison of a feedback signal sent from the microcomputer 4135 and a target instruction signal sent from the instruction generating device 4139. The motor drive device 4141 operates based on the pulse-like signal from the interface for motor drive 4140 to control a voltage to be applied to the motors 4102 and 4121. Reference numeral 4144 denotes a current sensor that detects a motor drive current flowing to the motors 4102 and 4121. A result of the detection of the current sensor 4144 is sent to the microcomputer 4135 via an interface device for motor drive current 4145.

In FIG. 83B, a mechanism for detecting angular velocity of the motors 4102 and 4121 is further provided. More specifically, an angular velocity detector 4146 is provided for the motors 4102 and 4121. The angular velocity detector 4146 counts an output pulse from an encoder provided in the rotation shafts of the motors 4102 and 4121 every predetermined time and detects angular velocity of the motors 4102 and 4121 from a value of the count and passing time of a pulse width. A result of the detection is sent to the microcomputer 4135 via an interface device for motor angular speed 4147.

Note that, in the thirty-fifth embodiment, the interface device for detection 4142, the microcomputer 4135, the instruction generating device 4139, and the interface for motor drive 4140 constitute a feedback control unit.

Figure 84:
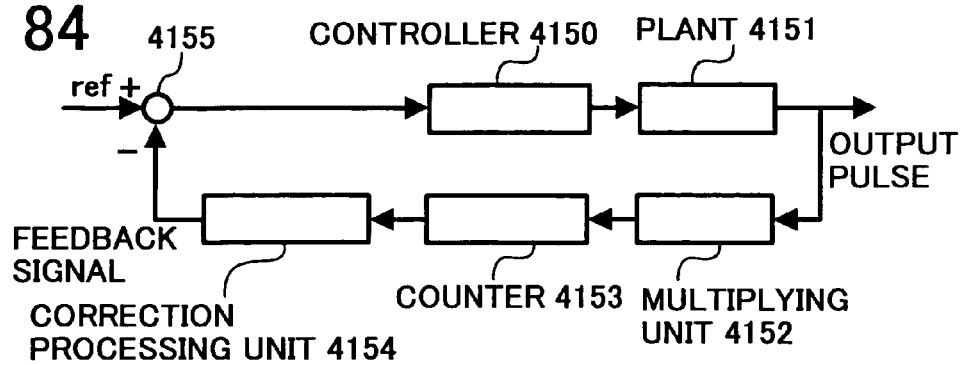
FIG. 84 is a control block diagram of a schematic structure of a feedback control system according to an embodiment of the invention.

FIG. 84 is a control block diagram of a schematic structure of a feedback control system according to the thirty-fifth embodiment. In this block diagram, the controller 4150 and the subtracter 4155 are constituted by the interface for motor drive 4140 shown in FIGS. 83A and 83B. The plant 4151 includes an overall structure (drive device), which drives the motors 4102 and 4121, the belt 4106, and the drum 4126, and the surface sensor 4109 shown in FIGS. 66 and 67. The multiplying unit 4152 and the counter 4153 are constituted by the interface device for detection 4142 shown in FIGS. 83A and 83B. In addition, the correction processing unit 4154 is constituted by the microcomputer 4135. Note that a reference signal ref input to the subtracter 4155 is equivalent to a target instruction signal output from the instruction generating device 4139.

Figure 85A:
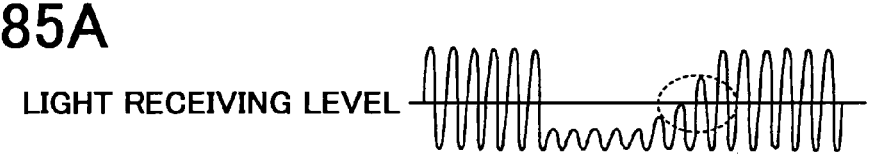
FIG. 85A is a diagram of a light receiving level of a surface sensor in a first operation example.
Figure 85B:
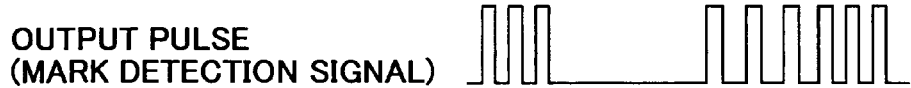
FIG. 85B is a diagram of an output pulse of the surface sensor that is output according to the light receiving level.

In such a feedback control system, when the controller 4150 outputs a control signal to the motor drive device 4141 in the plant 4151, the motors 4102 and 4121 are driven to rotate at the number of revolutions corresponding to the control signal. When this rotation drive force is transmitted to the belt 4106 or the drum 4126 in the plant 4151, and the belt 4106 or the drum 4126 performs surface movement, the linear scale 4108 moves endlessly following the surface movement. Then, when the surface sensor 4109 in the plant 4151 continuously detects the marks 4108a on the linear scale 4108, a light receiving level of a light receiving element thereof is as shown in FIG. 85A due to a difference of reflectance on a scale surface and mark parts. As shown in FIG. 85B, the surface sensor 4109 outputs a pulse signal (output pulse) serving as a mark detection signal that is at an H level when the light receiving level is equal to or lower than a threshold value set in advance and at an L level when the light receiving level is larger than the threshold value. When this output pulse is input to the multiplying unit 4152 constituted by the interface device for detection 4142, a frequency of the output pulse is multiplied to be sixty-four times as large. The pulse multiplied to be sixty-four times as large (multiplied pulse) in this way is input to the counter 4153 constituted by the interface device for detection 4142. The counter 4153 counts a pulse number of the input multiplied pulse every predetermined sampling time. This count number is input to the correction processing unit 4154 constituted by the microcomputer 4135. After performing correction processing to be described later, the correction processing unit 4154 outputs a feedback signal to the subtracter 4155. The subtracter 4155 subtracts the feedback signal (the multiplied pulse or a dummy pulse to be described later) output from the correction processing unit 4154 from the reference signal ref, that is, the target instruction signal (target pulse number) input to the subtracter 4155 and outputs a result of the subtraction to the controller 4150. The controller 4150 constituted by the interface for motor drive 4140 generates a control signal for controlling the motor drive device 4141 from the subtraction result and outputs the control signal to the motor drive device 4141 of the plant 4151. As a result, the belt 4106 or the drum 4126 is subjected to the feedback control such that a surface movement position thereof follows a target position corresponding to a target instruction signal generated by the instruction generating device 4139.

Figure 89:
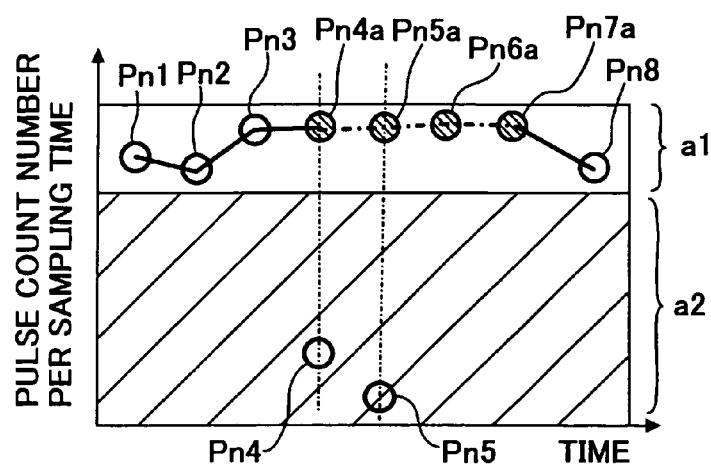
FIG. 89 is a graph of a pulse number to be counted every sampling time before and after a discontinuous part at the time when correction processing by the correction processing unit is performed.

FIG. 89 is a functional block diagram of a multiplying circuit that constitutes the multiplying unit 4152. This multiplying circuit uses Phase-Locked-Loop (PLL). More specifically, when an output pulse from the surface sensor 4109 is input, this output pulse is input to the phase comparator 4160. A divided pulse from the frequency divider 4163 is also input to the phase comparator 4160. The phase comparator 4160 performs phase comparison for the output pulse from the surface sensor 4109 and the divided pulse from the frequency divider 4163 and outputs a voltage proportional to a phase difference of the output pulse and the divided pulse. This output is input to a loop filter 4161 and smoothed. An output of this loop filter 4161 is input to the Voltage-Controlled-Oscillator (VCO) 4162. The VCO 4162 controls a frequency of a pulse that is output according to a voltage output from the loop filter 4161. In the thirty-fifth embodiment, the VCO 4162 outputs a multiplied pulse having a frequency sixty-four times as large as the output pulse from the surface sensor 4109. This multiplied pulse is input to the counter 4153 as described above and, at the same time, feedbacked to the frequency divider 4163. The frequency divider 4163 divides a frequency of the multiplied pulse from the VCO 4162 to a frequency inverse times of the multiple, that is, 1/64 as large. This divided pulse is input to the phase comparator 4160.

In the next explanation, a discontinuous part is formed in an output pulse from the surface sensor 4109 because a scratched or stained part of the linear scale 4108 or a joint of the scale is present in a detection area of the surface sensor 4109.

Figure 87:
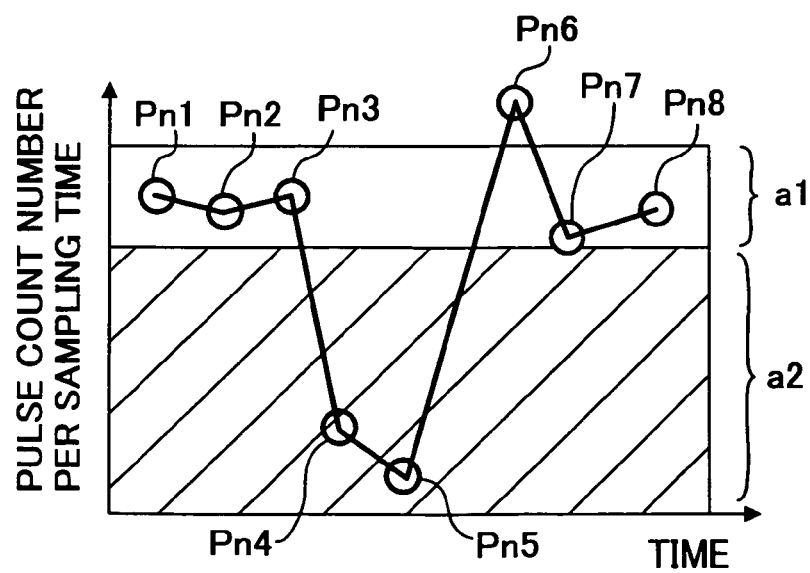
FIG. 87 is a graph of a pulse number to be counted every sampling time before and after a discontinuous part at the time when correction processing by a correction processing unit is not performed.

FIG. 87 is a graph of a pulse number to be counted every sampling time before and after a discontinuous part when correction processing by the correction processing unit 4154 is not performed. In FIG. 87, a horizontal axis indicates time and a vertical axis indicates a pulse number counted every sampling time for an output pulse from the surface sensor 4109. The pulse number per sampling time is within a usual area a1 in the figure for a continuous part. However, when the scratched or stained part of the linear scale 4108 or the joint of the scale reaches a detection area of the surface sensor 410, the surface sensor 4109 cannot detect the marks 4108a and the pulse number decreases as shown in the figure. Thus, in the thirty-fifth embodiment, when the pulse number per sampling time enters a range of an unusual area a2 deviating from the usual area a1, the correction processing unit 4154 judges that an error has occurred. Note that a designer can determine the usual area a1 arbitrarily.

As an example of a method of determining a threshold pulse number indicating a boundary of the usual area a1 and the unusual area a2, when it is assumed thin sampling time is A, velocity of the belt 4106 or the drum 4126 is B, resolution is C, and a mark interval (pitch of the marks 4108a) is D, the usual area a1 as shown in FIG. 87 is determined from a theoretical value calculated from the expression A×B×C÷D.

Pulse numbers Pn1, Pn2, and Pn3 at the time when the scratched or stained part or the joint part is not present in the detection area of the surface sensor 4109 are within the range of the usual area a1 in FIG. 87. However, when the scratched or stained part or the joint part reaches the detection area of the surface sensor 4109, the pulse numbers fall to Pn4 and Pn5 to enter the range of the unusual area a2 in FIG. 87. When the pulse numbers Pn4 and Pn5 (discontinuous part) are directly used as a feedback signal, although the belt 4106 or the drum 4126 is driven appropriately, it is judged that driving of the belt 4106 or the drum 4126 has slowed down, and the belt 4106 or the drum 4126 is subjected to drive control to increase velocity. Then, when the discontinuous part ends, it is judged that the driving of the belt 4106 or the drum 4126 is fast because the velocity is increased in the error part (Pn6), and the belt 4106 or the drum 4126 is subjected to drive control to decrease the velocity. Through such a series of drive operations, the feedback system itself causes fluctuation, which is not present originally, and large fluctuation is caused in driving of the belt 4106 or the drum 4126.

In the thirty-fifth embodiment, it is judged whether a pulse number counted every sampling time is within the range of the usual area a1. If it is judged that the pulse number is not within the range of the usual area a1, that is, the pulse number is within the range of the unusual area a2, a dummy pulse is used as an alternative signal in the usual area a1 instead of the counted pulse number to continue the control.

Figure 82C:
FIG. 82C is a diagram of an output pulse of the surface sensor that is output according to the light receiving level.

As a result of researches by the inventors, it was found that, even if a dummy pulse is used only for a discontinuous part, appropriate drive control cannot be performed immediately before and after the discontinuous part in some cases. This is caused by influence of charging time or the like of a capacitor provided in an electric circuit of the surface sensor 4109 as shown in FIG. 80, turn-up of an end of the linear scale 4108 as shown in FIG. 81, powder spread around a stain part as shown in FIG. 82, and the like.

Thus, in the thirty-fifth embodiment, control is performed using a dummy pulse not only in a discontinuous part but also in parts immediate before and after the discontinuous part such that appropriate drive control can be performed immediately before and after the discontinuous part even if such causes occur.

A first operation example will be explained. In the explanation, appropriate drive control cannot be performed immediately after a discontinuous part due to influence of charging time or the like of the capacitor provided in the electric circuit of the surface sensor 4109 as shown in FIG. 80 (this operation example will be hereinafter referred to as "first operation example").

Figure 85C:
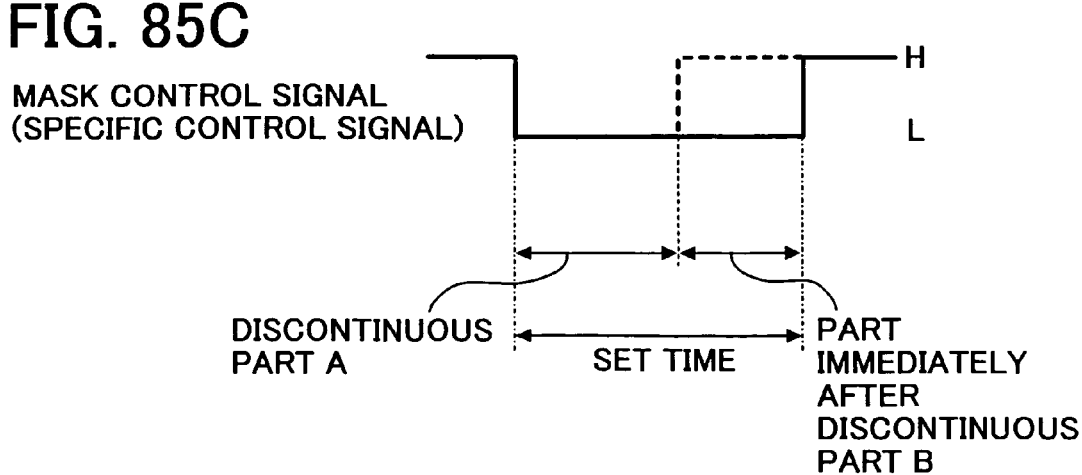
FIG. 85C is a diagram of a mark control signal in the first operation example.
Figure 86:
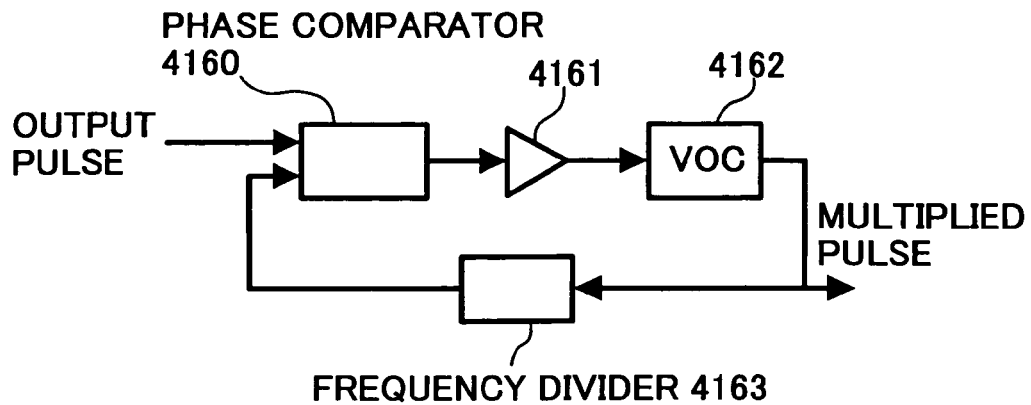
FIG. 86 is a functional block diagram of a multiplying circuit that constitutes a multiplying unit constituting the feedback control system.

Due to influence of charging time or the like of the capacitor provided in the electric circuit of the surface sensor 4109, immediately after a discontinuous part, a light receiving level is made unstable as indicated by a broken line in FIG. 85A and an output pulse is also made unstable as shown in FIG. 85B. Note that FIG. 85C shows a mark control signal (specific control signal) that is an output signal of a timer serving as specific control signal output means to be described later.

Figure 88:
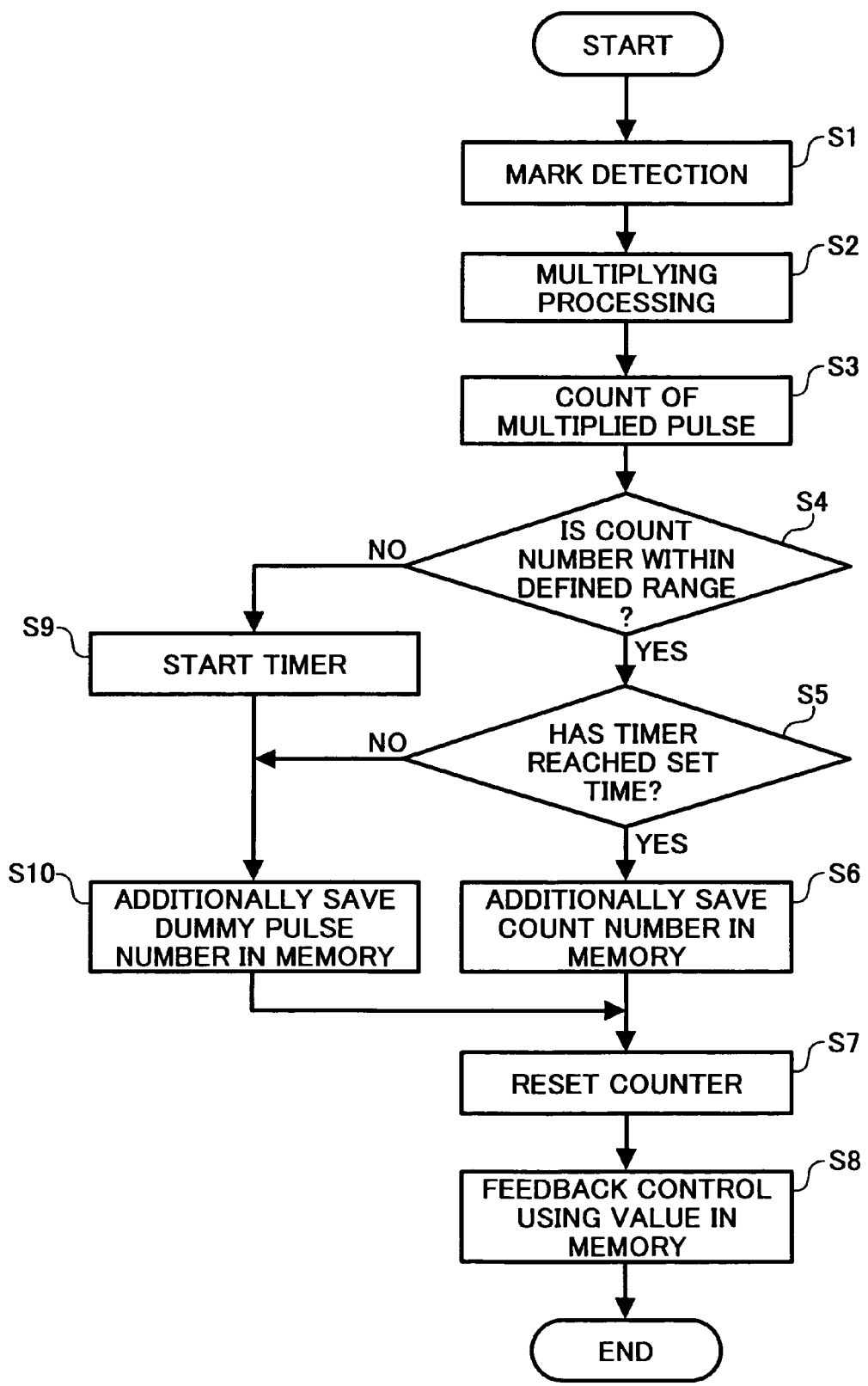
FIG. 88 is a flowchart of a flow of control of a feedback control system in the first operation example.

FIG. 88 is a flowchart of a flow of control in a feedback control system in this first operation example. The surface sensor 4109 detects the marks 4108a on the linear scale 4108 (S1). The multiplying unit 4152 multiplies a frequency of an output pulse from the surface sensor 4109 to be sixty-four times as large (S2). The counter 4153 counts a pulse number of the multiplied pulse every sampling time (S3). The correction processing unit 4154 judges whether a count number output from the counter 4153 is within a defined range, that is, whether the count number is equal to or larger than the threshold pulse number (threshold value) (S4).

When the count number is within the defined range, next, the feedback control system judges whether a timer started to count time as described later has reached set time (S5). Here, since the timer has not started yet, considering that the count number is normal, the feedback control system additionally saves the count number measured by the counter in addition to a count number accumulated to that point in the memory (check 1) (S6). The memory (check 1) means a specific saving area of the RAM 4138 shown in FIGS. 83A and 83B. Thereafter, the feed back control system reset the counter (S7) and performs feedback control using a value in the memory (check 1) in which the count number is additionally saved (S8). Note that an initial value of the memory (check 1) is 0.

On the other hand, when it is judged in S4 that the count number is not within the defined range, the count number is an error value corresponding to a joint part or a scratched or stained part. In this case, in the first operation example, first, the feedback control system starts the timer (S9). This timer is constituted by a not-shown timer circuit provided outside the microcomputer 4135 shown in FIGS. 83A and 83B. Thus, the microcomputer 4135, which has judged that the count number is not within the defined range, sends a measurement signal to the timer circuit, and the timer circuit, which has received the measurement signal, measures time until set time (fixed time). In addition, as shown in FIG. 85C, the timer circuit outputs an output signal of an L level to the microcomputer 4135 when the measurement of time is started and outputs an output signal of an H level after the set time. Note that, thereafter, while it is judged that a count number is within the defined range, the feedback control system never restarts the timer even if it is judged that a count number is within the defined range. Although the set time is measure using the timer circuit in the first operation example, other means may be used as long as the means can measure time.

When the timer is started in this way, the feedback control system additionally saves a pulse number of a dummy pulse in the memory (check 1) as a count number (S10). Then, the feedback control system resets the counter (S7) and performs the feedback control using a value in the memory (check 1) in which the count number is additionally saved (S8). Thereafter, when the correction processing unit 4154 judges that a count number is within the defined range (S4), the correction processing unit 4154 judges whether the timer has reached the set time using an output signal from the timer circuit (S5). When it is judged in this judgment that the time has not reached the set time yet, the feedback control system continues the feedback control using a dummy pulse in the same manner as at the time when the count number is not within the defined range in S4 (S10, S7, and S8). Then, when the feedback control system judges that the time has reached the set time (S5), the feedback control system returns to the usual feedback control (S6, S7, and S8). Therefore, if the set time for the timer is set to time obtained by adding a period B immediately after a part where an unstable signal part is present in an output pulse to a period A of a discontinuous part as shown in FIG. 85C, the feedback control system can perform appropriate feedback control without being affected by charging time or the like of the capacitor provided in the electric circuit of the surface sensor 4109.

Note that, even if the set time is a part of the period B in which an unstable signal part is present in an output pulse, sufficient effect can be shown. This is because influence of charging time or the like of the capacitor provided in the electric circuit of the surface sensor 4109 is larger when time from the discontinuous part is shorter. In other words, in the period in which an unstable signal part is present in an output pulse, a former half part in which time from the discontinuous part is short is significantly affected by charging time or the like of the capacitor. Thus, if control using a dummy pulse is applied to the former half part, influence of charging time or the like of the capacitor as a whole can be controlled significantly. In addition, this set time may be longer than the period B in which an unstable signal part is present in an output pulse to secure a margin taking into account an error.

In addition, it is desirable that the set time is set to be time equivalent to integer times as long as the sampling time. This makes it possible to use a reference clock, which is used for measuring the sampling time, in the timer circuit as well and not to provide a clock generating circuit in realizing the feedback control system.

Next, an example of a method of determining a dummy pulse used in the correction processing in the correction processing unit 4154 will be explained with reference to FIG. 89.

In FIG. 87, up to a pulse number Pn3, the usual feedback control, in which a count number indicating the pulse number is used directly as a feedback signal, is performed. The pulse number at this point is saved in, for example the RAM 4138. When a count number of an output pulse from the surface sensor 4109 is within the usual area a1, a value of the pulse number saved in the RAM 4138 is updated. Then, when a pulse number Pn4 within the unusual area a2 is counted, the pulse number saved in the RAM 4138 (the pulse number Pn3 updated last) is used as a pulse number Pn4a of a dummy pulse instead of the pulse number PN4 and is adopted as a feedback signal. This pulse number Pn4a is treated as a counted pulse number in a control loop. The same holds true for a pulse number Pn5. In this case, the value of the pulse number saved in the RAM 4138 is not updated, and the pulse number Pn3 updated last is held. Moreover, until the set time elapses after the count number enters the usual area a1, the pulse number is used as pulse numbers Pn6a and Pn7a of a dummy pulse and is adopted as a feedback signal. In this case, again, the value of the pulse number saved in the RAM 4138 is not updated, and the pulse number Pn3 updated last is held.

Then, when the set time has elapsed, the processing returns to the usual feedback control. By performing such correction processing, even if a joint part or a scratched or stained part is present in the detection area of the surface sensor 4109, the feedback control system is not made unstable, and the control is continued. Moreover, appropriate feedback control can be performed without being affected by charging time or the like of the capacitor provided in the electric circuit of the surface sensor 4109.

Note that the method of determining a dummy pulse is not limited to this, and other methods of determining a dummy pulse may be adopted.

According to the first operation example (the same holds true for operation examples to be described later), a pulse number is counted every predetermined sampling time for a multiplied pulse that is obtained by multiplying an output pulse from the surface sensor 4109 to be sixty-four times as large. Therefore, a pulse number to be counted in the sampling time can be increased significantly compared with the time when an output pulse is not multiplied. This makes it possible to perform highly accurate feedback control. As a result, a maximum deviation amount between a position of the belt 4106 or the drum 4126 immediately after a period of a discontinuous part ends and a target position can be reduced.

Figure 90A:
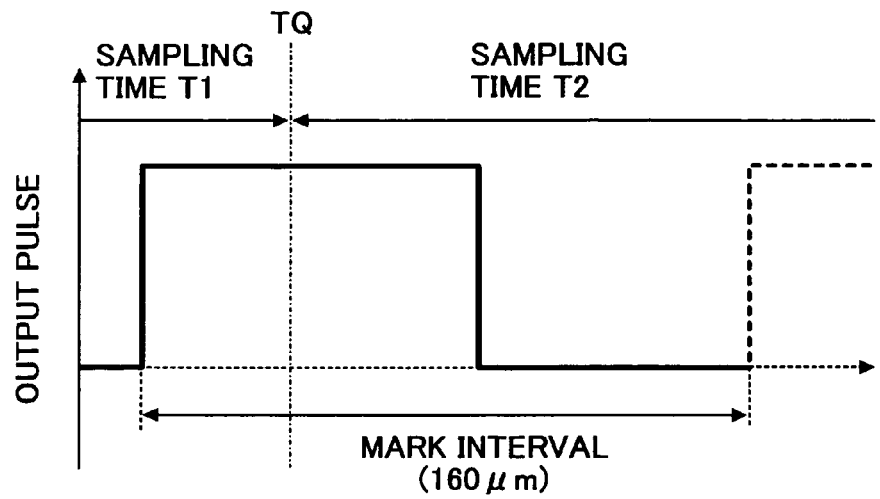
FIG. 90A is a diagram of an output pulse before multiplication and a multiplied pulse after the multiplication.
Figure 90B:
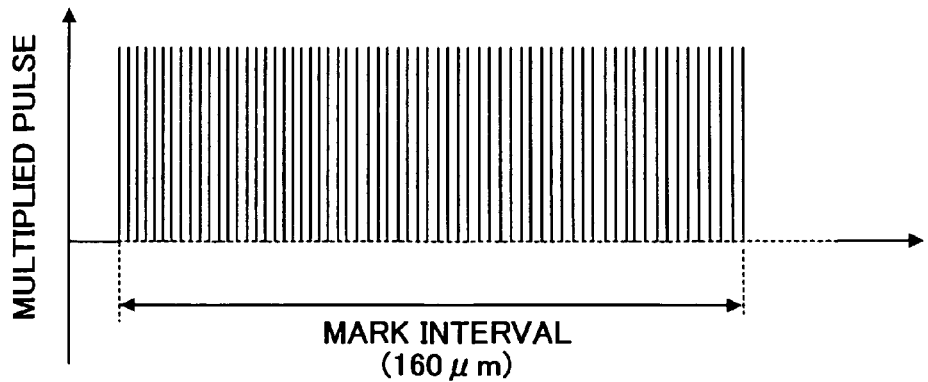
FIG. 90B is a diagram of an output pulse before multiplication and a multiplied pulse after the multiplication.

More specifically, as shown in FIG. 90A, in an output pulse before multiplication, when one pulse is present across a section timing T0 of sampling time T1 or T2, this one pulse is counted in the sampling time T1 when a pulse number is counted at a rising part of the pulse. In such a case, if the sampling time T1 is started right in the rising part of the pulse, an advance position error equivalent to about ¾ of a mark interval occurs at this sampling time T1. In addition, if the sampling time T2 is ended right in the rising part of the pulse, a delay position error equivalent to about ¼ of the mark interval occurs at this sampling time T2. On the other hand, when the multiplied pulse obtained by multiplying the output pulse is used as in the first operation example, as shown in FIG. 90B, a position error, which could occur in sampling time T1 or T2, is equivalent to 1/64 of the mark interval at the maximum. As a result, an error range of a position of the belt 4106 or the drum 4126 with respect to the target position can be reduced compared with the time when an output pulse is not multiplied.

In the first operation example, the microcomputer 4135 constituting the correction processing unit 4154 functions as a feedback control unit that judges whether a discontinuous part is present in an output pulse based on an output signal from the timer circuit, when it is judged that a discontinuous part is present in the output pulse, applies feedback control using a dummy pulse instead of the output pulse to the discontinuous part, and also applies the feedback control to at least a part of an unstable signal part present immediately after the discontinuous part using the dummy pulse. More specifically, a program for causing the microprocessor 4136 constituting the microcomputer 4135 to function as the feedback control unit is stored in the ROM 4137 serving as a program storing medium. The microprocessor 4136 reads out and executes this program, whereby processing by the feedback control unit is performed.

Although the processing by the feedback control unit is realized by software in the first operation example, the processing may be realized by hardware. For example, the interface device for detection 4142, which processes an output pulse from the surface sensor 4109 and converts the output pulse into a digital numerical value, is used as a part of the feedback control unit. In this case, for example, the interface device for detection 4142 judges a discontinuous part in the same manner as the correction processing unit 4154 from the output pulse from the surface sensor 4109 and prevents the output pulse from being input to the multiplying unit 4152 from the start of the period A of the discontinuous part until the set time.

In addition, in the first operation example, a cause of inappropriate control is not limited to the influence of charging time or the like of the capacitor provided in the electric circuit of the surface sensor 4109. The same explanation as above can be applied at the time when an unstable signal part is present in an output pulse immediately after the period A of the discontinuous part ends due to the turn-up at the end of the linear scale 4108 as shown in FIG. 81, the powder spread around the stain part as shown in FIG. 82, and the like.

A second operation example will be explained. In the second operation example, the turn-up at the end of the linear scale 4108 as shown in FIG. 81 occurs on a downstream side in an endless moving direction of a joint, and appropriate drive control cannot be performed immediately before a discontinuous part (this operation example will be hereinafter referred to as "second operation example").

Figure 91A:
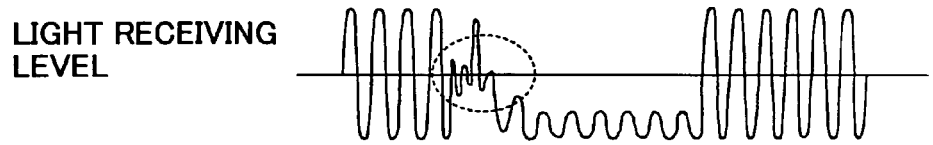
FIG. 91A is a diagram of a light receiving level of a surface sensor in a second operation example.
Figure 91B:
FIG. 91B is a diagram of an output pulse of the surface sensor that is output according to the light receiving level.
Figure 91C:
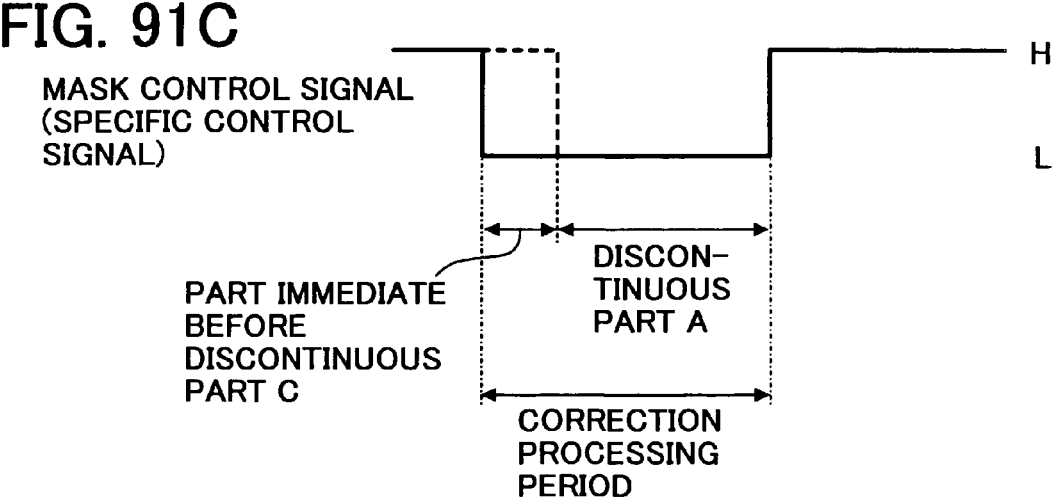
FIG. 91C is a diagram showing a mark control signal in the second operation example.

Due to the turn-up at the end of the linear scale 4108, immediately before the discontinuous part, a light receiving level is made unstable as indicated by a broken line in FIG. 91A, and an output pulse is also made unstable as shown in FIG. 91B. Note that FIG. 91C shows a mark control signal (specific control signal) as in the first operation example. The second operation example will be explained assuming that there is an unstable signal part only in a part immediately before the discontinuous part and there is no unstable signal part immediate after the discontinuous part.

Figure 92:
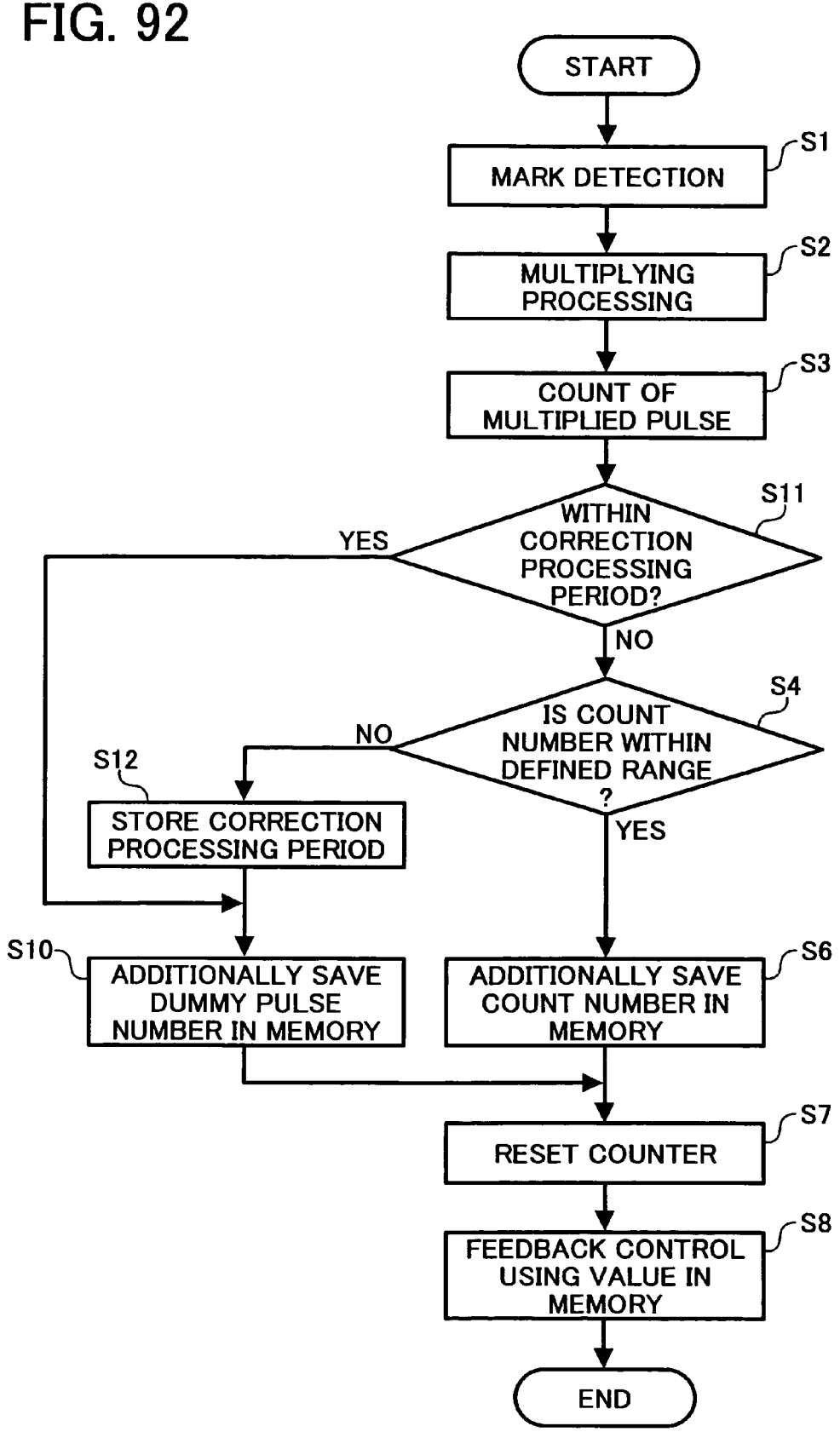
FIG. 92 is a flowchart of a flow of control of a feedback control system in the second operation example.

FIG. 92 is a flowchart of a flow of control in a feedback control system in the second operation example. Since a basic flow of the feedback control in the second operation example is the same as that in the first operation example, only points different from the first operation example will be hereinafter explained.

In the second operation example, before the correction processing unit 4154 judges whether a count number output from the counter 4153 is within a defied range (S4), the feedback control system judges whether the feedback control system is presently in a correction processing period to be described later (fixed period) (S11). Here, the correction processing time has not been set yet, the correction processing unit 4154 judges whether the count number is within the defined range as in the first operation example (S4). When it is judged that the count number is not within the defined range, the count number is an error value substantially corresponding to a boundary between the linear scale 4108 where turn-up at the end thereof has occurred and a belt surface in a joint part. In this case, in the second operation example, the correction processing period is stored in a storing unit serving as storing means provided in a not-shown signal generating unit serving as specific control signal output means. This signal generating unit outputs a mark control signal (specific control signal) of an L level during the correction processing period stored in the storing unit and outputs a mark control signal of an H level during other periods. The mark control signals are input to the microcomputer 4135.

Here, in the turned-up part of the linear scale 4108 adjacent on a downstream side in an endless moving direction of the boundary, a light receiving level is made unstable as shown in FIG. 91A and an output pulse is also made unstable as shown in FIG. 91B. Thus, in the second operation example, the control using a dummy pulse is also applied to a period C of an unstable signal part present immediately before this discontinuous part. Therefore, the correction processing period is set to start at start time of the period C of the unstable signal part present immediately before the discontinuous part and end at end time of the period A of the discontinuous part. However, since the turn-up at the end of the linear scale 4108 occurs due to use over time, it is not preferable to set a correction processing time from the beginning and store the correction processing time in the storage unit of the signal generating unit. This is because, if the turn-up at the end occurs, since a width of a joint changes according to an amount of the turn-up, an appropriate correction processing period is not obtained even if a correction processing period is set from the beginning assuming that a joint is fixed.

Thus, in the second operation example, when it is judged in S4 that a count number is not within the defined range, that point is grasped as a point when the boundary with the belt surface in the joint part passes the detection area of the surface sensor 4109. Then, a correction processing period, which has a point earlier than the point by time equivalent to the period C of the unstable signal part as start time and the end of the period A of the discontinuous part as end time, is stored in the storing unit of the signal generating unit (S12). Consequently, after turn-up at the end occurs, drive control taking into account an unstable signal part due to the turned-up part (drive control using a dummy pulse) cannot be performed when the turned-up part passes the detection area of the surface sensor 4109 for the first time, but the drive control taking into account the unstable signal part can be performed when the turned-up part passes the detection area of the surface sensor 4109 after that.

Thereafter, when an amount of turn-up at the end of the linear scale is further increased, before a correction processing time set at that point begins (S11), a count number is not within the defined range (S4). In this case, a new correction processing period is stored in the storing unit of the signal generation unit.

As described above, in the second operation example, as shown in FIG. 91C, a correction processing period is set to a period obtained by adding the period C immediately before a discontinuous part, in which an unstable signal part is present in an output pulse, immediately before the period A of the discontinuous part. Consequently, even if an unstable signal part is present in a part immediately before a discontinuous part due to the turn-up at the end of the linear scale 4108, the feedback control system can perform appropriate feedback control. The same holds true at the time when an unstable signal part is present in a part immediately before a discontinuous part due to other causes.

Note that, in the second operation example, the period immediately before the period A of the discontinues part is the period coinciding with the period C in which an unstable signal part is present in an output pulse. However, the period may be a period longer than the period C to secure a margin taking into account an error.

In the explanation of the second operation example, both start time and end time of a correction processing period are stored in the storing unit of the signal generating unit, and a mark control signal of an L level is output during this correction processing period. However, only the start time of the correction processing period may be stored in the storing unit. In this case, the end time of the correction processing period only has to be a point when the count number returns to the defined range in S4.

In addition, a correction processing period may be set from the beginning assuming occurrence of turn-up at the end of the linear scale 4108 to store the correction processing period in the storing unit of the signal generating unit. In this case, if the turn-up at the end has occurred more than assumed, a new correction processing period is stored in the storing unit of the signal generating unit as described above.

A third operation example will be explained. In the third operation example, a stain due to a toner adheres on the linear scale 4108 as shown in FIG. 82 and appropriate drive control cannot be performed immediately before and after a discontinuous part (this operation example will be hereinafter referred to as "third operation example").

Figure 93A:
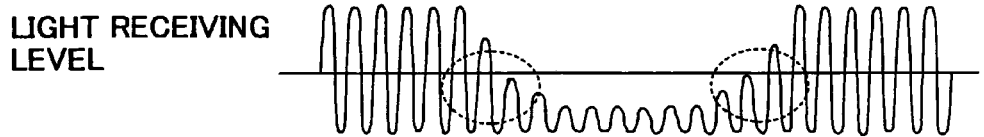
FIG. 93A is a diagram of a light receiving level of a surface sensor in a third operation example.
Figure 93B:
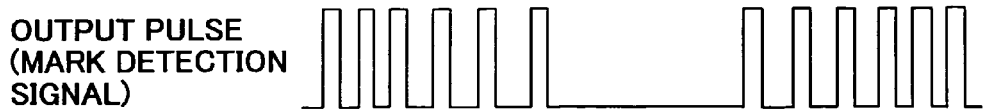
FIG. 93B is a diagram of an output pulse of the surface sensor that is output according to the light receiving level.
Figure 93C:
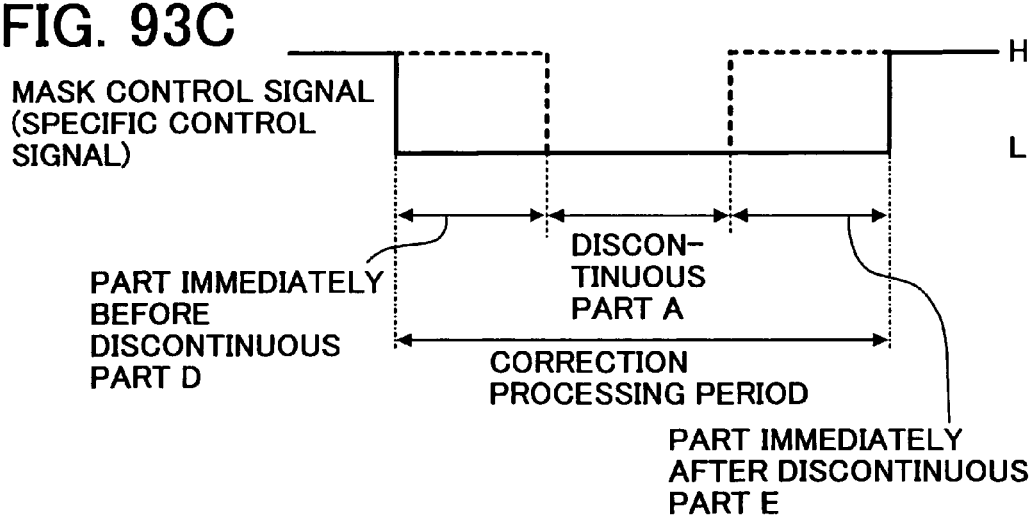
FIG. 93C is a diagram of a mark control signal in a third operation example.

When a stain due to a toner adheres on the linear scale 4108, immediately before and after a discontinuous part, a light receiving level is made unstable as indicated by a broken line in FIG. 93A, and an output pulse is also made unstable as shown in FIG. 93B. Note that FIG. 93C shows a mark control signal (specific control signal), which is an output signal from the signal generating unit, as in the second operation example.

A basic flow of control in a feedback control system in the third operation example is the same as that in the second operation example. The third operation example is different from the second operation example only in a correction processing period to be stored in the storing unit of the signal generating unit. In short, in the third operation example, the correction processing period is set to start at start time of a period D of an unstable signal part due to a spread toner present immediately before a discontinuous part and end at end time of a period E of the unstable signal part due to a spread toner present immediately after the discontinuous part. However, it is difficult to grasp in advance where on the linear scale 4108 and to which degree the stain due to a toner adheres. Therefore, it is impossible to set a correction processing period from the beginning and store the correction processing period in the storing unit of the signal generating unit.

Thus, in the third operation example, as in the case of the second operation example, when it is judged in S4 that a count number is not within a defined range, it is grasped that a stain part is present in the detection area of the surface sensor 4109. Then, a correction processing period, which has a point earlier than the grasped start time (start time of the discontinuous part) by time equivalent to the period D of the unstable signal part as start time and a point advanced by time equivalent to a period E of the unstable signal part from the grasped end time (end time of the discontinuous part) as end time, is stored in the storing unit of the signal generating unit. Consequently, after a stain adheres, drive control taking into account an unstable signal part present immediately before the discontinuous part corresponding to the stain part (drive control using a dummy pulse) cannot be performed when the stain part passes the detection area of the surface sensor 4109 for the first time, but the drive control taking into account the unstable signal part present immediately before the discontinuous part can be performed after that.

Thereafter, when the stain further spreads, the period A of the discontinuous part also becomes longer. Thus, it is desirable to update the correction processing period according to such a change of the period A of the discontinuous part.

Note that, in the third operation example, periods immediate before and after the period A of the discontinuous part are periods coinciding with the periods D and E in which an unstable signal part is present in an output pulse, respectively. However, because of the same reason as described above, the periods may be shorter or longer than the periods D and E.

Next, an example of generation of a mask control signal for determining the correction processing period in the third operation example will be explained. Note that, although the third operation example will be explained in the following explanation, the same holds true for the first operation example and the second operation example.

Figure 94A:
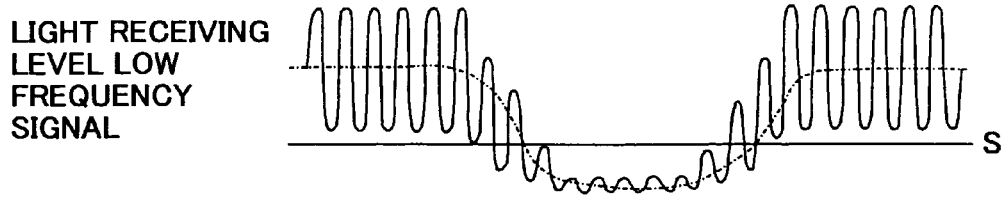
FIG. 94A is an explanatory diagram of an example of generation of a mask control signal.
Figure 94B:
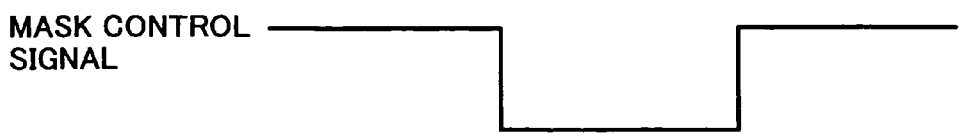
FIG. 94B is an explanatory diagram of an example of generation of a mask control signal.

A light receiving level of the surface sensor 4109 before and after a discontinuous part is as shown in FIGS. 93A and 94A. When a signal of this light receiving level is passed through a low pass filter serving as filtering means, a frequency component equivalent to time intervals of signal parts corresponding to respective marks is removed, and a low frequency signal as indicated by an alternate long and short dash line shown in FIG. 94A is obtained. Then, a signal level of this low frequency signal and a predetermined threshold level (threshold value) S are compared to generate a mask control signal as shown in FIG. 94B. This mask control signal is at an H level if a signal level of the low frequency signal is equal to or higher than the predetermined threshold level S and at an L level if the signal level is lower than the predetermined threshold level S. It is possible to provide a mechanism for generating such a mask control signal in the surface sensor 4109. In that case, the correction processing unit 4154 can perform simple processing of judging whether this mask control signal is at the L level instead of the judgment in S4. In other words, the correction processing unit 4154 only has to perform simple processing of judging whether the mask control signal input from the surface sensor 4109 is at the L level rather than the processing for judging whether a count number is within a defined range as in S4.

Note that, in the explanations of the first to the third operation example, a multiplied pulse obtained by multiplying an output pulse from the surface sensor 4109 to be sixty-four times as large in the multiplying unit 4152 is used as a feedback signal. However, the same effect can be obtained even if the output pulse is not multiplied and used as a feedback signal without providing such a multiplying unit 4152.

In addition, in the explanations of the first to the third operation example, it is judged whether a discontinuous part is present in an output pulse according to whether a pulse number counted every predetermined sampling time is within the usual area a1. However, a method of judging whether a discontinuous part is present in an output pulse is not limited to this.

Figure 95:
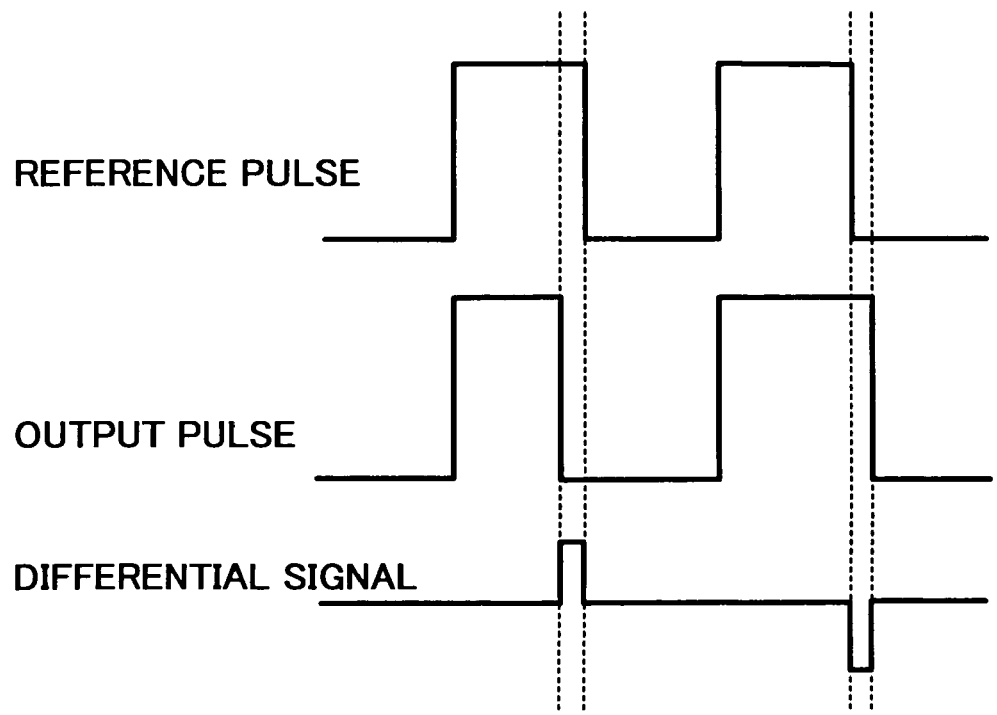
FIG. 95 is an explanatory diagram for explaining another example of a method of judging a discontinuous part.

A differential signal shown in FIG. 95C is calculated from a reference pulse (reference signal) corresponding to target velocity shown in FIG. 95A and an output pulse shown in FIG. 95B. This differential signal indicates how high or how low actual velocity of the rotating body such as the belt 4106 or the drum 4126 is with respect to target velocity. In other words, the differential signal indicates actual velocity of the rotating body by taking into account the target velocity. A period, in which the actual velocity of the rotating body indicated by the differential signal is outside a defined range decided in advance, is judged as a period of a discontinuous part. In the method of judging a discontinuous part adopted in the first to the third operation examples, presence of a discontinuous part in an output pulse cannot be recognized from the time when the discontinuous part starts to be present in the output pulse until the time when time equivalent to a pulse number elapses. On the other, in the above-mentioned other methods, start time and end time of a discontinuous part can be recognized only from one pulse immediately before start and immediate after end of the discontinuous part in an output pulse and a corresponding reference pulse. Therefore, according to the other methods, the start time and the end time of the discontinuous part can be recognized earlier. Consequently, a time lag from the time when the discontinuous part appears in the output pulse until the time when the discontinuous part is recognized is reduced. As a result, drive control using a dummy pulse can be preformed immediately after the discontinuous part starts to be present. Therefore, more stable drive control can be realized.

Note that, in the second operation example and the third operation example, since the drive control using a dummy pulse is started fixed time earlier than the time when the discontinuous part starts to be present, no useful effects is realized in particular even if the time lag is reduced during such drive control However, as described above, in the second operation example and the third operation example, when turn-up at the end or a stain part to be a discontinuous part passes the detection area of the surface sensor 4109 for the first time, the feedback control using a dummy pulse is performed from the time when it is judged that the discontinuous part is present as in the first operation example. Therefore, in the drive control at the time when turn-up at the end or a stain part to be a discontinuous part passes the detection area of the surface sensor 4109 for the first time, the effect of realizing stable drive control by reducing the time lag is useful.

As described above, the drive control device in the thirty-fifth embodiment detects the marks 4108a, which are provided to continue at the predetermined intervals over the endless moving direction of the belt 4106 or the drum 4126 serving as a drive control object member, which moves endlessly, or the drive roller 4101, the driven roller 4104 or 4105, or the driven pulley 4128 serving as an endless moving member endlessly moving following the endless movement of the belt 4106 or the drum 4126, with the surface sensor 4109 serving as mark detecting means. Then, the drive control device feedback-controls driving of the belt 4106 or the drum 4126 using an output pulse that is a mark detection signal obtained by the detection. The drive control device also includes the interface device for detection 4142 serving as feedback control means, which performs feedback control using an alternative signal instead of an output pulse for the discontinuous part A in an output pulse in which intervals of signal parts corresponding to the respective marks are outside the range decided in advance (usual area a1) and at least one of the signal parts B, C, D, and E immediately before and the signal parts B, C, D, and E immediately after the discontinuous part, the microcomputer 4135, the instruction generating device 4139, and the interface for motor drive 4140. With such a structure, as described above, even if the unstable signal parts B, C, D, and E are present in at least one of parts immediately before and immediately after the discontinuous part A, the drive control device can perform the appropriate drive control using a dummy pulse.

In the thirty-fifth embodiment, the feedback control using a dummy pulse is applied to all of the unstable signal parts B, C, D, and E present in at least one of the parts immediately before and immediately after the discontinuous part A. This makes it possible to prevent drive control from being made unstable by the unstable signal parts.

In the first operation example of the thirty-fifth embodiment, the timer serving as specific control signal output means, which outputs a mark control signal serving as a specific control signal in a discontinuous period in which the discontinuous part is present in the output pulse and a fixed period decided in advance immediately after this period. The drive control device performs the feedback control using a dummy pulse while the mark control signal is output. This makes it possible to perform appropriate drive control without performing complicated arithmetic processing even if the unstable signal part is present immediately after the discontinuous part.

In the second operation example of the thirty-fifth embodiment, the signal generating unit serving as specific control signal output means, which outputs a mark control signal serving as a specific control signal in a discontinuous period in which the discontinuous part is present in the output pulse and a fixed period decided in advance immediately before this period. The drive control device performs the feedback control using a dummy pulse while the mark control signal is output. This makes it possible to perform appropriate drive control without performing complicated arithmetic processing even if the unstable signal part is present immediately before the discontinuous part.

In the third operation example of the thirty-fifth embodiment, the signal generating unit serving as specific control signal output means, which outputs a mark control signal serving as a specific control signal in a discontinuous period in which the discontinuous part is present in the output pulse, a fixed period decided in advance immediately after the discontinuous period, and a fixed period decided in advance immediately before the discontinuous period. The drive control device performs the feedback control using a dummy pulse while the mark control signal is output. This makes it possible to perform appropriate drive control without performing complicated arithmetic processing even if the unstable signal parts are present immediately before and immediately after the discontinuous part.

In the second operation example and the third operation example of the thirty-fifth embodiment, the storing unit serving as storing means, which stores start time of the discontinuous part in the output pulse, is provided. An output of a mark control signal is started the fixed period before the start time stored in the storing unit when a discontinuous part appears in an output pulse the next time or after the next time. This makes it possible to perform the drive control using a dummy pulse surely in a period in which a unstable signal part is present immediately before the discontinuous part.

As explained in the second operation example and the third operation example of the thirty-fifth embodiment, the velocity detecting unit, which detects endless moving velocity of the belt 4106 or the drum 4126, the drive roller 4101, the driven roller 4104 or 4105, or the driven pulley 4128, is provided. Drive control is performed according to whether the endless moving velocity detected by this velocity detecting unit is outside a defined range. Consequently, as described above, a time lag from the time when a discontinuous part appears in an output pulse until the time when the discontinuous part is recognized is reduced, and more stable drive control can be realized.

In the thirty-fifth embodiment, start time and end time of the discontinuous period are set at timing when a signal, which is obtained by removing a frequency component equivalent to time intervals of signal parts corresponding to respective marks from the output pulse, changes across the threshold level S that is a predetermined threshold value. Consequently, the start time and the end time of the discontinuous period can be grasped clearly.

In the thirty-fifth embodiment, it is judged whether the discontinuous part is present according to whether the number of signal parts corresponding to marks in the output pulse obtained in predetermined sampling time is smaller than a defined number. The fixed period is set to time equivalent to time integer times as large as the sampling time. As described above, this makes it possible not to provide a clock generating circuit and to realize cost reduction.

In the thirty-fifth embodiment, the drive control device has the interface device for detection 4142 constituting the multiplying unit 4152 serving as multiplying means that generates a multiplied signal obtained by multiplying the output pulse to predetermined times as large. The drive control device performs feedback control using the multiplied signal in periods other than a period in which the feedback control using a dummy pulse is performed. With such a structure, as described above, even if the surface sensor 4109 is a surface sensor with low resolution, there is an effect of improving dummy resolution. In addition, concerning a continuous part in an output pulse or a multiplied pulse, an error range of a position of the belt 4106 or the drum 4126 with respect to a target position can be reduced. As a result, an amount of maximum deviation, which could occur immediately after the period B of the discontinuous part ends, can be reduced. Therefore, rapid velocity variation in the belt 4106 or the drum 4106, which could occur immediately after the period B of the discontinuous part ends, can be controlled. In particular, the PLL circuit serving as a multiplying circuit, which compares phases of a feedbacked multiplied pulse and an output pulse before multiplication and generates a multiplied pulse using a result of the phase comparison, is used. This makes it possible to generate a multiplied pulse with an inexpensive structure.

Figure 96:
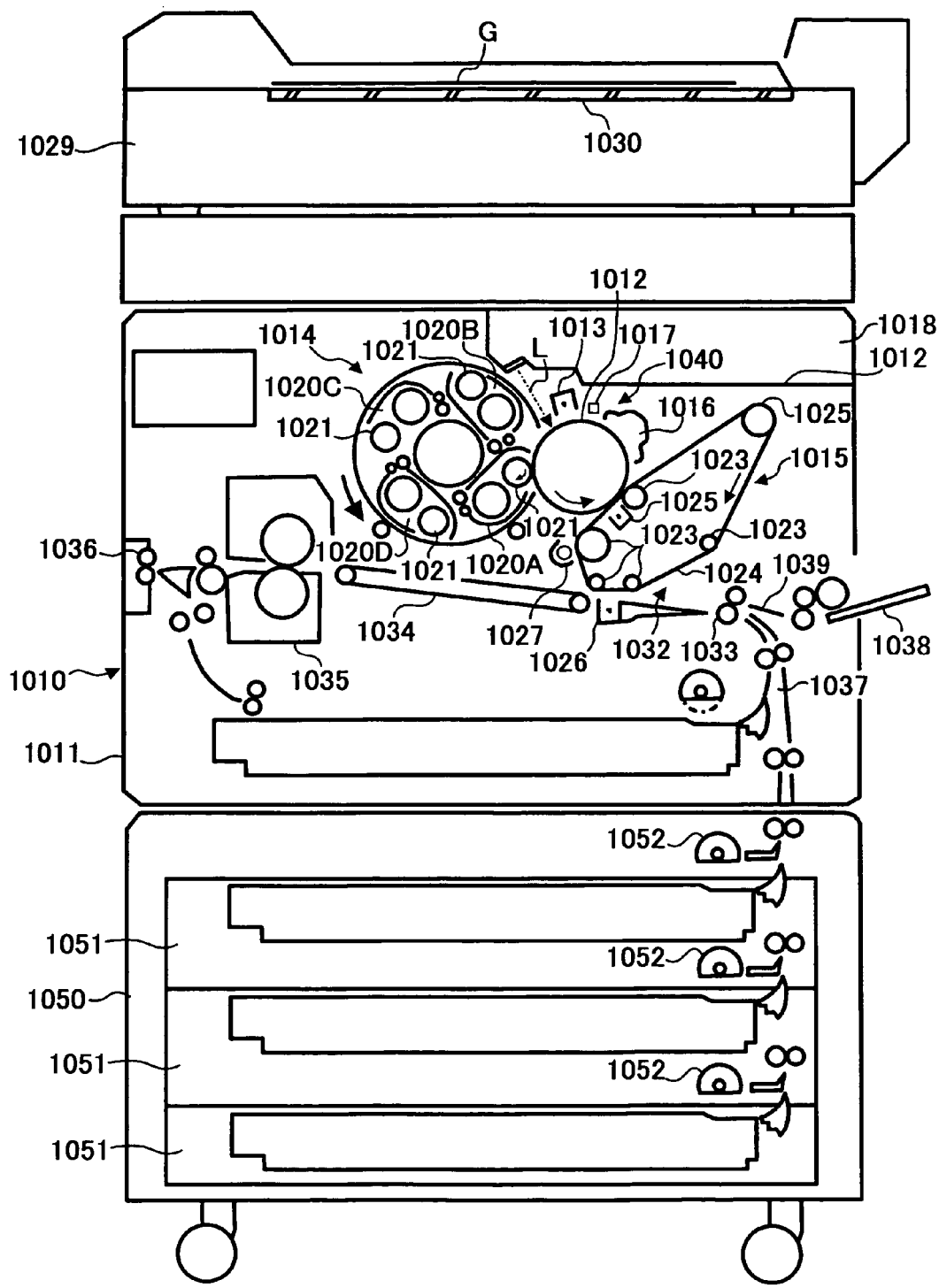
FIG. 96 is a schematic front view of a color copying machine serving as an image forming apparatus according to a thirty-sixth embodiment of the invention.

A thirty-sixth embodiment of the invention will be explained with reference to FIG. 96.

This embodiment is an example of application of the invention to a color copying machine serving as an image forming apparatus. Reference numeral 1010 denotes an apparatus body. The apparatus body 1010 includes a photosensitive drum 1012 serving as an image bearing member in a part slightly to the right in an armor case 1011. Around the photosensitive drum 1012, a rotating type developing device 1014 serving as developing means, an intermediate transfer unit 1015, a cleaning device 1016, a charge eliminating device 1017, and the like are arranged in order in a rotating direction indicated by arrow (counterclockwise) from a charging device 1014 set above the photosensitive drum 1012.

Above these charging device 1013, the rotating type developing device 1014, the cleaning device 1016, and the charge eliminating device 1017, an optical writing device serving as exposing means, for example, a laser writing device 1018 is set. The rotating type developing device 1014 includes developing devices 1020A, 1020B, 1020C, and 1020D having developing rollers 1021, in which toners of colors yellow, magenta, cyan, and black are contained, respectively. The rotating type developing device 1014 rotates around an axis thereof to selectively move the developing devices 1020A, 1020B, 1020C, and 1020D of the respective colors to developing positions opposed to an outer periphery of the photosensitive drum 1012.

In the intermediate transfer unit 1015, an endless intermediate transfer member serving as an image bearing member, for example, an intermediate transfer belt 1024 is laid over plural rollers 1023. This intermediate transfer belt 1024 is brought into abutment against the photosensitive drum 1012. A transfer device 1025 is set on an inner side of the intermediate transfer belt 1024, and a transfer device 1026 and a cleaning device 1027 are set on an outer side of the intermediate transfer belt 1024. The cleaning device 1027 is provided to be capable of approaching and separating from the intermediate transfer belt 1024 freely.

Image signals of the respective colors are input to the laser writing device 1018 from the image reading apparatus 1029 via a not-shown image processing unit. The laser writing device 1018 irradiates laser beams L, which are sequentially modulated by the image signals of the respective colors, on the photosensitive drum 1012 in a uniformly charged state and exposes the photosensitive drum 1012 to light to thereby form electrostatic latent images on the photosensitive drum 1012.

The image reading apparatus 1029 subjects an image of an original G set on an original stand 1030, which is provided on an upper surface of the apparatus body 1010, to color separation to read and convert the image into electric image signals. A recording medium conveying path 1032 conveys a recording medium like a sheet from the right to the left. In the recording medium conveying path 1032, a registration roller pair 1033 is set before the intermediate transfer unit 1015 and the transfer device 1026, and a conveying belt 1034, a fixing device 1035, and a sheet discharging roller pair 1036 are arranged further on a downstream side than the intermediate transfer unit 1015 and the transfer device 1026.

The apparatus body 1010 is mounted on a sheet feeding device 1050. Plural sheet feeding cassettes 1051 are provided in multiple stages in the sheet feeding device 1050. One of sheet feeding rollers 1052 is selectively driven to deliver a recording medium from one of the sheet feeding cassettes 1051. This recording medium is conveyed to the recording medium conveying path 1032 through an automatic sheet feeding path 1037 in the apparatus body 1010.

A hand-supply tray 1038 is provided to be capable of opening and closing freely on the right side of the apparatus body 1010. A recording medium inserted from the hand-supply tray 1038 is conveyed to the recording medium conveying path 1032 through a hand-supply sheet feeding path 1039 in the apparatus body 1010. A not-shown sheet discharge tray is detachably attached on the left side of the apparatus body 1010. A recording medium discharged by the sheet discharging roller pair 1036 is housed in the sheet discharge tray through the recording medium conveying path 1032.

In this color copying machine, when a user makes a color copy of an original G, the user sets the original G on the original stand 1030 and presses a not-shown start switch. Then, a copying operation is started. First, the image reading apparatus 1029 subjects an image of the original G on the original stand 1030 to color separation to read the image.

At the same time, a recording medium is selectively delivered by the sheet feeding roller 1052 from the sheet feeding cassette 1051 in the sheet feeding device 1050. This recording medium collides with the registration roller pair 1033 through the recording medium conveying path 1032 and stops.

The photosensitive drum 1012 rotates counterclockwise, and the intermediate transfer belt 1024 rotates clockwise according to rotation of a drive roller of the rollers 1023. The photosensitive drum 1012 is charged uniformly by the charging device 1013 according to the rotation. A laser beam modulated by an image signal of a first color, which is given to the laser writing device 1018 via the image processing unit from the image reading apparatus 1029, is irradiated on the photosensitive drum 1012 from the laser writing device 1018 to form an electrostatic latent image on the photosensitive drum 1012.

The electrostatic latent image on the photosensitive drum 1012 is developed by a developing device 1020A of the first color of the rotating type developing device 1014 to be changed to an image of the first color. The image of the first color on the photosensitive drum 1012 is transferred onto the intermediate transfer belt 1024 by the transfer device 1025. The photosensitive drum 1012 is cleaned by the cleaning device 1016 after the transfer of the image of the first color to have a residual toner removed and is subjected to charge elimination by the charge eliminating device 1017.

Subsequently, the photosensitive drum 1012 is uniformly charged by the charging device 1013. A laser beam modulated by an image signal of a second color, which is given to the laser writing device 1018 via the image processing unit from the image reading apparatus 1029, is irradiated on the photosensitive drum 1012 from the laser writing device 1018 to form an electrostatic latent image on the photosensitive drum 1012. The electrostatic latent image on the photosensitive drum 1012 is developed by a developing device 1020B of the second color of the rotating type developing device 1014 to be changed to an image of the second color. The image of the second color on the photosensitive drum 1012 is transferred onto the intermediate transfer belt 1024 by the transfer device 1025 to be superimposed on the image of the first color. The photosensitive drum 1012 is cleaned by the cleaning device 1016 after the transfer of the image of the second color to have a residual toner removed and is subjected to charge elimination by the charge eliminating device 1017.

Next, the photosensitive drum 1012 is uniformly charged by the charging device 1013. A laser beam modulated by an image signal of a third color, which is given to the laser writing device 1018 via the image processing unit from the image reading apparatus 1029, is irradiated on the photosensitive drum 1012 from the laser writing device 1018 to form an electrostatic latent image on the photosensitive drum 1012. The electrostatic latent image on the photosensitive drum 1012 is developed by a developing device 1020C of the third color of the rotating type developing device 1014 to be changed to an image of the third color. The image of the third color on the photosensitive drum 1012 is transferred onto the intermediate transfer belt 1024 by the transfer device 1025 to be superimposed on the images of the first color and the second color. The photosensitive drum 1012 is cleaned by the cleaning device 1016 after the transfer of the image of the third color to have a residual toner removed and is subjected to charge elimination by the charge eliminating device 1017.

Moreover, the photosensitive drum 1012 is uniformly charged by the charging device 1013. A laser beam modulated by an image signal of a fourth color, which is given to the laser writing device 1018 via the image processing unit from the image reading apparatus 1029, is irradiated on the photosensitive drum 1012 from the laser writing device 1018 to form an electrostatic latent image on the photosensitive drum 1012. The electrostatic latent image on the photosensitive drum 1012 is developed by a developing device 1020D of the fourth color of the rotating type developing device 1014 to be changed to an image of the fourth color. The image of the fourth color on the photosensitive drum 1012 is transferred onto the intermediate transfer belt 1024 by the transfer device 1025 to be superimposed on the images of the first color, the second color, and the third color to form a full color image.

The photosensitive drum 1012 is cleaned by the cleaning device 1016 after the transfer of the image of the fourth color to have a residual toner removed and is subjected to charge elimination by the charge eliminating device 1017.

Then, the registration roller pair 1033 rotates in timing to deliver a recording medium. The full color image on the intermediate transfer belt 1024 is transferred onto this recording medium by the transfer device 1026. The full color image is conveyed by the conveying belt 1034 to have the full color image fixed thereon by the fixing device 1035 and is discharged to the sheet discharge tray by the sheet discharging roller pair 1036. In addition, the intermediate transfer belt 1024 is cleaned by the cleaning device 1027 after the transfer of the full color image to have a residual toner removed.

The above explanation is about an operation for forming four-color image. When a three-color image is formed, three single color images are sequentially formed on the photosensitive drum 1012, transferred onto the intermediate transfer belt 1024 to be superimposed one on top of another, and then collectively transferred onto a recording medium. When a two-color image is formed, two single color images are sequentially formed on the photosensitive drum 1012, transferred onto the intermediate transfer belt 1024 to be superimposed one on top of the other, and then collectively transferred onto a recording medium.

In such a color copying machine, driving accuracy of the photosensitive drum 1012, the intermediate transfer belt 1024, and the conveying belt 1034, which serve as image bearing members, significantly affects a quality of a final image. Thus, more highly accurate driving for these members is desired.

Thus, in this embodiment, driving for the photosensitive drum 1012 is performed by the drive apparatuses described in the first embodiment to the thirty-fifth embodiment (e.g., the drive apparatus shown in FIG. 38) and driving for the intermediate transfer belt 1024 and the conveying belt 1034 is performed by the drive apparatuses described in the first embodiment to the thirty-fifty embodiment (e.g., the drive apparatus shown in FIG. 39) based on the above-mentioned method of controlling a position of a rotating body.

Therefore, accuracy of driving of the image bearing members is improved, and a high quality image can be obtained.

Figure 97:
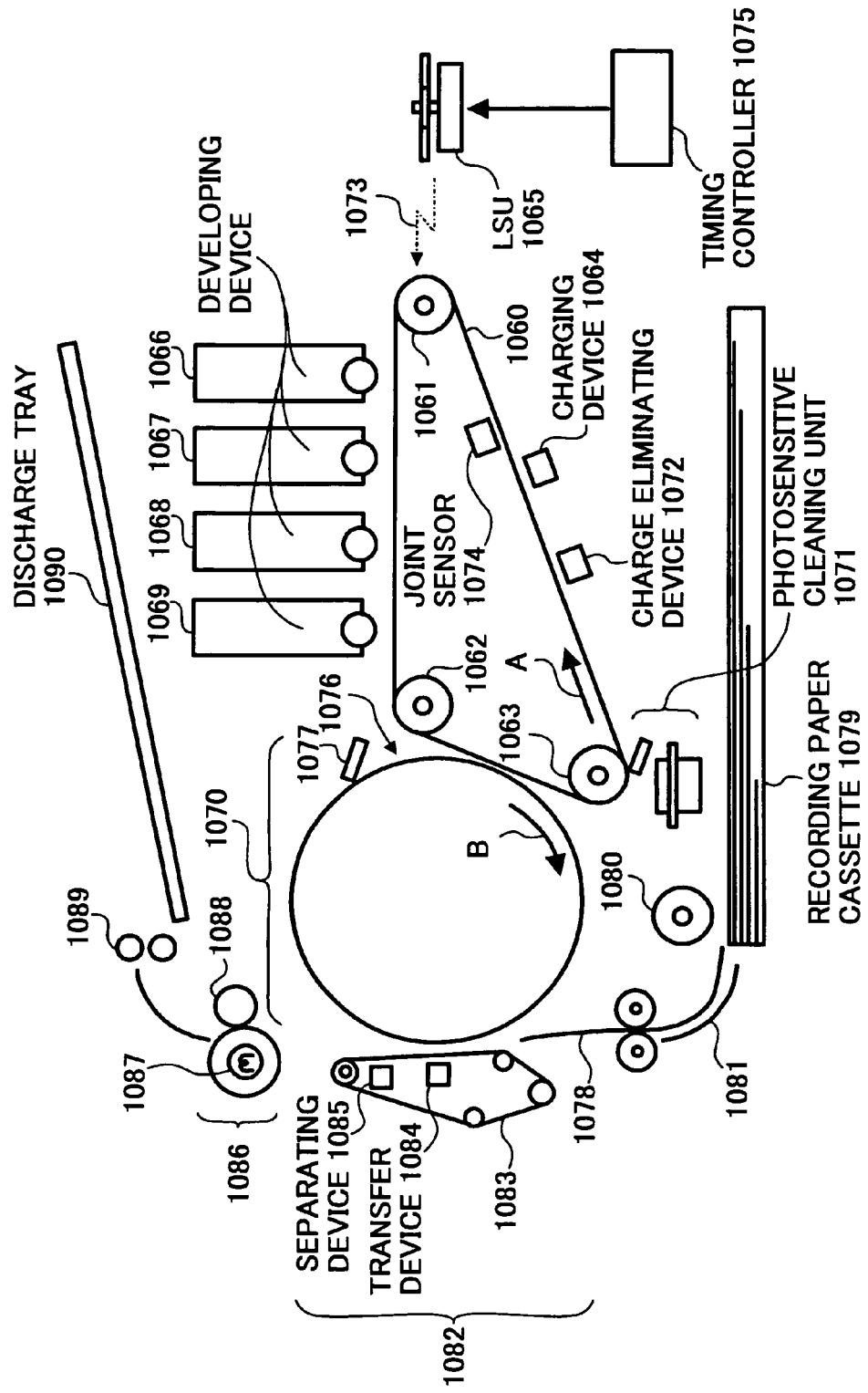
FIG. 97 is a schematic front view of a color copying machine serving as an image forming apparatus according to a thirty-seventh embodiment of the invention.

A thirty-seventh embodiment of the invention will be explained with reference to FIG. 97.

In a color copying machine serving as an image forming apparatus in this embodiment, a photosensitive member 1060 serving as an image bearing member is a photosensitive belt in which a photosensitive layer of an organic photoconductor (OPC) or the like is formed in a thin film shape on an outer peripheral surface of a belt base material of nickel (Ni) formed in a closed loop shape. This photosensitive member 1060 is supported by three photosensitive conveying rollers 1061 to 1063 and rotated in a direction of arrow A by a drive motor (not shown).

Around the photosensitive member 1060, a charging device 1064, an exposure optical system (hereinafter referred to as LSU) 1065 serving as exposing means, developing devices 1066 to 1069 of colors black, yellow, magenta, and cyan, an intermediate transfer unit 1070, a photosensitive cleaning unit 1071, and a charge eliminating device 1072 are provided in order in a rotating direction of the photosensitive member 1060 indicated by arrow A.

A high voltage of about −4 to 5 kilovolts is applied to the charging device 1064 from a not-shown power supply device. The charging device 1064 charges a part of the photosensitive member 1060 opposed to the charging device 1064 to give a uniform charging potential to the part.

The LSU 1065 sequentially subjects image signals of the respective colors from a gradation converting unit (not shown) to light intensity modulation and pulse width modulation with a laser driving circuit (not shown) and drives a semiconductor laser (not shown) with a signal of the modulation to thereby obtain an exposure beam 1073. Then, the LSU 1065 scans the photosensitive member 1060 with this exposure beam 1073 to sequentially form electrostatic latent images corresponding to the image signals of the respective colors on the photosensitive member 1060.

A joint sensor 1074 detects a joint of the photosensitive member 1060 formed in a loop shape. When the joint sensor 1074 detects the joint of the photosensitive member 1060, the timing controller 1075 controls light emitting timing of the LSU 1065 such that the joint of the photosensitive member 1060 is avoided and positions, where the electrostatic latent images of the respective colors are formed, are made identical.

The respective developing devices 1066 to 1069 contain toners corresponding to respective developing colors. The developing devices 1066 to 1069 come into abutment against the photosensitive member 1060 selectively at timing according to electrostatic latent images corresponding to image signals of the respective colors on the photosensitive member 1060, develop the electrostatic latent images on the photosensitive member 1060 with the toners, and change the electrostatic latent images to image of the respective colors to thereby form a full color image consisting of a four-color image.

The intermediate transfer unit 1070 includes a transfer drum 1076 serving as an intermediate transfer member, which is obtained by wrapping a belt-like sheet made of conductive resin or the like around a pipe of metal like aluminum, and an intermediate transfer member cleaning unit 1077 obtained by forming rubber or the like in a blade shape. The intermediate transfer member cleaning unit 1077 is separated from the intermediate transfer member 1076 while a four-color image is being formed on the intermediate transfer member 1076.

Only in cleaning the intermediate transfer member 1076, the intermediate transfer member cleaning unit 1077 comes into abutment against the intermediate transfer member 1076 to remove a toner, which remains without being transferred onto recording paper 1078 serving as a recording medium, from the intermediate transfer member 1076. The recording paper 1078 is delivered to a sheet conveying path 1081 one by one from a recording paper cassette 1079 by a sheet feeding roller 1080.

A transfer unit 1082 serving as transfer means transfers a full color image on the intermediate transfer member 1076 onto the recording paper 1078. The transfer unit 1082 includes a transfer belt 1083 that is obtained by forming conductive rubber or the like in a belt shape, a transfer device 1084 that applies a transfer bias for transferring the full color image on the intermediate transfer member 1076 onto the recording paper 1078 to the intermediate transfer member 1076, and a separating device 1085 that applies a bias to the intermediate transfer member 1076 to prevent the recording paper 1078 from sticking to the intermediate transfer member 1076 electrostatically after the full color image is transferred onto the recording paper 1078.

The fixing device 1086 includes a heat roller 1087 having a heat source in the inside thereof and a pressure roller 1088. The fixing device 1086 applies pressure and heat to the recording paper 1078 according to recording paper nipping rotation of the heat roller 1087 and the pressure roller 1088 and fixes the full color image on the recording paper 1078 to form a full color image.

An operation of the color copying machine constituted as described above will be hereinafter explained. In the explanation, it is assumed that development of electrostatic latent images is performed in an order of black, cyan, magenta, and yellow.

The photosensitive member 1060 and the intermediate transfer member 1076 are driven in directions of arrows A and B by drive sources (not show), respectively. In this state, first, a high voltage of about −4 to 5 kilovolts is applied to the charging device 1064 from a power supply device (not shown), and the charging device 1064 charges the surface of the photosensitive member 1060 to about −700 volts uniformly.

Next, when the joint sensor 1074 detects the joint of the photosensitive member 1060, the LSU 1065 irradiates the exposure beam 1073 of a laser beam corresponding to an image signal of black on the photosensitive member 1060 when fixed time elapses after the detection to avoid the joint of the photosensitive member 1060. A charge in a part of the photosensitive member 1060, on which the exposure beam 1073 is irradiated, is eliminated, and an electrostatic latent image is formed on the photosensitive member 1060.

On the other hand, the black developing device 1066 is brought into abutment against the photosensitive member 1060 at predetermined timing. A negative charge is given to a black toner in the black developing device 1066 in advance. The black toner adheres to only a part of the photosensitive member 1060 where a charge is eliminated by irradiation of the exposure beam 1073 (electrostatic latent image part), and development by a so-called negative positive process is performed.

The black toner image formed on the surface of the photosensitive member 1060 by the black developing device 1066 is transferred onto the intermediate transfer member 1076. A residual toner, which has not been transferred onto the intermediate transfer member 1076 from the photosensitive member 1060, is removed by the photosensitive member cleaning unit 1071, and the charge on the photosensitive member 1060 is eliminated by the charge eliminating device 1072.

Next, the charging device 1064 charges the surface of the photosensitive member 1060 to about −700 volts uniformly. Then, when the joint sensor 1074 detects the joint of the photosensitive member 1060, the LSU 1065 irradiates the exposure beam 1073 of a laser beam corresponding to an image signal of cyan on the photosensitive member 1060 when fixed time elapses after the detection to avoid the joint of the photosensitive member 1060. A charge in a part of the photosensitive member 1060, on which the exposure beam 1073 is irradiated, is eliminated, and an electrostatic latent image is formed on the photosensitive member 1060.

On the other hand, the cyan developing device 1067 is brought into abutment against the photosensitive member 1060 at predetermined timing. A negative charge is given to a cyan toner in the cyan developing device 1067 in advance. The cyan toner adheres to only a part of the photosensitive member 1060 where a charge is eliminated by irradiation of the exposure beam 1073 (electrostatic latent image part), and development by the so-called negative positive process is performed.

The cyan toner image formed on the surface of the photosensitive member 1060 by the cyan developing device 1067 is transferred onto the intermediate transfer member 1076 to be superimposed on the black toner image. A residual toner, which has not been transferred onto the intermediate transfer member 1076 from the photosensitive member 1060, is removed by the photosensitive member cleaning unit 1071, and the charge on the photosensitive member 1060 is removed by the charge eliminating device 1072.

Next, the charging device 1064 charges the surface of the photosensitive member 1060 to about −700 volts uniformly. Then, when the joint sensor 1074 detects the joint of the photosensitive member 1060, the LSU 1065 irradiates the exposure beam 1073 of a laser beam corresponding to an image signal of magenta on the photosensitive member 1060 when fixed time elapses after the detection to avoid the joint of the photosensitive member 1060. A charge in a part of the photosensitive member 1060, on which the exposure beam 1073 is irradiated, is eliminated, and an electrostatic latent image is formed on the photosensitive member 1060.

On the other hand, the magenta developing device 1068 is brought into abutment against the photosensitive member 1060 at predetermined timing. A negative charge is given to a magenta toner in the magenta developing device 1068 in advance. The magenta toner adheres to only a part of the photosensitive member 1060 where a charge is eliminated by irradiation of the exposure beam 1073 (electrostatic latent image part), and development by the so-called negative positive process is performed.

The magenta toner image formed on the surface of the photosensitive member 1060 by the magenta developing device 1068 is transferred onto the intermediate transfer member 1076 to be superimposed on the black toner image and the cyan toner image. A residual toner, which has not been transferred onto the intermediate transfer member 1076 from the photosensitive member 1060, is removed by the photosensitive member cleaning unit 1071, and the charge on the photosensitive member 1060 is eliminated by the charge eliminating device 1072.

Moreover, the charging device 1064 charges the surface of the photosensitive member 1060 to about −700 volts uniformly. Then, when the joint sensor 1074 detects the joint of the photosensitive member 1060, the LSU 1065 irradiates the exposure beam 1073 of a laser beam corresponding to an image signal of yellow on the photosensitive member 1060 when fixed time elapses after the detection to avoid the joint of the photosensitive member 1060. A charge in a part of the photosensitive member 1060, on which the exposure beam 1073 is irradiated, is eliminated, and an electrostatic latent image is formed on the photosensitive member 1060.

On the other hand, the yellow developing device 1069 is brought into abutment against the photosensitive member 1060 at predetermined timing. A negative charge is given to a yellow toner in the yellow developing device 1069 in advance. The yellow toner adheres to only a part of the photosensitive member 1060 where a charge is eliminated by irradiation of the exposure beam 1073 (electrostatic latent image part), and development by the so-called negative positive process is performed.

The yellow toner image formed on the surface of the photosensitive member 1060 by the yellow developing device 1069 is transferred onto the intermediate transfer member 1076 to be superimposed on the black toner image, the cyan toner image, and the magenta toner image, and a full color image is formed on the intermediate transfer member 1076. A residual toner, which has not been transferred onto the intermediate transfer member 1076 from the photosensitive member 1060, is removed by the photosensitive member cleaning unit 1071, and the charge on the photosensitive member 1060 is eliminated by the charge eliminating device 1072.

The transfer belt 1083, which has been separated from the intermediate transfer member 1076, comes into contact with the intermediate transfer member 1076, and a high voltage of about +1 kilovolt is applied to the transfer device 1084 from the power supply device (not shown), whereby the full color image formed on the intermediate transfer member 1076 is collectively transferred onto the recording paper 1078, which is conveyed along the sheet conveying path 1081 from the recording paper cassette 1079, by the transfer device 1084.

A voltage is applied to the separating device 1085 from the power supply device such that an electrostatic force for attracting the recording paper 1078 acts, and the recording paper 1078 is separated from the intermediate transfer member 1076. Subsequently the recording paper 1078 is sent to the fixing device 1086. In the fixing device 1086, the full color image is fixed on the recording paper 1078 by a nipping pressure of the heat roller 1087 and the pressure roller 1088 and heat of the heat roller 1088. The recording paper 1078 is discharged to the discharge tray 1090 by the sheet discharging roller pair 1089.

A residual toner on the intermediate transfer member 1076, which has not been transferred onto the recording paper 1078 by the transfer unit 1082, is removed by the intermediate transfer member cleaning unit 1077. The intermediate transfer member cleaning unit 1077 is in a position separated from the intermediate transfer member 1076 until the full color image is obtained. After the full color image is transferred onto the recording paper 1078, the intermediate transfer member cleaning unit 1077 comes into contact with the intermediate transfer member 1076 to remove the residual toner on the intermediate transfer member 1076. The formation of a full color image for one sheet ends according to the series of operations.

In such a color copying machine, driving accuracy of the photosensitive belt 1060, the transfer drum 1076, and the transfer belt 1083 significantly affects a quality of a final image. In particular, more highly accurate driving for the photosensitive belt 106 and the transfer belt 1083 is desired.

Thus, in this embodiment, driving for the photosensitive belt 1060 and the transfer belt 1083 is performed by the drive apparatuses described in the first embodiment to the thirty-fifth embodiment (e.g., the drive apparatus shown in FIG. 38) and driving for the transfer drum 1076 is performed by the drive apparatuses described in the first embodiment to the thirty-fifty embodiment (e.g., the drive apparatus shown in FIG. 39) based on the above-mentioned method of controlling a position of a rotating body.

Therefore, accuracy of driving of the image bearing members is improved, highly accurate sheet conveying drive can be performed, and a high quality image can be obtained.

Figure 98:
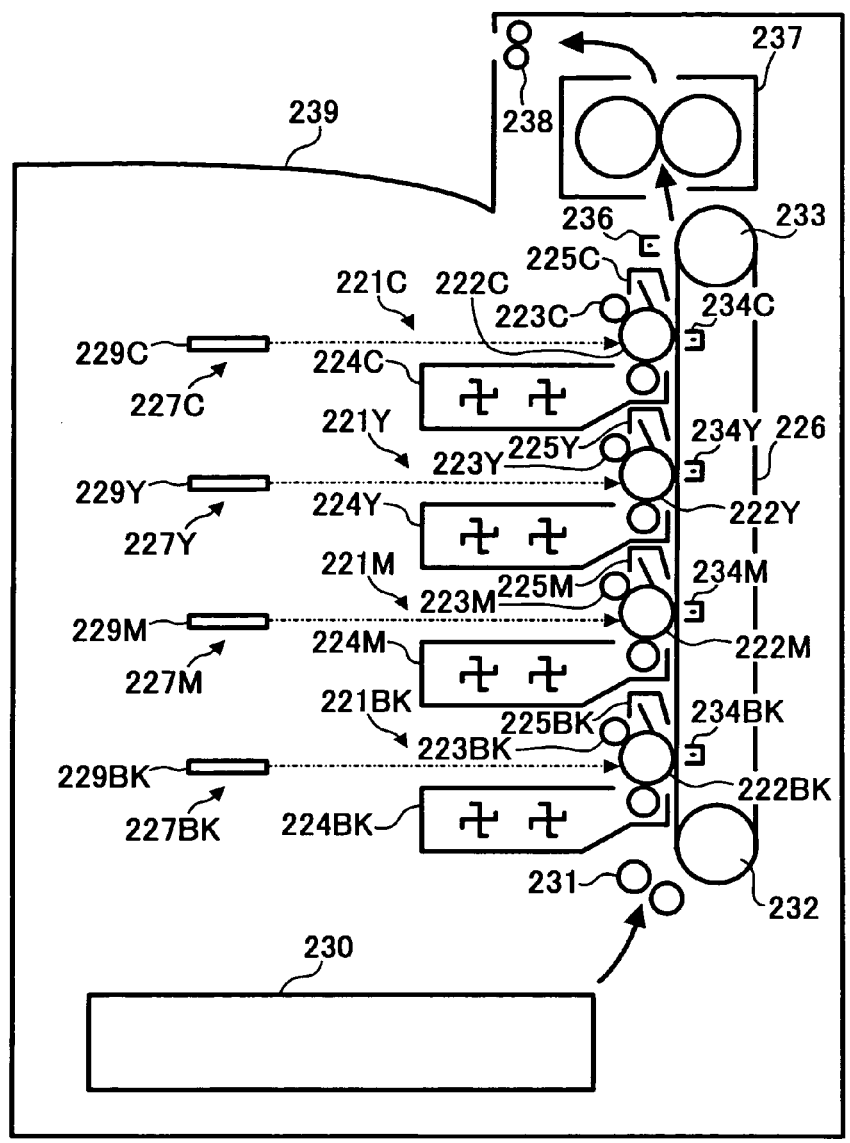
FIG. 98 is a schematic front view of a color copying machine serving as an image forming apparatus according to a thirty-eighth embodiment of the invention.

A thirty-eighth embodiment of the invention will be explained with reference to FIG. 98.

This embodiment describes an example of application of the invention to an image forming apparatus of a tandem system. In this embodiment, plural image forming units 221Bk, 221M, 221Y, and 221C, which form images of plural colors, for example, black (hereinafter referred to as Bk), magenta (hereinafter referred to as M), yellow (hereinafter referred to as Y), and cyan (hereinafter referred to as C), respectively, are arranged in the vertical direction. The image forming units 221Bk, 221M, 221Y, and 221C include image bearing members 222Bk, 222M, 222Y, and 222C consisting of a photosensitive member of a drum shape, respectively, charging devices (e.g., contact charging devices) 223Bk, 223M, 223Y, and 223C, developing devices 224Bk, 224M, 224Y, and 224C, cleaning devices 225Bk, 225M, 225Y, and 225C, and the like.

The photosensitive members 222Bk, 222M, 222Y, and 222C are arranged in the vertical direction to be opposed to an endless direct transfer belt (conveying transfer belt) 226 and are driven to rotate at the same peripheral velocity as the direct transfer belt 226. The photosensitive members 222Bk, 222M, 222Y, and 222C are uniformly charged by the charging devices 223Bk, 223M, 223Y, and 223C, respectively, and then exposed to light by exposing units 227Bk, 227M, 227Y, and 227C consisting of optical writing devices, whereby electrostatic latent images are formed thereon.

The optical writing devices 227Bk, 227M, 227Y, and 227C drive a semiconductor laser with a semiconductor laser drive circuit according to image signals of the respective colors Y, M, C, and Bk and deflect laser beams from the semiconductor laser with polygon mirrors 229Bk, 229M, 229Y, and 229C to use the laser beams for scanning. Then, the optical writing devices 227Bk, 227M, 227Y, and 227C focus the respective laser beams from the polygon mirrors 229Bk, 229M, 229Y, and 229C on the photosensitive members 222Bk, 222M, 222Y, and 222C via not-shown fθ lenses and mirrors to thereby expose the photosensitive members 222Bk, 222M, 222Y, and 222C to light to form electrostatic latent images.

The electrostatic latent images on the photosensitive members 222Bk, 222M, 222Y, and 222C are developed by the developing devices 224Bk, 224M, 224Y, and 224C, respectively, to be changed to toner images of the respective colors Bk, M, Y, and C. Therefore, the charging devices 223Bk, 223M, 223Y, and 223C, the optical writing devices 227Bk, 227M, 227Y, and 227C, and the developing devices 224Bk, 224M, 224Y, and 224C constitute an image forming unit that forms images (toner images) of the respective colors Bk, M, Y, and C on the photosensitive members 222Bk, 222M, 222Y, and 222C.

On the other hand, transfer paper like plain paper or an OHP sheet is fed to a registration roller 10231 along a transfer paper conveying path from a sheet feeding device 230, which is constituted by using sheet feed cassettes, set in a lower part of the image forming apparatus in this embodiment. The registration roller 10231 delivers the transfer paper to a transfer nip portion of the direct transfer belt 226 and the photosensitive member 222Bk in timing with the toner image on the photosensitive member 222Bk in the image forming unit of a first color (image forming unit that transfers an image on a photosensitive member to transfer paper first) 221Bk.

The direct transfer belt 226 is laid over a drive roller 10232 and a driven roller 10233 arranged in the vertical direction. The drive roller 10232 is driven to rotate by a not-shown drive unit, and the direct transfer belt 226 rotates at the same peripheral velocity as the photosensitive members 222Bk, 222M, 222Y, and 222C. The transfer paper delivered from the registration roller 10231 is conveyed by the direct transfer belt 226. The toner images of the respective colors Bk, M, Y, and C on the photosensitive members 222Bk, 222M, 222Y, and 222C are sequentially transferred onto the transfer paper by an action of an electric field formed by transfer units 234Bk, 234M, 234Y, and 234C consisting of corona chargers. Consequently, a full color image is formed on the transfer paper and, at the same time, the transfer paper is electrostatically attracted by the direct transfer belt 226 and conveyed surely.

The transfer paper is subjected to charge elimination by a separating unit 236 consisting of a separating charger and separated from the direct transfer belt 226. Then, the full color image is fixed on the transfer paper by the fixing device 237, and the transfer paper is discharged to a sheet discharging unit 239 provided in an upper part of the image forming apparatus in this embodiment. In addition, the photosensitive members 222Bk, 222M, 222Y, and 222C are cleaned by the cleaning devices 225Bk, 225M, 225Y, and 225C after the transfer of the toner images and prepare for the next image forming operation.

In such a color copying machine, driving accuracy of the direct transfer belt 226 significantly affects a quality of a final image. Therefore, more highly accurate driving for the direct transfer belt 226 is desired.

Thus, in this embodiment, driving for the direct transfer belt 226 is performed by the drive apparatuses described in the first embodiment to the thirty-fifth embodiment (e.g., the drive apparatus shown in FIG. 38) based on the above-mentioned method of controlling a position of a rotating body.

Therefore, accuracy of driving of the image bearing members is improved, highly accurate sheet conveying drive can be performed, and a high quality image can be obtained.

Figure 99:
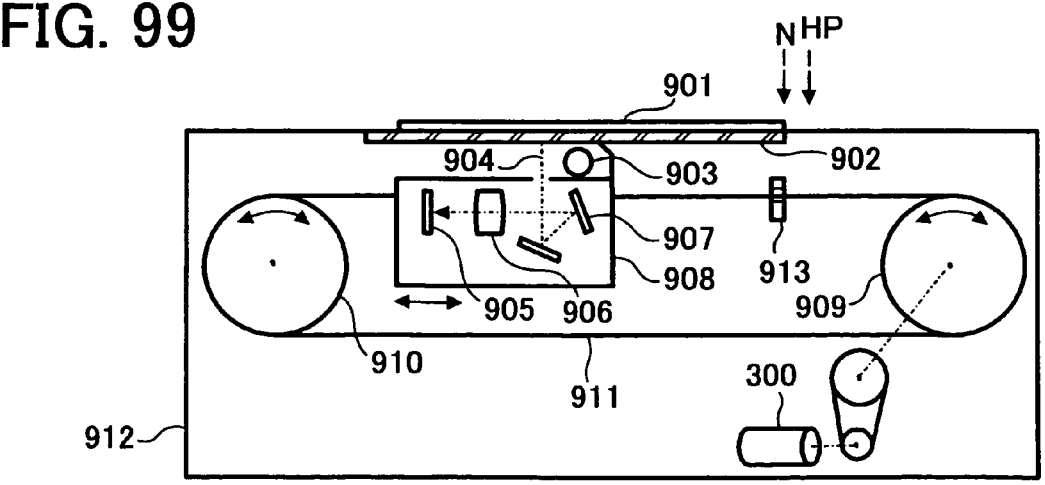
FIG. 99 is a schematic front view of an image reading apparatus according to a thirty-ninth embodiment of the invention.

A thirty-ninth embodiment of the invention will be explained with reference to FIG. 99.

This embodiment describes an example of application of the invention to a traveling body drive device of an image reading apparatus. In an image reading apparatus shown in FIG. 96, reference numeral 901 denotes an original to be read; 902, an original stand on which the original 901 is mounted;

903, an original lighting system that irradiates light on the original 901; 904, an optical axis of reflected light; 905, an element for reading, for example, a charge coupled device (CCD); 906, a focusing lens; and 907, a total reflection mirror.

Reference numeral 908 denotes a photoelectric conversion unit consisting of the CCD 905, the lens 906, the mirror 907, and the like; 909 and 910, pulleys for sub-scanning drive; 911, a wire; 300, a driving motor; and 912, a housing for an image scanner. In the photoelectric conversion unit 908 for reading an original, the driving motor 300 is fixed to the housing 912 to drive the photoelectric conversion unit 908 in a sub-scanning direction of the original 901 using means for transmitting a driving force of the motor such as the wire 911 and the pulleys 909 and 910.

In this case, the lighting system for reading 903 like a fluorescent tube lights the original 901 on the original stand 902, and plural mirrors 7 return a reflected light beam (an optical axis there of is denoted by 904) to focus an image of the original 901 in a light receiving unit of an image sensor such as the CCD 905. Then, the photoelectric conversion unit 908 scans the entire surface of the original 901 to read the entire original.

A sensor 913, which indicates a reading start position, is set below the end of the original 901. The photoelectric conversion unit 908 is designed to rise between a home position HP and a reading start position N to come into a steady state of uniform velocity and start reading after reaching the HP point.

In this embodiment, driving for the photoelectric conversion unit 908 is performed by the drive apparatuses described in the first embodiment to the thirty-fifth embodiment (e.g., the drive apparatus shown in FIG. 38) based on the above-mentioned method of controlling a position of a rotating body.

Therefore, accuracy of driving for the image reading apparatus is improved, highly accurate sheet conveying drive can be performed, and a high quality image can be obtained.

A fortieth embodiment of the invention will be explained with reference to FIG. 100.

Figure 100:
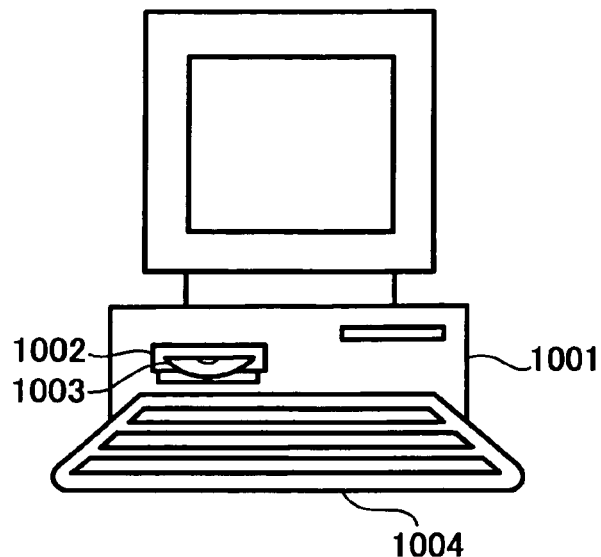
FIG. 100 is a schematic front view of a computer in which a CD-ROM serving as a recording medium according to a fortieth embodiment of the invention is usable.

FIG. 100 shows a personal computer that is an example of a computer used for executing the method of controlling a position of a rotating body.

Program for causing a personal computer 1001 to execute control operations are stored in a CD-ROM 1003 serving as a recording medium. The personal computer 1001 can execute the control method by executing the programs stored in the CD-ROM 1003.

As such programs, specifically, there are a control program for driving to rotate a rotating body with a computer, a control program for controlling a photosensitive drum drive device of an image forming apparatus with a computer, a control program for controlling a transfer drum drive device of an image forming apparatus with a computer, a control program for controlling a traveling body drive device of an image reading apparatus with a computer, and the like. In FIG. 100, reference numeral 1002 denotes a disk drive, and 1004 denotes a keyboard.

Figure 101:
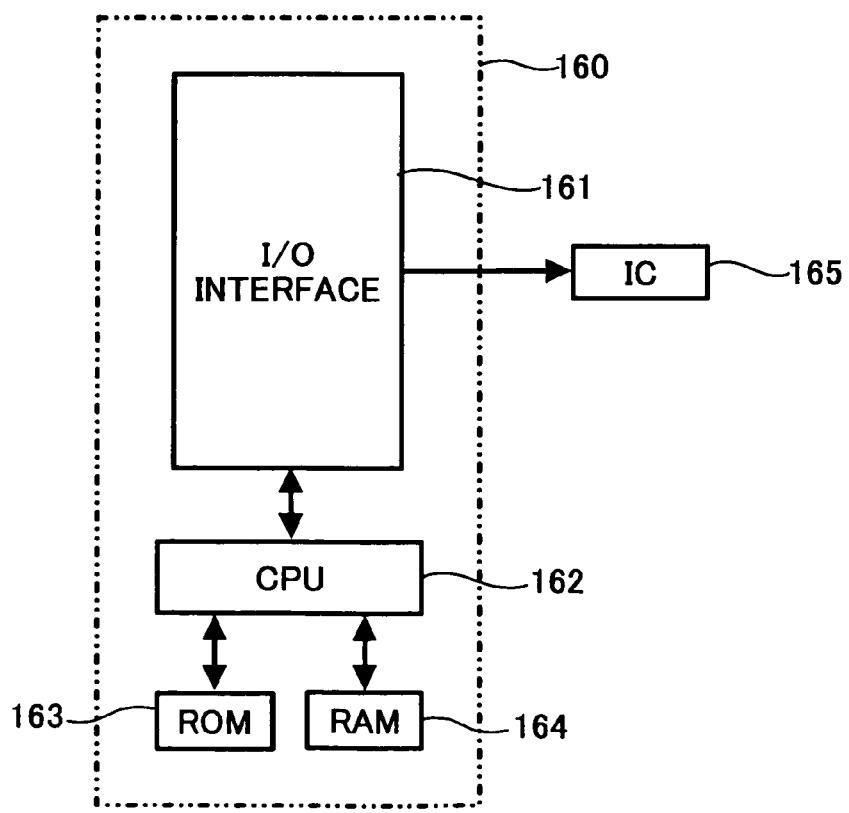
FIG. 101 is a main part block diagram of a computer in which an IC card serving as the recording medium is usable.

As shown in FIG. 101, an IC card 165 serving as a recording medium may be connected to a computer 106 serving as the control means to execute the programs for the method of controlling a position of a rotating body.

The computer 160 has an I/O interface 161, a CPU 162, a ROM 163, and a RAM 164. Programs for controlling a position of a rotating body for executing the method of controlling a position of a rotating body explained in the embodiments are recorded in the IC card 165.

When the IC card 165 is connected, the CPU 162 of the computer 160 accesses the IC card 165, reads the programs for controlling a position of a rotating body stored in the IC card 165, and executes any one of the programs for controlling a position of a rotating body as required.

It is also possible to rewrite the programs stored in the ROM 163 with the programs read from the IC card 165. In this case, the ROM 163 is constituted by an electrically erasable/rewritable element like a flash memory.

It is also possible to prepare a ROM in which the programs as described above are recorded and replace the already mounted ROM 163 with the ROM.

Figure 102:
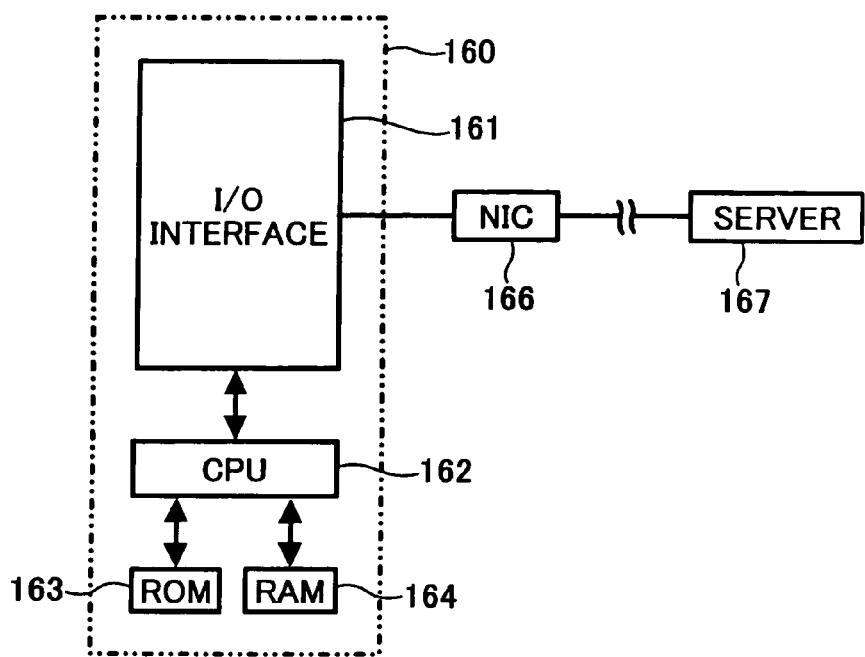
FIG. 102 is a main part block diagram of an image forming apparatus of a system for fetching a computer program (hereinafter, "program") from a network according to a forty-first embodiment of the invention.

A forty-first embodiment of the invention will be explained with reference to FIG. 102.

In this embodiment, the computer 160 actuating an apparatus is connected to a communication network via a network interface card (NIC) 166. The CPU 162 accesses a server 167 on a side supplying a program for controlling a position of a rotating body, downloads the program for controlling a position for a rotating body recorded in a hard disk or the like in the server 167, and rewrites a program stored in the ROM 163. Consequently, it is possible to give the above-mentioned function for controlling a position of a rotating body to an existing image forming apparatus easily.

Figure 103:
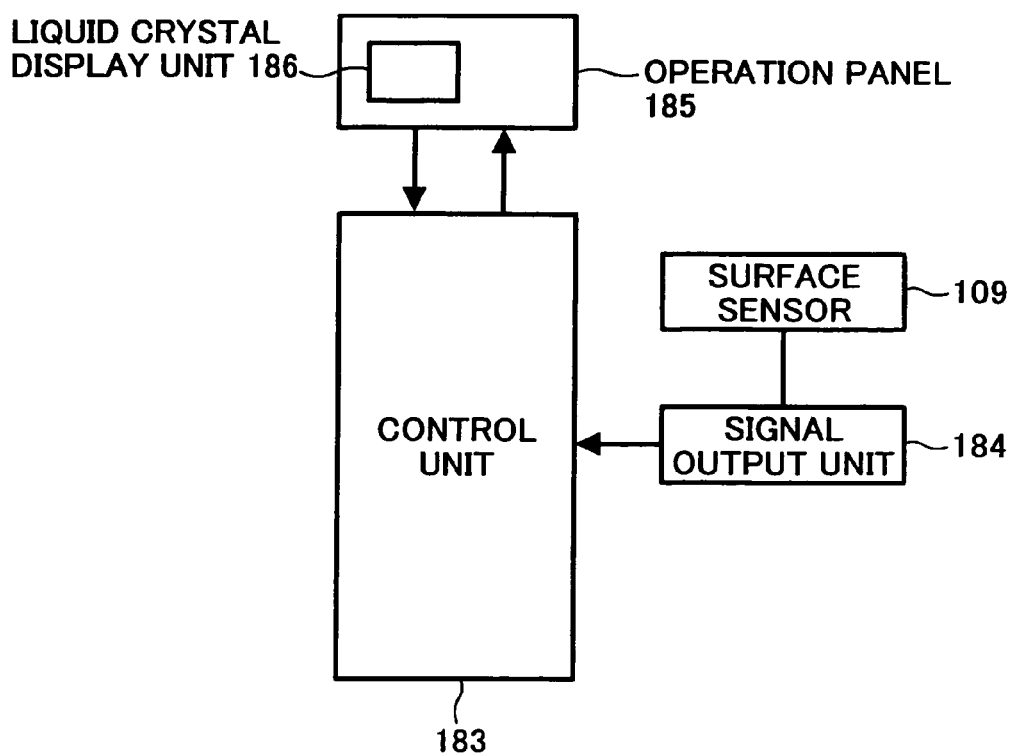
FIG. 103 is a main part block diagram of an image forming apparatus including a display apparatus according to the forty-first embodiment.

A forty-second embodiment of the invention will be explained with reference to FIG. 103.

This embodiment is characterized in that a user is notified of failure or failure in the past of a unit 109 that reads a signal like a scale pulse (the surface sensor 2109 in FIG. 14, the surface sensor 3109 in FIG. 38, etc.) in the image forming apparatus or the image reading apparatus described above.

A user (operator) uses a not-shown apparatus body for outputting or reading an image. At this point, the user checks whether an output from the surface sensor 109, which always reads a scale (2108 in FIG. 14, 3108 in FIG. 38, etc.) on a belt or a drum, is abnormal. In the apparatus body, a signal output unit 184 outputs a signal representing a state of the surface sensor 109.

A control unit 183 serving as an abnormality detecting unit (equivalent to the microcomputer 135 and the computer 160) receives a signal from the signal output unit 184. The control unit 183 judges a state of the surface sensor 109 from information on whether an abnormal signal is received or a signal is not received normally. When abnormality has occurred, the control unit 183 informs an operation panel 185 serving as a display device (error display device) of the occurrence of abnormality. When the operation panel 185 is informed of the occurrence of abnormality, the operation panel 185 indicates the occurrence of abnormality on a liquid crystal display unit 186 serving as a display.

Even when abnormality has occurred in the surface sensor 109 but the surface sensor 109 has revived because of some situation, the operation panel 185 indicates the occurrence of abnormality in the past on the liquid crystal display unit 186, whereby it is possible to inform a user of the occurrence of abnormality in the past. Consequently, the user can recognize that a situation unmeasurable by the surface sensor 109 could occur and, when the surface sensor 109 actually breaks down, can cope with the failure calmly and accurately.

In this case, indication of occurrence of abnormality at present and indication of occurrence of abnormality in the past may be performed by different methods. Other than indicting occurrence of abnormality on the liquid crystal display unit 186, the occurrence of abnormality may be notified to the user using voice or the like.

Moreover, a signal for exclusive use by a maintenance personnel may be used without notifying the user of occurrence of abnormality or occurrence of abnormality in the past in the surface sensor 109. In the case of the signal for exclusive use by a maintenance personnel, for example, a display may be provided inside the apparatus body without indicating the occurrence of abnormality on the liquid crystal display unit 186. Alternatively, when the apparatus is connected to a network, the occurrence of abnormality may be sent to a management section, which performs maintenance, through the network.

In the respective embodiments, control signals are two kinds of signals, namely, a first signal obtained from a belt or a drum itself and a second signal obtained from a motor shaft or a shaft following the motor shaft, or a shaft supporting the belt (including a drive shaft). However, control signals may be three or more kinds of signals.

The embodiments of the invention have been explained. However, the invention is not limited to the embodiments, and various alterations are possible within a range not departing from the gist of the invention.

The invention can also be applied to a drive device for a photosensitive drum, a transfer drum, a photosensitive belt, an intermediate transfer belt, or a sheet conveying belt, an image reading apparatus, a machine tool, a measurement apparatus, and the like.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A position control method for feedback-controlling displacement in a rotating direction of a rotating body, which is driven to rotate by a drive source, comprising:
    reading a signal generated according to rotation of the rotating body; and
    when a signal amount read in sampling time is outside a range compared with a defined signal amount, performing correction processing for a feedback signal using a signal amount other than the signal amount outside the range.

2. The position control method according to claim 1, wherein the defined signal amount is set taking into account a variation width that could occur due to usual disturbance.

3. The position control method according to claim 1, wherein, as the correction processing, the defined signal amount is used instead of the signal amount read in sampling time.

4. The position control method according to claim 1, wherein, as the correction processing, a signal amount measured before present sampling time is used instead of the signal amount read in sampling time.

5. The position control method according to claim 1, wherein, as the correction processing, an average value of signal amounts measured before present sampling time is used instead of the signal amount read in sampling time.

6. The position control method according to claim 1, wherein, as the correction processing, a signal amount, which is measured in a time section before present sampling time and calculated from velocity of the rotating body, is used instead of the signal amount read in sampling time.

7. The position control method according to claim 1, wherein a value of deviation between a reference signal and a feedback signal in the feedback control is set to zero while the correction processing is performed.

8. A position control method for feedback-controlling displacement in a rotating direction of a rotating body, which is driven to rotate by a drive source, comprising:
    reading a scale pulse generated based on a scale provided in the rotating body; and
    when a scale pulse number read in sampling time is outside a range compared with a defined scale pulse number, performing correction processing for a feedback signal using a scale pulse number other than the scale pulse number outside the range.

9. The position control method according to claim 8, wherein the defined scale pulse number is set taking into account a variation width that could occur due to usual disturbance.

10. The position control method according to claim 8, wherein at least one discontinuous part including a scale interval outside a predetermined range is present in the scale.

11. The position control method according to claim 8, wherein, as the correction processing, the defined scale pulse number is used instead of the scale pulse number read in sampling time.

12. The position control method according to claim 8, wherein, as the correction processing, a scale pulse number measured before present sampling time is used instead of the scale pulse number read in sampling time.

13. The position control method according to claim 8, wherein, as the correction processing, an average value of scale pulse numbers measured before present sampling time is used instead of the scale pulse number read in sampling time.

14. The position control method according to claim 8, wherein, as the correction processing, a scale pulse number, which is measured in a time section before present sampling time and calculated from velocity of the rotating body, is used instead of the scale pulse number read in sampling time.

15. A position control device that controls a position of a rotating body, comprising:
    a signal generating unit that is provided in a rotating body driven to rotate by a drive source, which operates in response to a control signal, and generates a signal for detecting displacement in a rotating direction of the rotating body; and
    a control unit that reads the signal generated by the signal generating unit, feedbacks the signal, calculates a deviation between present displacement and a target displacement, and outputs the control signal anew, wherein
    when a signal amount read in sampling time is outside a range compared with a defined signal amount, the control unit performs correction processing for a feedback signal using a signal amount other than the signal amount outside the range.

16. The position control device according to claim 15, wherein the defined signal amount is set taking into account a variation width that could occur due to usual disturbance.

17. The position control device according to claim 15, wherein, as the correction processing, the control unit uses the defined signal amount instead of the signal amount read in sampling time.

18. The position control device according to claim 15, wherein, as the correction processing, the control unit uses a signal amount measured before present sampling time instead of the signal amount read in sampling time.

19. The position control device according to claim 15, wherein, as the correction processing, the control unit uses an average value of signal amounts measured before present sampling time instead of the signal amount read in sampling time.

20. The position control device according to claim 15, wherein, as the correction processing, the control unit uses a signal amount, which is measured in a time section before present sampling time and calculated from velocity of the rotating body, instead of the signal amount read in sampling time.

21. The position control device according to claim 15, wherein the control unit sets a value of the deviation to zero while the control unit performs the correction processing.

22. A position control device that controls a position of a rotating body, comprising:
a scale that is provided in a rotating body driven to rotate by a drive source, which operates in response to a control signal;
a scale pulse generating unit that generates a pulse for detecting displacement in a rotating direction of the rotating body based on the scale; and
a control unit that reads a scale pulse generated by the scale pulse generating unit, feedbacks the scale pulse, calculates a deviation between present displacement and target displacement, and outputs the control signal anew, wherein
when a scale pulse number read in sampling time is outside a range compared with a defined scale pulse number, the control unit performs correction processing for a feedback signal using a scale pulse number other than the scale pulse number outside the range.

23. The position control device according to claim 22, wherein the defined scale pulse number is set taking into account a variation width that could occur due to usual disturbance.

24. The position control device according to claim 22, wherein at least one discontinuous part including a scale interval outside a predetermined range is present in the scale.

25. The position control device according to claim 22, wherein, as the correction processing, the control unit uses the defined scale pulse number instead of the scale pulse number read in sampling time.

26. The position control device according to claim 22, wherein, as the correction processing, the control unit uses a scale pulse number measured before present sampling time instead of the scale pulse number read in sampling time.

27. The position control device according to claim 22, wherein, as the correction processing, the control unit uses an average value of scale pulse numbers measured before present sampling time instead of the scale pulse number read in sampling time.

28. The position control device according to claim 22, wherein, as the correction processing, the control unit uses a scale pulse number, which is measured in a time section before present sampling time and calculated from velocity of the rotating body, instead of the scale pulse number read in sampling time.

29. An image forming apparatus comprising:
an image bearing member on which an image is formed; and
a position control device that controls a position of a rotating body that drive controls the image bearing member and includes
a signal generating unit that is provided in a rotating body driven to rotate by a drive source, which operates in response to a control signal, and generates a signal for detecting displacement in a rotating direction of the rotating body; and
a control unit that reads the signal generated by the signal generating unit, feedbacks the signal, calculates a deviation between present displacement and a target displacement, and outputs the control signal anew, wherein
when a signal amount read in sampling time is outside a range compared with a defined signal amount, the control unit performs correction processing for a feedback signal using a signal amount other than the signal amount outside the range.

30. The image forming apparatus according to claim 29, wherein the image bearing member is a photosensitive drum.

31. The image forming apparatus according to claim 29, wherein the image bearing member is a transfer drum.

32. The image forming apparatus according to claim 29, wherein the image bearing member is a photosensitive belt.

33. The image forming apparatus according to claim 29, wherein the image bearing member is an intermediate transfer belt.

34. The image forming apparatus according to claim 29, wherein the image bearing member is a direct transfer belt.

35. The image forming apparatus according to claim 29, further comprising a recording medium that is detachably connected to a control unit actuating the apparatus and in which a computer program for controlling a rotating body is recorded, wherein
position control for the image bearing member is performed by the computer program for a rotating body recorded in the recording medium.

36. The image forming apparatus according to claim 29, wherein a control unit actuating the apparatus is provided to be connectable to a communication network, and
position control for the image bearing member is performed by the computer program for controlling a rotating body captured from a server on the communication network.

37. An image forming apparatus comprising:
an image bearing member on which an image is formed; and
a position control device that drive controls the image bearing member and includes
a scale that is provided in a rotating body driven to rotate by a drive source, which operates in response to a control signal;
a scale pulse generating unit that generates a pulse for detecting displacement in a rotating direction of the rotating body based on the scale; and
a control unit that reads a scale pulse generated by the scale pulse generating unit, feedbacks the scale pulse, calculates a deviation between present displacement and target displacement, and outputs the control signal anew, wherein
when a scale pulse number read in sampling time is outside a range compared with a defined scale pulse number, the control unit performs correction processing for a feedback signal using a scale pulse number other than the scale pulse number outside the range.

38. The image forming apparatus according to claim 37, wherein the image bearing member is a photosensitive drum.

39. The image forming apparatus according to claim 37, wherein the image bearing member is a transfer drum.

40. The image forming apparatus according to claim 37, wherein the image bearing member is a photosensitive belt.

41. The image forming apparatus according to claim 37, wherein the image bearing member is an intermediate transfer belt.

42. The image forming apparatus according to claim 37, wherein the image bearing member is a direct transfer belt.

43. The image forming apparatus according to claim 37, further comprising a recording medium that is detachably connected to a control unit actuating the apparatus and in which a computer program for controlling a rotating body is recorded, wherein
position control for the image bearing member is performed by the computer program for a rotating body recorded in the recording medium.

44. The image forming apparatus according to claim 37, wherein a control unit actuating the apparatus is provided to be connectable to a communication network, and
position control for the image bearing member is performed by the computer program for controlling a rotating body captured from a server on the communication network.

45. An image forming apparatus comprising:
a plurality of image bearing members on which a color image is formed; and
a position control device that controls a position of a rotating body that drive controls at least one of the image bearing members and includes
a signal generating unit that is provided in a rotating body driven to rotate by a drive source, which operates in response to a control signal, and generates a signal for detecting displacement in a rotating direction of the rotating body; and
a control unit that reads the signal generated by the signal generating unit, feedbacks the signal, calculates a deviation between present displacement and a target displacement, and outputs the control signal anew, wherein
when a signal amount read in sampling time is outside a range compared with a defined signal amount, the control unit performs correction processing for a feedback signal using a signal amount other than the signal amount outside the range.

46. The image forming apparatus according to claim 45, further comprising a recording medium that is detachably connected to a control unit actuating the apparatus and in which a computer program for controlling a rotating body is recorded, wherein
position control for the image bearing member is performed by the computer program for a rotating body recorded in the recording medium.

47. The image forming apparatus according to claim 45, wherein a control unit actuating the apparatus is provided to be connectable to a communication network, and
position control for the image bearing member is performed by the computer program for controlling a rotating body captured from a server on the communication network.

48. An image forming apparatus comprising:
a plurality of image bearing members on which a color image is formed; and
a position control device that drive controls at least one of the image bearing members and includes
a scale that is provided in a rotating body driven to rotate by a drive source, which operates in response to a control signal;
a scale pulse generating unit that generates a pulse for detecting displacement in a rotating direction of the rotating body based on the scale; and
a control unit that reads a scale pulse generated by the scale pulse generating unit, feedbacks the scale pulse, calculates a deviation between present displacement and target displacement, and outputs the control signal anew, wherein
when a scale pulse number read in sampling time is outside a range compared with a defined scale pulse number, the control unit performs correction processing for a feedback signal using a scale pulse number other than the scale pulse number outside the range.

49. The image forming apparatus according to claim 48, further comprising a recording medium that is detachably connected to a control unit actuating the apparatus and in which a computer program for controlling a rotating body is recorded, wherein
position control for the image bearing member is performed by the computer program for a rotating body recorded in the recording medium.

50. The image forming apparatus according to claim 48, wherein a control unit actuating the apparatus is provided to be connectable to a communication network, and
position control for the image bearing member is performed by the computer program for controlling a rotating body captured from a server on the communication network.

51. An image reading apparatus comprising:
a traveling body drive device that reads an image; and
a position control device that controls a position of a rotating body that drive controls the traveling body drive device and includes
a signal generating unit that is provided in a rotating body driven to rotate by a drive source, which operates in response to a control signal, and generates a signal for detecting displacement in a rotating direction of the rotating body; and
a control unit that reads the signal generated by the signal generating unit, feedbacks the signal, calculates a deviation between present displacement and a target displacement, and outputs the control signal anew, wherein
when a signal amount read in sampling time is outside a range compared with a defined signal amount, the control unit performs correction processing for a feedback signal using a signal amount other than the signal amount outside the range.

52. An image reading apparatus comprising:
a traveling body drive device that reads an image; and
a position control device that drive controls the traveling body drive device and includes
a scale that is provided in a rotating body driven to rotate by a drive source, which operates in response to a control signal;
a scale pulse generating unit that generates a pulse for detecting displacement in a rotating direction of the rotating body based on the scale; and
a control unit that reads a scale pulse generated by the scale pulse generating unit, feedbacks the scale pulse, calculates a deviation between present displacement and target displacement, and outputs the control signal anew, wherein
when a scale pulse number read in sampling time is outside a range compared with a defined scale pulse number, the control unit performs correction processing for a feedback signal using a scale pulse number other than the scale pulse number outside the range.

53. A computer readable recording medium with a computer program stored therein that causes a computer to perform a position control method for feedback-controlling displacement in a rotating direction of a rotating body, which is driven to rotate by a drive source, by reading a signal generated according to rotation of the rotating body, wherein when a signal amount read in sampling time is outside a range compared with a defined signal amount, correction processing for a feedback signal is performed using a signal amount other than the signal amount outside the range.

54. A computer readable recording medium with a computer program stored therein that causes a computer to perform a position control method for feedback-controlling displacement in a rotating direction of a rotating body, which is driven to rotate by a drive source, by reading a scale pulse generated based on a scale provided in the rotating body, wherein
when a scale pulse number read in sampling time is outside a range compared with a defined scale pulse number, correction processing for a feedback signal is performed using a scale pulse number other than the scale pulse number outside the range.

55. A position control method for controlling displacement in a rotating direction of a rotating body, which is driven to rotate by a drive source, comprising:
reading a first signal generated by rotation of the rotating body and a second signal generated by rotation of a shaft of the drive source of the rotating body; and
selecting between the first signal and the second signal as a control signal to control the rotation of the rotating body based upon predetermined factors.

56. The position control method according to claim 55, wherein, when control is performed based on the second signal, in switching the control to control based on the first signal at arbitrary time, the control based on the second signal is continued when the first signal cannot be read.

57. The position control method according to claim 55, wherein the control based on the second signal is performed from a state in which the rotating body is stopped until the rotating body reaches steady drive, and the control is switched to control based on the first signal after the rotating body reaches the steady drive.

58. The position control method according to claim 55, wherein, when control is performed based on the first signal, the control is switched to control based on the second signal when the first signal cannot be read.

59. The position control method according to claim 55, wherein, when the first signal cannot be read and control is performed based on the second signal, the control is switched to control based on the first signal when it becomes possible to read the first signal.

60. The position control method according to claim 55, wherein, when a breaking part where the first signal breaks is present and control is performed based on the first signal, the control is switched to control based on the second signal in the breaking part, and the control is switched to the control based on the first signal again when the rotating body has passed the breaking part.

61. The position control method according to claim 56, wherein, when there is abnormality in a unit that reads the first signal, the unit outputs a signal informing the abnormality to a control side.

62. The position control method according to claim 58, wherein, when there is abnormality in a unit that reads the first signal, the unit outputs a signal informing the abnormality to a control side.

63. The position control method according to claim 59, wherein, when there is abnormality in a unit that reads the first signal, the unit outputs a signal informing the abnormality to a control side.

64. The position control method according to claim 56, wherein, when a normal signal is not recognized on a control side in an arbitrary time section with respect to a signal from a unit that reads the first signal, the control side outputs a control signal equivalent to the first signal.

65. The position control method according to claim 58, wherein, when a normal signal is not recognized on a control side in an arbitrary time section with respect to a signal from a unit that reads the first signal, the control side outputs a control signal equivalent to the first signal.

66. The position control method according to claim 59, wherein, when a normal signal is not recognized on a control side in an arbitrary time section with respect to a signal from a unit that reads the first signal, the control side outputs a control signal equivalent to the first signal.

67. The position control method according to claim 55, wherein, in switching a control signal, the switching is performed after applying correction processing equivalent to a difference between a position, which is obtained from control signal to be used after the switching, and a target position to the control signal to be used after the switching.

68. The position control method according to claim 55, wherein, in switching a control signal, the switching is performed after applying correction processing equivalent to a difference between a position, which is obtained from control signal to be used after the switching, and a position, which is obtained from a control signal used before the switching, to the control signal to be used after the switching.

69. The position control method according to claim 55, wherein the first signal is a scale pulse based on a scale provided in the rotating body, and the second signal is a signal from an encoder provided in a shaft of the rotating body.

70. A position control device that controls a position of a rotating body, comprising:
a first signal generating unit that is provided with a rotating body driven to rotate by a drive source and generates a first signal for detecting displacement in a rotating direction of the rotating body;
a second signal generating unit that is provided with a shaft of the drive source of the rotating body and generates a second signal for detecting displacement in a rotating direction of the shaft; and
a control unit that controls the drive source based on the first signal generated by the first signal generating unit or the second signal generated by the second signal generating unit, wherein
the control unit selects between the first signal and the second signal as a control signal to control the position of the rotating body based upon predetermined factors.

71. The position control device according to claim 70, wherein, when control is performed based on the second signal, in switching the control to control based on the first signal at arbitrary time, the control unit continues the control based on the second signal when the first signal cannot be read.

72. The position control device according to claim 70, wherein the control based on the second signal is performed from a state in which the rotating body is stopped until the rotating body reaches steady drive, and the control is switched to control based on the first signal after the rotating body reaches the steady drive.

73. The position control device according to claim 70, wherein, when control is performed based on the first signal, the control is switched to control based on the second signal when the first signal cannot be read.

74. The position control device according to claim 70, wherein, when the first signal cannot be read and control is performed based on the second signal, the control is switched to control based on the first signal when it becomes possible to read the first signal.

75. The position control device according to claim 70, wherein, when a breaking part where the first signal breaks is present and control is performed based on the first signal, the control is switched to control based on the second signal in the breaking part, and the control is switched to the control based on the first signal again when the rotating body has passed the breaking part.

76. The position control device according to claim 71, wherein, when there is abnormality in a unit that reads the first signal, the unit outputs a signal informing the abnormality to a control side.

77. The position control device according to claim 73, wherein, when there is abnormality in a unit that reads the first signal, the unit outputs a signal informing the abnormality to a control side.

78. The position control device according to claim 74, wherein, when there is abnormality in a unit that reads the first signal, the unit outputs a signal informing the abnormality to a control side.

79. The position control device according to claim 71, wherein, when a normal signal is not recognized on a control side in an arbitrary time section with respect to a signal from a unit that reads the first signal, the control side outputs a control signal equivalent to the first signal.

80. The position control device according to claim 73, wherein, when a normal signal is not recognized on a control side in an arbitrary time section with respect to a signal from a unit that reads the first signal, the control side outputs a control signal equivalent to the first signal.

81. The position control device according to claim 74, wherein, when a normal signal is not recognized on a control side in an arbitrary time section with respect to a signal from a unit that reads the first signal, the control side outputs a control signal equivalent to the first signal.

82. The position control device according to claim 70, wherein, in switching a control signal, the switching is performed after applying correction processing equivalent to a difference between a position, which is obtained from control signal to be used after the switching, and a target position to the control signal to be used after the switching.

83. The position control device according to claim 70, wherein, in switching a control signal, the switching is performed after applying correction processing equivalent to a difference between a position, which is obtained from control signal to be used after the switching, and a position, which is obtained from a control signal used before the switching, to the control signal to be used after the switching.

84. The position control device according to claim 70, wherein
the first signal generating unit includes a scale provided in the rotating body and a reflective photo-sensor that reads the scale,
the first signal is a scale pulse,
the second signal generating unit includes an encoder provided in a shaft of the rotating body, and
the second signal is a signal from the encoder.

85. An image forming apparatus comprising:
an image bearing member on which an image is formed; and
a position control device that drive controls the image bearing member and includes
a first signal generating unit that is provided with a rotating body driven to rotate by a drive source and generates a first signal for detecting displacement in a rotating direction of the rotating body;
a second signal generating unit that is provided with a shaft of the drive source of the rotating body and generates a second signal for detecting displacement in a rotating direction of the shaft; and
a control unit that controls the drive source based on the first signal generated by the first signal generating unit or the second signal generated by the second signal generating unit, wherein
the control unit selects between the first signal and the second signal as a control signal to control the position of the rotating body based upon predetermined factors.

86. The image forming apparatus according to claim 85, wherein the image bearing member is a photosensitive drum.

87. The image forming apparatus according to claim 85, wherein the image bearing member is a photosensitive belt.

88. The image forming apparatus according to claim 85, wherein the image bearing member is a transfer drum.

89. The image forming apparatus according to claim 85, wherein the image bearing member is an intermediate transfer belt.

90. The image forming apparatus according to claim 85, wherein the image bearing member is a direct transfer belt.

91. The image forming apparatus according to claim 85, further comprising a recording medium that is detachably connected to a control unit actuating the apparatus and in which a computer program for controlling a rotating body is recorded, wherein
position control for the image bearing member is performed by the computer program for a rotating body recorded in the recording medium.

92. The image forming apparatus according to claim 85, wherein a control unit actuating the apparatus is provided to be connectable to a communication network, and
position control for the image bearing member is performed by the computer program for controlling the rotating body captured from a server on the communication network.

93. The image forming apparatus according to claim 85, further comprising a display unit that, when the first signal generating unit breaks down, informs a user that the first signal generating unit has broken down.

94. The image forming apparatus according to claim 85, further comprising a display unit that, when the first signal generating unit breaks down and revives thereafter, informs a user that the first signal generating unit has revived.

* * * * *